US012627687B1

(12) United States Patent
Adamson et al.

(10) Patent No.: US 12,627,687 B1
(45) Date of Patent: May 12, 2026

(54) GENERATIVE ARTIFICIAL INTELLIGENCE-BASED MULTI-STAGE COMPOSITE EVENT PROCESSING

(71) Applicant: Lacework, Inc., Mountain View, CA (US)

(72) Inventors: David Nellinger Adamson, Oakland, CA (US); Christopher Hall, Baltimore, MD (US); Njall Skarphedinsson, Redwood City, CA (US); Pamela Bhattacharya, Redmond, WA (US); Aditya Samalla, San Jose, CA (US); Rui Zhang, Brooklyn, NY (US); Jessica Liu, San Francisco, CA (US); Marcos Garcia Marti, Montréal (CA); Sowmya A. Karmali, Tustin, CA (US); Yijou Chen, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 197 days.

(21) Appl. No.: 18/385,069

(22) Filed: Oct. 30, 2023

Related U.S. Application Data

(63) Continuation-in-part of application No. 18/227,228, filed on Jul. 27, 2023, which is a continuation-in-part
(Continued)

(51) Int. Cl.
    *G06F 7/00*     (2006.01)
    *G06F 9/455*     (2018.01)
    (Continued)

(52) U.S. Cl.
    CPC .......... *H04L 63/1425* (2013.01); *G06F 9/455* (2013.01); *G06F 9/545* (2013.01);
    (Continued)

(58) Field of Classification Search
CPC .. G06F 16/243; G06F 16/285; G06F 16/9038; G06F 16/9535; G06F 16/9558;
(Continued)

(56) References Cited

U.S. PATENT DOCUMENTS 6,347,339 B1   2/2002   Morris et al.
6,363,411 B1   3/2002   Dugan et al.
(Continued)

OTHER PUBLICATIONS

Amidon et al., "Program Fracture and Recombination for Efficient Automatic Code Reuse", 2015 IEEE High Performance Extreme Computing Conference (HPEC), (2015), pp. 1-6, doi: 10.1109/HPEC.2015.7396314.

(Continued)

*Primary Examiner* — Mohammad A Sana
(74) *Attorney, Agent, or Firm* — Jaffery Watson Hamilton & DeSanctis LLP

(57) ABSTRACT

A data platform monitors a compute environment by performing multi-stage heuristic analysis of event data representing a plurality of events occurring within the environment. The platform utilizes multiple event analyzers, each configured according to a distinct analysis heuristic, to evaluate different subsets of the event data and generate corresponding output signals. A higher-level event analyzer applies a further heuristic to the multiple output signals to generate a composite alert signal, indicating whether the combination of analyzed events collectively represents a security intrusion or other anomalous condition of sufficient severity to warrant alerting. Based on the composite alert signal, the platform performs an alert-based operation, such as generating a user-facing alert, initiating an automated mitigation, or updating a contextual model of system behavior. By combining the analytical outputs of heterogeneous heuristics, the disclosed architecture enhances the accuracy
(Continued)

and contextual relevance of automated intrusion detection within complex computing environments.

20 Claims, 63 Drawing Sheets

Related U.S. Application Data of application No. 18/129,243, filed on Mar. 31, 2023, now Pat. No. 12,341,797, which is a continuation-in-part of application No. 18/119,045, filed on Mar. 8, 2023, now Pat. No. 11,882,141, which is a continuation of application No. 17/510,179, filed on Oct. 25, 2021, now Pat. No. 11,637,849, which is a continuation of application No. 16/786,822, filed on Feb. 10, 2020, now Pat. No. 11,157,502, which is a continuation of application No. 16/134,806, filed on Sep. 18, 2018, now Pat. No. 10,614,071.

(60) Provisional application No. 63/466,933, filed on May 16, 2023, provisional application No. 63/400,073, filed on Aug. 23, 2022, provisional application No. 63/394,765, filed on Aug. 3, 2022, provisional application No. 63/351,607, filed on Jun. 13, 2022, provisional application No. 63/333,751, filed on Apr. 22, 2022, provisional application No. 62/650,971, filed on Mar. 30, 2018, provisional application No. 62/590,986, filed on Nov. 27, 2017.

(51) Int. Cl.

| | |
|---|---|
| *G06F 9/54* | (2006.01) |
| *G06F 16/901* | (2019.01) |
| *G06F 16/9038* | (2019.01) |
| *G06F 16/9535* | (2019.01) |
| *G06F 16/9537* | (2019.01) |
| *G06F 21/57* | (2013.01) |
| *H04L 9/40* | (2022.01) |
| *H04L 43/045* | (2022.01) |
| *H04L 43/06* | (2022.01) |
| *H04L 67/306* | (2022.01) |
| *H04L 67/50* | (2022.01) |
| *G06F 16/2455* | (2019.01) |

(52) U.S. Cl.
CPC ...... *G06F 16/9024* (2019.01); *G06F 16/9038* (2019.01); *G06F 16/9535* (2019.01); *G06F 16/9537* (2019.01); *G06F 21/57* (2013.01); *H04L 43/045* (2013.01); *H04L 43/06* (2013.01); *H04L 63/10* (2013.01); *H04L 67/306* (2013.01); *H04L 67/535* (2022.05); *G06F 16/2456* (2019.01)

(58) Field of Classification Search
CPC .......... G06F 16/9537; G06F 16/90332; G06F 16/9044; G06F 16/2456; G06F 16/3326; G06F 16/3349; G06F 16/3344; G06F 16/24545; G06F 9/455; G06F 9/545; G06F 21/6227; G06F 21/554; G06F 21/57; H04L 63/1425; H04L 63/10; H04L 67/306; H04L 67/535; H04L 43/045; H04L 43/06
See application file for complete search history.

(56) References Cited

U.S. PATENT DOCUMENTS

| | | | |
|---|---|---|---|
| 6,434,663 | B1 | 8/2002 | Grimsrud et al. |
| 6,938,084 | B2 | 8/2005 | Gamache et al. |
| 7,054,873 | B2 | 5/2006 | Nordström et al. |
| 7,233,333 | B2 | 6/2007 | Lomask |
| 7,310,733 | B1 | 12/2007 | Pearson et al. |
| 7,478,246 | B2 | 1/2009 | Arndt et al. |
| 7,484,091 | B2 | 1/2009 | Bade et al. |
| 7,526,501 | B2 | 4/2009 | Albahari et al. |
| 7,529,801 | B2 | 5/2009 | Moore et al. |
| 7,562,045 | B2 | 7/2009 | Beadle et al. |
| 7,707,411 | B2 | 4/2010 | Bade et al. |
| 7,739,211 | B2 | 6/2010 | Coffman et al. |
| 7,743,153 | B2 | 6/2010 | Hall et al. |
| 7,747,559 | B2 | 6/2010 | Leitner et al. |
| 7,765,431 | B2 | 7/2010 | Agha et al. |
| 7,797,548 | B2 | 9/2010 | Pearson et al. |
| 7,856,544 | B2 | 12/2010 | Schenfeld et al. |
| 7,926,026 | B2 | 4/2011 | Klein et al. |
| 7,962,635 | B2 | 6/2011 | Naidu et al. |
| 7,996,885 | B2 | 8/2011 | Jaiswal et al. |
| 8,032,925 | B2 | 10/2011 | Cho |
| 8,037,284 | B2 | 10/2011 | Schenfeld et al. |
| 8,037,521 | B2 | 10/2011 | Minato |
| 8,050,907 | B2 | 11/2011 | Baisley et al. |
| 8,086,852 | B2 | 12/2011 | Bade et al. |
| 8,140,977 | B2 | 3/2012 | Kriss et al. |
| 8,151,107 | B2 | 4/2012 | Song et al. |
| 8,160,999 | B2 | 4/2012 | Jin et al. |
| 8,209,204 | B2 | 6/2012 | Adler et al. |
| 8,276,197 | B1 | 9/2012 | Mangal et al. |
| 8,291,233 | B2 | 10/2012 | Pearson et al. |
| 8,301,660 | B2 | 10/2012 | Yalamanchi |
| 8,341,711 | B1 | 12/2012 | Pennington et al. |
| 8,351,456 | B2 | 1/2013 | Kadous et al. |
| 8,352,589 | B2 | 1/2013 | Ridel et al. |
| 8,359,584 | B2 | 1/2013 | Rao et al. |
| 8,490,055 | B2 | 7/2013 | Basak |
| 8,497,863 | B2 | 7/2013 | Xie et al. |
| 8,549,002 | B2 | 10/2013 | Herter et al. |
| 8,561,157 | B2 | 10/2013 | Ge |
| 8,595,262 | B1 | 11/2013 | Hayden |
| 8,607,306 | B1 | 12/2013 | Bridge et al. |
| 8,655,989 | B2 | 2/2014 | Ritter et al. |
| 8,725,587 | B2 | 5/2014 | Beadle et al. |
| 8,779,921 | B1* | 7/2014 | Curtiss ................. G08B 25/009 340/541 |
| 8,826,403 | B2 | 9/2014 | Bhaskaran et al. |
| 8,843,646 | B2 | 9/2014 | Kuzin et al. |
| 8,959,608 | B2 | 2/2015 | Ahmed et al. |
| 9,043,764 | B2 | 5/2015 | Ranganathan et al. |
| 9,053,306 | B2 | 6/2015 | Yoshigaki et al. |
| 9,053,437 | B2 | 6/2015 | Adler et al. |
| 9,064,210 | B1 | 6/2015 | Hart |
| 9,075,618 | B2 | 7/2015 | Winternitz et al. |
| 9,110,873 | B2 | 8/2015 | Woodall et al. |
| 9,159,024 | B2 | 10/2015 | Bhanot et al. |
| 9,189,623 | B1 | 11/2015 | Lin et al. |
| 9,225,730 | B1 | 12/2015 | Brezinski |
| 9,231,935 | B1 | 1/2016 | Bridge et al. |
| 9,239,873 | B2 | 1/2016 | Branch et al. |
| 9,246,897 | B2 | 1/2016 | He |
| 9,323,806 | B2 | 4/2016 | Sadikov et al. |
| 9,369,450 | B1 | 6/2016 | Barak et al. |
| 9,391,978 | B2 | 7/2016 | Burch et al. |
| 9,400,882 | B2 | 7/2016 | Pearson et al. |
| 9,430,830 | B2 | 8/2016 | Madabhushi et al. |
| 9,495,522 | B2 | 11/2016 | Singh et al. |
| 9,497,224 | B2 | 11/2016 | Sweet et al. |
| 9,537,851 | B2 | 1/2017 | Gordon et al. |
| 9,569,869 | B2 | 2/2017 | Hesse et al. |
| 9,582,766 | B2 | 2/2017 | Sadikov et al. |
| 9,589,069 | B2 | 3/2017 | Yang et al. |
| 9,591,010 | B1 | 3/2017 | Muddu et al. |
| 9,596,254 | B1 | 3/2017 | Muddu et al. |
| 9,596,295 | B2 | 3/2017 | Banadaki et al. |
| 9,600,915 | B2 | 3/2017 | Winternitz et al. |
| 9,602,506 | B2 | 3/2017 | Kang et al. |
| 9,602,526 | B2 | 3/2017 | Liu et al. |
| 9,639,676 | B2 | 5/2017 | Betz et al. |
| 9,652,875 | B2 | 5/2017 | Vassilvitskii et al. |
| 9,659,337 | B2 | 5/2017 | Lee et al. |

(56) References Cited

U.S. PATENT DOCUMENTS

| | | | |
|---|---|---|---|
| 9,665,660 B2 | 5/2017 | Wensel | |
| 9,667,641 B2 | 5/2017 | Muddu et al. | |
| 9,679,243 B2 | 6/2017 | Zou et al. | |
| 9,699,205 B2 | 7/2017 | Muddu et al. | |
| 9,710,332 B1 | 7/2017 | Fan et al. | |
| 9,720,703 B2 | 8/2017 | Reick et al. | |
| 9,720,704 B2 | 8/2017 | Reick et al. | |
| 9,727,441 B2 | 8/2017 | Agarwal et al. | |
| 9,727,604 B2 | 8/2017 | Jin et al. | |
| 9,729,416 B1 | 8/2017 | Khanal et al. | |
| 9,740,744 B2 | 8/2017 | Stetson et al. | |
| 9,741,138 B2 | 8/2017 | Friedlander et al. | |
| 9,753,960 B1 | 9/2017 | Troyanovsky | |
| 9,760,619 B1 | 9/2017 | Lattanzi et al. | |
| 9,781,115 B2 | 10/2017 | Heise | |
| 9,787,705 B1 | 10/2017 | Love et al. | |
| 9,805,080 B2 | 10/2017 | Joshi et al. | |
| 9,805,140 B2 | 10/2017 | Chakrabarti et al. | |
| 9,811,790 B2 | 11/2017 | Ahern et al. | |
| 9,813,435 B2 | 11/2017 | Muddu et al. | |
| 9,819,671 B2 | 11/2017 | Ji | |
| 9,824,473 B2 | 11/2017 | Winternitz et al. | |
| 9,830,435 B2 | 11/2017 | Haven | |
| 9,836,183 B1 | 12/2017 | Love et al. | |
| 9,838,410 B2 | 12/2017 | Muddu et al. | |
| 9,843,837 B2 | 12/2017 | Gopalan | |
| 9,852,230 B2 | 12/2017 | Fleury et al. | |
| 9,864,672 B2 | 1/2018 | Seto et al. | |
| 9,887,999 B2 | 2/2018 | Dong et al. | |
| 9,923,911 B2 | 3/2018 | Vasseur et al. | |
| 9,942,220 B2 | 4/2018 | Bajenov et al. | |
| 9,946,800 B2 | 4/2018 | Qian et al. | |
| 9,954,842 B2 | 4/2018 | Huang | |
| 9,985,827 B2 | 5/2018 | Li | |
| 10,003,605 B2 | 6/2018 | Muddu et al. | |
| 10,104,071 B2 | 10/2018 | Gordon et al. | |
| 10,116,670 B2 | 10/2018 | Muddu et al. | |
| 10,121,000 B1 | 11/2018 | Rivlin et al. | |
| 10,122,740 B1 | 11/2018 | Finkelshtein et al. | |
| 10,148,677 B2 | 12/2018 | Muddu et al. | |
| 10,149,148 B2 | 12/2018 | Zha et al. | |
| 10,158,652 B2 | 12/2018 | Muddu et al. | |
| 10,182,058 B2 | 1/2019 | Xu | |
| 10,205,735 B2 | 2/2019 | Apostolopoulos | |
| 10,237,254 B2 | 3/2019 | McDowell et al. | |
| 10,237,294 B1 | 3/2019 | Zadeh et al. | |
| 10,243,970 B2 | 3/2019 | Muddu et al. | |
| 10,249,266 B2 | 4/2019 | Zamir | |
| 10,254,848 B2 | 4/2019 | Winternitz et al. | |
| 10,331,659 B2 | 6/2019 | Ahuja et al. | |
| 10,338,895 B2 | 7/2019 | Zhang et al. | |
| 10,339,309 B1 | 7/2019 | Kling et al. | |
| 10,367,704 B2 | 7/2019 | Giura et al. | |
| 10,382,303 B2 | 8/2019 | Khanal et al. | |
| 10,382,529 B2 | 8/2019 | Wan et al. | |
| 10,389,738 B2 | 8/2019 | Muddu et al. | |
| 10,404,748 B2 * | 9/2019 | Parthasarathi ...... H04L 63/1408 | |
| 10,419,463 B2 | 9/2019 | Muddu et al. | |
| 10,419,465 B2 | 9/2019 | Muddu et al. | |
| 10,419,468 B2 | 9/2019 | Glatfelter et al. | |
| 10,419,469 B1 | 9/2019 | Singh et al. | |
| 10,425,437 B1 | 9/2019 | Bog et al. | |
| 10,432,639 B1 | 10/2019 | Bebee et al. | |
| 10,447,526 B2 | 10/2019 | Tucker et al. | |
| 10,454,753 B2 | 10/2019 | Sasturkar et al. | |
| 10,454,889 B2 | 10/2019 | Huang | |
| 10,459,979 B2 | 10/2019 | Piechowicz et al. | |
| 10,462,169 B2 | 10/2019 | Durairaj et al. | |
| 10,491,705 B2 | 11/2019 | Oetting et al. | |
| 10,496,263 B2 | 12/2019 | So et al. | |
| 10,496,468 B2 | 12/2019 | Gefen et al. | |
| 10,496,678 B1 | 12/2019 | Tang | |
| 10,505,818 B1 | 12/2019 | Yona et al. | |
| 10,510,007 B2 | 12/2019 | Singhal et al. | |
| 10,515,095 B2 | 12/2019 | Childress et al. | |
| 10,521,584 B1 | 12/2019 | Mehr | |
| 10,534,633 B2 | 1/2020 | Hilemon et al. | |
| 10,565,373 B1 | 2/2020 | Rao et al. | |
| 10,581,891 B1 | 3/2020 | Kapoor et al. | |
| 10,587,609 B2 | 3/2020 | Ebrahimi et al. | |
| 10,592,535 B2 | 3/2020 | Ahn et al. | |
| 10,599,718 B2 | 3/2020 | Kumar et al. | |
| RE47,937 E | 4/2020 | Ramachandran et al. | |
| RE47,952 E | 4/2020 | Ramachandran et al. | |
| 10,614,200 B2 | 4/2020 | Betz et al. | |
| 10,642,867 B2 | 5/2020 | Palanciuc | |
| 10,656,979 B2 | 5/2020 | Ishakian et al. | |
| 10,664,757 B2 | 5/2020 | Lastras-Montano et al. | |
| 10,666,668 B2 | 5/2020 | Muddu et al. | |
| 10,673,880 B1 | 6/2020 | Pratt et al. | |
| 10,685,295 B1 | 6/2020 | Ross et al. | |
| 10,686,829 B2 * | 6/2020 | Amit .................. H04L 63/0245 | |
| 10,693,900 B2 | 6/2020 | Zadeh et al. | |
| 10,698,954 B2 | 6/2020 | Piechowicz et al. | |
| 10,701,051 B2 | 6/2020 | Ohsumi | |
| 10,754,940 B2 | 8/2020 | Ohsumi | |
| 10,756,982 B2 | 8/2020 | Bai et al. | |
| 10,771,488 B2 | 9/2020 | Verma et al. | |
| 10,775,183 B2 | 9/2020 | Ho et al. | |
| 10,776,191 B2 | 9/2020 | Zheng et al. | |
| 10,788,570 B2 | 9/2020 | Wilson | |
| 10,791,131 B2 | 9/2020 | Nor et al. | |
| 10,797,974 B2 | 10/2020 | Giura et al. | |
| 10,812,497 B2 | 10/2020 | Venkatramani et al. | |
| 10,824,675 B2 | 11/2020 | Alonso et al. | |
| 10,824,813 B2 | 11/2020 | Smith et al. | |
| 10,885,452 B1 | 1/2021 | Garg | |
| 10,904,007 B2 | 1/2021 | Kim et al. | |
| 10,904,270 B2 | 1/2021 | Muddu et al. | |
| 10,911,470 B2 | 2/2021 | Muddu et al. | |
| 10,986,114 B1 | 4/2021 | Singh et al. | |
| 11,036,716 B2 | 6/2021 | Griffith et al. | |
| 11,036,800 B1 | 6/2021 | Kayyoor et al. | |
| 11,044,264 B2 | 6/2021 | Durairaj et al. | |
| 11,048,492 B2 | 6/2021 | Jain et al. | |
| 11,082,289 B2 | 8/2021 | Dang et al. | |
| 11,120,343 B2 | 9/2021 | Das et al. | |
| 11,126,533 B2 | 9/2021 | Knowles et al. | |
| 11,194,849 B2 | 12/2021 | Lassoued et al. | |
| 11,212,299 B2 | 12/2021 | Gamble et al. | |
| 11,258,807 B2 | 2/2022 | Muddu et al. | |
| 11,281,519 B2 | 3/2022 | Krishnaswamy et al. | |
| 11,314,789 B2 | 4/2022 | Goldfarb | |
| 11,411,966 B2 | 8/2022 | Muddu et al. | |
| 11,431,735 B2 | 8/2022 | Shua | |
| 11,463,464 B2 | 10/2022 | Zadeh et al. | |
| 11,489,863 B1 | 11/2022 | Shua | |
| 11,494,787 B2 | 11/2022 | Erickson et al. | |
| 11,544,138 B2 | 1/2023 | Kapish et al. | |
| 11,575,693 B1 | 2/2023 | Muddu et al. | |
| 11,606,272 B1 | 3/2023 | Popelka et al. | |
| 11,636,090 B2 | 4/2023 | Li et al. | |
| 11,640,388 B2 | 5/2023 | Yang et al. | |
| 11,647,034 B2 | 5/2023 | Levin et al. | |
| 11,658,990 B2 | 5/2023 | Shapoury | |
| 11,669,571 B2 | 6/2023 | Binkley et al. | |
| 11,693,958 B1 | 7/2023 | Steiman | |
| 11,722,554 B2 | 8/2023 | Keren et al. | |
| 11,734,351 B2 | 8/2023 | Binkley et al. | |
| 11,734,419 B1 | 8/2023 | Mackle | |
| 11,748,473 B2 | 9/2023 | Araujo et al. | |
| 11,755,576 B1 | 9/2023 | Jiang et al. | |
| 11,755,602 B2 | 9/2023 | Smith et al. | |
| 11,769,098 B2 | 9/2023 | Adinarayan et al. | |
| 11,770,387 B1 | 9/2023 | Shivamoggi et al. | |
| 2002/0059531 A1 | 5/2002 | On | |
| 2002/0161889 A1 | 10/2002 | Gamache et al. | |
| 2003/0233361 A1 | 12/2003 | Cady | |
| 2004/0225929 A1 | 11/2004 | Agha et al. | |
| 2005/0060287 A1 | 3/2005 | Hellman et al. | |
| 2005/0102365 A1 | 5/2005 | Moore et al. | |
| 2005/0108142 A1 | 5/2005 | Beadle et al. | |
| 2005/0231760 A1 | 10/2005 | Minato | |
| 2005/0246288 A1 | 11/2005 | Kimura et al. | |

(56) References Cited

U.S. PATENT DOCUMENTS

| | | |
|---|---|---|
| 2005/0246521 A1 | 11/2005 | Bade et al. |
| 2006/0025987 A1 | 2/2006 | Baisley et al. |
| 2006/0026419 A1 | 2/2006 | Arndt et al. |
| 2006/0036896 A1 | 2/2006 | Gamache et al. |
| 2006/0090095 A1 | 4/2006 | Massa et al. |
| 2006/0109271 A1 | 5/2006 | Lomask |
| 2007/0130330 A1 | 6/2007 | Ridel et al. |
| 2007/0162605 A1 | 7/2007 | Chalasani et al. |
| 2007/0162963 A1 | 7/2007 | Penet et al. |
| 2007/0168696 A1 | 7/2007 | Ridel et al. |
| 2007/0169175 A1 | 7/2007 | Hall et al. |
| 2007/0214111 A1 | 9/2007 | Jin et al. |
| 2007/0225956 A1 | 9/2007 | Pratt et al. |
| 2007/0266425 A1 | 11/2007 | Cho |
| 2007/0282916 A1 | 12/2007 | Albahari et al. |
| 2008/0034411 A1 | 2/2008 | Aoyama |
| 2008/0065879 A1 | 3/2008 | Song et al. |
| 2008/0072062 A1 | 3/2008 | Pearson et al. |
| 2008/0109730 A1 | 5/2008 | Coffman et al. |
| 2008/0147707 A1 | 6/2008 | Jin et al. |
| 2008/0155335 A1 | 6/2008 | Klein et al. |
| 2008/0244718 A1 | 10/2008 | Frost et al. |
| 2008/0263643 A1 | 10/2008 | Jaiswal et al. |
| 2008/0270451 A1 | 10/2008 | Thomsen et al. |
| 2009/0006843 A1 | 1/2009 | Bade et al. |
| 2009/0007010 A1 | 1/2009 | Kriss et al. |
| 2009/0063857 A1 | 3/2009 | Bade et al. |
| 2009/0165109 A1 | 6/2009 | Hird |
| 2009/0177573 A1 | 7/2009 | Beadle et al. |
| 2009/0222740 A1 | 9/2009 | Yuan |
| 2009/0287720 A1 | 11/2009 | Herter et al. |
| 2009/0307651 A1 | 12/2009 | Senthil et al. |
| 2009/0327328 A1 | 12/2009 | Woodall et al. |
| 2010/0042823 A1 | 2/2010 | Arndt et al. |
| 2010/0217860 A1 | 8/2010 | Naidu et al. |
| 2010/0309206 A1 | 12/2010 | Xie et al. |
| 2010/0329162 A1 | 12/2010 | Kadous et al. |
| 2011/0023098 A1 | 1/2011 | Pearson et al. |
| 2011/0029952 A1 | 2/2011 | Harrington |
| 2011/0119100 A1 | 5/2011 | Ruhl et al. |
| 2011/0154287 A1 | 6/2011 | Mukkamala et al. |
| 2011/0302631 A1 | 12/2011 | Sureshchandra et al. |
| 2012/0054732 A1 | 3/2012 | Jain et al. |
| 2012/0089875 A1 | 4/2012 | Faust et al. |
| 2012/0102029 A1 | 4/2012 | Larson et al. |
| 2012/0143898 A1 | 6/2012 | Bruno et al. |
| 2012/0158858 A1 | 6/2012 | Gkantsidis et al. |
| 2012/0159333 A1 | 6/2012 | Mital et al. |
| 2012/0173541 A1 | 7/2012 | Venkataramani |
| 2012/0317149 A1 | 12/2012 | Jagota et al. |
| 2013/0024412 A1 | 1/2013 | Gong et al. |
| 2013/0067100 A1 | 3/2013 | Kuzin et al. |
| 2013/0081118 A1 | 3/2013 | Ge |
| 2013/0086667 A1 | 4/2013 | Haven |
| 2013/0097320 A1 | 4/2013 | Ritter et al. |
| 2013/0151453 A1 | 6/2013 | Bhanot et al. |
| 2013/0173915 A1 | 7/2013 | Haulund |
| 2013/0219295 A1 | 8/2013 | Feldman et al. |
| 2013/0269007 A1 | 10/2013 | Yoshigaki et al. |
| 2013/0347060 A1* | 12/2013 | Hazzani .............. G06F 21/554 726/1 |
| 2014/0041005 A1 | 2/2014 | He |
| 2014/0067750 A1 | 3/2014 | Ranganathan et al. |
| 2014/0098101 A1 | 4/2014 | Friedlander et al. |
| 2014/0125672 A1 | 5/2014 | Winternitz et al. |
| 2014/0181944 A1 | 6/2014 | Ahmed et al. |
| 2014/0279779 A1 | 9/2014 | Zou et al. |
| 2014/0325631 A1 | 10/2014 | Pearson et al. |
| 2014/0379716 A1 | 12/2014 | Branch et al. |
| 2015/0058619 A1 | 2/2015 | Sweet et al. |
| 2015/0161201 A1 | 6/2015 | Sadikov et al. |
| 2015/0213598 A1 | 7/2015 | Madabhushi et al. |
| 2015/0310649 A1 | 10/2015 | Winternitz et al. |
| 2016/0063226 A1 | 3/2016 | Singh et al. |
| 2016/0120070 A1 | 4/2016 | Myrah et al. |
| 2016/0203411 A1 | 7/2016 | Sadikov et al. |
| 2016/0261544 A1 | 9/2016 | Conover |
| 2016/0330183 A1 | 11/2016 | McDowell et al. |
| 2016/0330206 A1 | 11/2016 | Xu |
| 2016/0357521 A1 | 12/2016 | Zhang et al. |
| 2016/0373428 A1 | 12/2016 | Shi |
| 2017/0063830 A1 | 3/2017 | Huang |
| 2017/0063888 A1 | 3/2017 | Muddu et al. |
| 2017/0063903 A1 | 3/2017 | Muddu et al. |
| 2017/0063905 A1 | 3/2017 | Muddu et al. |
| 2017/0063906 A1 | 3/2017 | Muddu et al. |
| 2017/0063908 A1 | 3/2017 | Muddu et al. |
| 2017/0063909 A1 | 3/2017 | Muddu et al. |
| 2017/0063910 A1 | 3/2017 | Muddu et al. |
| 2017/0063911 A1 | 3/2017 | Muddu et al. |
| 2017/0063912 A1 | 3/2017 | Muddu et al. |
| 2017/0070594 A1 | 3/2017 | Oetting et al. |
| 2017/0076206 A1 | 3/2017 | Lastras-Montano et al. |
| 2017/0085553 A1 | 3/2017 | Gordon et al. |
| 2017/0086069 A1 | 3/2017 | Liu |
| 2017/0102961 A1 | 4/2017 | Hilemon et al. |
| 2017/0111245 A1 | 4/2017 | Ishakian et al. |
| 2017/0116315 A1 | 4/2017 | Xiong et al. |
| 2017/0118099 A1 | 4/2017 | Huang |
| 2017/0142140 A1 | 5/2017 | Muddu et al. |
| 2017/0148197 A1 | 5/2017 | Winternitz et al. |
| 2017/0155570 A1 | 6/2017 | Maheshwari et al. |
| 2017/0155672 A1 | 6/2017 | Muthukrishnan et al. |
| 2017/0163666 A1 | 6/2017 | Venkatramani et al. |
| 2017/0223036 A1 | 8/2017 | Muddu et al. |
| 2017/0230183 A1 | 8/2017 | Sweet et al. |
| 2017/0249069 A1 | 8/2017 | Zamir |
| 2017/0257358 A1 | 9/2017 | Ebrahimi et al. |
| 2017/0262521 A1 | 9/2017 | Cho et al. |
| 2017/0277553 A1 | 9/2017 | Zada et al. |
| 2017/0277997 A1 | 9/2017 | Zong et al. |
| 2017/0286190 A1 | 10/2017 | Ishakian et al. |
| 2017/0330096 A1 | 11/2017 | Gupta et al. |
| 2017/0337262 A1 | 11/2017 | Smith et al. |
| 2017/0346683 A1 | 11/2017 | Li et al. |
| 2017/0353853 A1 | 12/2017 | Zha et al. |
| 2017/0359361 A1 | 12/2017 | Modani et al. |
| 2018/0004835 A1 | 1/2018 | Piechowicz et al. |
| 2018/0004859 A1 | 1/2018 | Piechowicz et al. |
| 2018/0004948 A1* | 1/2018 | Martin ................ H04L 63/1425 |
| 2018/0007145 A1 | 1/2018 | Piechowicz et al. |
| 2018/0013650 A1 | 1/2018 | Khanal et al. |
| 2018/0019932 A1 | 1/2018 | Giura et al. |
| 2018/0025361 A1 | 1/2018 | Llagostera et al. |
| 2018/0039688 A1 | 2/2018 | Ahn et al. |
| 2018/0067981 A1 | 3/2018 | Ahuja et al. |
| 2018/0069885 A1 | 3/2018 | Patterson et al. |
| 2018/0084069 A1 | 3/2018 | Be'ery et al. |
| 2018/0089132 A1 | 3/2018 | Atta et al. |
| 2018/0096047 A1 | 4/2018 | Childress et al. |
| 2018/0097793 A1 | 4/2018 | Agarwal et al. |
| 2018/0123864 A1 | 5/2018 | Tucker et al. |
| 2018/0139200 A1 | 5/2018 | Gordon et al. |
| 2018/0191781 A1 | 7/2018 | Palani et al. |
| 2018/0211425 A1 | 7/2018 | Winternitz et al. |
| 2018/0219888 A1 | 8/2018 | Apostolopoulos |
| 2018/0219897 A1 | 8/2018 | Muddu et al. |
| 2018/0227286 A1 | 8/2018 | Ohsumi |
| 2018/0359162 A1 | 12/2018 | Savov et al. |
| 2019/0042879 A1 | 2/2019 | Munoz |
| 2019/0042950 A1 | 2/2019 | Lin et al. |
| 2019/0050445 A1 | 2/2019 | Griffith et al. |
| 2019/0058626 A1 | 2/2019 | Knowles et al. |
| 2019/0075126 A1 | 3/2019 | Muddu et al. |
| 2019/0087480 A1 | 3/2019 | Palanciuc |
| 2019/0101622 A1 | 4/2019 | Wilson |
| 2019/0149553 A1 | 5/2019 | Xu |
| 2019/0158524 A1 | 5/2019 | Zadeh et al. |
| 2019/0163555 A1 | 5/2019 | Zheng et al. |
| 2019/0227860 A1 | 7/2019 | Gefen et al. |
| 2019/0312796 A1 | 10/2019 | Giura et al. |
| 2019/0312898 A1 | 10/2019 | Verma et al. |
| 2019/0327251 A1 | 10/2019 | Muddu et al. |
| 2019/0342282 A1 | 11/2019 | Carbune et al. |

(56) References Cited

U.S. PATENT DOCUMENTS

| | | |
|---|---|---|
| 2019/0342307 A1 | 11/2019 | Gamble et al. |
| 2019/0342311 A1 | 11/2019 | Muddu et al. |
| 2019/0354554 A1 | 11/2019 | Piechowicz et al. |
| 2019/0356555 A1 | 11/2019 | Bai et al. |
| 2019/0364067 A1 | 11/2019 | Yona et al. |
| 2020/0014718 A1 | 1/2020 | Durairaj et al. |
| 2020/0021607 A1 | 1/2020 | Muddu et al. |
| 2020/0065857 A1 | 2/2020 | Lagi et al. |
| 2020/0074341 A1 | 3/2020 | He et al. |
| 2020/0080856 A1 | 3/2020 | Ho et al. |
| 2020/0111038 A1* | 4/2020 | Ward ................. G06Q 10/0635 |
| 2020/0175042 A1 | 6/2020 | Batruni |
| 2020/0175361 A1 | 6/2020 | Che et al. |
| 2020/0228555 A1 | 7/2020 | Wittenschlaeger |
| 2020/0287923 A1 | 9/2020 | Raghavendra et al. |
| 2020/0287927 A1 | 9/2020 | Zadeh et al. |
| 2020/0320106 A1 | 10/2020 | Goldfarb |
| 2020/0334293 A1 | 10/2020 | Piechowicz et al. |
| 2020/0351151 A1 | 11/2020 | Dang et al. |
| 2020/0404008 A1 | 12/2020 | Venkatramani et al. |
| 2020/0412752 A1 | 12/2020 | Shapoury |
| 2021/0019209 A1 | 1/2021 | Krishnaswamy et al. |
| 2021/0232420 A1 | 7/2021 | Dhruvakumar et al. |
| 2021/0286798 A1 | 9/2021 | Li et al. |
| 2021/0294798 A1 | 9/2021 | Binkley et al. |
| 2021/0329019 A1 | 10/2021 | Shua |
| 2021/0336976 A1 | 10/2021 | Shua |
| 2021/0377287 A1 | 12/2021 | Shua |
| 2021/0406917 A1 | 12/2021 | Erickson et al. |
| 2022/0004718 A1 | 1/2022 | Quamar et al. |
| 2022/0050840 A1 | 2/2022 | Parravicini et al. |
| 2022/0058193 A1 | 2/2022 | Smith et al. |
| 2022/0067186 A1 | 3/2022 | Thakur et al. |
| 2022/0086179 A1 | 3/2022 | Levin et al. |
| 2022/0092481 A1 | 3/2022 | Neithalath et al. |
| 2022/0121741 A1 | 4/2022 | Araujo et al. |
| 2022/0124108 A1 | 4/2022 | Gamble et al. |
| 2022/0129803 A1 | 4/2022 | Bikumala et al. |
| 2022/0191226 A1 | 6/2022 | Chan et al. |
| 2022/0327119 A1 | 10/2022 | Gasper et al. |
| 2022/0342690 A1 | 10/2022 | Shua |
| 2022/0345480 A1 | 10/2022 | Shua |
| 2022/0345481 A1 | 10/2022 | Shua |
| 2022/0345483 A1 | 10/2022 | Shua |
| 2022/0350789 A1 | 11/2022 | Yang et al. |
| 2022/0350931 A1 | 11/2022 | Shua |
| 2022/0374800 A1 | 11/2022 | Adinarayan et al. |
| 2022/0376970 A1 | 11/2022 | Chawathe et al. |
| 2022/0382611 A1 | 12/2022 | Kapish et al. |
| 2022/0394082 A1 | 12/2022 | Keren et al. |
| 2022/0414072 A1 | 12/2022 | Tandon et al. |
| 2022/0414105 A1 | 12/2022 | Umay et al. |
| 2023/0025252 A1 | 1/2023 | Erickson et al. |
| 2023/0039566 A1 | 2/2023 | Ghag et al. |
| 2023/0052827 A1 | 2/2023 | Araujo et al. |
| 2023/0088960 A1 | 3/2023 | Popelka et al. |
| 2023/0096930 A1 | 3/2023 | Dasdan |
| 2023/0101773 A1 | 3/2023 | Katahanas et al. |
| 2023/0138371 A1 | 5/2023 | Bandukwala et al. |
| 2023/0244523 A1 | 8/2023 | Gorantla et al. |
| 2023/0251960 A1 | 8/2023 | Sharma et al. |
| 2023/0275909 A1 | 8/2023 | Shivamoggi et al. |
| 2023/0291755 A1 | 9/2023 | Siebel et al. |

OTHER PUBLICATIONS

Long et al., "Automatic Input Rectification", 2012 34th International Conference on Software Engineering (ICSE), (2012), pp. 80-90, doi: 10.1109/ICSE.2012.6227204.
Perkins et al., "Automatically Patching Errors in Deployed Software", SOSP '09: Proceedings of the ACM SIGOPS 22nd symposium on Operating systems principles, Oct. 2009, p. 87-102, https://doi.org/10.1145/1629575.1629585.
Rinard, "Living in the Comfort Zone", OOPSLA'07, Oct. 21-25, 2007, Montreal, Quebec, Canada, pp. 611-622.
Rinard, "Manipulating Program Functionality to Eliminate Security Vulnerabilities", Moving Target Defense. Springer, New York, NY, (2011). pp. 109-115.
Samuel et al., "Let's Parse to Prevent Pwnage Invited Position Paper", LEET'12: Proceedings of the 5th USENIX conference on Large-Scale Exploits and Emergent Threats, Apr. 2012, pp. 3-6.
Shen et al., "Active Learning for Inference and Regeneration of Applications that Access Databases", ACM Trans. Program. Lang. Syst. 42, 4, Article 18 (Jan. 2021), 119 pages, https://doi.org/10.1145/3430952.
Vasilakis et al., "Supply-Chain Vulnerability Elimination via Active Learning and Regeneration", Proceedings of the 2021 ACM SIGSAC Conference on Computer and Communications Security (CCS '21), Nov. 15-19, 2021, Virtual Event, Republic of Korea. ACM, New York, NY, USA, 16 pages, https://doi.org/10.1145/3460120.3484736

* cited by examiner

200

Receive packet.    201

Get connection information associated with packet.    202

Determine process associated with connection.    203

Determine information about process (e.g., parents, binary, user).    204

Transmit information.    205

227

Connections: 7
Sent:10.5 KB
Received: 29.3 KB

TCP: 100%

228

Update_engine (7)

Update.core-os.net

225

226

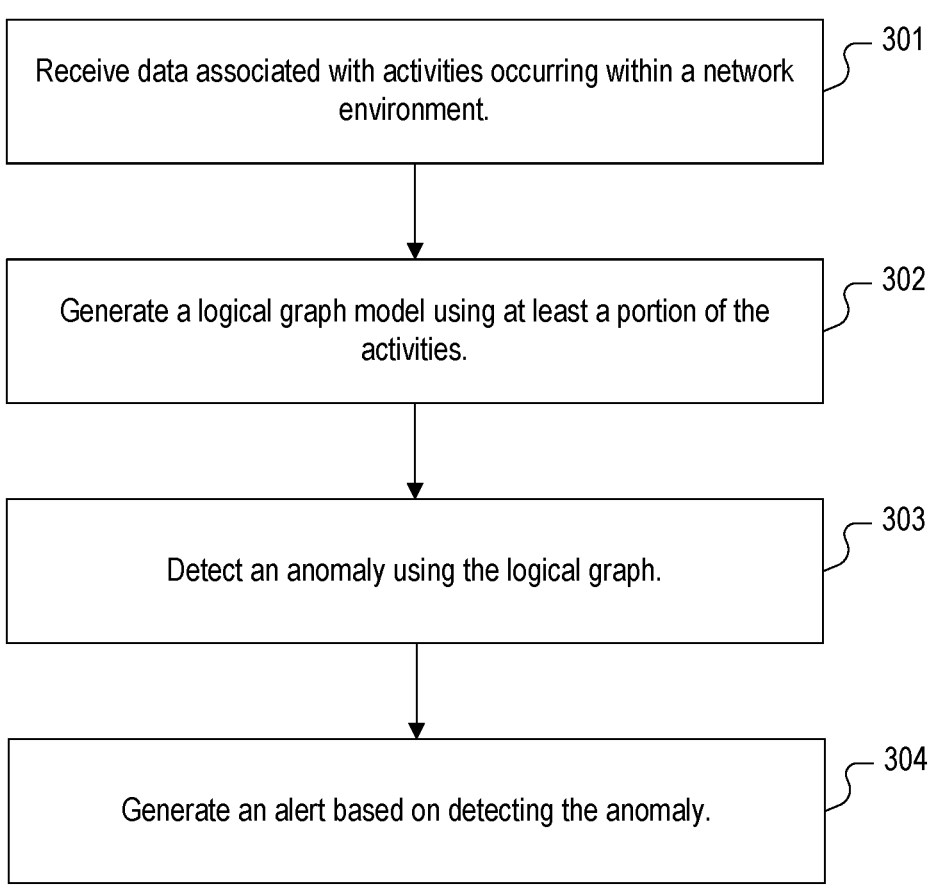
Receive data associated with activities occurring within a network environment. ⟍ 301
Generate a logical graph model using at least a portion of the activities. ⟍ 302
Detect an anomaly using the logical graph. ⟍ 303
Generate an alert based on detecting the anomaly. ⟍ 304
Fig. 3A

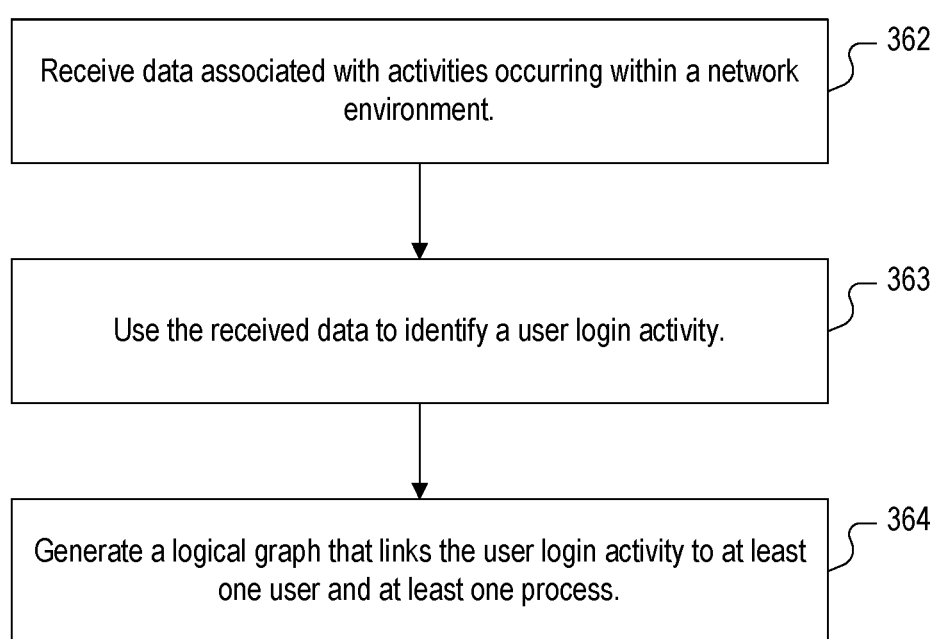
361
362 — Receive data associated with activities occurring within a network environment.
363 — Use the received data to identify a user login activity.
364 — Generate a logical graph that links the user login activity to at least one user and at least one process.
Fig. 3H

380

381 Identify new ssh connection records.

382 Match ssh connection records.

383 Identify new login records.

384 Identify new login-connection records.

385 Identify login-local-descendant records in the lookback time period.

386 Identify new processes.

387 Identify new login-local-descendant records.

388 Identify new login-lineage records.

389 Generate output data.

| MID | start_time | PID_hash | src_IP_addr | src_port | dst_IP_addr | dst_port | prot | dir |
|-----|-----------|----------|-------------|----------|-------------|----------|------|-----|
| A | t1 | A1 | 1.1.1.10 | 10000 | 2.2.2.20 | 22 | TCP | Incoming |
| A | t2 | A3 | 2.2.2.20 | 10001 | 2.2.2.21 | 22 | TCP | Outgoing |
| B | t2 | B1 | 2.2.2.20 | 10001 | 2.2.2.21 | 22 | TCP | Incoming |

| src_MID | src_PID_hash | dst_MID | dst_PID_hash | dst_start_time | src_IP_addr | src_port | dst_IP_addr | dst_port |
|---------|--------------|---------|--------------|----------------|-------------|----------|-------------|----------|
| null | null | A | A1 | t1 | 1.1.1.10 | 10000 | 2.2.2.20 | 22 |
| A | A3 | B | B1 | t2 | 2.2.2.20 | 10001 | 2.2.2.21 | 22 |

Fig. 3L

| MID | login_time | sshd_PID_hash |
|-----|-----------|---------------|
| A | t1 | A1 |
| B | t2 | B1 |

Fig. 3M

| MID | sshd_PID_hash | login_time | login_username | src_IP_addr | src_port | dst_IP_addr | dst_port |
|-----|---------------|-----------|----------------|-------------|----------|-------------|----------|
| A | A1 | t1 | X | 1.1.1.10 | 10000 | 2.2.2.20 | 22 |
| B | B1 | t2 | Y | 2.2.2.20 | 10001 | 2.2.2.21 | 22 |

Fig. 3N

| MID | start_time | PID_hash | exe_path | parent_PID_hash |
|-----|-----------|----------|----------|-----------------|
| A | t1 | A1 | /usr/sbin/sshd | A0 |
| A | t1 | A2 | /bin/bash | A1 |
| A | t2 | A3 | /usr/bin/ssh | A2 |
| B | t2 | B1 | /usr/sbin/sshd | B0 |
| B | t2 | B2 | /bin/bash | B1 |
| B | t3 | B3 | /usr/bin/curl | B2 |

Fig. 3O

| MID | sshd_PID_hash | PID_hash |
|-----|---------------|----------|
| A | A1 | A1 |
| A | A1 | A2 |
| A | A1 | A3 |
| B | B1 | B1 |
| B | B1 | B2 |
| B | B1 | B3 |

Fig. 3P

| parent_MID | parent_sshd_PID_hash | child_MID | origin_sshd_PID_hash |
|------------|----------------------|-----------|----------------------|
| A | A1 | B | B1 |

Fig. 3Q

| MID | sshd_PID_hash | parent_MID | parent_sshd_PID_hash | origin_MID | origin_sshd_PID_hash |
|-----|---------------|------------|----------------------|------------|----------------------|
| A | A1 | null | null | A | A1 |
| B | B1 | A | A1 | A | A1 |

Fig. 3R

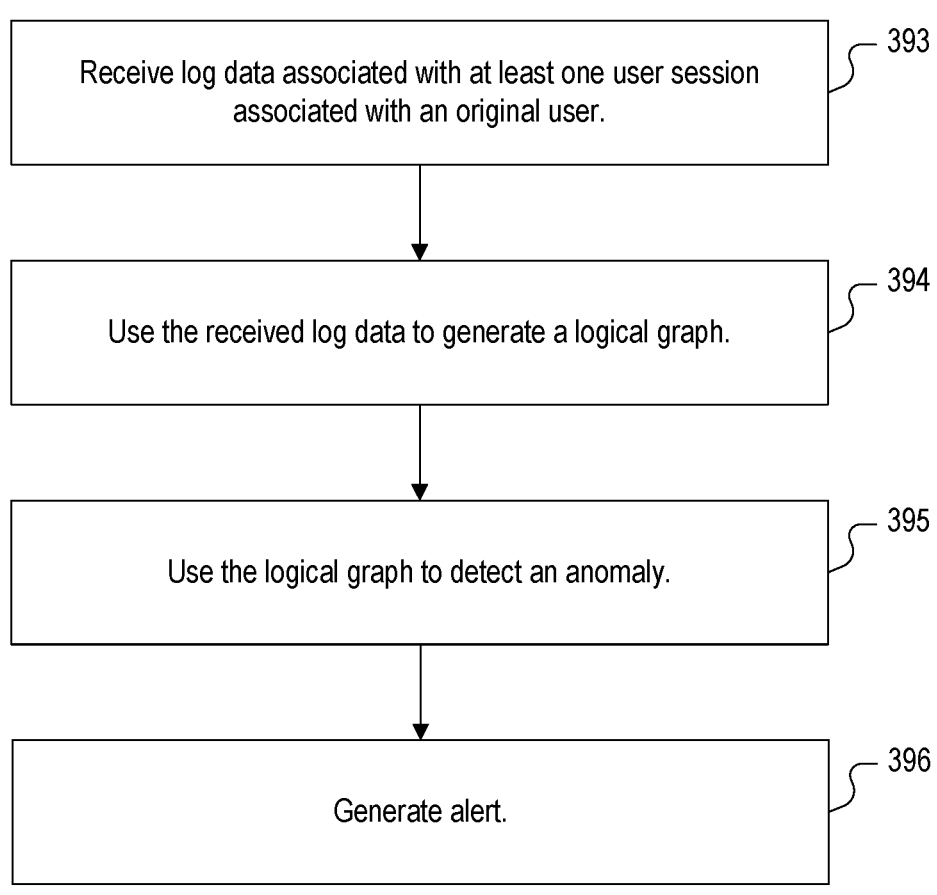
Fig. 3S

485
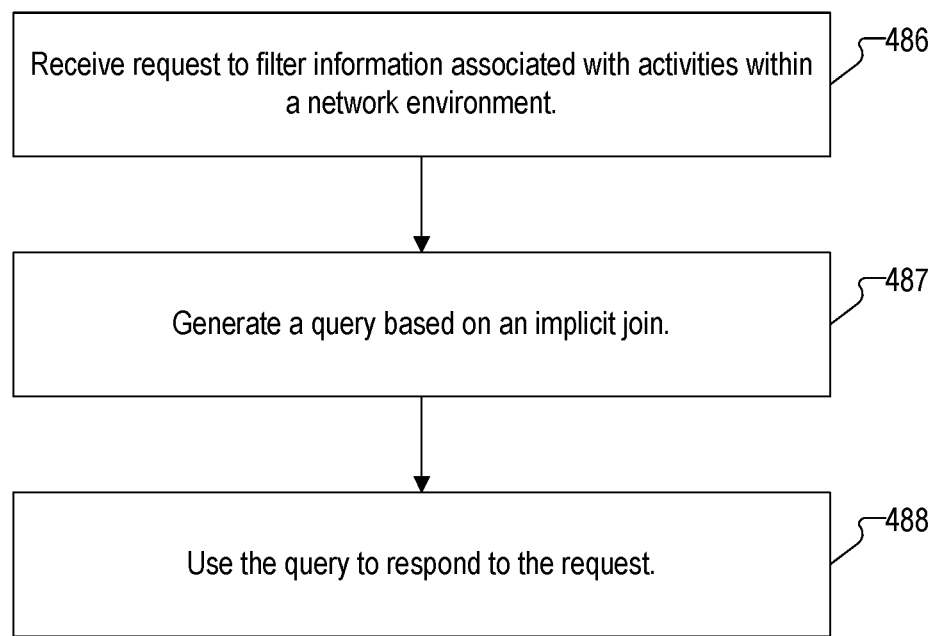
Receive request to filter information associated with activities within a network environment.    486
Generate a query based on an implicit join.    487
Use the query to respond to the request.    488
Fig. 4L

GENERATIVE ARTIFICIAL INTELLIGENCE-BASED MULTI-STAGE COMPOSITE EVENT PROCESSING

RELATED APPLICATIONS

This application is a continuation-in-part of U.S. patent application Ser. No. 18/227,228, filed Jul. 27, 2023, which is a continuation-in-part of U.S. patent application Ser. No. 18/129,243, filed Mar. 31, 2023, which is a continuation-in-part of U.S. patent application Ser. No. 18/119,045, filed Mar. 8, 2023, which is a continuation of U.S. patent application Ser. No. 17/510,179, filed Oct. 25, 2021, now U.S. Pat. No. 11,637,849, which is a continuation of U.S. patent application Ser. No. 16/786,822, filed Feb. 10, 2020, now U.S. Pat. No. 11,157,502, which is a continuation of U.S. patent application Ser. No. 16/134,806, filed Sep. 18, 2018, now U.S. Pat. No. 10,614,071, which claims priority to U.S. Provisional Patent Application No. 62/590,986 filed Nov. 27, 2017 and to U.S. Provisional Patent Application No. 62/650,971 filed Mar. 30, 2018. U.S. patent application Ser. No. 18/129,243 also claims priority to U.S. Provisional Patent Application No. 63/333,751 filed Apr. 22, 2022, to U.S. Provisional Patent Application No. 63/394,765 filed Aug. 3, 2022, and to U.S. Provisional Patent Application No. 63/351,607, filed Jun. 13, 2022. U.S. patent application Ser. No. 18/227,228 also claims priority to U.S. Provisional Patent Application No. 63/400,073 filed Aug. 23, 2022. This application also claims priority to U.S. Provisional Patent Application No. 63/466,933 filed May 16, 2023. The contents of each of these applications are hereby incorporated by reference in their entirety.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 2I illustrates an example of a portion of a polygraph as rendered in an interface.

FIG. 2O illustrates an example of a machine server graph as rendered in an interface.

FIG. 3A illustrates an example of a process for detecting anomalies in a network environment.

FIG. 3H illustrates an example of a process for performing extended user tracking.

FIG. 3K illustrates example records.

FIG. 3L illustrates example output from performing an ssh connection match.

FIG. 3M illustrates example records.

FIG. 3N illustrates example records.

FIG. 3O illustrates example records.

FIG. 3P illustrates example records.

FIG. 3Q illustrates an adjacency relationship between two login sessions.

FIG. 3R illustrates example records.

FIG. 3S illustrates an example of a process for detecting anomalies.

FIG. 4I illustrates an example of a dossier for an event.

FIG. 4L illustrates an example of a process for dynamically generating and executing a query.

DETAILED DESCRIPTION

Various illustrative embodiments are described herein with reference to the accompanying drawings. It will, however, be evident that various modifications and changes may be made thereto, and additional embodiments may be implemented, without departing from the scope of the invention as set forth in the claims. For example, certain features of one embodiment described herein may be combined with or substituted for features of another embodiment described herein. The description and drawings are accordingly to be regarded in an illustrative rather than a restrictive sense.

Figure 1A:
FIG. 1A shows an illustrative configuration in which a data platform is configured to perform various operations with respect to a cloud environment that includes a plurality of compute assets.

FIG. 1A shows an illustrative configuration 10 in which a data platform 12 is configured to perform various operations with respect to a cloud environment 14 that includes a plurality of compute assets 16-1 through 16-N(collectively "compute assets 16"). For example, data platform 12 may include data ingestion resources 18 configured to ingest data from cloud environment 14 into data platform 12, data processing resources 20 configured to perform data processing operations with respect to the data, and user interface resources 22 configured to provide one or more external users and/or compute resources (e.g., computing device 24) with access to an output of data processing resources 20. Each of these resources are described in detail herein.

Cloud environment 14 may include any suitable network-based computing environment as may serve a particular application. For example, cloud environment 14 may be implemented by one or more compute resources provided and/or otherwise managed by one or more cloud service providers, such as Amazon Web Services (AWS), Google Cloud Platform (GCP), Microsoft Azure, and/or any other cloud service provider configured to provide public and/or private access to network-based compute resources. While FIG. 1A shows that compute assets 16 are included in a cloud environment, compute assets 16 may be may be deployed in any compute environment such as cloud environment 14 and/or a non-cloud environment (e.g., a local datacenter).

Compute assets 16 may include, but are not limited to, containers (e.g., container images, deployed and executing container instances, etc.), virtual machines, workloads, applications, processes, physical machines, compute nodes, clusters of compute nodes, software runtime environments (e.g., container runtime environments), and/or any other virtual and/or physical compute resource that may reside in and/or be executed by one or more computer resources in cloud environment 14. In some examples, one or more compute assets 16 may reside in one or more datacenters.

A compute asset 16 may be associated with (e.g., owned, deployed, or managed by) a particular entity, such as a customer or client of cloud environment 14 and/or data platform 12. Accordingly, for purposes of the discussion herein, cloud environment 14 may be used by one or more entities.

Data platform 12 may be configured to perform one or more data security monitoring and/or remediation services, compliance monitoring services, anomaly detection services, DevOps services, compute asset management services, and/or any other type of data analytics service as may serve a particular implementation. Data platform 12 may be managed or otherwise associated with any suitable data platform provider, such as a provider of any of the data analytics services described herein. The various resources included in data platform 12 may reside in the cloud and/or be located on-premises and be implemented by any suitable combination of physical and/or virtual compute resources, such as one or more computing devices, microservices, applications, etc.

Data ingestion resources 18 may be configured to ingest data from cloud environment 14 into data platform 12. This may be performed in various ways, some of which are described in detail herein. For example, as illustrated by arrow 26, data ingestion resources 18 may be configured to receive the data from one or more agents deployed within cloud environment 14, utilize an event streaming platform (e.g., Kafka) to obtain the data, and/or pull data (e.g., configuration data) from cloud environment 14. In some examples, data ingestion resources 18 may obtain the data using one or more agentless configurations.

The data ingested by data ingestion resources 18 from cloud environment 14 may include any type of data as may serve a particular implementation. For example, the data may include data representative of configuration information associated with compute assets 16, information about one or more processes running on compute assets 16, network activity information, information about events (creation events, modification events, communication events, user-initiated events, etc.) that occur with respect to compute assets 16, etc. In some examples, the data may or may not include actual customer data processed or otherwise generated by compute assets 16.

As illustrated by arrow 28, data ingestion resources 18 may be configured to load the data ingested from cloud environment 14 into a data store 30. Data store 30 is illustrated in FIG. 1A as being separate from and communicatively coupled to data platform 12. However, in some alternative embodiments, data store 30 is included within data platform 12.

Data store 30 may be implemented by any suitable data warehouse, data lake, data mart, and/or other type of database structure as may serve a particular implementation. Such data stores may be proprietary or may be embodied as vendor provided products or services such as, for example, Snowflake, Google BigQuery, Druid, Amazon Redshift, IBM Db2, Dremio, Databricks Lakehouse Platform, Cloudera, Azure Synapse Analytics, and others.

Although the examples described herein largely relate to embodiments where data is collected from agents and ultimately stored in a data store such as those provided by Snowflake, in other embodiments data that is collected from agents and other sources may be stored in different ways. For example, data that is collected from agents and other sources may be stored in a data warehouse, data lake, data mart, and/or any other data store.

A data warehouse may be embodied as an analytic database (e.g., a relational database) that is created from two or more data sources. Such a data warehouse may be leveraged to store historical data, often on the scale of petabytes. Data warehouses may have compute and memory resources for running complicated queries and generating reports. Data warehouses may be the data sources for business intelligence ('BI') systems, machine learning applications, and/or other applications. By leveraging a data warehouse, data that has been copied into the data warehouse may be indexed for good analytic query performance, without affecting the write performance of a database (e.g., an Online Transaction Processing ('OLTP') database). Data warehouses also enable joining data from multiple sources for analysis. For example, a sales OLTP application probably has no need to know about the weather at various sales locations, but sales predictions could take advantage of that data. By adding historical weather data to a data warehouse, it would be possible to factor it into models of historical sales data.

Data lakes, which store files of data in their native format, may be considered as "schema on read" resources. As such, any application that reads data from the lake may impose its own types and relationships on the data. Data warehouses, on the other hand, are "schema on write," meaning that data types, indexes, and relationships are imposed on the data as it is stored in an enterprise data warehouse (EDW). "Schema on read" resources may be beneficial for data that may be used in several contexts and poses little risk of losing data. "Schema on write" resources may be beneficial for data that has a specific purpose, and good for data that must relate properly to data from other sources. Such data stores may include data that is encrypted using homomorphic encryption, data encrypted using privacy-preserving encryption, smart contracts, non-fungible tokens, decentralized finance, and other techniques.

Data marts may contain data oriented towards a specific business line whereas data warehouses contain enterprise-wide data. Data marts may be dependent on a data warehouse, independent of the data warehouse (e.g., drawn from an operational database or external source), or a hybrid of the two. In embodiments described herein, different types of data stores (including combinations thereof) may be leveraged.

Data processing resources 20 may be configured to perform various data processing operations with respect to data ingested by data ingestion resources 18, including data ingested and stored in data store 30. For example, data processing resources 20 may be configured to perform one or more data security monitoring and/or remediation operations, compliance monitoring operations, anomaly detection operations, DevOps operations, compute asset management operations, and/or any other type of data analytics operation as may serve a particular implementation. Various examples of operations performed by data processing resources 20 are described herein.

As illustrated by arrow 32, data processing resources 20 may be configured to access data in data store 30 to perform the various operations described herein. In some examples, this may include performing one or more queries with respect to the data stored in data store 30. Such queries may be generated using any suitable query language.

In some examples, the queries provided by data processing resources 20 may be configured to direct data store 30 to perform one or more data analytics operations with respect to the data stored within data store 30. These data analytics operations may be with respect to data specific to a particular entity (e.g., data residing in one or more silos within data store 30 that are associated with a particular customer) and/or data associated with multiple entities. For example, data processing resources 20 may be configured to analyze data associated with a first entity and use the results of the analysis to perform one or more operations with respect to a second entity.

One or more operations performed by data processing resources 20 may be performed periodically according to a predetermined schedule. For example, one or more operations may be performed by data processing resources 20 every hour or any other suitable time interval. Additionally or alternatively, one or more operations performed by data processing resources 20 may be performed in substantially real-time (or near real-time) as data is ingested into data platform 12. In this manner, the results of such operations (e.g., one or more detected anomalies in the data) may be provided to one or more external entities (e.g., computing device 24 and/or one or more users) in substantially real-time and/or in near real-time.

User interface resources 22 may be configured to perform one or more user interface operations, examples of which are described herein. For example, user interface resources 22 may be configured to present one or more results of the data processing performed by data processing resources 20 to one or more external entities (e.g., computing device 24 and/or one or more users), as illustrated by arrow 34. As illustrated by arrow 36, user interface resources 22 may access data in data store 30 to perform the one or more user interface operations.

Figure 1B:
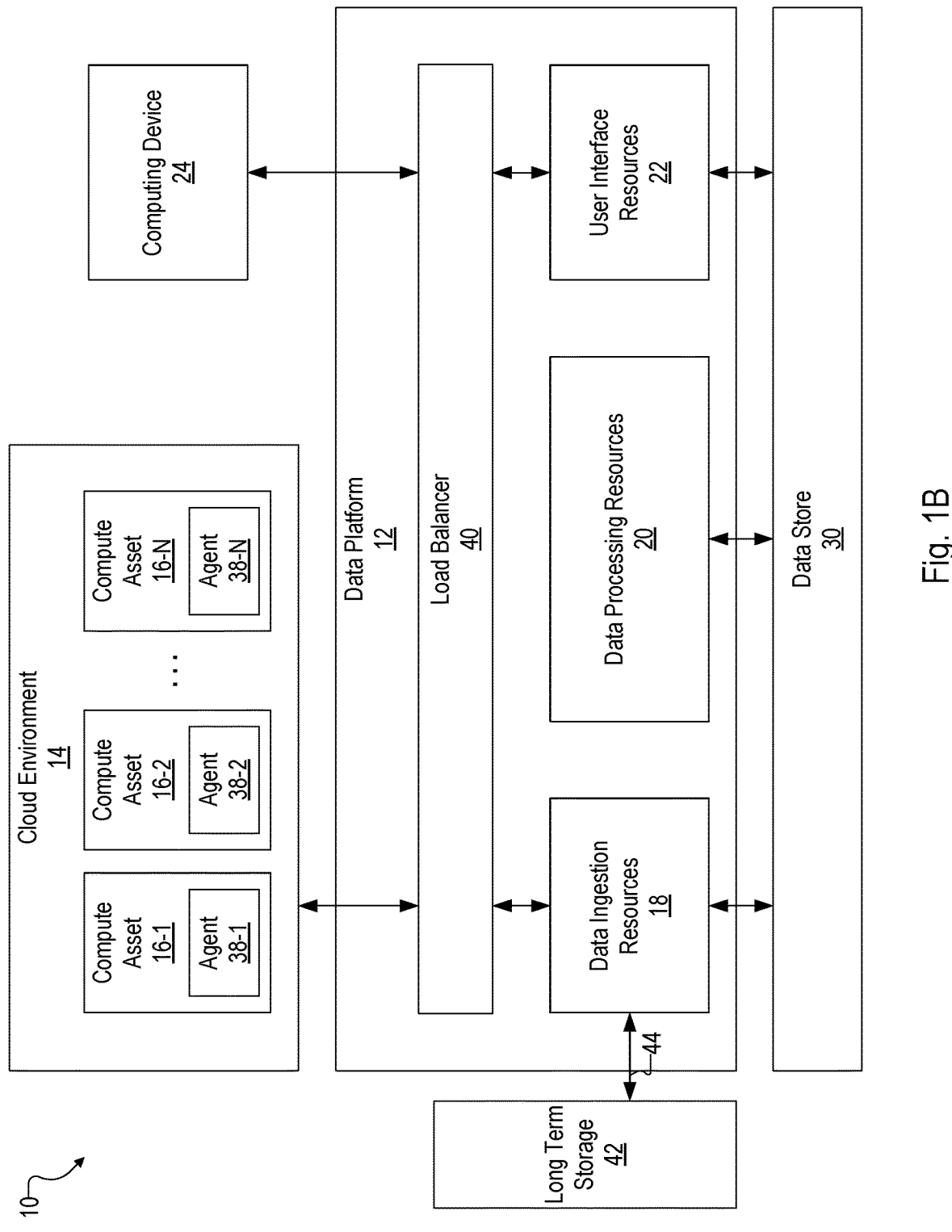
FIG. 1B shows an illustrative implementation of the configuration of FIG. 1A.

FIG. 1B illustrates an implementation of configuration 10 in which an agent 38 (e.g., agent 38-1 through agent 38-N) is installed on each of compute assets 16. As used herein, an agent may include a self-contained binary and/or other type of code or application that can be run on any appropriate platforms, including within containers and/or other virtual compute assets. Agents 38 may monitor the nodes on which they execute for a variety of different activities, including but not limited to, connection, process, user, machine, and file activities. In some examples, agents 38 can be executed in user space, and can use a variety of kernel modules (e.g., auditd, iptables, netfilter, pcap, etc.) to collect data. Agents can be implemented in any appropriate programming language, such as C or Golang, using applicable kernel APIs.

Agents 38 may be deployed in any suitable manner. For example, an agent 38 may be deployed as a containerized application or as part of a containerized application. As described herein, agents 38 may selectively report information to data platform 12 in varying amounts of detail and/or with variable frequency.

Also shown in FIG. 1B is a load balancer 40 configured to perform one or more load balancing operations with respect to data ingestion operations performed by data ingestion resources 18 and/or user interface operations performed by user interface resources 22. Load balancer 40 is shown to be included in data platform 12. However, load balancer 40 may alternatively be located external to data platform 12. Load balancer 40 may be implemented by any suitable microservice, application, and/or other computing resources. In some alternative examples, data platform 12 may not utilize a load balancer such as load balancer 40.

Also shown in FIG. 1B is long term storage 42 with which data ingestion resources 18 may interface, as illustrated by arrow 44. Long term storage 42 may be implemented by any suitable type of storage resources, such as cloud-based storage (e.g., AWS S3, etc.) and/or on-premises storage and may be used by data ingestion resources 18 as part of the data ingestion process. Examples of this are described herein. In some examples, data platform 12 may not utilize long term storage 42.

The embodiments described herein can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the principles described herein. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 1C:
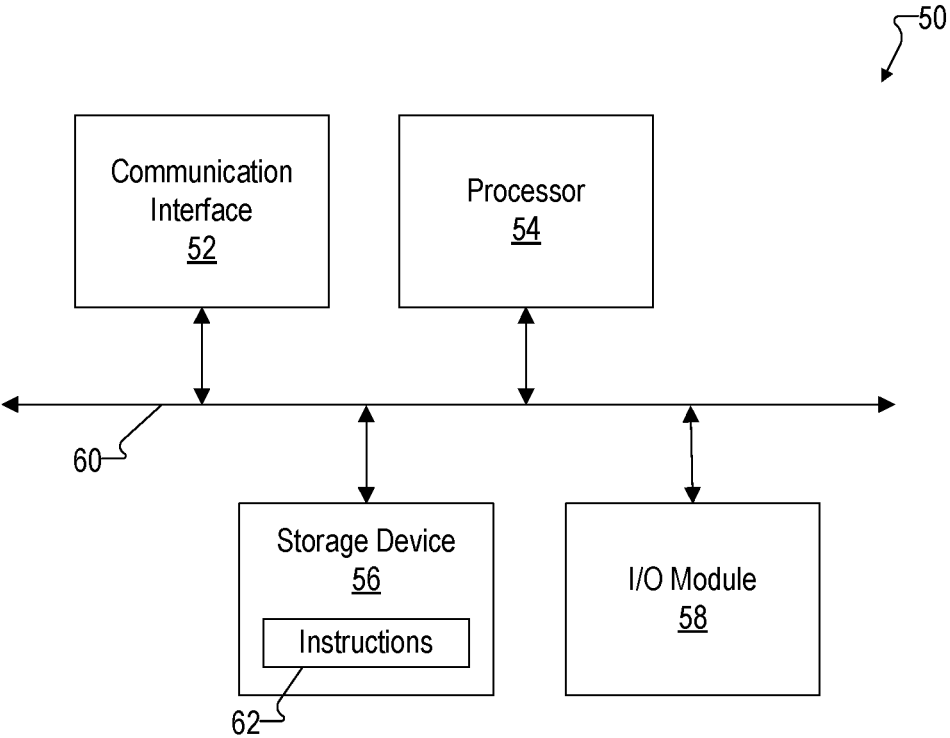
FIG. 1C illustrates an example computing device.

FIG. 1C illustrates an example computing device 50 that may be specifically configured to perform one or more of the processes described herein. Any of the systems, microservices, computing devices, and/or other components described herein may be implemented by computing device 50.

As shown in FIG. 1C, computing device 50 may include a communication interface 52, a processor 54, a storage device 56, and an input/output ("I/O") module 58 communicatively connected one to another via a communication infrastructure 60. While an exemplary computing device 50 is shown in FIG. 1C, the components illustrated in FIG. 1C are not intended to be limiting. Additional or alternative components may be used in other embodiments. Components of computing device 50 shown in FIG. 1C will now be described in additional detail.

Communication interface 52 may be configured to communicate with one or more computing devices. Examples of communication interface 52 include, without limitation, a wired network interface (such as a network interface card), a wireless network interface (such as a wireless network interface card), a modem, an audio/video connection, and any other suitable interface.

Processor 54 generally represents any type or form of processing unit capable of processing data and/or interpreting, executing, and/or directing execution of one or more of the instructions, processes, and/or operations described herein. Processor 54 may perform operations by executing computer-executable instructions 62 (e.g., an application, software, code, and/or other executable data instance) stored in storage device 56.

Storage device 56 may include one or more data storage media, devices, or configurations and may employ any type, form, and combination of data storage media and/or device. For example, storage device 56 may include, but is not limited to, any combination of the non-volatile media and/or volatile media described herein. Electronic data, including data described herein, may be temporarily and/or permanently stored in storage device 56. For example, data representative of computer-executable instructions 62 configured to direct processor 54 to perform any of the operations described herein may be stored within storage device 56. In some examples, data may be arranged in one or more databases residing within storage device 56.

I/O module 58 may include one or more I/O modules configured to receive user input and provide user output. I/O module 58 may include any hardware, firmware, software, or combination thereof supportive of input and output capabilities. For example, I/O module 58 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 58 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 58 is configured to provide graphical data to a display for presentation to a user. The graphical data may be representative of one or more graphical user interfaces and/or any other graphical content as may serve a particular implementation.

Figure 1D:
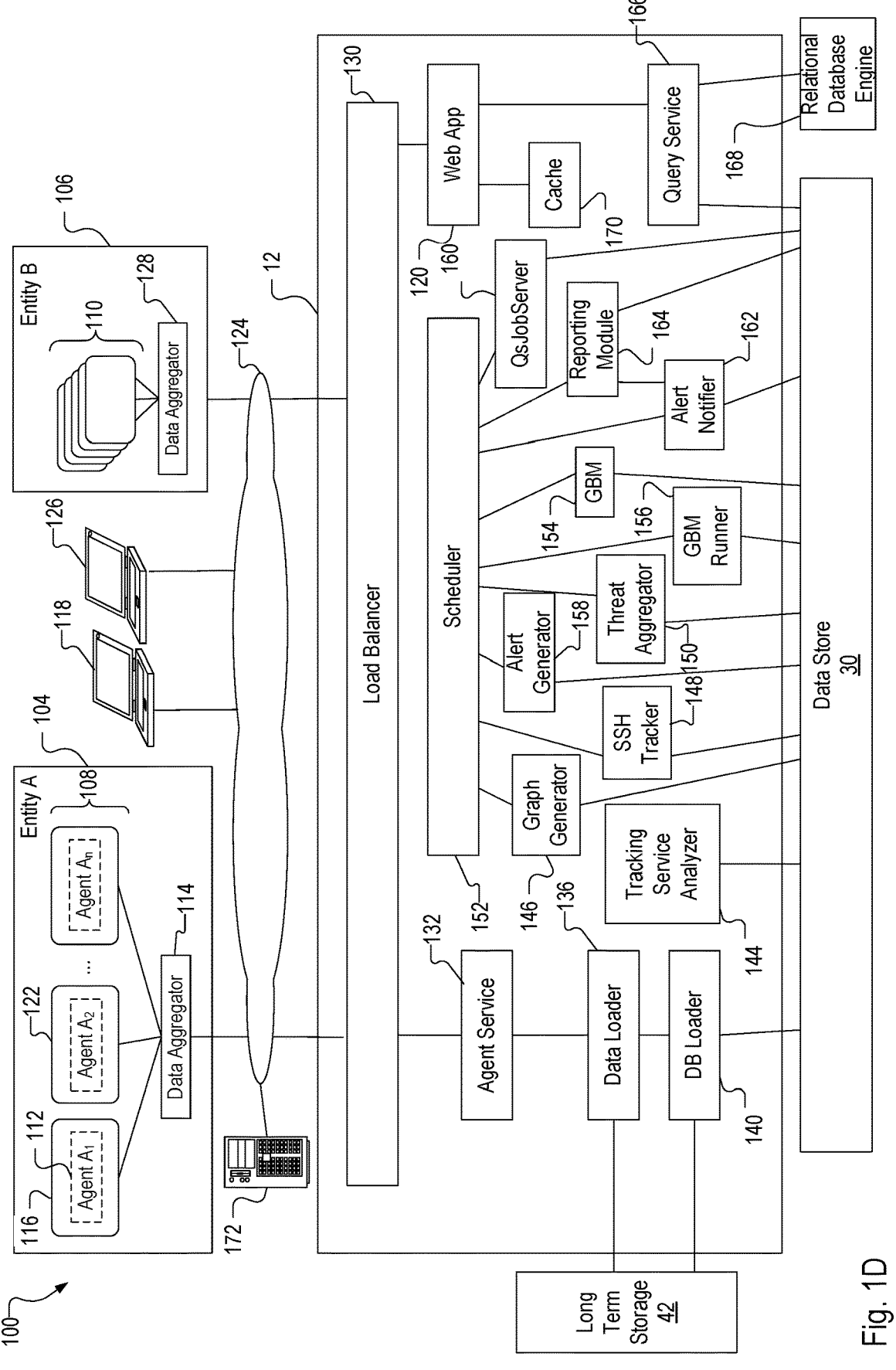
FIG. 1D illustrates an example of an environment in which activities that occur within datacenters are modeled.

FIG. 1D illustrates an example implementation 100 of configuration 10. As such, one or more components shown in FIG. 1D may implement one or more components shown in FIG. 1A and/or FIG. 1B. In particular, implementation 100 illustrates an environment in which activities that occur within datacenters are modeled using data platform 12. Using techniques described herein, a baseline of datacenter activity can be modeled, and deviations from that baseline can be identified as anomalous. Anomaly detection can be beneficial in a security context, a compliance context, an asset management context, a DevOps context, and/or any other data analytics context as may serve a particular implementation.

Two example datacenters (104 and 106) are shown in FIG. 1D, and are associated with (e.g., belong to) entities named entity A and entity B, respectively. A datacenter may include dedicated equipment (e.g., owned and operated by entity A, or owned/leased by entity A and operated exclusively on entity A's behalf by a third party). A datacenter can also include cloud-based resources, such as infrastructure as a service (IaaS), platform as a service (PaaS), and/or software as a service (SaaS) elements. The techniques described herein can be used in conjunction with multiple types of datacenters, including ones wholly using dedicated equipment, ones that are entirely cloud-based, and ones that use a mixture of both dedicated equipment and cloud-based resources.

Both datacenter 104 and datacenter 106 include a plurality of nodes, depicted collectively as set of nodes 108 and set of nodes 110, respectively, in FIG. 1D. These nodes may implement compute assets 16. Installed on each of the nodes are in-server/in-virtual-machine (VM)/embedded-in-IoT device agents (e.g., agent 112), which are configured to collect data and report it to data platform 12 for analysis. As described herein, agents may be small, self-contained binaries that can be run on any appropriate platforms, including virtualized ones (and, as applicable, within containers).

Agents may monitor the nodes on which they execute for a variety of different activities, including: connection, process, user, machine, and file activities. Agents can be executed in user space, and can use a variety of kernel modules (e.g., auditd, iptables, netfilter, pcap, etc.) to collect data. Agents can be implemented in any appropriate programming language, such as C or Golang, using applicable kernel APIs.

As described herein, agents can selectively report information to data platform 12 in varying amounts of detail and/or with variable frequency. As is also described herein, the data collected by agents may be used by data platform 12 to create polygraphs, which are graphs of logical entities, connected by behaviors. In some embodiments, agents report information directly to data platform 12. In other embodiments, at least some agents provide information to a data aggregator, such as data aggregator 114, which in turn provides information to data platform 12. The functionality of a data aggregator can be implemented as a separate binary or other application (distinct from an agent binary), and can also be implemented by having an agent execute in an "aggregator mode" in which the designated aggregator node acts as a Layer 7 proxy for other agents that do not have access to data platform 12. Further, a chain of multiple aggregators can be used, if applicable (e.g., with agent 112 providing data to data aggregator 114, which in turn provides data to another aggregator (not pictured) which provides data to data platform 12). An example way to implement an aggregator is through a program written in an appropriate language, such as C or Golang.

Use of an aggregator can be beneficial in sensitive environments (e.g., involving financial or medical transactions) where various nodes are subject to regulatory or other architectural requirements (e.g., prohibiting a given node from communicating with systems outside of datacenter 104). Use of an aggregator can also help to minimize security exposure more generally. As one example, by limiting communications with data platform 12 to data aggregator 114, individual nodes in nodes 108 need not make external network connections (e.g., via Internet 124), which can potentially expose them to compromise (e.g., by other external devices, such as device 118, operated by a criminal). Similarly, data platform 12 can provide updates, configuration information, etc., to data aggregator 114 (which in turn distributes them to nodes 108), rather than requiring nodes 108 to allow incoming connections from data platform 12 directly.

Another benefit of an aggregator model is that network congestion can be reduced (e.g., with a single connection being made at any given time between data aggregator 114 and data platform 12, rather than potentially many different connections being open between various of nodes 108 and data platform 12). Similarly, network consumption can also be reduced (e.g., with the aggregator applying compression techniques/bundling data received from multiple agents).

One example way that an agent (e.g., agent 112, installed on node 116) can provide information to data aggregator 114 is via a REST API, formatted using data serialization protocols such as Apache Avro. One example type of information sent by agent 112 to data aggregator 114 is status information. Status information may be sent by an agent periodically (e.g., once an hour or once any other predetermined amount of time). Alternatively, status information may be sent continuously or in response to occurrence of one or more events. The status information may include, but is not limited to, a. an amount of event backlog (in bytes) that has not yet been transmitted, b. configuration information, c. any data loss period for which data was dropped, d. a cumulative count of errors encountered since the agent started, e. version information for the agent binary, and/or f. cumulative statistics on data collection (e.g., number of network packets processed, new processes seen, etc.).

A second example type of information that may be sent by agent 112 to data aggregator 114 is event data (described in more detail herein), which may include a UTC timestamp for each event. As applicable, the agent can control the amount of data that it sends to the data aggregator in each call (e.g., a maximum of 10 MB) by adjusting the amount of data sent to manage the conflicting goals of transmitting data as soon as possible, and maximizing throughput. Data can also be compressed or uncompressed by the agent (as applicable) prior to sending the data.

Each data aggregator may run within a particular customer environment. A data aggregator (e.g., data aggregator 114) may facilitate data routing from many different agents (e.g., agents executing on nodes 108) to data platform 12. In various embodiments, data aggregator 114 may implement a SOCKS 5 caching proxy through which agents can connect to data platform 12. As applicable, data aggregator 114 can encrypt (or otherwise obfuscate) sensitive information prior to transmitting it to data platform 12, and can also distribute key material to agents which can encrypt the information (as applicable). Data aggregator 114 may include a local storage, to which agents can upload data (e.g., pcap packets). The storage may have a key-value interface. The local storage can also be omitted, and agents configured to upload data to a cloud storage or other storage area, as applicable. Data aggregator 114 can, in some embodiments, also cache locally and distribute software upgrades, patches, or configuration information (e.g., as received from data platform 12).

Various examples associated with agent data collection and reporting will now be described.

In the following example, suppose that a user (e.g., a network administrator) at entity A (hereinafter "user A") has decided to begin using the services of data platform 12. In some embodiments, user A may access a web frontend (e.g., web app 120) using a computer 126 and enrolls (on behalf of entity A) an account with data platform 12. After enrollment is complete, user A may be presented with a set of installers, pre-built and customized for the environment of entity A, that user A can download from data platform 12 and deploy on nodes 108. Examples of such installers include, but are not limited to, a Windows executable file, an iOS app, a Linux package (e.g., .deb or .rpm), a binary, or a container (e.g., a Docker container). When a user (e.g., a network administrator) at entity B (hereinafter "user B") also signs up for the services of data platform 12, user B may be similarly presented with a set of installers that are pre-built and customized for the environment of entity B.

User A deploys an appropriate installer on each of nodes 108 (e.g., with a Windows executable file deployed on a Windows-based platform or a Linux package deployed on a Linux platform, as applicable). As applicable, the agent can be deployed in a container. Agent deployment can also be performed using one or more appropriate automation tools, such as Chef, Puppet, Salt, and Ansible. Deployment can also be performed using managed/hosted container management/orchestration frameworks such as Kubernetes, Mesos, and/or Docker Swarm.

In various embodiments, the agent may be installed in the user space (i.e., is not a kernel module), and the same binary is executed on each node of the same type (e.g., all Windows-based platforms have the same Windows-based binary installed on them). An illustrative function of an agent, such as agent 112, is to collect data (e.g., associated with node 116) and report it (e.g., to data aggregator 114). Other tasks that can be performed by agents include data configuration and upgrading.

One approach to collecting data as described herein is to collect virtually all information available about a node (and, e.g., the processes running on it). Alternatively, the agent may monitor for network connections, and then begin collecting information about processes associated with the network connections, using the presence of a network packet associated with a process as a trigger for collecting additional information about the process. As an example, if a user of node 116 executes an application, such as a calculator application, which does not typically interact with the network, no information about use of that application may be collected by agent 112 and/or sent to data aggregator 114. If, however, the user of node 116 executes an ssh command (e.g., to ssh from node 116 to node 122), agent 112 may collect information about the process and provide associated information to data aggregator 114. In various embodiments, the agent may always collect/report information about certain events, such as privilege escalation, irrespective of whether the event is associated with network activity.

Figure 2A:
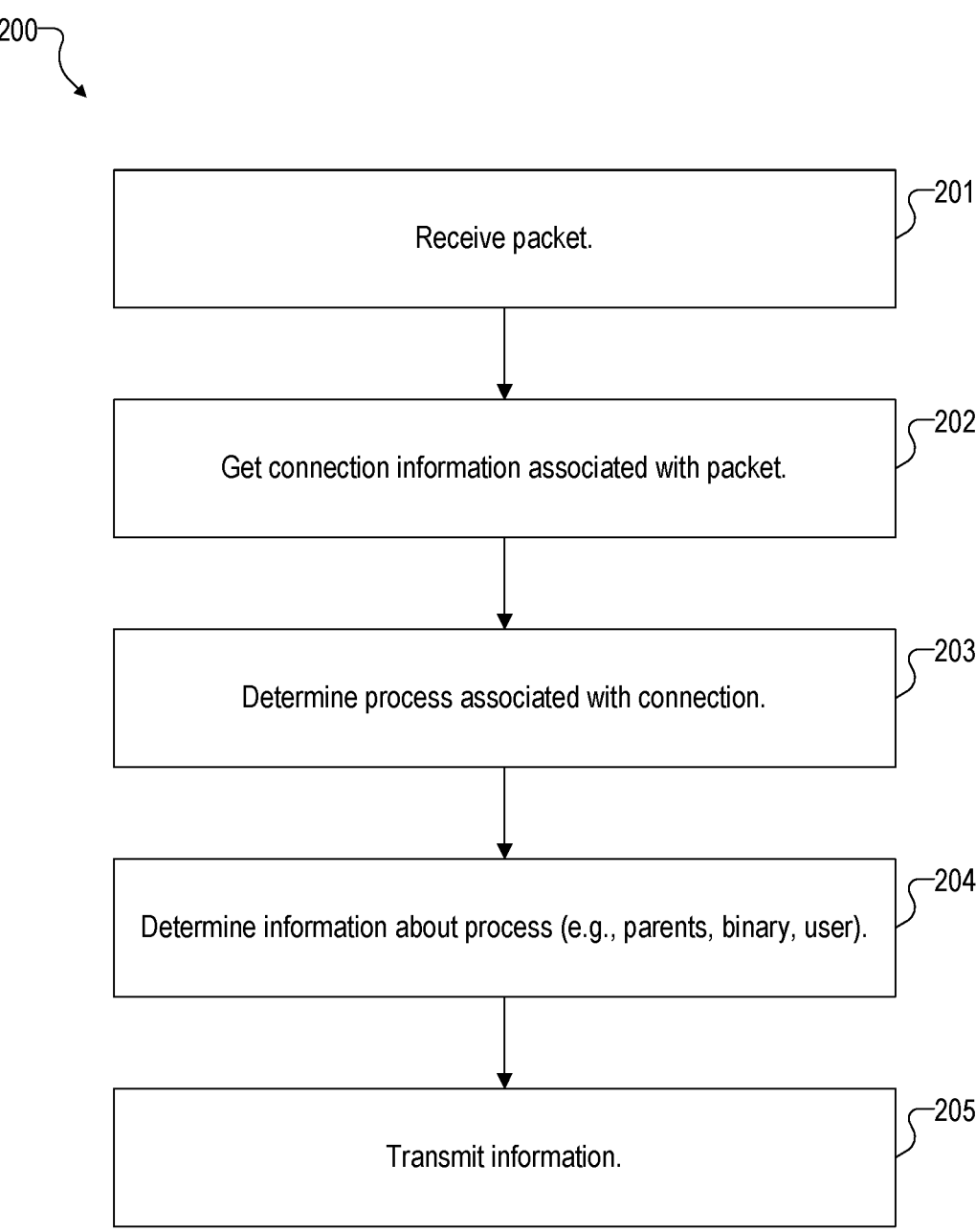
FIG. 2A illustrates an example of a process, used by an agent, to collect and report information about a client.

An approach to collecting information (e.g., by an agent) is as follows, and described in conjunction with process 200 depicted in FIG. 2A. An agent (e.g., agent 112) monitors its node (e.g., node 116) for network activity. One example way that agent 112 can monitor node 116 for network activity is by using a network packet capture tool (e.g., listening using libpcap). As packets are received (201), the agent obtains and maintains (e.g., in an in-memory cache) connection information associated with the network activity (202). Examples of such information include DNS query/response, TCP, UDP, and IP information.

The agent may also determine a process associated with the network connection (203). One example approach is for the agent to use a kernel network diagnostic API (e.g., netlink_diag) to obtain inode/process information from the kernel. Another example approach is for the agent to scan using netstat (e.g., on/proc/net/tcp,/proc/net/tcp6,/proc/net/udp, and/proc/net/udp6) to obtain sockets and relate them to processes. Information such as socket state (e.g., whether a socket is connected, listening, etc.) can also be collected by the agent.

One way an agent can obtain a mapping between a given inode and a process identifier is to scan within the/proc/pid directory. For each of the processes currently running, the agent examines each of their file descriptors. If a file descriptor is a match for the inode, the agent can determine that the process associated with the file descriptor owns the inode. Once a mapping is determined between an inode and a process identifier, the mapping is cached. As additional packets are received for the connection, the cached process information is used (rather than a new search being performed).

In some cases, exhaustively scanning for an inode match across every file descriptor may not be feasible (e.g., due to CPU limitations). In various embodiments, searching through file descriptors is accordingly optimized. User filtering is one example of such an optimization. A given socket is owned by a user. Any processes associated with the socket will be owned by the same user as the socket. When matching an inode (identified as relating to a given socket) against processes, the agent can filter through the processes and only examine the file descriptors of processes sharing the same user owner as the socket. In various embodiments, processes owned by root are always searched against (e.g., even when user filtering is employed).

Another example of an optimization is to prioritize searching the file descriptors of certain processes over others. One such prioritization is to search through the subdirectories of/proc/starting with the youngest process. One approximation of such a sort order is to search through/ proc/in reverse order (e.g., examining highest numbered processes first). Higher numbered processes are more likely to be newer (i.e., not long-standing processes), and thus more likely to be associated with new connections (i.e., ones for which inode-process mappings are not already cached). In some cases, the most recently created process may not have the highest process identifier (e.g., due to the kernel wrapping through process identifiers).

Another example prioritization is to query the kernel for an identification of the most recently created process and to search in a backward order through the directories in/proc/ (e.g., starting at the most recently created process and working backwards, then wrapping to the highest value (e.g., 32768) and continuing to work backward from there). An alternate approach is for the agent to keep track of the newest process that it has reported information on (e.g., to data aggregator 114), and begin its search of/proc/in a forward order starting from the PID of that process.

Another example prioritization is to maintain, for each user actively using node 116, a list of the five (or any other number) most recently active processes. Those processes are more likely than other processes (less active, or passive) on node 116 to be involved with new connections, and can thus be searched first. For many processes, lower valued file descriptors tend to correspond to non-sockets (e.g., stdin, stdout, stderr). Yet another optimization is to preferentially search higher valued file descriptors (e.g., across processes) over lower valued file descriptors (that are less likely to yield matches).

In some cases, while attempting to locate a process identifier for a given inode, an agent may encounter a socket that does not correspond to the inode being matched against and is not already cached. The identity of that socket (and its corresponding inode) can be cached, once discovered, thus removing a future need to search for that pair.

In some cases, a connection may terminate before the agent is able to determine its associated process (e.g., due to a very short-lived connection, due to a backlog in agent processing, etc.). One approach to addressing such a situation is to asynchronously collect information about the connection using the audit kernel API, which streams information to user space. The information collected from the audit API (which can include PID/inode information) can be matched by the agent against pcap/inode information. In some embodiments, the audit API is always used, for all connections. However, due to CPU utilization considerations, use of the audit API can also 17ddressed for short/ otherwise problematic connections (and/or omitted, as applicable).

Once the agent has determined which process is associated with the network connection (203), the agent can then collect additional information associated with the process (204). As will be described in more detail below, some of the collected information may include attributes of the process (e.g., a process parent hierarchy, and an identification of a binary associated with the process). As will also be described in more detail below, other of the collected information is derived (e.g., session summarization data and hash values).

The collected information is then transmitted (205), e.g., by an agent (e.g., agent 112) to a data aggregator (e.g., data aggregator 114), which in turn provides the information to data platform 12. In some embodiments, all information collected by an agent may be transmitted (e.g., to a data aggregator and/or to data platform 12). In other embodiments, the amount of data transmitted may be minimized (e.g., for efficiency reasons), using various techniques.

One approach to minimizing the amount of data flowing from agents (such as agents installed on nodes 108) to data platform 12 is to use a technique of implicit references with unique keys. The keys can be explicitly used by data platform 12 to extract/derive relationships, as necessary, in a data set at a later time, without impacting performance.

As previously mentioned, some data collected about a process is constant and does not change over the lifetime of the process (e.g., attributes), and some data changes (e.g., statistical information and other variable information). Constant data can be transmitted (205) once, when the agent first becomes aware of the process. And, if any changes to the constant data are detected (e.g., a process changes its parent), a refreshed version of the data can be transmitted (205) as applicable.

In some examples, an agent may collect variable data (e.g., data that may change over the lifetime of the process). In some examples, variable data can be transmitted (205) at periodic (or other) intervals. Alternatively, variable data may be transmitted in substantially real time as it is collected. In some examples, the variable data may indicate a thread count for a process, a total virtual memory used by the process, the total resident memory used by the process, the total time spent by the process executing in user space, and/or the total time spent by the process executing in kernel space. In some examples, the data may include a hash that may be used within data platform 12 to join process creation time attributes with runtime attributes to construct a full dataset.

Below are additional examples of data that an agent, such as agent 112, can collect and provide to data platform 12.

1. User Data
   Core User Data: user name, UID (user ID), primary group, other groups, home directory.
   Failed Login Data: IP address, hostname, username, count.
   User Login Data: user name, hostname, IP address, start time, TTY (terminal), UID (user ID), GID (group ID), process, end time.
2. Machine Data
   Dropped Packet Data: source IP address, destination IP address, destination port, protocol, count.
   Machine Data: hostname, domain name, architecture, kernel, kernel release, kernel version, OS, OS version, OS description, CPU, memory, model number, number of cores, last boot time, last boot reason, tags (e.g., Cloud provider tags such as AWS, GCP, or Azure tags), default router, interface name, interface hardware address, interface IP address and mask, promiscuous mode.
3. Network Data
   Network Connection Data: source IP address, destination IP address, source port, destination port, protocol, start time, end time, incoming and outgoing bytes, source process, destination process, direction of connection, histograms of packet length, inter packet delay, session lengths, etc.

Listening Ports in Server: source IP address, port number, protocol, process.

Dropped Packet Data: source IP address, destination IP address, destination port, protocol, count.

Arp Data: source hardware address, source IP address, destination hardware address, destination IP address.

DNS Data: source IP address, response code, response string, question (request), packet length, final answer (response).

4. Application Data

Package Data: exe path, package name, architecture, version, package path, checksums (MD5, SHA-1, SHA-256), size, owner, owner ID.

Application Data: command line, PID (process ID), start time, UID (user ID), EUID (effective UID), PPID (parent process ID), PGID (process group ID), SID (session ID), exe path, username, container ID.

5. Container Data

Container Image Data: image creation time, parent ID, author, container type, repo, (AWS) tags, size, virtual size, image version.

Container Data: container start time, container type, container name, container ID, network mode, privileged, PID mode, IP addresses, listening ports, volume map, process ID.

6. File Data

File path, file data hash, symbolic links, file creation data, file change data, file metadata, file mode.

As mentioned above, an agent, such as agent 112, can be deployed in a container (e.g., a Docker container), and can also be used to collect information about containers. Collection about a container can be performed by an agent irrespective of whether the agent is itself deployed in a container or not (as the agent can be deployed in a container running in a privileged mode that allows for monitoring).

Agents can discover containers (e.g., for monitoring) by listening for container create events (e.g., provided by Docker), and can also perform periodic ordered discovery scans to determine whether containers are running on a node. When a container is discovered, the agent can obtain attributes of the container, e.g., using standard Docker API calls (e.g., to obtain IP addresses associated with the container, whether there's a server running inside, what port it is listening on, associated PIDs, etc.). Information such as the parent process that started the container can also be collected, as can information about the image (which comes from the Docker repository).

In various embodiments, agents may use namespaces to determine whether a process is associated with a container. Namespaces are a feature of the Linux kernel that can be used to isolate resources of a collection of processes. Examples of namespaces include process ID (PID) namespaces, network namespaces, and user namespaces. Given a process, the agent can perform a fast lookup to determine whether the process is part of the namespace the container claims to be its namespace.

As mentioned, agents can be configured to report certain types of information (e.g., attribute information) once, when the agent first becomes aware of a process. In various embodiments, such static information is not reported again (or is reported once a day, every twelve hours, etc.), unless it changes (e.g., a process changes its parent, changes its owner, or a SHA-1 of the binary associated with the process changes).

In contrast to static/attribute information, certain types of data change constantly (e.g., network-related data). In various embodiments, agents are configured to report a list of current connections every minute (or other appropriate time interval). In that connection list will be connections that started in that minute interval, connections that ended in that minute interval, and connections that were ongoing throughout the minute interval (e.g., a one minute slice of a one hour connection).

In various embodiments, agents are configured to collect/ compute statistical information about connections (e.g., at the one minute level of granularity and or at any other time interval). Examples of such information include, for the time interval, the number of bytes transferred, and in which direction. Another example of information collected by an agent about a connection is the length of time between packets. For connections that span multiple time intervals (e.g., a seven minute connection), statistics may be calculated for each minute of the connection. Such statistical information (for all connections) can be reported (e.g., to a data aggregator) once a minute.

In various embodiments, agents are also configured to maintain histogram data for a given network connection, and provide the histogram data (e.g., in the Apache Avro data exchange format) under the Connection event type data. Examples of such histograms include: 1. A packet length histogram (packet_len_hist), which characterizes network packet distribution; 2. A session length histogram (session_ len_hist), which characterizes a network session length; 3. A session time histogram (session_time_hist), which characterizes a network session time; and 4. A session switch time histogram (session_switch_time_hist), which characterizes network session switch time (i.e., incoming→outgoing and vice versa). For example, histogram data may include one or more of the following fields: 1. Count, which provides a count of the elements in the sampling; 2. Sum, which provides a sum of elements in the sampling; 3. Max, which provides the highest value element in the sampling; 4. Std_dev, which provides the standard deviation of elements in the sampling; and 5. Buckets, which provides a discrete sample bucket distribution of sampling data (if applicable).

For some protocols (e.g., HTTP), typically, a connection is opened, a string is sent, a string is received, and the connection is closed. For other protocols (e.g., NFS), both sides of the connection engage in a constant chatter. Histograms allow data platform 12 to model application behavior (e.g., using machine learning techniques), for establishing baselines, and for detecting deviations. As one example, suppose that a given HTTP server typically sends/receives 1,000 bytes (in each direction) whenever a connection is made with it. If a connection generates 500 bytes of traffic, or 2,000 bytes of traffic, such connections would be considered within the typical usage pattern of the server. Suppose, however, that a connection is made that results in 10G of traffic. Such a connection is anomalous and can be flagged accordingly.

Returning to FIG. 1D, as previously mentioned, data aggregator 114 may be configured to provide information (e.g., collected from nodes 108 by agents) to data platform 12. Data aggregator 128 may be similarly configured to provide information to data platform 12. As shown in FIG. 1D, both aggregator 114 and aggregator 128 may connect to a load balancer 130, which accepts connections from aggregators (and/or as applicable, agents), as well as other devices, such as computer 126 (e.g., when it communicates with web app 120), and supports fair balancing. In various embodiments, load balancer 130 is a reverse proxy that load balances accepted connections internally to various microservices (described in more detail below), allowing for services provided by data platform 12 to scale up as more agents are added to the environment and/or as more entities subscribe to services provided by data platform 12. Example ways to implement load balancer 130 include, but are not limited to, using HaProxy, using nginx, and using elastic load balancing (ELB) services made available by Amazon.

Agent service 132 is a microservice that is responsible for accepting data collected from agents (e.g., provided by aggregator 114). In various embodiments, agent service 132 uses a standard secure protocol, such as HTTPS to communicate with aggregators (and, as applicable, agents), and receives data in an appropriate format such as Apache Avro. When agent service 132 receives an incoming connection, it can perform a variety of checks, such as to see whether the data is being provided by a current customer, and whether the data is being provided in an appropriate format. If the data is not appropriately formatted (and/or is not provided by a current customer), it may be rejected.

If the data is appropriately formatted, agent service 132 may facilitate copying the received data to a streaming data stable storage using a streaming service (e.g., Amazon Kinesis and/or any other suitable streaming service). Once the ingesting into the streaming service is complete, agent service 132 may send an acknowledgement to the data provider (e.g., data aggregator 114). If the agent does not receive such an acknowledgement, it is configured to retry sending the data to data platform 12. One way to implement agent service 132 is as a REST API server framework (e.g., Java DropWizard), configured to communicate with Kinesis (e.g., using a Kinesis library).

In various embodiments, data platform 12 uses one or more streams (e.g., Kinesis streams) for all incoming customer data (e.g., including data provided by data aggregator 114 and data aggregator 128), and the data is sharded based on the node (also referred to herein as a "machine") that originated the data (e.g., node 116 vs. node 122), with each node having a globally unique identifier within data platform 12. Multiple instances of agent service 132 can write to multiple shards.

Kinesis is a streaming service with a limited period (e.g., 1-7 days). To persist data longer than a day, the data may be copied to long term storage 42 (e.g., S3). Data loader 136 is a microservice that is responsible for picking up data from a data stream (e.g., a Kinesis stream) and persisting it in long term storage 42. In one example embodiment, files collected by data loader 136 from the Kinesis stream are placed into one or more buckets, and segmented using a combination of a customer identifier and time slice. Given a particular time segment, and a given customer identifier, the corresponding file (stored in long term storage) contains five minutes (or another appropriate time slice) of data collected at that specific customer from all of the customer's nodes. Data loader 136 can be implemented in any appropriate programming language, such as Java or C, and can be configured to use a Kinesis library to interface with Kinesis. In various embodiments, data loader 136 uses the Amazon Simple Queue Service (SQS) (e.g., to alert DB loader 140 that there is work for it to do).

DB loader 140 is a microservice that is responsible for loading data into an appropriate data store 30, such as SnowflakeDB or Amazon Redshift, using individual per-customer databases. In particular, DB loader 140 is configured to periodically load data into a set of raw tables from files created by data loader 136 as per above. DB loader 140 manages throughput, errors, etc., to make sure that data is loaded consistently and continuously. Further, DB loader 140 can read incoming data and load into data store 30 data that is not already present in tables of data store 30 (also referred to herein as a database). DB loader 140 can be implemented in any appropriate programming language, such as Java or C, and an SQL framework such as jOOQ (e.g., to manage SQLs for insertion of data), and SQL/JDBC libraries. In some examples, DB loader 140 may use Amazon S3 and Amazon Simple Queue Service (SQS) to manage files being transferred to and from data store 30.

Customer data included in data store 30 can be augmented with data from additional data sources, such as AWS Cloud-Trail and/or other types of external tracking services. To this end, data platform may include a tracking service analyzer 144, which is another microservice. Tracking service analyzer 144 may pull data from an external tracking service (e.g., Amazon CloudTrail) for each applicable customer account, as soon as the data is available. Tracking service analyzer 144 may normalize the tracking data as applicable, so that it can be inserted into data store 30 for later querying/analysis. Tracking service analyzer 144 can be written in any appropriate programming language, such as Java or C. Tracking service analyzer 144 also makes use of SQL/JDBC libraries to interact with data store 30 to insert/ query data.

As described herein, data platform 12 can model activities that occur within datacenters, such as datacenters 104 and 106. The model may be stable over time, and differences, even subtle ones (e.g., between a current state of the datacenter and the model) can be surfaced. The ability to surface such anomalies can be particularly beneficial in datacenter environments where rogue employees and/or external attackers may operate slowly (e.g., over a period of months), hoping that the elastic nature of typical resource use (e.g., virtualized servers) will help conceal their nefarious activities.

Using techniques described herein, data platform 12 can automatically discover entities (which may implement compute assets 16) deployed in a given datacenter. Examples of entities include workloads, applications, processes, machines, virtual machines, containers, files, IP addresses, domain names, and users. The entities may be grouped together logically (into analysis groups) based on behaviors, and temporal behavior baselines can be established. In particular, using techniques described herein, periodic graphs can be constructed (also referred to herein as poly-graphs), in which the nodes are applicable logical entities, and the edges represent behavioral relationships between the logical entities in the graph. Baselines can be created for every node and edge.

Communication (e.g., between applications/nodes) is one example of a behavior. A model of communications between processes is an example of a behavioral model. As another example, the launching of applications is another example of a behavior that can be modeled. The baselines may be periodically updated (e.g., hourly) for every entity. Additionally or alternatively, the baselines may be continuously updated in substantially real-time as data is collected by agents. Deviations from the expected normal behavior can then be detected and automatically reported (e.g., as anomalies or threats detected). Such deviations may be due to a desired change, a misconfiguration, or malicious activity. As applicable, data platform 12 can score the detected deviations (e.g., based on severity and threat posed). Additional examples of analysis groups include models of machine communications, models of privilege changes, and models of insider behaviors (monitoring the interactive behavior of human users as they operate within the datacenter).

Two example types of information collected by agents are network level information and process level information. As previously mentioned, agents may collect information about every connection involving their respective nodes. And, for each connection, information about both the server and the client may be collected (e.g., using the connection-to-process identification techniques described above). DNS queries and responses may also be collected. The DNS query information can be used in logical entity graphing (e.g., collapsing many different IP addresses to a single service—e.g., s3 .amazon.com). Examples of process level information collected by agents include attributes (user ID, effective user ID, and command line). Information such as what user/application is responsible for launching a given process and the binary being executed (and its SHA-256 values) may also provided by agents.

The dataset collected by agents across a datacenter can be very large, and many resources (e.g., virtual machines, IP addresses, etc.) are recycled very quickly. For example, an IP address and port number used at a first point in time by a first process on a first virtual machine may very rapidly be used (e.g., an hour later) by a different process/virtual machine.

Figure 2B:
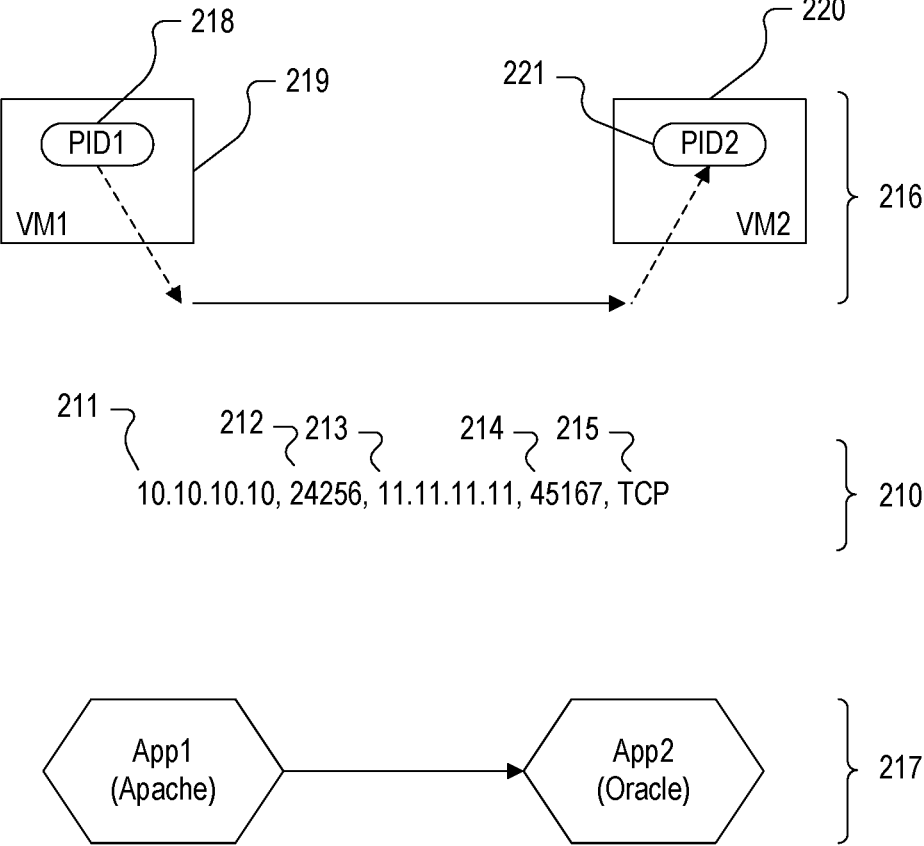
FIG. 2B illustrates a 5-tuple of data collected by an agent, physically and logically.

A dataset (and elements within it) can be considered at both a physical level, and a logical level, as illustrated in FIG. 2B. In particular, FIG. 2B illustrates an example 5-tuple of data 210 collected by an agent, represented physically (216) and logically (217). The 5-tuple includes a source address 211, a source port 212, a destination address 213, a destination port 214, and a protocol 215. In some cases, port numbers (e.g., 212, 214) may be indicative of the nature of a connection (e.g., with certain port usage standardized). However, in many cases, and in particular in datacenters, port usage is ephemeral. For example, a Docker container can listen on an ephemeral port, which is unrelated to the service it will run. When another Docker container starts (for the same service), the port may well be different. Similarly, particularly in a virtualized environment, IP addresses may be recycled frequently (and are thus also potentially ephemeral) or could be NATed, which makes identification difficult.

A physical representation of the 5-tuple is depicted in region 216. A process 218 (executing on machine 219) has opened a connection to machine 220. In particular, process 218 is in communication with process 221. Information such as the number of packets exchanged between the two machines over the respective ports can be recorded.

As previously mentioned, in a datacenter environment, portions of the 5-tuple may change—potentially frequently—but still be associated with the same behavior. Namely, one application (e.g., Apache) may frequently be in communication with another application (e.g., Oracle), using ephemeral datacenter resources. Further, either/both of Apache and Oracle may be multi-homed. This can lead to potentially thousands of 5-tuples (or more) that all correspond to Apache communicating with Oracle within a datacenter. For example, Apache could be executed on a single machine, and could also be executed across fifty machines, which are variously spun up and down (with different IP addresses each time). An alternate representation of the 5-tuple of data 210 is depicted in region 217, and is logical. The logical representation of the 5-tuple aggregates the 5-tuple (along with other connections between Apache and Oracle having other 5-tuples) as logically representing the same connection. By aggregating data from raw physical connection information into logical connection information, using techniques described herein, a size reduction of six orders of magnitude in the data set can be achieved.

Figure 2C:
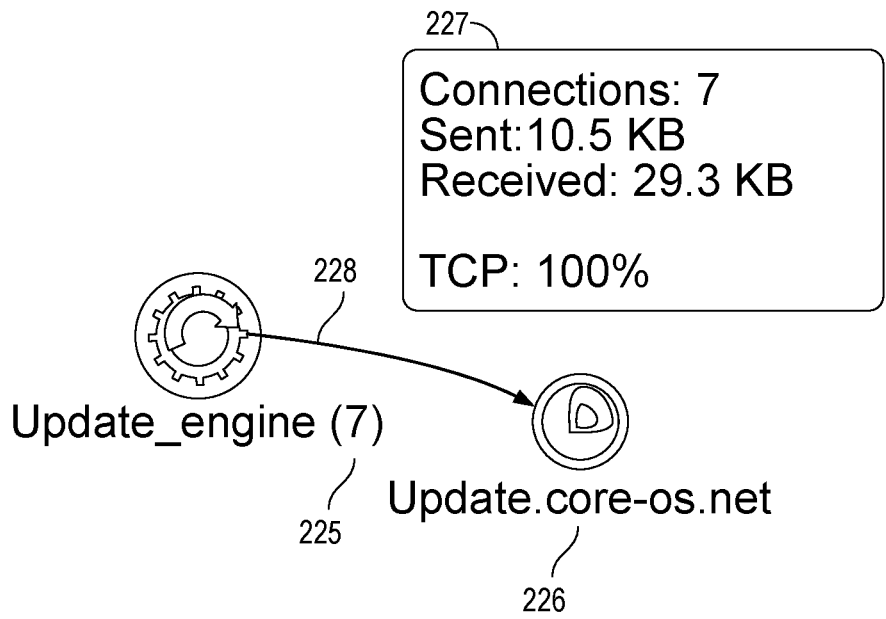
FIG. 2C illustrates a portion of a polygraph.

FIG. 2C depicts a portion of a logical polygraph. Suppose a datacenter has seven instances of the application update_engine 225, executing as seven different processes on seven different machines, having seven different IP addresses, and using seven different ports. The instances of update_engine variously communicate with update.core-os.net 226, which may have a single IP address or many IP addresses itself, over the one hour time period represented in the polygraph. In the example shown in FIG. 2C, update_engine is a client, connecting to the server update.core-os.net, as indicated by arrow 228.

Behaviors of the seven processes are clustered together, into a single summary. As indicated in region 227, statistical information about the connections is also maintained (e.g., number of connections, histogram information, etc.). A polygraph such as is depicted in FIG. 2C can be used to establish a baseline of behavior (e.g., at the one-hour level), allowing for the future detection of deviations from that baseline. As one example, suppose that statistically an update_engine instance transmits data at 11 bytes per second. If an instance were instead to transmit data at 1000 bytes per second, such behavior would represent a deviation from the baseline and could be flagged accordingly. Similarly, changes that are within the baseline (e.g., an eighth instance of update_engine appears, but otherwise behaves as the other instances; or one of the seven instances disappears) are not flagged as anomalous. Further, datacenter events, such as failover, autobalancing, and A-B refresh are unlikely to trigger false alarms in a polygraph, as at the logical level, the behaviors remain the same.

Figure 2D:
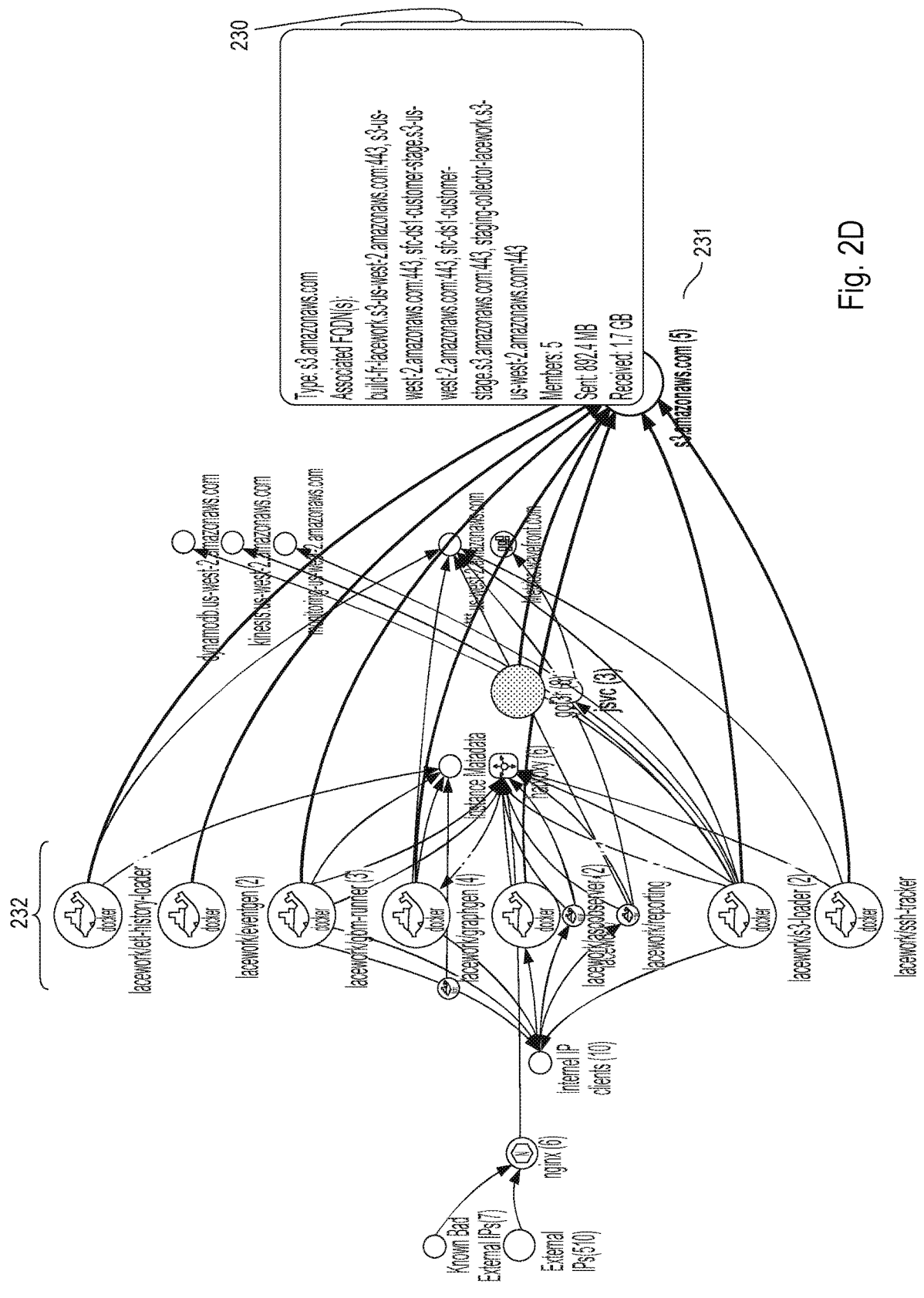
FIG. 2D illustrates a portion of a polygraph.

In various embodiments, polygraph data is maintained for every application in a datacenter, and such polygraph data can be combined to make a single datacenter view across all such applications. FIG. 2D illustrates a portion of a polygraph for a service that evidences more complex behaviors than are depicted in FIG. 2C. In particular, FIG. 2D illustrates the behaviors of S3 as a service (as used by a particular customer datacenter). Clients within the datacenter variously connect to the S3 service using one of five fully qualified domains (listed in region 230). Contact with any of the domains is aggregated as contact with S3 (as indicated in region 231). Depicted in region 232 are various containers which (as clients) connect with S3. Other containers (which do not connect with S3) are not included. As with the polygraph portion depicted in FIG. 2C, statistical information about the connections is known and summarized, such as the number of bytes transferred, histogram information, etc.

Figure 2E:
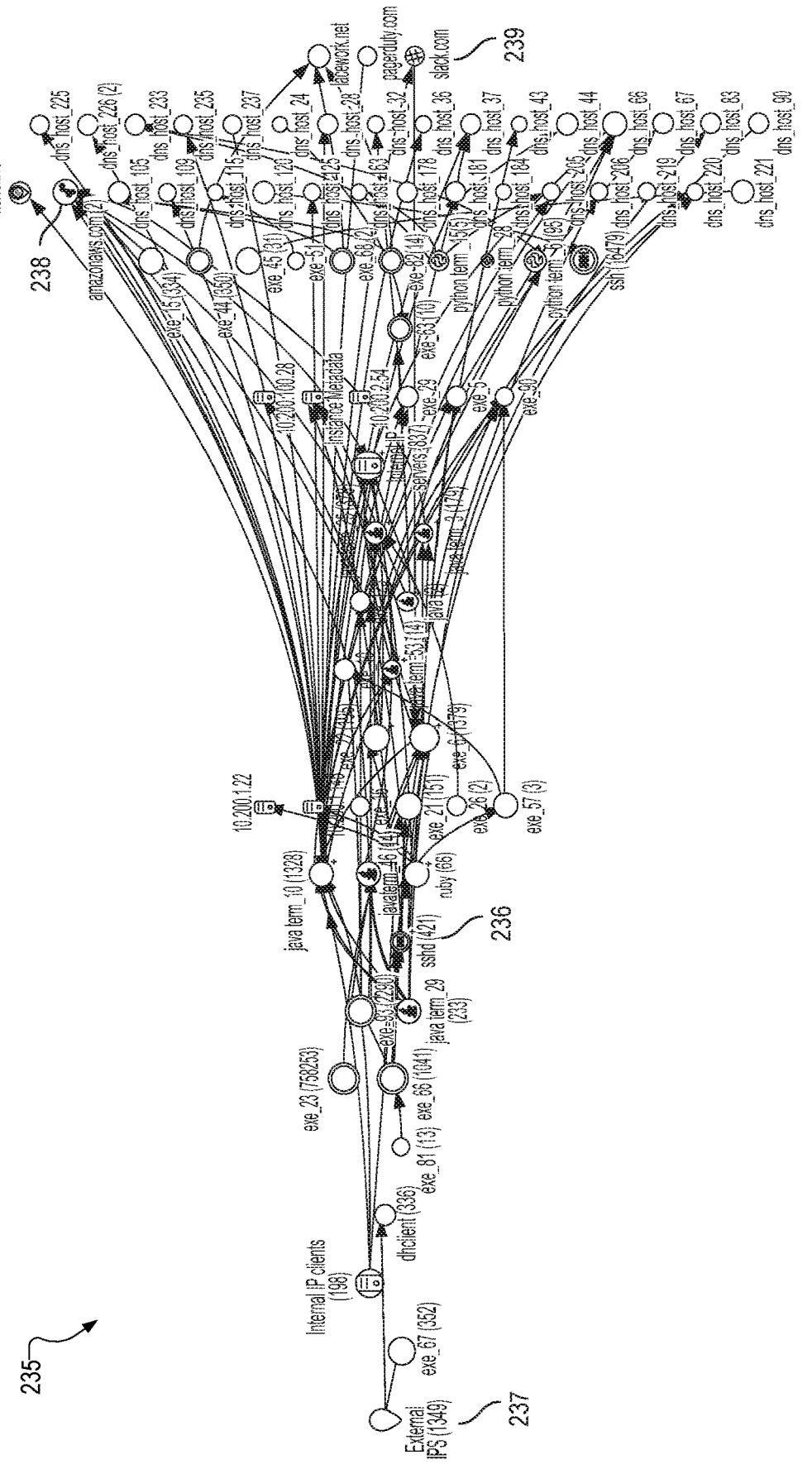
FIG. 2E illustrates an example of a communication polygraph.

FIG. 2E illustrates a communication polygraph for a datacenter. In particular, the polygraph indicates a one hour summary of approximately 500 virtual machines, which collectively run one million processes, and make 100 million connections in that hour. As illustrated in FIG. 2E, a polygraph represents a drastic reduction in size (e.g., from tracking information on 100 million connections in an hour, to a few hundred nodes and a few hundred edges). Further, as a datacenter scales up (e.g., from using 10 virtual machines to 100 virtual machines as the datacenter uses more workers to support existing applications), the polygraph for the datacenter will tend to stay the same size (with the 100 virtual machines clustering into the same nodes that the 10 virtual machines previously clustered into). As new applications are added into the datacenter, the polygraph may automatically scale to include behaviors involving those applications.

In the particular polygraph shown in FIG. 2E, nodes generally correspond to workers, and edges correspond to communications the workers engage in (with connection activity being the behavior modeled in polygraph 235). Another example polygraph could model other behavior, such as application launching. The communications graphed in FIG. 2E include traffic entering the datacenter, traffic exiting the datacenter, and traffic that stays wholly within the datacenter (e.g., traffic between workers). One example of a node included in polygraph 235 is the sshd application, depicted as node 236. As indicated in FIG. 2E, 421 instances of sshd were executing during the one hour time period of data represented in polygraph 235. As indicated in region 237, nodes within the datacenter communicated with a total of 1349 IP addresses outside of the datacenter (and not otherwise accounted for, e.g., as belonging to a service such as Amazon AWS 238 or Slack 239).

In the following examples, suppose that user B, an administrator of datacenter 106, is interacting with data platform 12 to view visualizations of polygraphs in a web browser (e.g., as served to user B via web app 120). One type of polygraph user B can view is an application-communication polygraph, which indicates, for a given one hour window (or any other suitable time interval), which applications communicated with which other applications. Another type of polygraph user B can view is an application launch polygraph. User B can also view graphs related to user behavior, such as an insider behavior graph which tracks user connections (e.g., to internal and external applications, including chains of such behavior), a privilege change graph which tracks how privileges change between processes, and a user login graph, which tracks which (logical) machines a user logs into.

Figure 2F:
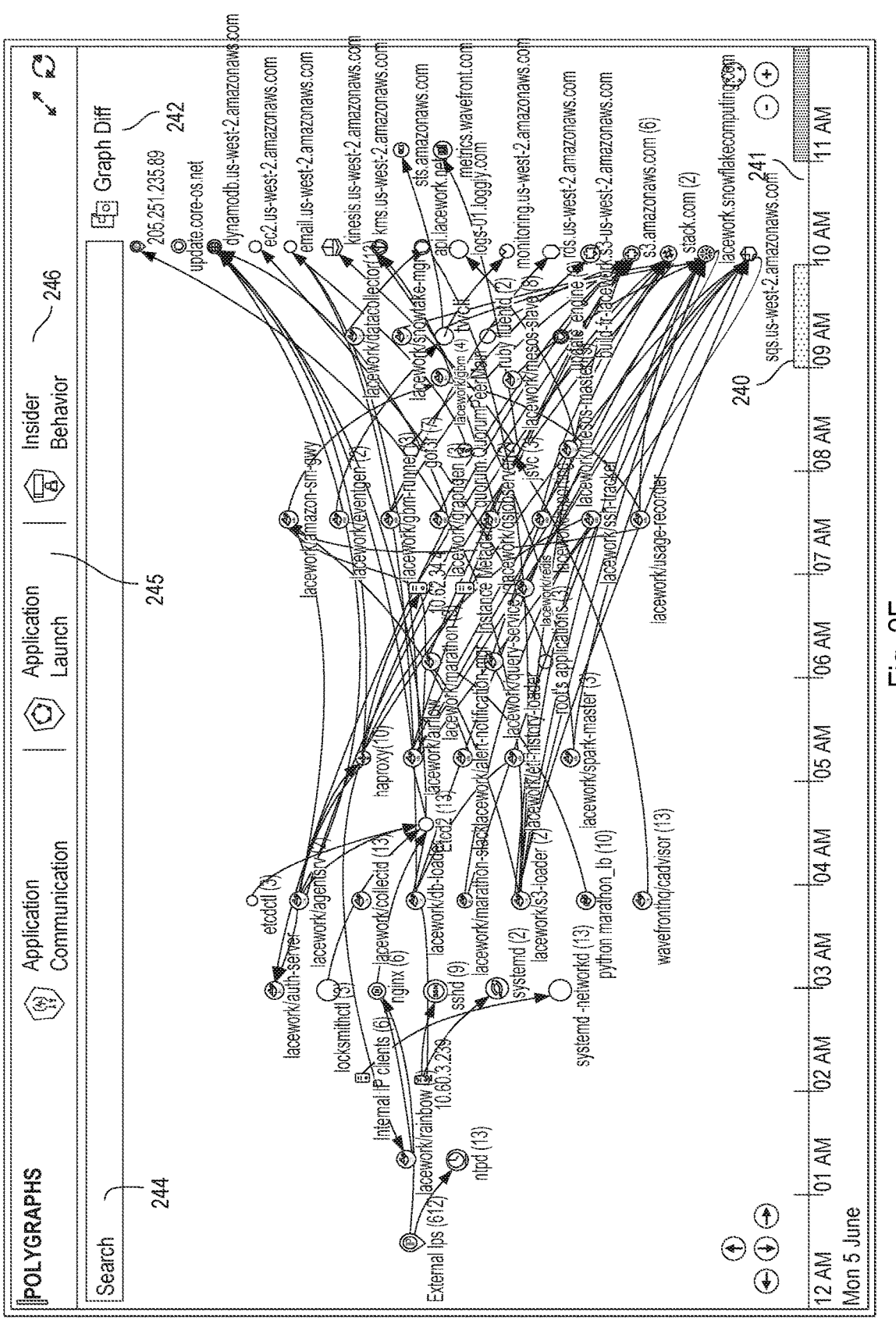
FIG. 2F illustrates an example of a polygraph.

FIG. 2F illustrates an example of an application-communication polygraph for a datacenter (e.g., datacenter 106) for the one hour period of 9 am-10 am on June 5. The time slice currently being viewed is indicated in region 240. If user B clicks his mouse in region 241, user B will be shown a representation of the application-communication polygraph as generated for the following hour (10 am-11 am on June 5).

Figure 2G:
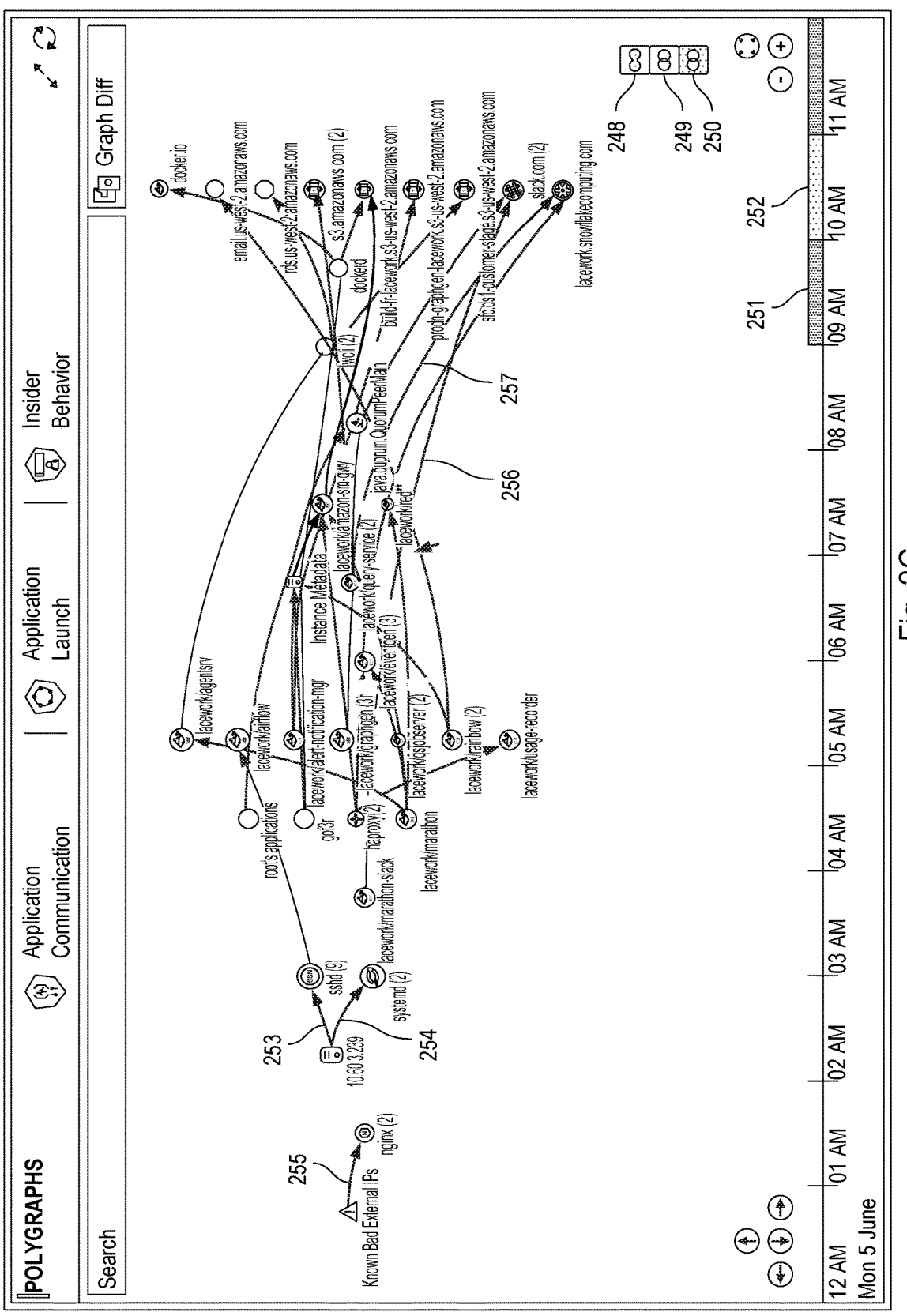
FIG. 2G illustrates an example of a polygraph as rendered in an interface.

FIG. 2G depicts what is shown in user B's browser after he has clicked on region 241, and has further clicked on region 242. The selection in region 242 turns on and off the ability to compare two time intervals to one another. User B can select from a variety of options when comparing the 9 am-10 am and 10 am-11 am time intervals. By clicking region 248, user B will be shown the union of both graphs (i.e., any connections that were present in either time interval). By clicking region 249, user B will be shown the intersection of both graphs (i.e., only those connections that were present in both time intervals).

As shown in FIG. 2G, user B has elected to click on region 250, which depicts connections that are only present in the 9 am-10 am polygraph in a first color 251, and depicts connections that are only present in the 10 am-11 am polygraph in a second color 252. Connections present in both polygraphs are omitted from display. As one example, in the 9 am-10 am polygraph (corresponding to connections made during the 9 am-10 am time period at datacenter 106), a connection was made by a server to sshd (253) and also to 26ddres (254). Both of those connections ended prior to 10 am and are thus depicted in the first color. As another example, in the 10 am-11 am polygraph (corresponding to connections made during the 10 am-11am time period at datacenter 106), a connection was made from a known bad external IP to nginx (255). The connection was not present during the 9 am-10 am time slice and thus is depicted in the second color. As yet another example, two different connections were made to a Slack service between 9 am and 11 am. However, the first was made by a first client during the 9 am-10 am time slice (256) and the second was made by a different client during the 10 am-11 am slice (257), and so the two connections are depicted respectively in the first and second colors and blue.

Figure 2H:
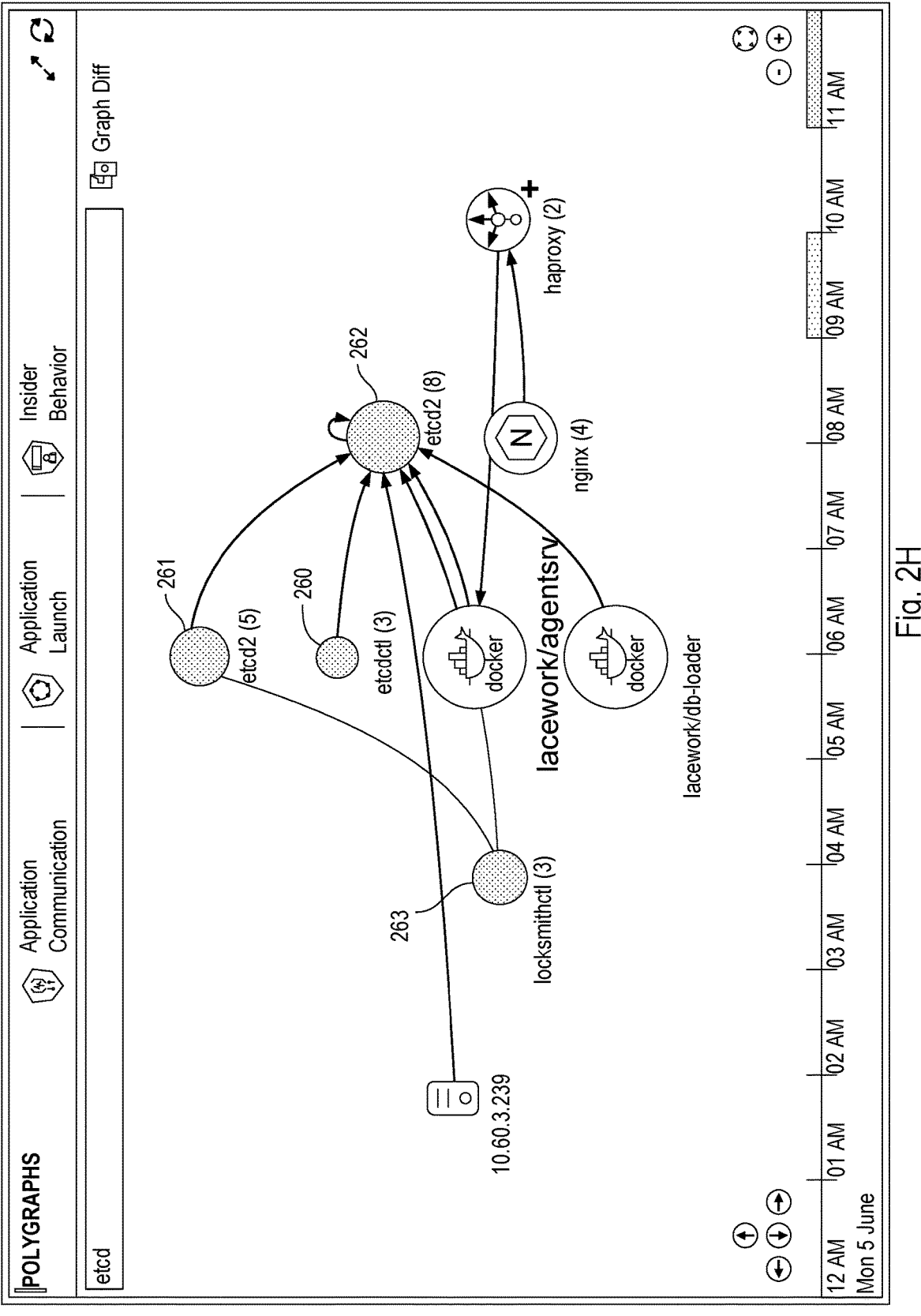
FIG. 2H illustrates an example of a portion of a polygraph as rendered in an interface.
Figure 21:
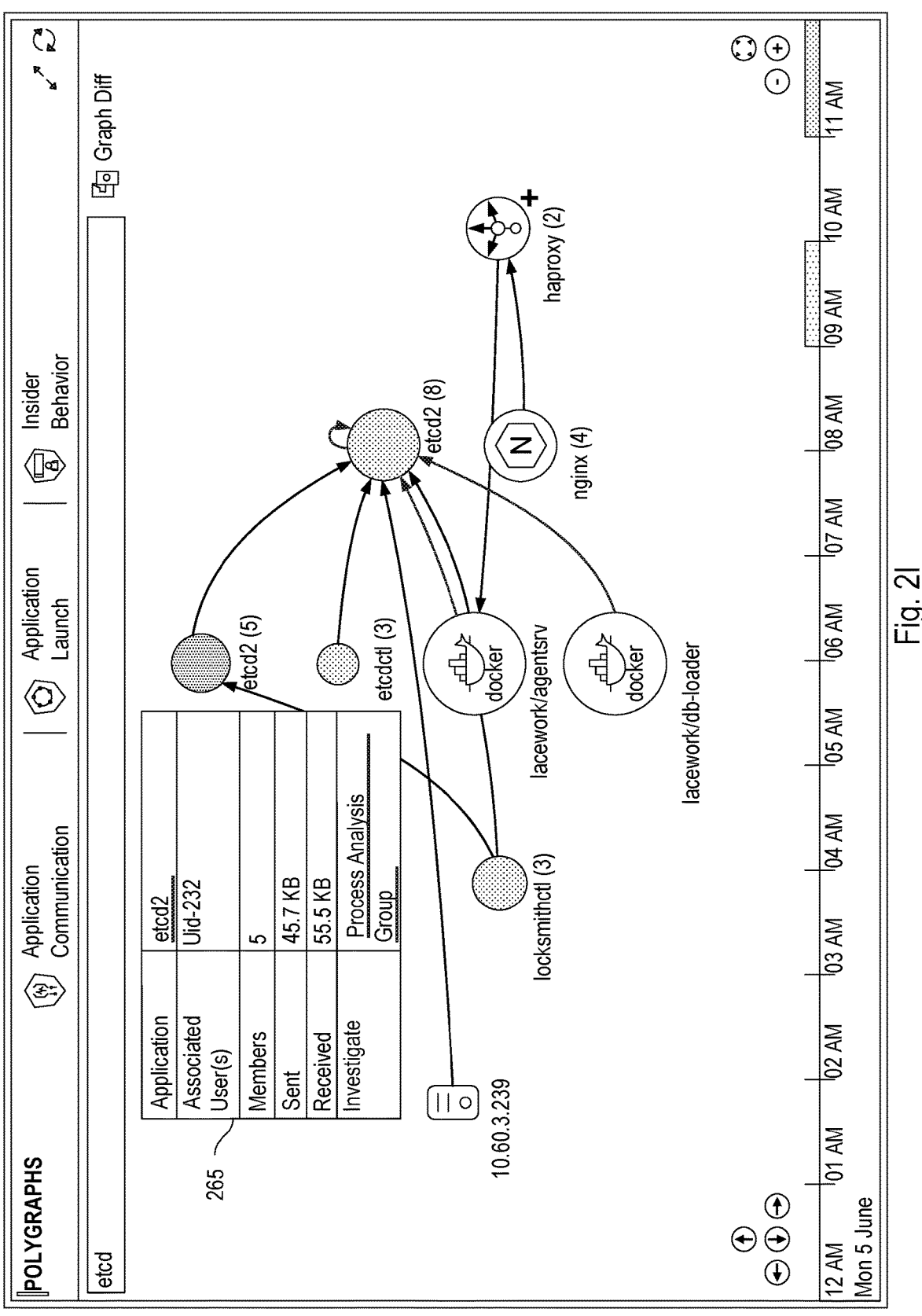

Returning to the polygraph depicted in FIG. 2F, suppose user B enters "etcd" into the search box located in region 244. User B will then be presented with the interface illustrated in FIG. 2H. As shown in FIG. 2H, three applications containing the term "etcd" were engaged in communications during the 9 am-10 am window. One application is etcdctl, a command line client for etcd. As shown in FIG. 2H, a total of three different etcdctl processes were executed during the 9 am-10 am window, and were clustered together (260). FIG. 2H also depicts two different clusters that are both named etcd2. The first cluster includes (for the 9 am-10 am window) five members (261) and the second cluster includes (for the same window) eight members (262). The reason for these two distinct clusters is that the two groups of applications behave differently (e.g., they exhibit two distinct sets of communication patterns). Specifically, the instances of etcd2 in cluster 261 only communicate with locksmithctl (263) and other etcd2 instances (in both clusters 261 and 262). The instances of etcd2 in cluster 262 communicate with additional entities, such as etcdctl and Docker containers. As desired, user B can click on one of the clusters (e.g., cluster 261) and be presented with summary information about the applications included in the cluster, as is shown in FIG. 2I (e.g., in region 265). User B can also double click on a given cluster (e.g., cluster 261) to see details on each of the individual members of the cluster broken out.

Figure 2J:
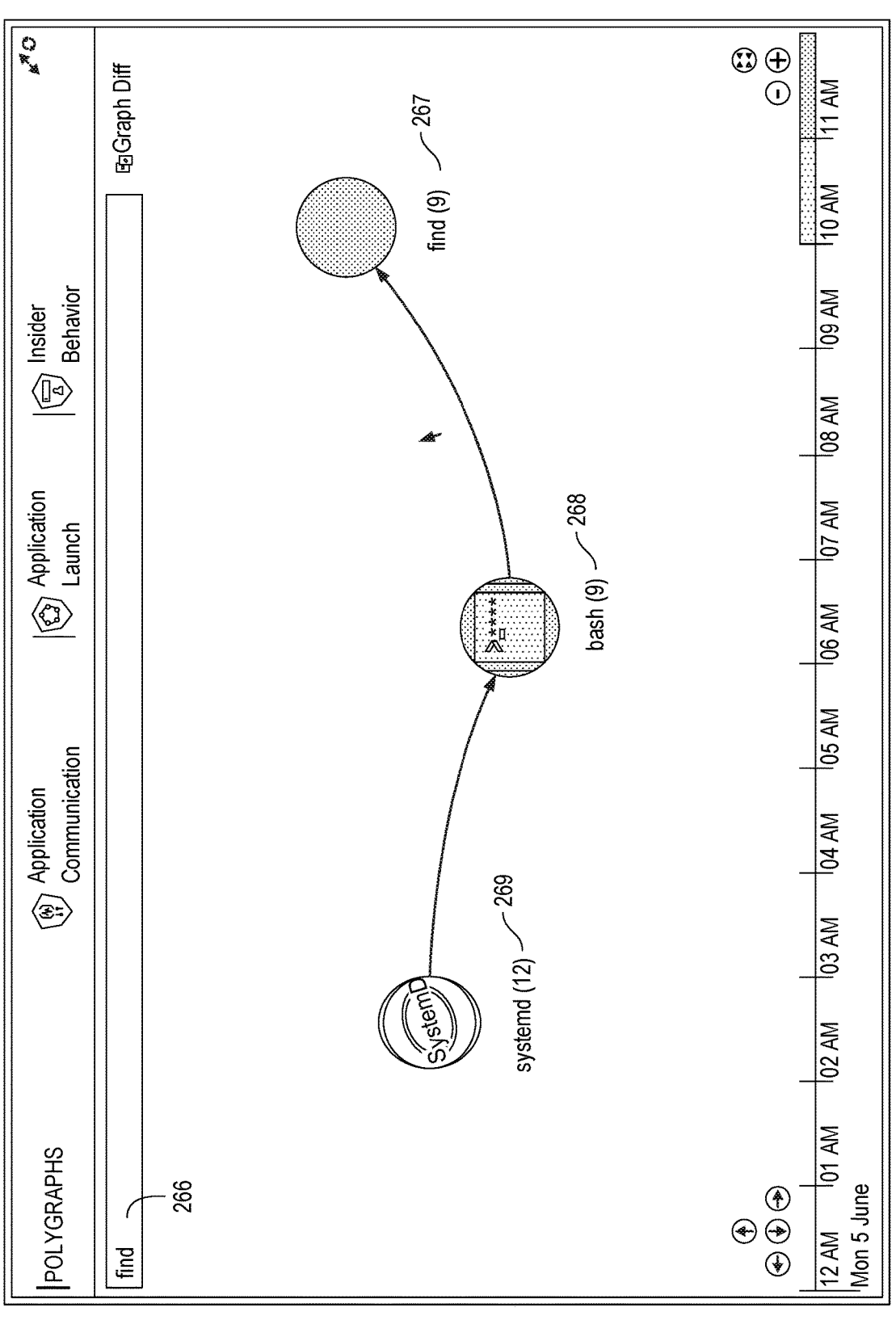
FIG. 2J illustrates an example of a portion of a polygraph as rendered in an interface.

Suppose user B now clicks on region 245 of the interface shown in FIG. 2F. User B will then be shown an application launch polygraph. Launching an application is another example of a behavior. The launch polygraph models how applications are launched by other applications. FIG. 2J illustrates an example of a portion of a launch polygraph. In particular, user B has typed "find" into region 266, to see how the "find" application is being launched. As shown in FIG. 2J, in the launch polygraph for the 10 am-11 am time period, find applications (267) are always launched by bash (268), which is in turn always launched by systemd (269). If find is launched by a different application, this would be anomalous behavior.

Figure 2K:
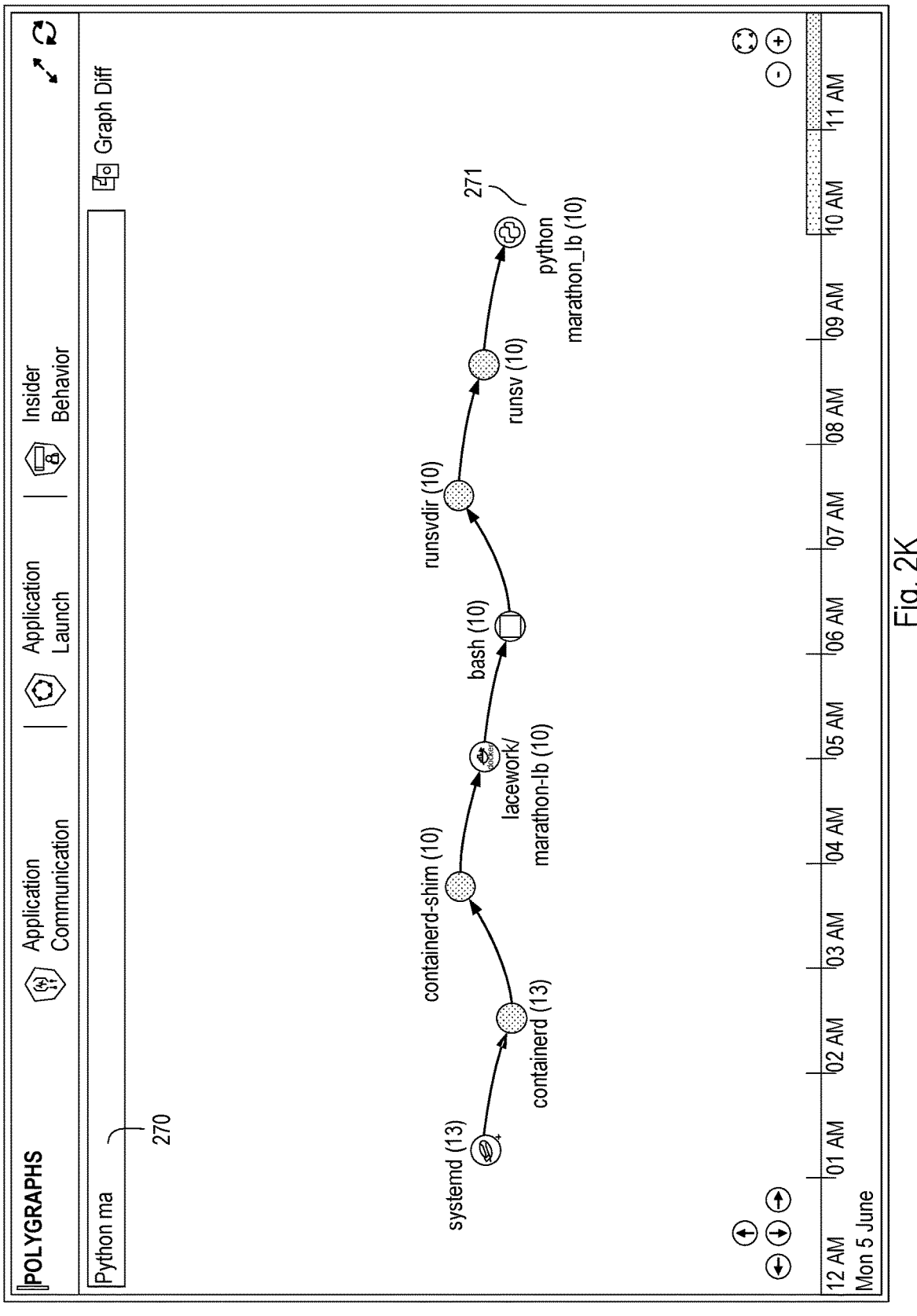
FIG. 2K illustrates an example of a portion of a polygraph as rendered in an interface.

FIG. 2K illustrates another example of a portion of an application launch polygraph. In FIG. 2K, user B has searched (270) for "python ma" to see how "python marathon_1b" (271) is launched. As shown in FIG. 2K, in each case (during the one hour time slice of 10 am-11 am), python marathon_1b is launched as a result of a chain of the same seven applications each time. If python marathon_1b is ever launched in a different manner, this indicates anomalous behavior. The behavior could be indicative of malicious activities, but could also be due to other reasons, such as a misconfiguration, a performance-related issue, and/or a failure, etc.

Suppose user B now clicks on region 246 of the interface shown in FIG. 2F. User B will then be shown an insider behavior graph. The insider behavior graph tracks information about behaviors such as processes started by a user interactively using protocols such as ssh or telnet, and any processes started by those processes. As one example, suppose an administrator logs into a first virtual machine in datacenter 106 (e.g., using sshd via an external connection he makes from a hotel), using a first set of credentials (e.g., first last@example.com and an appropriate password). From the first virtual machine, the administrator connects to a second virtual machine (e.g., using the same credentials), then uses the sudo command to change identities to those of another user, and then launches a program. Graphs built by data platform 12 can be used to associate the administrator with each of his actions, including launching the program using the identity of another user.

Figure 2L:
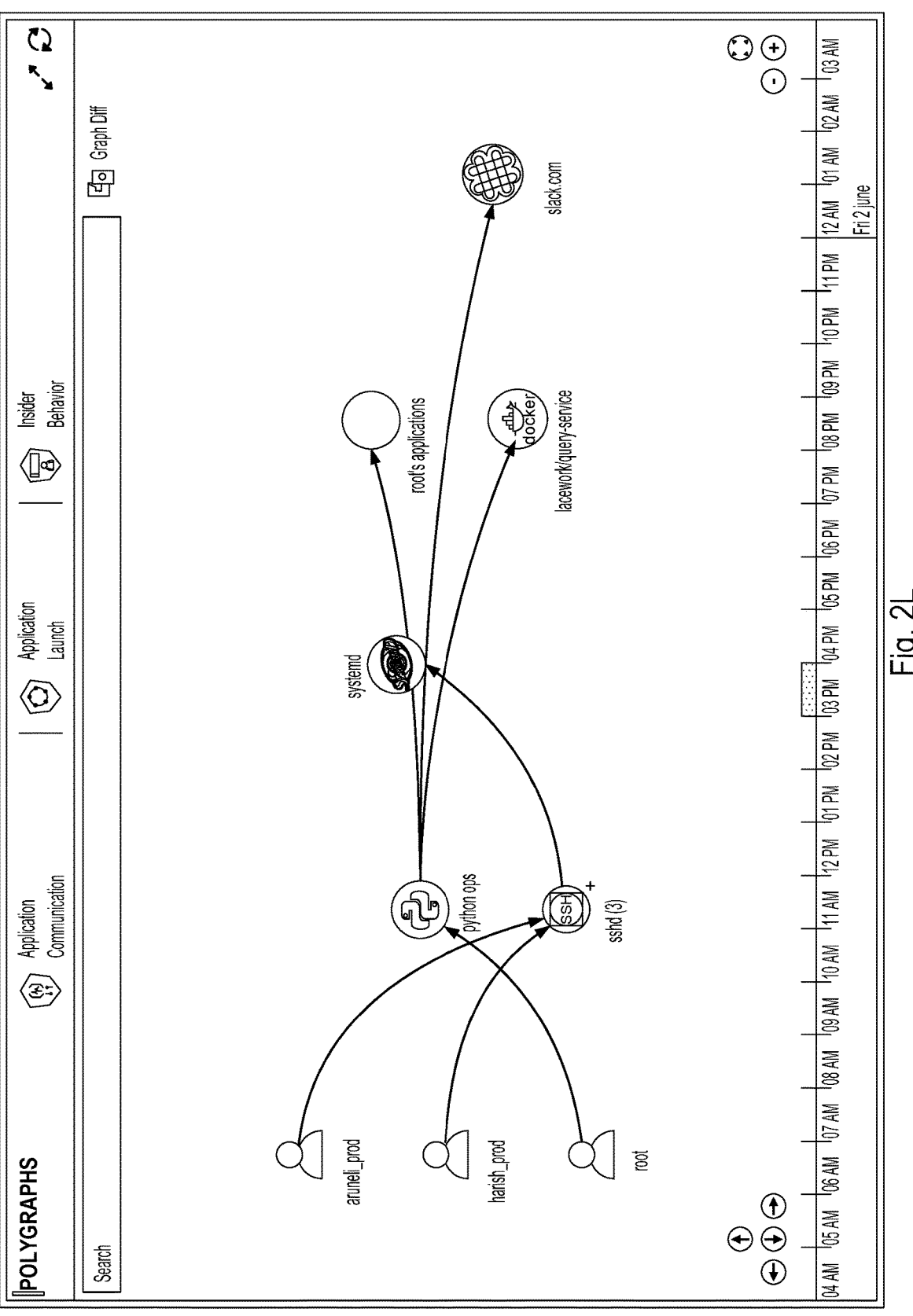
FIG. 2L illustrates an example of an insider behavior graph as rendered in an interface.

FIG. 2L illustrates an example of a portion of an insider behavior graph. In particular, in FIG. 2L, user B is viewing a graph that corresponds to the time slice of 3 pm-4 pm on June 1. FIG. 2L illustrates the internal/external applications that users connected to during the one hour time slice. If a user typically communicates with particular applications, that information will become part of a baseline. If the user deviates from his baseline behavior (e.g., using new applications, or changing privilege in anomalous ways), such anomalies can be surfaced.

Figure 2M:
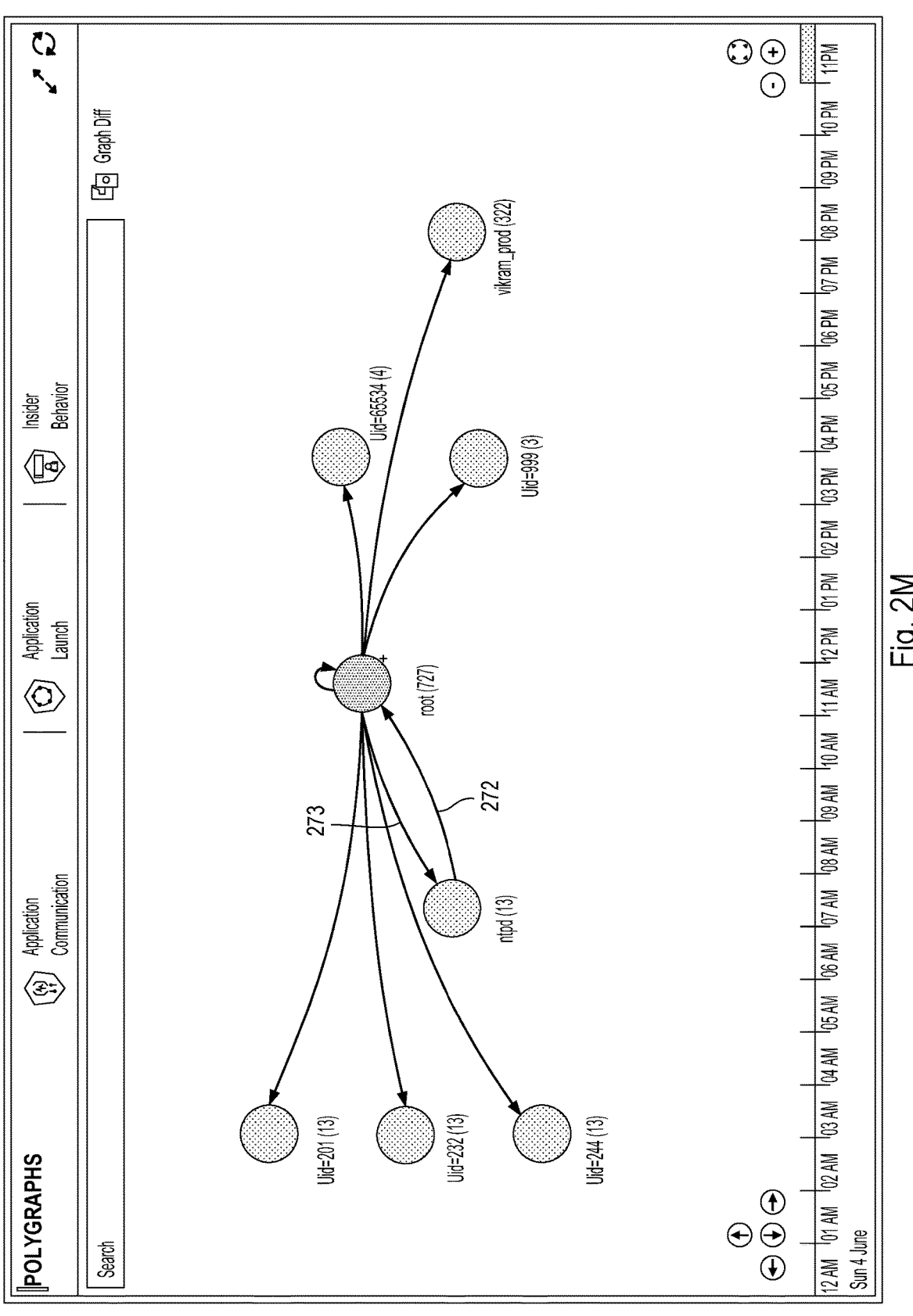
FIG. 2M illustrates an example of a privilege change graph as rendered in an interface.

FIG. 2M illustrates an example of a portion of a privilege change graph, which identifies how privileges are changed between processes. Typically, when a user launches a process (e.g., "ls"), the process inherits the same privileges that the user has. And, while a process can have fewer privileges than the user (i.e., go down in privilege), it is rare (and generally undesirable) for a user to escalate in privilege. Information included in the privilege change graph can be determined by examining the parent of each running process, and determining whether there is a match in privilege between the parent and the child. If the privileges are different, a privilege change has occurred (whether a change up or a change down). The application ntpd ls one rare example of a scenario in which a process escalates (272) to root, and then returns back (273). The sudo command is another example (e.g., used by an administrator to temporarily have a higher privilege). As with the other examples, ntpd's privilege change actions, and the legitimate actions of various administrators (e.g., using sudo) will be incorporated into a baseline model by data platform 12. When deviations occur, such as where a new application that is not ntpd escalates privilege, or where an individual that has not previously/does not routinely use sudo does so, such behaviors can be identified as anomalous.

Figure 2N:
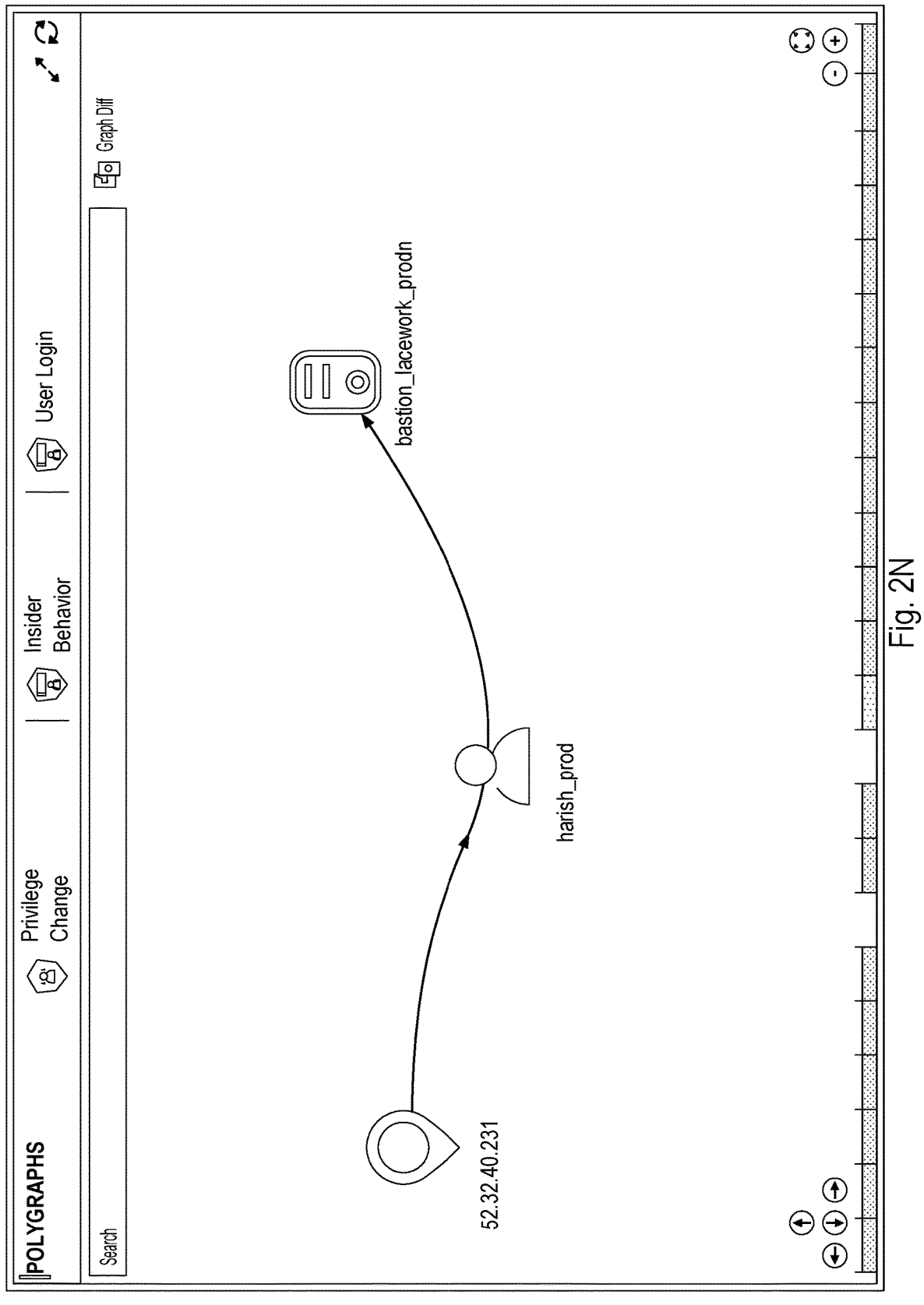
FIG. 2N illustrates an example of a user login graph as rendered in an interface.
Figure 20:
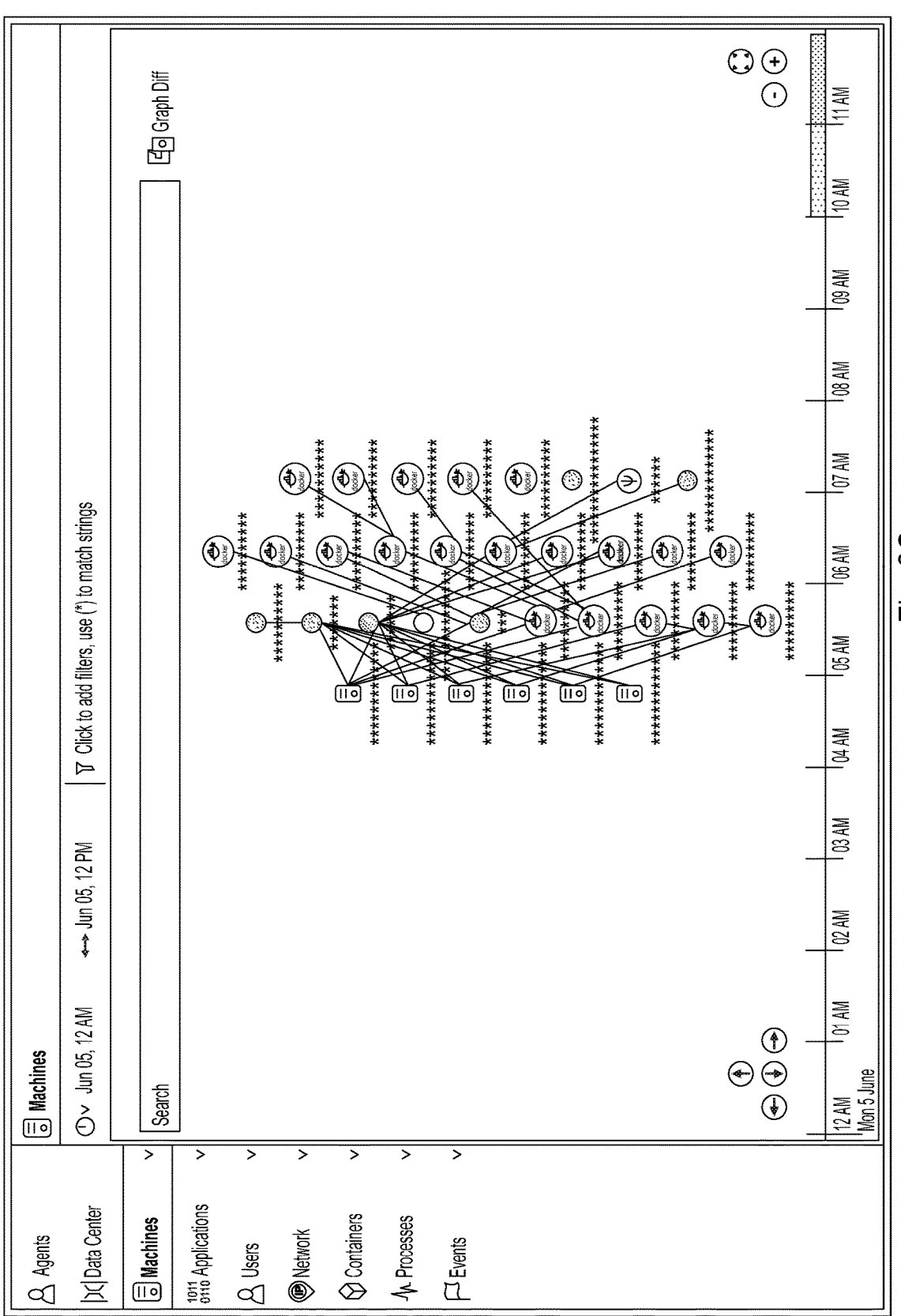

FIG. 2N illustrates an example of a portion of a user login graph, which identifies which users log into which logical nodes. Physical nodes (whether bare metal or virtualized) are clustered into a logical machine cluster, for example, using yet another graph, a machine-server graph, an example of which is shown in FIG. 2O. For each machine, a determination is made as to what type of machine it is, based on what kind(s) of workflows it runs. As one example, some machines run as master nodes (having a typical set of workflows they run, as master nodes) and can thus be clustered as master nodes. Worker nodes are different from master nodes, for example, because they run Docker containers, and frequently change as containers move around. Worker nodes can similarly be clustered.

As previously mentioned, the polygraph depicted in FIG. 2E corresponds to activities in a datacenter in which, in a given hour, approximately 500 virtual machines collectively run one million processes, and make 100 million connections in that hour. The polygraph represents a drastic reduction in size (e.g., from tracking information on 100 million connections in an hour, to a few hundred nodes and a few hundred edges). Using techniques described herein, such a polygraph can be constructed (e.g., using commercially available computing infrastructure) in less than an hour (e.g., within a few minutes). Thus, ongoing hourly snapshots of a datacenter can be created within a two hour moving window (i.e., collecting data for the time period 8 am-9 am, while also generating a snapshot for the time previous time period 7 am-8 am). The following describes various example infrastructure that can be used in polygraph construction, and also describes various techniques that can be used to construct polygraphs.

Returning to FIG. 1D, embodiments of data platform 12 may be built using any suitable infrastructure as a service (IaaS) (e.g., AWS). For example, data platform 12 can use Simple Storage Service (S3) for data storage, Key Management Service (KMS) for managing secrets, Simple Queue Service (SQS) for managing messaging between applications, Simple Email Service (SES) for sending emails, and Route 53 for managing DNS. Other infrastructure tools can also be used. Examples include: orchestration tools (e.g., Kubernetes or Mesos/Marathon), service discovery tools (e.g., Mesos-DNS), service load balancing tools (e.g., marathon-LB), container tools (e.g., Docker or rkt), log/metric tools (e.g., collectd, fluentd, kibana, etc.), big data processing systems (e.g., Spark, Hadoop, AWS Redshift, Snowflake etc.), and distributed key value stores (e.g., Apache Zookeeper or etcd2).

As previously mentioned, in various embodiments, data platform 12 may make use of a collection of microservices. Each microservice can have multiple instances, and may be configured to recover from failure, scale, and distribute work amongst various such instances, as applicable. For example, microservices are auto-balancing for new instances, and can distribute workload if new instances are started or existing instances are terminated. In various embodiments, microservices may be deployed as self-contained Docker containers. A Mesos-Marathon or Spark framework can be used to deploy the microservices (e.g., with Marathon monitoring and restarting failed instances of microservices as needed). The service etcd2 can be used by microservice instances to discover how many peer instances are running, and used for calculating a hash-based scheme for workload distribution. Microservices may be configured to publish various health/status metrics to either an SQS queue, or etcd2, as applicable. In some examples, Amazon DynamoDB can be used for state management.

Additional information on various microservices used in embodiments of data platform 12 is provided below.

Graph generator 146 is a microservice that may be responsible for generating raw behavior graphs on a per customer basis periodically (e.g., once an hour). In particular, graph generator 146 may generate graphs of entities (as the nodes in the graph) and activities between entities (as the edges). In various embodiments, graph generator 146 also performs other functions, such as aggregation, enrichment (e.g., geolocation and threat), reverse DNS resolution, TF-IDF based command line analysis for command type extraction, parent process tracking, etc.

Graph generator 146 may perform joins on data collected by the agents, so that both sides of a behavior are linked. For example, suppose a first process on a first virtual machine (e.g., having a first IP address) communicates with a second process on a second virtual machine (e.g., having a second IP address). Respective agents on the first and second virtual machines may each report information on their view of the communication (e.g., the PID of their respective processes, the amount of data exchanged and in which direction, etc.). When graph generator performs a join on the data provided by both agents, the graph will include a node for each of the processes, and an edge indicating communication between them (as well as other information, such as the directionality of the communication—i.e., which process acted as the server and which as the client in the communication).

In some cases, connections are process to process (e.g., from a process on one virtual machine within the cloud environment associated with entity A to another process on a virtual machine within the cloud environment associated with entity A). In other cases, a process may be in communication with a node (e.g., outside of entity A) which does not have an agent deployed upon it. As one example, a node within entity A might be in communication with node 172, outside of entity A. In such a scenario, communications with node 172 are modeled (e.g., by graph generator 146) using the IP address of node 172. Similarly, where a node within entity A does not have an agent deployed upon it, the IP address of the node can be used by graph generator in modeling.

Graphs created by graph generator 146 may be written to data store 30 and cached for further processing. A graph may be a summary of all activity that happened in a particular time interval. As each graph corresponds to a distinct period of time, different rows can be aggregated to find summary information over a larger timestamp. In some examples, picking two different graphs from two different timestamps can be used to compare different periods. If necessary, graph generator 146 can parallelize its workload (e.g., where its backlog cannot otherwise be handled within a particular time period, such as an hour, or if is required to process a graph spanning a long time period).

Graph generator 146 can be implemented in any appropriate programming language, such as Java or C, and machine learning libraries, such as Spark's MLLib. Example ways that graph generator computations can be implemented include using SQL or Map-R, using Spark or Hadoop.

SSH tracker 148 is a microservice that may be responsible for following ssh connections and process parent hierarchies to determine trails of user ssh activity. Identified ssh trails are placed by the SSH tracker 148 into data store 30 and cached for further processing.

SSH tracker 148 can be implemented in any appropriate programming language, such as Java or C, and machine libraries, such as Spark's MLLib. Example ways that SSH tracker computations can be implemented include using SQL or Map-R, using Spark or Hadoop.

Threat aggregator 150 is a microservice that may be responsible for obtaining third party threat information from various applicable sources, and making it available to other micro-services. Examples of such information include reverse DNS information, GeoIP information, lists of known bad domains/IP addresses, lists of known bad files, etc. As applicable, the threat information is normalized before insertion into data store 30. Threat aggregator 150 can be implemented in any appropriate programming language, such as Java or C, using SQL/JDBC libraries to interact with data store 30 (e.g., for insertions and queries).

Scheduler 152 is a microservice that may act as a scheduler and that may run arbitrary jobs organized as a directed graph. In some examples, scheduler 152 ensures that all jobs for all customers are able to run during a given time interval (e.g., every hour). Scheduler 152 may handle errors and retrying for failed jobs, track dependencies, manage appropriate resource levels, and/or scale jobs as needed. Scheduler 152 can be implemented in any appropriate programming language, such as Java or C. A variety of components can also be used, such as open source scheduler frameworks (e.g., Airflow), or AWS services (e.g., the AWS Data pipeline) which can be used for managing schedules.

Graph Behavior Modeler (GBM) 154 is a microservice that may compute polygraphs. In particular, GBM 154 can be used to find clusters of nodes in a graph that should be considered similar based on some set of their properties and relationships to other nodes. As described herein, the clusters and their relationships can be used to provide visibility into a datacenter environment without requiring user specified labels. GBM 154 may track such clusters over time persistently, allowing for changes to be detected and alerts to be generated.

GBM 154 may take as input a raw graph (e.g., as generated by graph generator 146). Nodes are actors of a behavior, and edges are the behavior relationship itself. For example, in the case of communication, example actors include processes, which communicate with other processes. The GBM 154 clusters the raw graph based on behaviors of actors and produces a summary (the polygraph). The polygraph summarizes behavior at a datacenter level. The GBM 154 also produces "observations" that represent changes detected in the datacenter. Such observations may be based on differences in cumulative behavior (e.g., the baseline) of the datacenter with its current behavior. The GBM 154 can be implemented in any appropriate programming language, such as Java, C, or Golang, using appropriate libraries (as applicable) to handle distributed graph computations (handling large amounts of data analysis in a short amount of time). Apache Spark is another example tool that can be used to compute polygraphs. The GBM 154 can also take feedback from users and adjust the model according to that feedback. For example, if a given user is interested in relearning behavior for a particular entity, the GBM 154 can be instructed to "forget" the implicated part of the polygraph.

GBM runner 156 is a microservice that may be responsible for interfacing with GBM 154 and providing GBM 154 with raw graphs (e.g., using a query language, such as SQL, to push any computations it can to data store 30). GBM runner 156 may also insert polygraph output from GBM 154 to data store 30. GBM runner 156 can be implemented in any appropriate programming language, such as Java or C, using SQL/JDBC libraries to interact with data store 30 to insert and query data.

Alert generator 158 is a microservice that may be responsible for generating alerts. Alert generator 158 may examine observations (e.g., produced by GBM 154) in aggregate, deduplicate them, and score them. Alerts may be generated for observations with a score exceeding a threshold. Alert generator 158 may also compute (or retrieve, as applicable) data that a customer (e.g., user A or user B) might need when reviewing the alert. Examples of events that can be detected by data platform 12 (and alerted on by alert generator 158) include, but are not limited to the following:

new user: This event may be created the first time a user (e.g., of node 116) is first observed by an agent within a datacenter.

user launched new binary: This event may be generated when an interactive user launches an application for the first time.

new privilege escalation: This event may be generated when user privileges are escalated and a new application is run.

new application or container: This event may be generated when an application or container is seen for the first time.

new external connection: This event may be generated when a connection to an external IP/domain is made from a new application.

new external host or IP: This event may be generated
when a new external host or IP is involved in a
connection with a datacenter.
new internal connection: This event may be generated
when a connection between internal-only applications
is seen for the first time.
new external client: This event may be generated when a
new external connection is seen for an application
which typically does not have external connections.
new parent: This event may be generated when an appli-
cation is launched by a different parent.
connection to known bad IP/domain: Data platform 12
maintains (or can otherwise access) one or more repu-
tation feeds. If an environment makes a connection to
a known bad IP or domain, an event will be generated.
login from a known bad IP/domain: An event may be
generated when a successful connection to a datacenter
from a known bad IP is observed by data platform 12.
Alert generator 158 can be implemented in any appropri-
ate programming language, such as Java or C, using SQL/
JDBC libraries to interact with data store 30 to insert and
query data. In various embodiments, alert generator 158 also
uses one or more machine learning libraries, such as Spark's
MLLib (e.g., to compute scoring of various observations).
Alert generator 158 can also take feedback from users about
which kinds of events are of interest and which to suppress.

QsJobServer 160 is a microservice that may look at all the
data produced by data platform 12 for an hour, and compile
a materialized view (MV) out of the data to make queries
faster. The MV helps make sure that the queries customers
most frequently run, and data that they search for, can be
easily queried and answered. QsJobServer 160 may also
precompute and cache a variety of different metrics so that
they can quickly be provided as answers at query time.
QsJobServer 160 can be implemented using any appropriate
programming language, such as Java or C, using SQL/JDBC
libraries. In some examples, QsJobServer 160 is able to
compute an MV efficiently at scale, where there could be a
large number of joins. An SQL engine, such as Oracle, can
be used to efficiently execute the SQL, as applicable.

Alert notifier 162 is a microservice that may take alerts
produced by alert generator 158 and send them to custom-
ers' integrated Security Information and Event Management
(SIEM) products (e.g., Splunk, Slack, etc.). Alert notifier
162 can be implemented using any appropriate program-
ming language, such as Java or C. Alert notifier 162 can be
configured to use an email service (e.g., AWS SES or
pagerduty) to send emails. Alert notifier 162 may also
provide templating support (e.g., Velocity or Moustache) to
manage templates and structured notifications to SIEM
products.

Reporting module 164 is a microservice that may be
responsible for creating reports out of customer data (e.g.,
daily summaries of events, etc.) and providing those reports
to customers (e.g., via email). Reporting module 164 can be
implemented using any appropriate programming language,
such as Java or C. Reporting module 164 can be configured
to use an email service (e.g., AWS SES or pagerduty) to send
emails. Reporting module 164 may also provide templating
support (e.g., Velocity or Moustache) to manage templates
(e.g., for constructing HTML-based email).

Web app 120 is a microservice that provides a user
interface to data collected and processed on data platform
12. Web app 120 may provide login, authentication, query,
data visualization, etc. features. Web app 120 may, in some
embodiments, include both client and server elements.
Example ways the server elements can be implemented are using Java DropWizard or Node.Js to serve business logic,
and a combination of JSON/HTTP to manage the service.
Example ways the client elements can be implemented are
using frameworks such as React, Angular, or Backbone.
JSON, jQuery, and JavaScript libraries (e.g., underscore)
can also be used.

Query service 166 is a microservice that may manage all
database access for web app 120. Query service 166
abstracts out data obtained from data store 30 and provides
a JSON-based REST API service to web app 120. Query
service 166 may generate SQL queries for the REST APIs
that it receives at run time. Query service 166 can be
implemented using any appropriate programming language,
such as Java or C and SQL/JDBC libraries, or an SQL
framework such as jOOQ. Query service 166 can internally
make use of a variety of types of databases, including a
relational database engine 168 (e.g., AWS Aurora) and/or
data store 30 to manage data for clients. Examples of tables
that query service 166 manages are OLTP tables and data
warehousing tables.

Cache 170 may be implemented by Redis and/or any
other service that provides a key-value store. Data platform
12 can use cache 170 to keep information for frontend
services about users. Examples of such information include
valid tokens for a customer, valid cookies of customers, the
last time a customer tried to login, etc.

FIG. 3A illustrates an example of a process for detecting
anomalies in a network environment. In various embodi-
ments, process 300 is performed by data platform 12. The
process begins at 301 when data associated with activities
occurring in a network environment (such as entity A's
datacenter) is received. One example of such data that can
be received at 301 is agent-collected data described above
(e.g., in conjunction with process 200).

At 302, a logical graph model is generated, using at least
a portion of the monitored activities. A variety of approaches
can be used to generate such logical graph models, and a
variety of logical graphs can be generated (whether using the
same, or different approaches). The following is one
example of how data received at 301 can be used to generate
and maintain a model.

During bootstrap, data platform 12 creates an aggregate
graph of physical connections (also referred to herein as an
aggregated physical graph) by matching connections that
occurred in the first hour into communication pairs. Clus-
tering is then performed on the communication pairs.
Examples of such clustering, described in more detail below,
include performing Matching Neighbor clustering and simi-
larity (e.g., SimRank) clustering. Additional processing can
also be performed (and is described in more detail below),
such as by splitting clusters based on application type, and
annotating nodes with DNS query information. The result-
ing graph (also referred to herein as a base graph or common
graph) can be used to generate a variety of models, where a
subset of node and edge types (described in more detail
below) and their properties are considered in a given model.
One example of a model is a UID to UID model (also
referred to herein as a Uid2Uid model) which clusters
together processes that share a username and show similar
privilege change behavior. Another example of a model is a
Ctype model, which clusters together processes that share
command line similarity. Yet another example of a model is
a Ptype model, which clusters together processes that share
behaviors over time.

Each hour (or any other predetermined time interval) after
bootstrap, a new snapshot is taken (i.e., data collected about
a datacenter in the last hour is processed) and information from the new snapshot is merged with existing data to create and (as additional data is collected/processed) maintain a cumulative graph. The cumulative graph (also referred to herein as a cumulative Ptype graph and a polygraph) is a running model of how processes behave over time. Nodes in the cumulative graph are Ptype nodes, and provide information such as a list of all active processes and PIDs in the last hour, the number of historic total processes, the average number of active processes per hour, the application type of the process (e.g., the CType of the Ptype), and historic Ctype information/frequency. Edges in the cumulative graph can represent connectivity and provide information such as connectivity frequency. The edges can be weighted (e.g., based on number of connections, number of bytes exchanged, etc.). Edges in the cumulative graph (and snapshots) can also represent transitions.

One approach to merging a snapshot of the activity of the last hour into a cumulative graph is as follows. An aggregate graph of physical connections is made for the connections included in the snapshot (as was previously done for the original snapshot used during bootstrap). And, clustering/splitting is similarly performed on the snapshot's aggregate graph. Next, Ptype clusters in the snapshot's graph are compared against Ptype clusters in the cumulative graph to identify commonality.

One approach to determining commonality is, for any two nodes that are members of a given CmdType (described in more detail below), comparing internal neighbors and calculating a set membership Jaccard distance. The pairs of nodes are then ordered by decreasing similarity (i.e., with the most similar sets first). For nodes with a threshold amount of commonality (e.g., at least 66% members in common), any new nodes (i.e., appearing in the snapshot's graph but not the cumulative graph) are assigned the same Ptype identifier as is assigned to the corresponding node in the cumulative graph. For each node that is not classified (i.e., has not been assigned a Ptype identifier), a network signature is generated (i.e., indicative of the kinds of network connections the node makes, who the node communicates with, etc.). The following processing is then performed until convergence. If a match of the network signature is found in the cumulative graph, the unclassified node is assigned the Ptype identifier of the corresponding node in the cumulative graph. Any nodes which remain unclassified after convergence are new Ptypes and are assigned new identifiers and added to the cumulative graph as new. As applicable, the detection of a new Ptype can be used to generate an alert. If the new Ptype has a new CmdType, a severity of the alert can be increased. If any surviving nodes (i.e., present in both the cumulative graph and the snapshot graph) change Ptypes, such change is noted as a transition, and an alert can be generated. Further, if a surviving node changes Ptype and also changes CmdType, a severity of the alert can be increased.

Changes to the cumulative graph (e.g., a new Ptype or a new edge between two Ptypes) can be used (e.g., at 303) to detect anomalies (described in more detail below). Two example kinds of anomalies that can be detected by data platform 12 include security anomalies (e.g., a user or process behaving in an unexpected manner) and devops/root cause anomalies (e.g., network congestion, application failure, etc.). Detected anomalies can be recorded and surfaced (e.g., to administrators, auditors, etc.), such as through alerts which are generated at 304 based on anomaly detection.

Additional detail regarding processing performed, by various components depicted in FIG. 1D (whether performed individually or in combination), in conjunction with model/polygraph construction (e.g., as performed at 302) are provided below.

As explained above, an aggregated physical graph can be generated on a per customer basis periodically (e.g., once an hour) from raw physical graph information, by matching connections (e.g., between two processes on two virtual machines). In various embodiments, a deterministic fixed approach is used to cluster nodes in the aggregated physical graph (e.g., representing processes and their communications). As one example, Matching Neighbors Clustering (MNC) can be performed on the aggregated physical graph to determine which entities exhibit identical behavior and cluster such entities together.

Figure 3B:
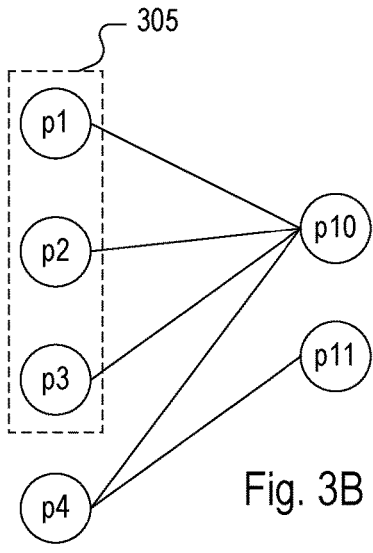
FIG. 3B depicts a set of example processes communicating with other processes.

FIG. 3B depicts a set of example processes (p1, p2, p3, and p4) communicating with other processes (p10 and p11). FIG. 3B is a graphical representation of a small portion of an aggregated physical graph showing (for a given time period, such as an hour) which processes in a datacenter communicate with which other processes. Using MNC, processes p1, p2, and p3 will be clustered together (305), as they exhibit identical behavior (they communicate with p10 and only p10). Process p4, which communicates with both p10 and p11, will be clustered separately.

In MNC, only those processes exhibiting identical (communication) behavior will be clustered. In various embodiments, an alternate clustering approach can also/instead be used, which uses a similarity measure (e.g., constrained by a threshold value, such as a 60% similarity) to cluster items. In some embodiments, the output of MNC is used as input to SimRank, in other embodiments, MNC is omitted.

Figure 3C:
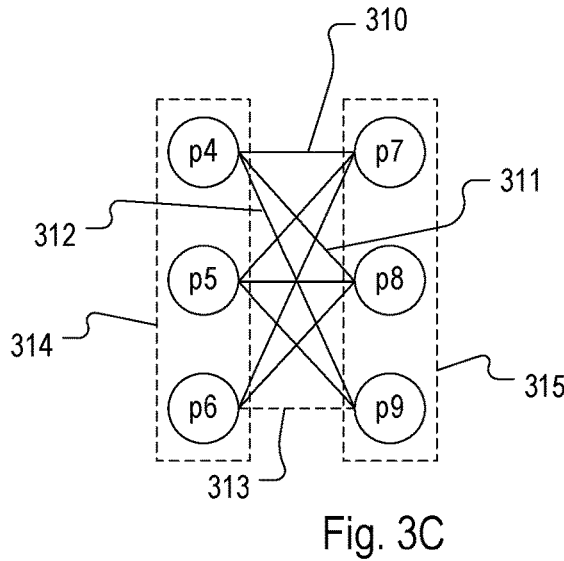
FIG. 3C depicts a set of example processes communicating with other processes.

FIG. 3C depicts a set of example processes (p4, p5, p6) communicating with other processes (p7, p8, p9). As illustrated, most of nodes p4, p5, and p6 communicate with most of nodes p7, p8, and p9 (as indicated in FIG. 3C with solid connection lines). As one example, process p4 communicates with process p7 (310), process p8 (311), and process p9 (312). An exception is process p6, which communicates with processes p7 and p8, but does not communicate with process p9 (as indicated by dashed line 313). If MNC were applied to the nodes depicted in FIG. 3C, nodes p4 and p5 would be clustered (and node p6 would not be included in their cluster).

One approach to similarity clustering is to use SimRank. In an embodiment of the SimRank approach, for a given node v in a directed graph, I(v) and O(v) denote the respective set of in-neighbors and out-neighbors of v. Individual in-neighbors are denoted as $I_i(v)$, for $1 \le i \le |I(v)|$, and individual out-neighbors are denoted as $O_i(v)$, for $1 \le i \le |O(v)|$. The similarity between two objects a and b can be denoted by $s(a,b) \in [1,0]$. A recursive equation (hereinafter "the SimRank equation") can be written for s(a,b), where, if a=b, then s(a,b) is defined as 1, otherwise, $$s(a, b) = \frac{C}{|I(a)||I(b)|} \sum_{i=1}^{|I(a)|} \sum_{j=1}^{|I(b)|} s(I_i(a), I_j(b))$$

where C is a constant between 0 and 1. One example value for the decay factor C is 0.8 (and a fixed number of iterations such as five). Another example value for the decay factor C is 0.6 (and/or a different number of iterations). In the event that a or b has no in-neighbors, similarity is set to s(a,b)=0, so the summation is defined to be 0 when I(a)=Ø or I(b)=Ø.

The SimRank equations for a graph G can be solved by iteration to a fixed point. Suppose n is the number of nodes in G. For each iteration k, $n^2$ entries $s_k(*, *)$ are kept, where $s_k(a,b)$ gives the score between a and b on iteration k. Successive computations of $s_{k+1}(*,*)$ are made based on $s_k(*,*)$. Starting with $s_0(*,*)$, where each $s_0(a,b)$ is a lower bound on the actual SimRank score $$s(a, b): s_0(a, b) = \begin{cases} 1, & \text{if } a = b, \\ 0, & \text{if } a \neq b. \end{cases}$$

The SimRank equation can be used to compute $s_{k+1}(a, b)$ from $s_k(*, *)$ with $$s_{k+1}(a, b) = \frac{C}{|I(a)||I(b)|} \sum_{i=1}^{|I(a)|} \sum_{j=1}^{|I(b)|} s_k(I_i(a), I_j(b)) \text{ for } a \neq b,$$

and $s_{k+1}(a, b)=1$ for a=b. On each iteration k+1, the similarity of (a,b) is updated using the similarity scores of the neighbors of (a,b) from the previous iteration k according to the SimRank equation. The values $s_k (*, *)$ are nondecreasing as k increases.

Returning to FIG. 3C, while MNC would cluster nodes p4 and p5 together (and not include node p6 in their cluster), application of SimRank would cluster nodes p4-p6 into one cluster (314) and also cluster nodes p7-p9 into another cluster (315).

Figure 3D:
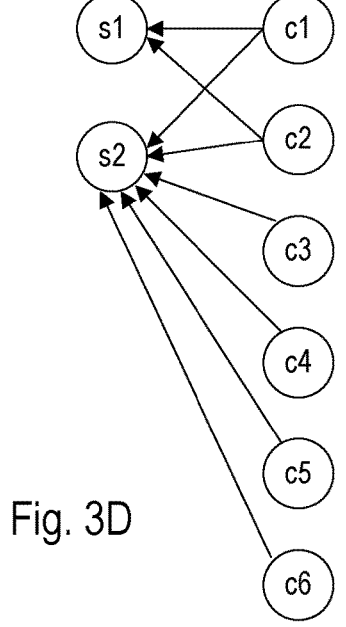
FIG. 3D depicts a set of example processes communicating with other processes.

FIG. 3D depicts a set of processes, and in particular server processes s1 and s2, and client processes c1, c2, c3, c4, c5, and c6. Suppose only nodes s1, s2, c1, and c2 are present in the graph depicted in FIG. 3D (and the other nodes depicted are omitted from consideration). Using MNC, nodes s1 and s2 would be clustered together, as would nodes c1 and c2. Performing SimRank clustering as described above would also result in those two clusters (s1 and s2, and c1 and c2). As previously mentioned, in MNC, identical behavior is required. Thus, if node c3 were now also present in the graph, MNC would not include c3 in a cluster with c2 and c1 because node c3 only communicates with node s2 and not node s1. In contrast, a SimRank clustering of a graph that includes nodes s1, s2, c1, c2, and c3 would result (based, e.g., on an applicable selected decay value and number of iterations) in a first cluster comprising nodes s1 and s2, and a second cluster of c1, c2, and c3. As an increasing number of nodes which communicate with server process s2, and do not also communicate with server process s1, are included in the graph (e.g., as c4, c5, and c6 are added), under SimRank, nodes s1 and s2 will become decreasingly similar (i.e., their intersection is reduced).

In various embodiments, SimRank is modified (from what is described above) to accommodate differences between the asymmetry of client and server connections. As one example, SimRank can be modified to use different thresholds for client communications (e.g., an 80% match among nodes c1-c6) and for server communications (e.g., a 60% match among nodes s1 and s2). Such modification can also help achieve convergence in situations such as where a server process dies on one node and restarts on another node.

The application of MNC/SimRank to an aggregated physical graph results in a smaller graph, in which processes which are determined to be sufficiently similar are clustered together. Typically, clusters generated as output of MNC will be underinclusive. For example, for the nodes depicted in FIG. 3C, process p6 will not be included in a cluster with processes p4 and p5, despite substantial similarity in their communication behaviors. The application of SimRank (e.g., to the output of MNC) helps mitigate the underinclusiveness of MNC, but can result in overly inclusive clusters. As one example, suppose (returning to the nodes depicted in FIG. 3B) that as a result of applying SimRank to the depicted nodes, nodes p1-p4 are all included in a single cluster. Both MNC and SimRank operate agnostically of which application a given process belongs to. Suppose processes p1-p3 each correspond to a first application (e.g., an update engine), and process p4 corresponds to a second application (e.g., sshd). Further suppose process p10 corresponds to contact with AWS. Clustering all four of the processes together (e.g., as a result of SimRank) could be problematic, particularly in a security context (e.g., where granular information useful in detecting threats would be lost).

As previously mentioned, data platform 12 may maintain a mapping between processes and the applications to which they belong. In various embodiments, the output of SimRank (e.g., SimRank clusters) is split based on the applications to which cluster members belong (such a split is also referred to herein as a "CmdType split"). If all cluster members share a common application, the cluster remains. If different cluster members originate from different applications, the cluster members are split along application-type (CmdType) lines. Using the nodes depicted in FIG. 3D as an example, suppose that nodes c1, c2, c3, and c5 all share "update engine" as the type of application to which they belong (sharing a CmdType). Suppose that node c4 belongs to "ssh," and suppose that node c6 belongs to "bash." As a result of SimRank, all six nodes (c1-c6) might be clustered into a single cluster. After a CmdType split is performed on the cluster, however, the single cluster will be broken into three clusters (c1, c2, c3, c5; c4; and c6). Specifically, the resulting clusters comprise processes associated with the same type of application, which exhibit similar behaviors (e.g., communication behaviors). Each of the three clusters resulting from the CmdType split represents, respectively, a node (also referred to herein as a Ptype) of a particular CmdType. Each Ptype is given a persistent identifier and stored persistently as a cumulative graph.

A variety of approaches can be used to determine a CmdType for a given process. As one example, for some applications (e.g., sshd), a one-to-one mapping exists between the CmdType and the application/binary name. Thus, processes corresponding to the execution of sshd will be classified using a CmdType of sshd. In various embodiments, a list of common application/binary names (e.g., sshd, apache, etc.) is maintained by data platform 12 and manually curated as applicable. Other types of applications (e.g., Java, Python, and Ruby) are multi-homed, meaning that several very different applications may all execute using the binary name, "java." For these types of applications, information such as command line/execution path information can be used in determining a CmdType. In particular, the subapplication can be used as the CmdType of the application, and/or term frequency analysis (e.g., TF/IDF) can be used on command line information to group, for example, any marathon related applications together (e.g., as a python.marathon CmdType) and separately from other Python applications (e.g., as a python.airflow CmdType).

In various embodiments, machine learning techniques are used to determine a CmdType. The CmdType model is constrained such that the execution path for each CmdType is unique. One example approach to making a CmdType model is a random forest based approach. An initial CmdType model is bootstrapped using process parameters (e.g., available within one minute of process startup) obtained using one hour of information for a given customer (e.g., entity A). Examples of such parameters include the command line of the process, the command line of the process's parent(s) (if applicable), the uptime of the process, UID/EUID and any change information, TTY and any change information, listening ports, and children (if any). Another approach is to perform term frequency clustering over command line information to convert command lines into cluster identifiers.

The random forest model can be used (e.g., in subsequent hours) to predict a CmdType for a process (e.g., based on features of the process). If a match is found, the process can be assigned the matching CmdType. If a match is not found, a comparison between features of the process and its nearest CmdType (e.g., as determined using a Levenstein distance) can be performed. The existing CmdType can be expanded to include the process, or, as applicable, a new CmdType can be created (and other actions taken, such as generating an alert). Another approach to handling processes which do not match an existing CmdType is to designate such processes as unclassified, and once an hour, create a new random forest seeded with process information from a sampling of classified processes (e.g., 10 or 100 processes per CmdType) and the new processes. If a given new process winds up in an existing set, the process is given the corresponding CmdType. If a new cluster is created, a new CmdType can be created.

Conceptually, a polygraph represents the smallest possible graph of clusters that preserve a set of rules (e.g., in which nodes included in the cluster must share a CmdType and behavior). As a result of performing MNC, SimRank, and cluster splitting (e.g., CmdType splitting) many processes are clustered together based on commonality of behavior (e.g., communication behavior) and commonality of application type. Such clustering represents a significant reduction in graph size (e.g., compared to the original raw physical graph). Nonetheless, further clustering can be performed (e.g., by iterating on the graph data using the GBM to achieve such a polygraph). As more information within the graph is correlated, more nodes can be clustered together, reducing the size of the graph, until convergence is reached and no further clustering is possible.

Figure 3E:
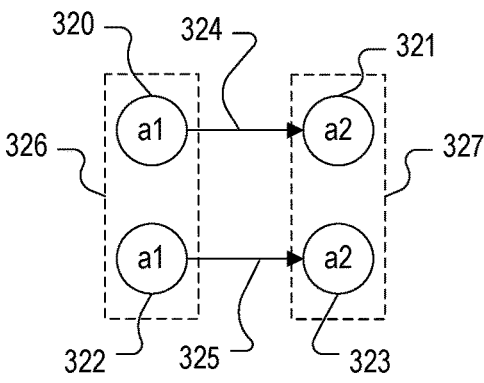
FIG. 3E depicts two pairs of clusters.

FIG. 3E depicts two pairs of clusters. In particular, cluster 320 represents a set of client processes sharing the same CmdType ("a1"), communicating (collectively) with a server process having a CmdType ("a2"). Cluster 322 also represents a set of client processes having a CmdType a1 communicating with a server process having a CmdType a2. The nodes in clusters 320 and 322 (and similarly nodes in 321 and 323) remain separately clustered (as depicted) after MNC/SimRank/CmdType splitting-isolated islands. One reason this could occur is where server process 321 corresponds to processes executing on a first machine (having an IP address of 1.1.1.1). The machine fails and a new server process 323 starts, on a second machine (having an IP address of 2.2.2.2) and takes over for process 321.

Communications between a cluster of nodes (e.g., nodes of cluster 320) and the first IP address can be considered different behavior from communications between the same set of nodes and the second IP address, and thus communications 324 and 325 will not be combined by MNC/SimRank in various embodiments. Nonetheless, it could be desirable for nodes of clusters 320/322 to be combined (into cluster 326), and for nodes of clusters 321/323 to be combined (into cluster 327), as representing (collectively) communications between a1 and a2. One task that can be performed by data platform 12 is to use DNS query information to map IP addresses to logical entities. As will be described in more detail below, GBM 154 can make use of the DNS query information to determine that graph nodes of cluster 320 and graph nodes of cluster 322 both made DNS queries for "appserverabc.example.com," which first resolved to 1.1.1.1 and then to 2.2.2.2, and to combine nodes 320/322 and 321/323 together into a single pair of nodes (326 communicating with 327).

In various embodiments, GBM 154 operates in a batch manner in which it receives as input the nodes and edges of a graph for a particular time period along with its previous state, and generates as output clustered nodes, cluster membership edges, cluster-to-cluster edges, events, and its next state.

GBM 154 may not try to consider all types of entities and their relationships that may be available in a conceptual common graph all at once. Instead, GBM uses a concept of models where a subset of node and edge types and their properties are considered in a given model. Such an approach is helpful for scalability, and also to help preserve detailed information (of particular importance in a security context)—as clustering entities in a more complex and larger graph could result in less useful results. In particular, such an approach allows for different types of relationships between entities to be preserved/more easily analyzed.

While GBM 154 can be used with different models corresponding to different subgraphs, core abstractions remain the same across types of models.

For example, each node type in a GBM model is considered to belong to a class. The class can be thought of as a way for the GBM to split nodes based on the criteria it uses for the model. The class for a node is represented as a string whose value is derived from the node's key and properties depending on the GBM Model. Note that different GBM models may create different class values for the same node. For each node type in a given GBM model, GBM 154 can generate clusters of nodes for that type. A GBM generated cluster for a given member node type cannot span more than one class for that node type. GBM 154 generates edges between clusters that have the same types as the edges between source and destination cluster node types.

Additionally or alternatively, the processes described herein as being used for a particular model can be used (can be the same) across models, and different models can also be configured with different settings.

Additionally or alternatively, the node types and the edge types may correspond to existing types in the common graph node and edge tables but this is not necessary. Even when there is a correspondence, the properties provided to GBM 154 are not limited to the properties that are stored in the corresponding graph table entries. They can be enriched with additional information before being passed to GBM 154.

Logically, the input for a GBM model can be characterized in a manner that is similar to other graphs. Edge triplets can be expressed, for example, as an array of source node type, edge type, and destination node type. And, each node type is associated with node properties, and each edge type is associated with edge properties. Other edge triplets can also be used (and/or edge triplets can be extended) in accordance with various embodiments.

Note that the physical input to the GBM model need not (and does not, in various embodiments) conform to the logical input. For example, the edges in the PtypeConn model correspond to edges between Matching Neighbors (MN) clusters, where each process node has an MN cluster identifier property. In the User ID to User ID model (also referred to herein as the Uid2Uid model), edges are not explicitly provided separately from nodes (as the euid array in the node properties serves the same purpose). In both cases, however, the physical information provides the applicable information necessary for the logical input.

The state input for a particular GBM model can be stored in a file, a database, or other appropriate storage. The state file (from a previous run) is provided, along with graph data, except for when the first run for a given model is performed, or the model is reset. In some cases, no data may be available for a particular model in a given time period, and GBM may not be run for that time period. As data becomes available at a future time, GBM can run using the latest state file as input.

GBM 154 outputs cluster nodes, cluster membership edges, and inter-cluster relationship edges that are stored (in some embodiments) in the graph node tables: node_c, node_cm, and node_icr, respectively. The type names of nodes and edges may conform to the following rules:

A given node type can be used in multiple different GBM models. The type names of the cluster nodes generated by two such models for that node type will be different. For instance, process type nodes will appear in both PtypeConn and Uid2Uid models, but their cluster nodes will have different type names.

The membership edge type name is "MemberOf."

The edge type names for cluster-to-cluster edges will be the same as the edge type names in the underlying node-to-node edges in the input.

The following are example events GBM 154 can generate: new class, new cluster, new edge from class to class, split class (the notion that GBM 154 considers all nodes of a given type and class to be in the same cluster initially and if GBM 154 splits them into multiple clusters, it is splitting a class), new edge from cluster and class, new edge between cluster and cluster, and/or new edge from class to cluster.

One underlying node or edge in the logical input can cause multiple types of events to be generated. Conversely, one event can correspond to multiple nodes or edges in the input. Not every model generates every event type.

Additional information regarding examples of data structures/models that can be used in conjunction with models used by data platform 12 is now provided.

In some examples, a PtypeConn Model clusters nodes of the same class that have similar connectivity relationships. For example, if two processes had similar incoming neighbors of the same class and outgoing neighbors of the same class, they could be clustered.

The node input to the PtypeConn model for a given time period includes non-interactive (i.e., not associated with tty) process nodes that had connections in the time period and the base graph nodes of other types (IP Service Endpoint (IPSep) comprising an IP address and a port, DNS Service Endpoint (DNSSep) and IPAddress) that have been involved in those connections. The base relationship is the connectivity relationship for the following type triplets:

Process, ConnectedTo, Process
Process, ConnectedTo, IP Service Endpoint (IPSep)
Process, ConnectedTo, DNS Service Endpoint (DNSSep)
IPAddress, ConnectedTo, ProcessProcess, DNS, ConnectedTo, Process The edge inputs to this model are the ConnectedTo edges from the MN cluster, instead of individual node-to-node ConnectedTo edges from the base graph. The membership edges created by this model refer to the base graph node type provided in the input.

Class Values:
The class values of nodes are determined as follows depending on the node type (e.g., Process nodes, IPSep nodes, DNSSep nodes, and IP Address nodes).
Process nodes:
if exe_path contains java then "java<cmdline_term_1> . . . "
else if exe_path contains python then "python<cmdline_term_1> . . . "
else "last_part_of_exe_path"
IPSep nodes:
if IP_internal then "IntIPS"
else if severity=0 then "<IP_addr>:<protocol>:<port>"
else "<IP_addr>:<port>_BadIP"
DNSSep nodes:
if IP_internal=1 then "<hostname>"
else if severity=0 then "<hostname>:<protocol>: port"
else "<hostname>:<port>_BadIP"
IPAddress nodes (will appear only on client side):
if IP_internal=1 then "IPIntC"
else if severity=0 then "ExtIPC"
else "ExtBadIPC"
Events:
A new class event in this model for a process node is equivalent to seeing a new Ctype being involved in a connection for the first time. Note that this does not mean the Ctype was not seen before. It is possible that it was previously seen but did not make a connection at that time.
A new class event in this model for an IPSep node with IP_internal=0 is equivalent to seeing a connection to a new external IP address for the first time.
A new class event in this model for a DNSSep node is equivalent to seeing a connection to a new domain for the first time.
A new class event in this model for an IPAddress node with IP_internal=0 and severity=0 is equivalent to seeing a connection from any external IP address for the first time.
A new class event in this model for an IPAddress node with IP_internal=0 and severity>0 is equivalent to seeing a connection from any bad external IP address for the first time.
A new class to class to edge from a class for a process node to a class for a process node is equivalent to seeing a communication from the source Ctype making a connection to the destination Ctype for the first time.
A new class to class to edge from a class for a process node to a class for a DNSSep node is equivalent to seeing a communication from the source Ctype making a connection to the destination domain name for the first time.
An IntPConn Model may be similar to the PtypeConn Model, except that connection edges between parent/child processes and connections between processes where both sides are not interactive are filtered out.
A Uid2Uid Model may cluster processes with the same username that show similar privilege change behavior. For instance, if two processes with the same username had similar effective user values, launched processes with similar usernames, and were launched by processes with similar usernames, then they could be clustered.
An edge between a source cluster and destination cluster generated by this model means that all of the processes in the source cluster had a privilege change relationship to at least one process in the destination cluster.
The node input to this model for a given time period includes process nodes that are running in that period. The value of a class of process nodes is "<username>".

The base relationship that is used for clustering is privilege change, either by the process changing its effective user ID, or by launching a child process which runs with a different user.

The physical input for this model includes process nodes (only), with the caveat that the complete ancestor hierarchy of process nodes active (i.e., running) for a given time period is provided as input even if an ancestor is not active in that time period. Note that effective user IDs of a process are represented as an array in the process node properties, and launch relationships are available from ppid_hash fields in the properties as well.

A new class event in this model is equivalent to seeing a user for the first time.

A new class to class edge event is equivalent to seeing the source user making a privilege change to the destination user for the first time.

A Ct2Ct Model may cluster processes with the same Ctype that show similar launch behavior. For instance, if two processes with the same Ctype have launched processes with similar Ctypes, then they could be clustered.

The node input to this model for a given time period includes process nodes that are running in that period. The value class of process nodes is Ctype (similar to how it is created for the PtypeConn Model).

The base relationship that is used for clustering is a parent process with a given Ctype launching a child process with another given destination Ctype.

The physical input for this model includes process nodes (only) with the caveat that the complete ancestor hierarchy active process nodes (i.e., that are running) for a given time period is provided as input even if an ancestor is not active in that time period. Note that launch relationships are available from ppid_hash fields in the process node properties.

An edge between a source cluster and destination cluster generated by this model means that all of the processes in the source cluster launched at least one process in the destination cluster.

A new class event in this model is equivalent to seeing a Ctype for the first time. Note that the same type of event will be generated by the PtypeConn Model as well.

A new class to class edge event is equivalent to seeing the source Ctype launching the destination Ctype for the first time.

An MtypeConn Model may cluster nodes of the same class that have similar connectivity relationships. For example, if two machines had similar incoming neighbors of the same class and outgoing neighbors of the same class, they could be clustered.

A new class event in this model will be generated for external IP addresses or (as applicable) domain names seen for the first time. Note that a new class to class to edge Machine, class to class for an IPSep or DNSName node will also be generated at the same time.

The membership edges generated by this model will refer to Machine, IPAddress, DNSName, and IPSep nodes in the base graph. Though the nodes provided to this model are IPAddress nodes instead of IPSep nodes, the membership edges it generates will refer to IPSep type nodes. Alternatively, the base graph can generate edges between Machine and IPSep node types. Note that the Machine to IPAddress edges have tcp_dst_ports/udp_dst_ports properties that can be used for this purpose.

The node input to this model for a given time period includes machine nodes that had connections in the time period and the base graph nodes of other types (IPAddress and DNSName) that were involved in those connections.

The base relationship is the connectivity relationship for the following type triplets:

Machine, ConnectedTo, Machine
Machine, ConnectedTo, IPAddress
Machine, ConnectedTo, DNSName
IPAddress, ConnectedTo, Machine, DNS, ConnectedTo, Machine The edge inputs to this model are the corresponding ConnectedTo edges in the base graph.

Class Values:

Machine:

The class value for all Machine nodes is "Machine."

The machine_terms property in the Machine nodes is used, in various embodiments, for labeling machines that are clustered together. If a majority of the machines clustered together share a term in the machine_terms, that term can be used for labeling the cluster.

IPSep:

The class value for IPSep nodes is determined as follows:
if IP_internal then "IntIPS"
else
if severity=0 then "<ip_addr>:<protocol>:<port>"
else "<IP_addr_BadIP>"

IP Address:

The class value for IpAddress nodes is determined as follows:
if IP_internal then "IntIPC"
else
if severity=0 then "ExtIPC"
else "ExtBadIPC"

DNSName:

The class value for DNSName nodes is determined as follows:
if severity=0 then "<hostname>"
else then "<hostname>_BadIP"

An example structure for a New Class Event is now described.

The key field for this event type looks as follows (using the PtypeConn model as an example):

```
{
"node": {
"class": {
"cid": "httpd"
},
"key": {
"cid": "29654"
},
"type": "PtypeConn"
}
}
```

It contains the class value and also the ID of the cluster where that class value is observed. Multiple clusters can be observed with the same value in a given time period. It contains the class value and also the ID of the cluster where that class value is observed. Multiple clusters can be observed with the same value in a given time period. Accordingly, in some embodiments, GBM 154 generates multiple events of this type for the same class value.

The properties field looks as follows:

```
{
"set_size": 5
}
```

The set_size indicates the size of the cluster referenced in the keys field.

Conditions:

For a given model and time period, multiple NewClass events can be generated if there is more than one cluster in that class. NewNode events will not be generated separately in this case.

Example New Class to Class Edge Event structure:

The key field for this event type looks as follows (using the PtypeConn model as an example):

```
"edge": {
"dst_node": {
"class": {
"cid": "java war"
},
"key": {
"cid": "27635"
},
"type": "PtypeConn"
},
"src_node": {
"class": {
"cid": "IntIPC"
},
"key": {
"cid": "20881"
},
"type": "PtypeConn"
},
"type": "ConnectedTo"
}
}
```

The key field contains source and destination class values and also source and destination cluster identifiers (i.e., the src/dst_node:key.cid represents the src/dst cluster identifier).

In a given time period for a given model, an event of this type could involve multiple edges between different cluster pairs that have the same source and destination class values. GBM 154 can generate multiple events in this case with different source and destination cluster identifiers.

The props fields look as follows for this event type:

```
{
"dst_set_size": 2,
"src_set_size": 1
}
```

The source and destination sizes represent the sizes of the clusters given in the keys field.

Conditions:

For a given model and time period, multiple NewClassToClass events can be generated if there are more than one pair of clusters in that class pair. NewNodeToNode events are not generated separately in this case.

Combining Events at the Class Level: for a given model and time period, the following example types of events can represent multiple changes in the underlying GBM cluster level graph in terms of multiple new clusters or multiple new edges between clusters:

NewClass

NewEdgeClassToClass

NewEdgeNodeToClass

NewEdgeClassToNode

Multiple NewClass events with the same model and class can be output if there are multiple clusters in that new class.

Multiple NewEdgeClassToClass events with the same model and class pair can be output if there are multiple new cluster edges within that class pair.

Multiple NewEdgeNodeToClass events with the same model and destination class can be output if there are multiple new edges from the source cluster to the destination clusters in that destination class (the first time seeing this class as a destination cluster class for the source cluster).

Multiple NewEdgeClassToNode events with the same model and source class can be output if there are multiple new edges from source clusters to the destination clusters in that source class (the first time seeing this class as a source cluster class for the destination cluster).

These events may be combined at the class level and treated as a single event when it is desirable to view changes at the class level, e.g., when one wants to know when there is a new Ctype.

In some examples, different models may have partial overlap in the types of nodes they use from the base graph. Therefore, they can generate NewClass type events for the same class. NewClass events can also be combined across models when it is desirable to view changes at the class level.

Using techniques herein, actions can be associated with processes and (e.g., by associating processes with users) actions can thus also be associated with extended user sessions. Such information can be used to track user behavior correctly, even where a malicious user attempts to hide his trail by changing user identities (e.g., through lateral movement). Extended user session tracking can also be useful in operational use cases without malicious intent, e.g., where users make original logins with distinct usernames (e.g., "50ddress" or "dave") but then perform actions under a common username (e.g., "admin" or "support"). One such example is where multiple users with administrator privileges exist, and they need to gain superuser privilege to perform a particular type of maintenance. It may be desirable to know which operations are performed (as the superuser) by which original user when debugging issues. In the following examples describing extended user session tracking, reference is generally made to using the secure shell (ssh) protocol as implemented by openssh (on the server side) as the mechanism for logins. However, extended user session tracking is not limited to the ssh protocol or a particular limitation and the techniques described herein can be extended to other login mechanisms.

On any given machine, there will be a process that listens for and accepts ssh connections on a given port. This process can run the openssh server program running in daemon mode or it could be running another program (e.g., initd on a Linux system). In either case, a new process running openssh will be created for every new ssh login session and this process can be used to identify an ssh session on that machine. This process is called the "privileged" process in openssh.

After authentication of the ssh session, when an ssh client requests a shell or any other program to be run under that ssh session, a new process that runs that program will be created under (i.e., as a child of) the associated privileged process. If an ssh client requests port forwarding to be performed, the connections will be associated with the privileged process.

In modern operating systems such as Linux and Windows, each process has a parent process (except for the very first process) and when a new process is created the parent process is known. By tracking the parent-child hierarchy of processes, one can determine if a particular process is a descendant of a privileged openssh process and thus if it is associated with an ssh login session.

For user session tracking across machines (or on a single machine with multiple logins) in a distributed environment, it is established when two login sessions have a parent-child relationship. After that, the "original" login session, if any, for any given login session can be determined by following the parent relationship recursively.

Figure 3F:
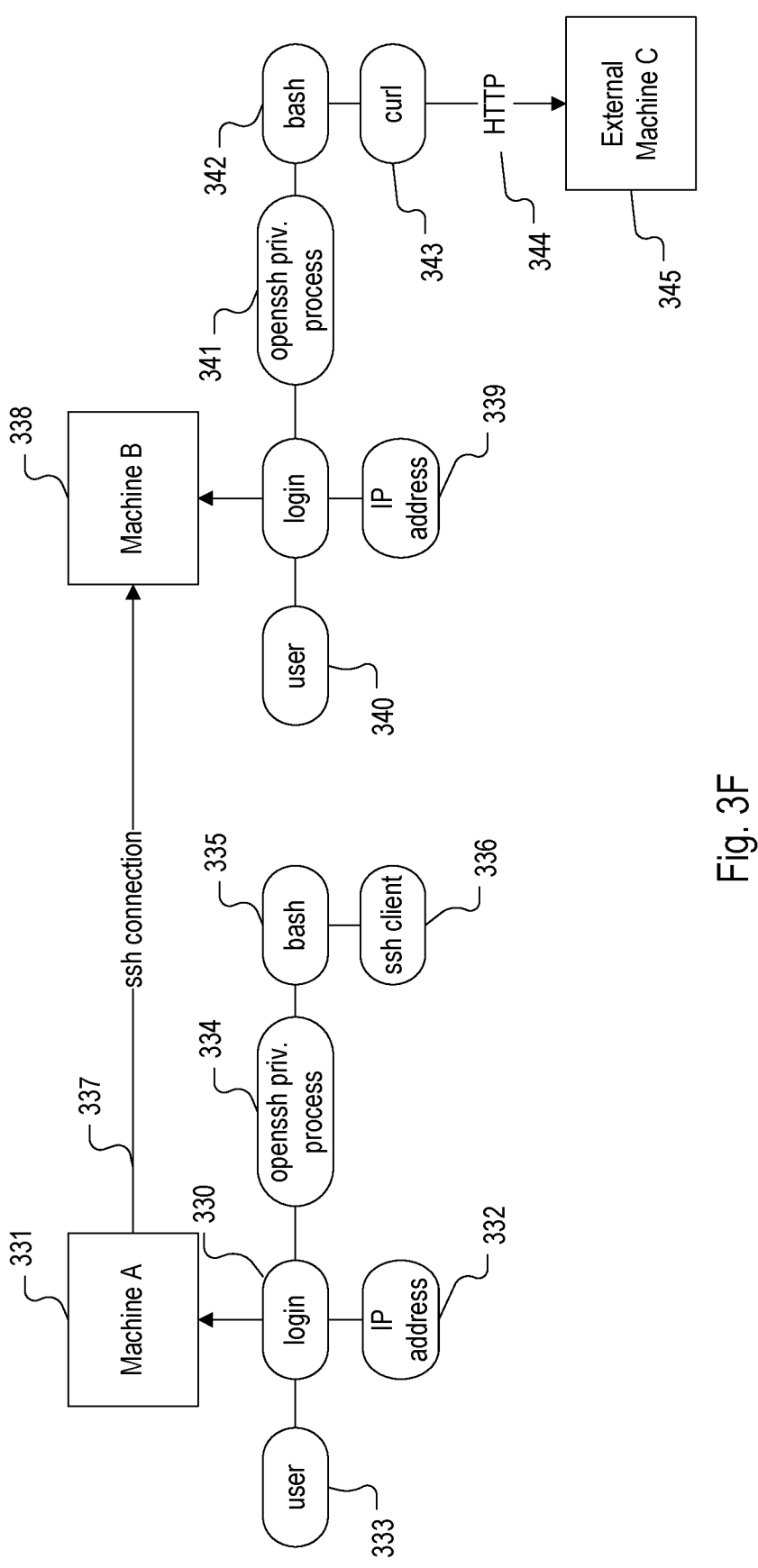
FIG. 3F is a representation of a user logging into a first machine, then into a second machine from the first machine, and then making an external connection.

FIG. 3F is a representation of a user logging into a first machine and then into a second machine from the first machine, as well as information associated with such actions. In the example of FIG. 3F, a user, Charlie, logs into Machine A (331) from a first IP address (332). As part of the login process, he provides a username (333). Once connected to Machine A, an openssh privileged process (334) is created to handle the connection for the user, and a terminal session is created and a bash process (335) is created as a child. Charlie launches an ssh client (336) from the shell, and uses it to connect (337) to Machine B (338). As with the connection he makes to Machine A, Charlie's connection to Machine B will have an associated incoming IP address (339), in this case, the IP address of Machine A. And, as part of the login process with Machine B, Charlie will provide a username (340) which need not be the same as username 333. An openssh privileged process (341) is created to handle the connection, and a terminal session and child bash process (342) will be created. From the command line of Machine B, Charlie launches a curl command (343), which opens an HTTP connection (344) to an external Machine C (345).

Figure 3G:
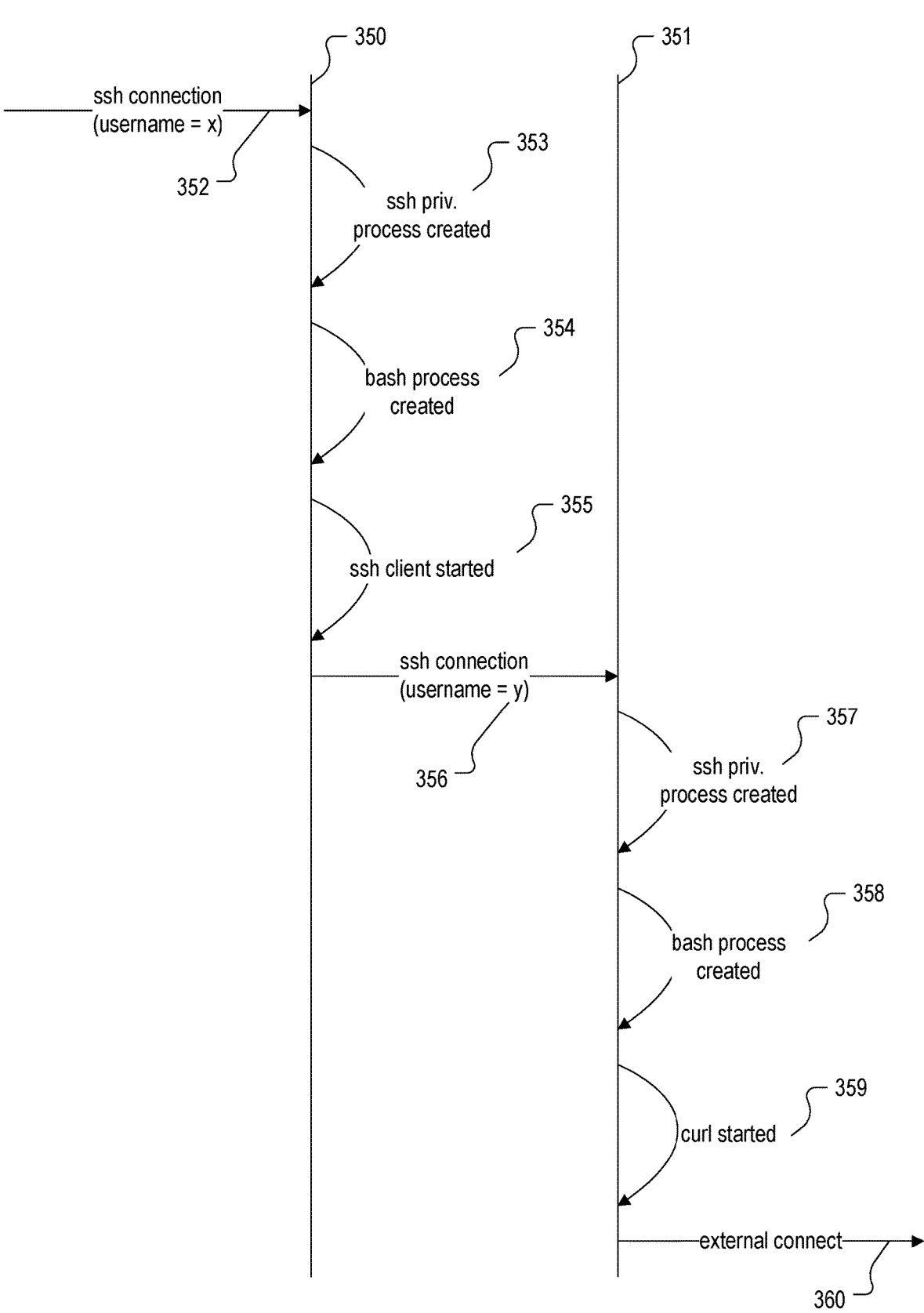
FIG. 3G is an alternate representation of actions occurring in FIG. 3F.

FIG. 3G is an alternate representation of actions occurring in FIG. 3F, where events occurring on Machine A are indicated along line 350, and events occurring on Machine B are indicated along line 351. As shown in FIG. 3G, an incoming ssh connection is received at Machine A (352). Charlie logs in (as user "x") and an ssh privileged process is created to handle Charlie's connection (353). A terminal session is created and a bash process is created (354) as a child of process 353. Charlie wants to ssh to Machine B, and so executes an ssh client on Machine A (355), providing credentials (as user "y") at 356. Charlie logs into Machine B, and an sash privileged process is created to handle Charlie's connection (357). A terminal session is created and a bash process is created (358) as a child of process 357. Charlie then executes curl (359) to download content from an external domain (via connection 360).

The external domain could be a malicious domain, or it could be benign. Suppose the external domain is malicious (and, e.g., Charlie has malicious intent). It would be advantageous (e.g., for security reasons) to be able to trace the contact with the external domain back to Machine A, and then back to Charlie's IP address. Using techniques described herein (e.g., by correlating process information collected by various agents), such tracking of Charlie's activities back to his original login (330) can be accomplished. In particular, an extended user session can be tracked that associates Charlie's ssh processes together with a single original login and thus original user.

As described herein, software agents (such as agent 112) may run on machines (such as a machine that implements one of nodes 116) and detect new connections, processes, and/or logins. As also previously explained, such agents send associated records to data platform 12 which includes one or more datastores (e.g., data store 30) for persistently storing such data. Such data can be modeled using logical tables, also persisted in datastores (e.g., in a relational database that provides an SQL interface), allowing for querying of the data. Other datastores such as graph oriented databases and/or hybrid schemes can also be used.

The following identifiers are commonly used in the tables:
MID
PID_hash
An ssh login session can be identified uniquely by an (MID, PID_hash) tuple. The MID is a machine identifier that is unique to each machine, whether physical or virtual, across time and space. Operating systems use numbers called process identifiers (PIDs) to identify processes running at a given time. Over time processes may die and new processes may be started on a machine or the machine itself may restart. The PID is not necessarily unique across time in that the same PID value can be reused for different processes at different times. In order to track process descendants across time, one should therefore account for time as well. In order to be able to identify a process on a machine uniquely across time, another number called a PID_hash is generated for the process. In various embodiments, the PID_hash is generated using a collision-resistant hash function that takes the PID, start time, and (in various embodiments, as applicable) other properties of a process.

Input data collected by agents comprises the input data model and is represented by the following logical tables:
connections
processes
logins A connections table may maintain records of TCP/IP connections observed on each machine. Example columns included in a connections table are as follows:

| Column Name | Description |
|---|---|
| MID | Identifier of the machine that the connection was observed on. |
| Start_time | Connection start time. |
| PID_hash | Identifier of the process that was associated with the connection. |
| Src_IP_addr | Source IP address (the connection was initiated from this IP address). |
| Src_port | Source port. |
| Dst_IP_addr | Destination IP address (the connection was made to this IP address). |
| Dst_port | Destination port. |
| Prot | Protocol (TCP or UDP). |
| Dir | Direction of the connection (incoming or outgoing) with respect to this machine. |

The source fields (IP address and port) correspond to the side from which the connection was initiated. On the destination side, the agent associates an ssh connection with the privileged ssh process that is created for that connection.

For each connection in the system, there will be two records in the table, assuming that the machines on both sides of the connection capture the connection. These records can be matched based on equality of the tuple (src_IP_addr, src_port, dst_IP_addr, dst_port, Prot) and proximity of the start_time fields (e.g., with a one minute upper threshold between the start_time fields).

A processes table maintains records of processes observed on each machine. It may have the following columns:

| Column Name | Description |
|---|---|
| MID | Identifier of the machine that the process was observed on. |
| PID_hash | Identifier of the process. |
| Start_time | Start time of the process. |
| Exe_path | The executable path of the process. |
| PPID_hash | Identifier of the parent process. |

A logins table may maintain records of logins to machines. It may have the following columns:

| Column Name | Description |
|---|---|
| MID | Identifier of the machine that the login was observed on. |
| Sshd_PID_hash | Identifier of the sshd privileged process associated with login. |
| Login_time | Time of login. |
| Login_username | Username used in login. |

Output data generated by session tracking is represented with the following logical tables:

login-local-descendant
    login-connection
    login-lineage

Using data in these tables, it is possible to determine descendant processes of a given ssh login session across the environment (i.e., spanning machines). Conversely, given a process, it is possible to determine if it is an ssh login descendant as well as the original ssh login session for it if so.

A login-local-descendant table maintains the local (i.e., on the same machine) descendant processes of each ssh login session. It may have the following columns:

| Column Name | Description |
|---|---|
| MID | Identifier of the machine that the login was observed on. |
| Sshd_PID_hash | Identifier of the sshd privileged process associated with login. |
| Login_time | Time of login. |
| Login_username | Username used in login. |

A login-connections table may maintain the connections associated with ssh logins. It may have the following columns:

| Column Name | Description |
|---|---|
| MID | Identifier of the machine that the process was observed on. |
| Sshd_PID_hash | Identifier of the sshd privileged process associated with the login. |
| Login_time | Time of login. |
| Login_username | The username used in the login. |
| Src_IP_addr | Source IP address (connection was initiated from this IP address). |
| Src_port | Source port. |
| Dst_IP_addr | Destination IP address (connection was made to this IP address). |
| Dst_port | Destination port. |

A login-lineage table may maintain the lineage of ssh login sessions. It may have the following columns:

| Column Name | Description |
|---|---|
| MID | Identifier of the machine that the ssh login was observed on. |
| Sshd_PID_hash | Identifier of the sshd privileged process associated with the login. |
| Parent_MID | Identifier of the machine that the parent ssh login was observed on. |
| Parent_sshd_PID_hash | Identifier of the sshd privileged process associated with the parent login. |

-continued

| Column Name | Description |
|---|---|
| Origin_MID | Identifier of the machine that the origin ssh login was observed on. |
| Origin_sshd_PID_hash | Identifier of the sshd privileged process associated with the origin login. |

The parent_MID and parent_sshd_PID_hash columns can be null if there is no parent ssh login. In that case, the (MID, sshd_PID_hash) tuple will be the same as the (origin_MID, origin_sshd_PID_hash) tuple.

FIG. 3H illustrates an example of a process for performing extended user tracking. In various embodiments, process 361 is performed by data platform 12. The process begins at 362 when data associated with activities occurring in a network environment (such as entity A's datacenter) is received. One example of such data that can be received at 362 is agent-collected data described above (e.g., in conjunction with process 200). At 363, the received network activity is used to identify user login activity. And, at 364, a logical graph that links the user login activity to at least one user and at least one process is generated (or updated, as applicable). Additional detail regarding process 361, and in particular, portions 363 and 364 of process 361 are described in more detail below (e.g., in conjunction with discussion of FIG. 3J).

Figure 3I:
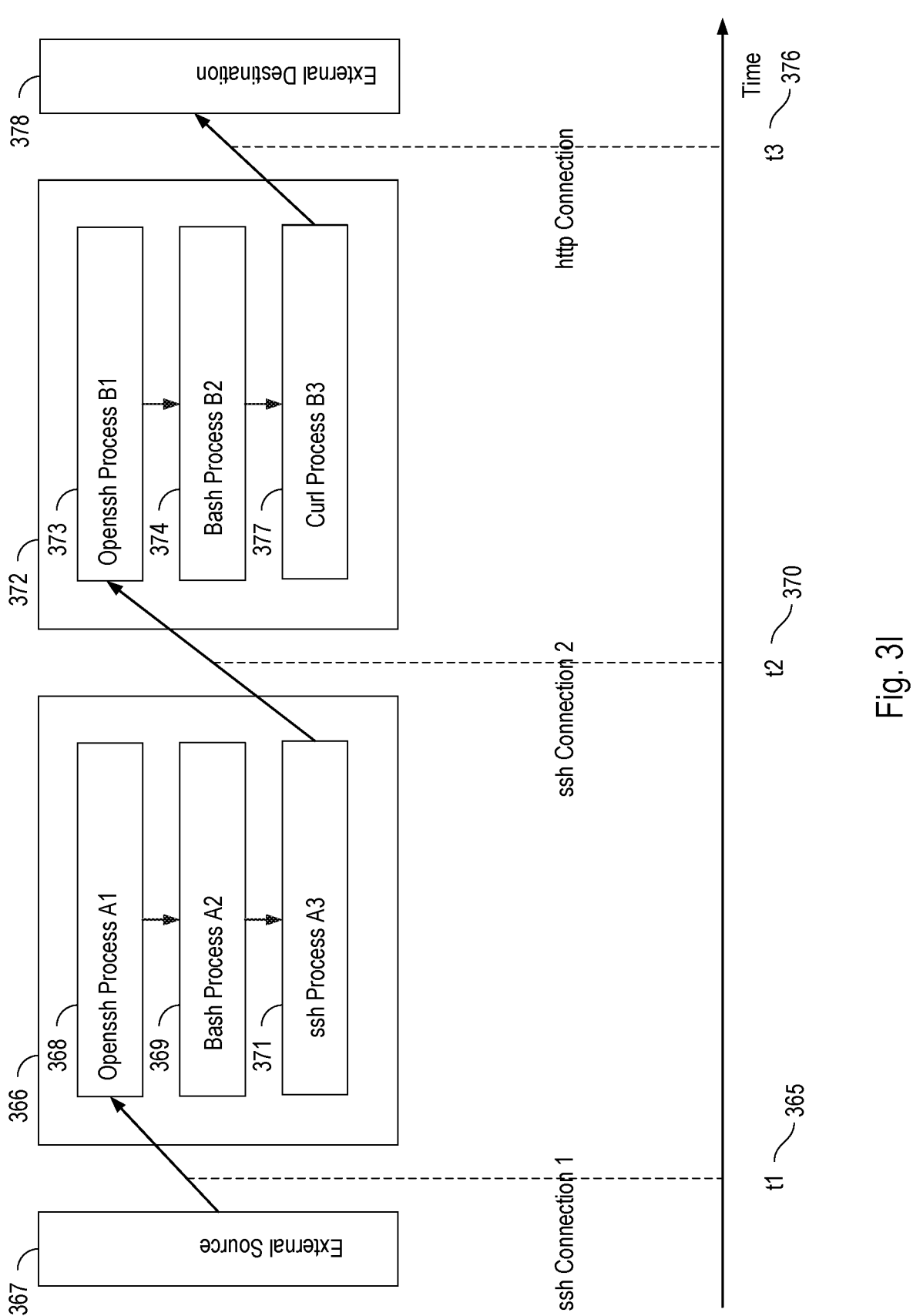
FIG. 3I is a representation of a user logging into a first machine, then into a second machine from the first machine, and then making an external connection.

FIG. 3I depicts a representation of a user logging into a first machine, then into a second machine from the first machine, and then making an external connection. The scenario depicted in FIG. 3I is used to describe an example of processing that can be performed on data collected by agents to generate extended user session tracking information. FIG. 3I is an alternate depiction of the information shown in FIGS. 3F and 3G.

At time t1 (365), a first ssh connection is made to Machine A (366) from an external source (367) by a user having a username of "X." In the following example, suppose the external source has an IP address of 1.1.1.10 and uses source port 10000 to connect to Machine A (which has an IP address of 2.2.2.20 and a destination port 22). External source 367 is considered an external source because its IP address is outside of the environment being monitored (e.g., is a node outside of entity A's datacenter, connecting to a node inside of entity A's datacenter).

A first ssh login session LS1 is created on machine A for user X. The privileged openssh process for this login is A1 (368). Under the login session LS1, the user creates a bash shell process with PID_hash A2 (369).

At time t2 (370), inside the bash shell process A2, the user runs an ssh program under a new process A3 (371) to log in to machine B (372) with a different username ("Y"). In particular, an ssh connection is made from source IP address 2.2.2.20 and source port 10001 (Machine A's source information) to destination IP address 2.2.2.21 and destination port 22 (Machine B's destination information).

A second ssh login session LS2 is created on machine B for user Y. The privileged openssh process for this login is B1 (373). Under the login session LS2, the user creates a bash shell process with PID_hash B2 (374).

At time t3 (376), inside the bash shell process B2, the user runs a curl command under a new process B3 (377) to download a file from an external destination (378). In particular, an HTTPS connection is made from source IP address 2.2.2.21 and source port 10002 (Machine B's source information) to external destination IP address 3.3.3.30 and destination port 443 (the external destination's information).

Using techniques described herein, it is possible to determine the original user who initiated the connection to external destination 378, which in this example is a user having the username X on machine A (where the extended user session can be determined to start with ssh login session LS1).

Based on local descendant tracking, the following determinations can be on machine A and B without yet having performed additional processing (described in more detail below):

A3 is a descendant of A1 and thus associated with LS1.
The connection to the external domain from machine B is initiated by B3.
B3 is a descendant of B1 and is thus associated with LS2.
Connection to the external domain is thus associated with LS2.

An association between A3 and LS2 can be established based on the fact that LS2 was created based on an ssh connection initiated from A3. Accordingly, it can be determined that LS2 is a child of LS1.

To determine the user responsible for making the connection to the external destination (e.g., if it were a known bad destination), first, the process that made the connection would be traced, i.e., from B3 to LS2. Then LS2 would be traced to LS1 (i.e., LS1 is the origin login session for LS2). Thus the user for this connection is the user for LS1, i.e., X. As represented in FIG. 3I, one can visualize the tracing by following the links (in the reverse direction of arrows) from external destination 378 to A1 (368).

In the example scenario, it is assumed that both ssh connections occur in the same analysis period. However, the approaches described herein will also work for connections and processes that are created in different time periods.

Figure 3J:
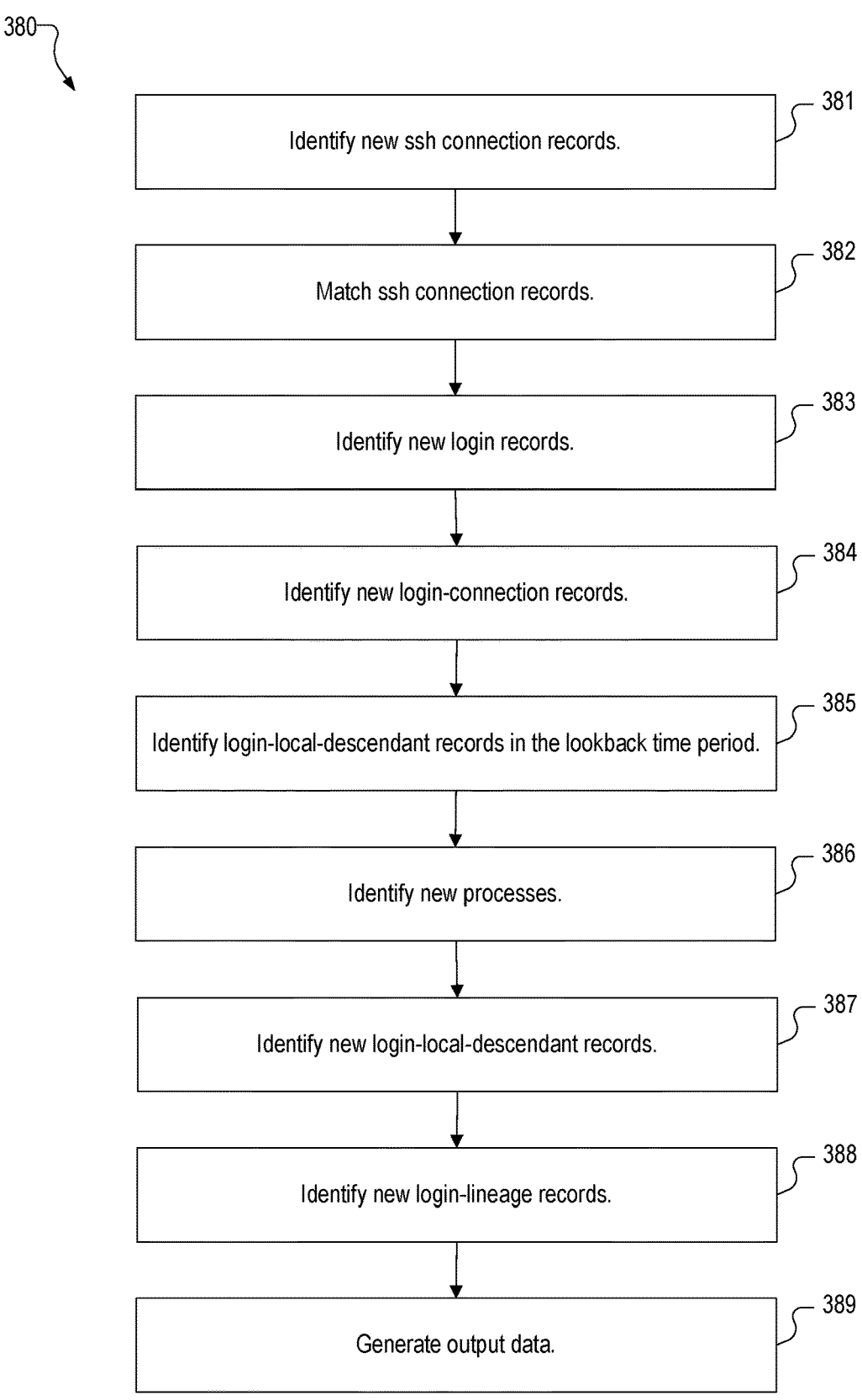
FIG. 3J illustrates an example of a process for performing extended user tracking.

FIG. 3J illustrates an example of a process for performing extended user tracking. In various embodiments, process 380 is performed periodically (e.g., once an hour in a batch fashion) by ssh tracker 148 to generate new output data. In general, batch processing allows for efficient analysis of large volumes of data. However, the approach can be adapted, as applicable, to process input data on a record-by-record fashion while maintaining the same logical data processing flow. As applicable the results of a given portion of process 380 are stored for use in a subsequent portion.

The process begins at 381 when new ssh connection records are identified. In particular, new ssh connections started during the current time period are identified by querying the connections table. The query uses filters on the start_time and dst_port columns. The values of the range filter on the start_time column are based on the current time period. The dst_port column is checked against ssh listening port(s). By default, the ssh listening port number is 22. However, as this could vary across environments, the port(s) that openssh servers are listening to in the environment can be determined by data collection agents dynamically and used as the filter value for the dst_port as applicable. In the scenario depicted in FIG. 3I, the query result will generate the records shown in FIG. 3K. Note that for the connection between machine A and B, the two machines are likely to report start_time values that are not exactly the same but close enough to be considered matching (e.g., within one minute or another appropriate amount of time). In the above table, they are shown to be the same for simplicity.

At 382, ssh connection records reported from source and destination sides of the same connection are matched. The ssh connection records (e.g., returned from the query at 381) are matched based on the following criteria:

The five tuples (src_IP, dst_IP, IP_prot, src_port, dst_port) of the connection records must match.
The delta between the start times of the connections must be within a limit that would account for the worst case clock difference expected between two machines in the environment and typical connection setup latency.
If there are multiple matches possible, then the match with the smallest time delta is chosen.

Note that record 390 from machine A for the incoming connection from the external source cannot be matched with another record as there is an agent only on the destination side for this connection. Example output of portion 382 of process 380 is shown in FIG. 3L. The values in the dst_PID_hash column (391) are that of the sshd privileged process associated with ssh logins.

At 383, new logins during the current time period are identified by querying the logins table. The query uses a range filter on the login_time column with values based on the current time period. In the example depicted in FIG. 3I, the query result will generate the records depicted in FIG. 3M.

At 384, matched ssh connection records created at 382 and new login records created at 383 are joined to create new records that will eventually be stored in the login-connection table. The join condition is that dst_MID of the matched connection record is equal to the MID of the login record and the dst_PID_hash of the matched connection record is equal to the sshd_PID_hash of the login record. In the example depicted in FIG. 3I, the processing performed at 384 will generate the records depicted in FIG. 3N.

At 385, login-local-descendant records in the lookback time period are identified. It is possible that a process that is created in a previous time period makes an ssh connection in the current analysis batch period. Although not depicted in the example illustrated in FIG. 3I, consider a case where bash process A2 does not create ssh process A3 right away but instead that the ssh connection A3 later makes to machine B is processed in a subsequent time period than the one where A2 was processed. While processing this subsequent time period in which processes A3 and B1 are seen, knowledge of A2 would be useful in establishing that B1 is associated with A3 (via ssh connection) which is associated with A2 (via process parentage) Ih in turn would be useful in establishing that the parent of the second ssh login is the first ssh login. The time period for which look back is performed can be limited to reduce the amount of historical data that is considered. However, this is not a requirement (and the amount of look back can be determined, e.g., based on available processing resources). The login local descendants in the lookback time period can be identified by querying the login-local-descendant table. The query uses a range filter on the login_time column where the range is from start_time_of_current_period-lookback_time to start_time_of_current_period. (No records as a result of performing 385 on the scenario depicted in FIG. 3I are obtained, as only a single time period is applicable in the example scenario.)

At 386, new processes that are started in the current time period are identified by querying the processes table. The query uses a range filter on the start_time column with values based on the current time period. In the example depicted in FIG. 3I, the processing performed at 386 will generate the records depicted in FIG. 3O.

At 387, new login-local-descendant records are identified. The purpose is to determine whether any of the new processes in the current time period are descendants of an ssh login process and if so to create records that will be stored in the login-local-descendant table for them. In order to do so, the parent-child relationships between the processes are recursively followed. Either a top down or bottom up approach can be used. In a top down approach, the ssh local descendants in the lookback period identified at 385, along with new ssh login processes in the current period identified at 384 are considered as possible ancestors for the new processes in the current period identified at 386.

Conceptually, the recursive approach can be considered to include multiple sub-steps where new processes that are identified to be ssh local descendants in the current sub-step are considered as ancestors for the next step. In the example scenario depicted in FIG. 3I, the following descendancy relationships will be established in two sub-steps:

Sub-step 1:

Process A2 is a local descendant of LS1 (i.e., MID=A, sshd_PID_hash=A1) because it is a child of process A1 which is the login process for LS1.

Process B2 is a local descendant of LS2 (i.e., MID=B, sshd_PID_hash=B1) because it is a child of process B1 which is the login process for LS2.

Sub-step 2:

Process A3 is a local descendant of LS1 because it is a child of process A2 which is associated to LS1 in sub-step 1.

Process B3 is a local descendant of LS2 because it is a child of process B1 which is associated to LS2 in sub-step 1.

Implementation portion 387 can use a datastore that supports recursive query capabilities, or, queries can be constructed to process multiple conceptual sub-steps at once. In the example depicted in FIG. 3I, the processing performed at 387 will generate the records depicted in FIG. 3P. Note that the ssh privileged processes associated with the logins are also included as they are part of the login session.

At 388, the lineage of new ssh logins created in the current time period is determined by associating their ssh connections to source processes that may be descendants of other ssh logins (which may have been created in the current period or previous time periods). In order to do so, first an attempt is made to join the new ssh login connections in the current period (identified at 384) with the combination of the login local descendants in the lookback period (identified at 385) and the login local descendants in the current time period (identified at 386). This will create adjacency relationships between child and parent logins. In the example depicted in FIG. 3I, the second ssh login connection will be associated with process A3 and an adjacency relationship between the two login sessions will be created (as illustrated in FIG. 3Q).

Next, the adjacency relationships are used to find the original login sessions. While not shown in the sample scenario, there could be multiple ssh logins in a chain in the current time period, in which case a recursive approach (as in 387) could be used. At the conclusion of portion 388, the login lineage records depicted in FIG. 3R will be generated.

Finally, at 389, output data is generated. In particular, the new login-connection, login-local-descendant, and login-lineage records generated at 384, 387, and 388 are inserted into their respective output tables (e.g., in a transaction manner).

An alternate approach to matching TCP connections between machines running an agent is for the client to generate a connection GUID and send it in the connection request (e.g., the SYN packet) it sends and for the server to extract the GUID from the request. If two connection records from two machines have the same GUID, they are for the same connection. Both the client and server will store the GUID (if if exists) in the connection records they maintain and report. On the client side, the agent can configure the network stack (e.g. using IP tables functionality on Linux) to intercept an outgoing TCP SYN packet and modify it to add the generated GUID as a TCP option. On the server side, the agent already extracts TCP SYN packets and thus can look for this option and extract the GUID if it exists.

Example graph-based user tracking and threat detection embodiments associated with data platform 12 will now be described. Administrators and other users of network environments (e.g., entity A's datacenter 104) often change roles to perform tasks. As one example, suppose that at the start of a workday, an administrator (hereinafter "Joe Smith") logs in to a console, using an individualized account (e.g., username=joe.smith). Joe performs various tasks as himself (e.g., answering emails, generating status reports, writing code, etc.). For other tasks (e.g., performing updates), Joe may require different/additional permission than his individual account has (e.g., root privileges). One way Joe can gain access to such permissions is by using sudo, which will allow Joe to run a single command with root privileges. Another way Joe can gain access to such permissions is by su or otherwise logging into a shell as root. After gaining root privileges, another thing that Joe can do is switch identities. As one example, to perform administrative tasks, Joe may use "su help" or "su database-admin" to become (respectively) the help user or the database-admin user on a system. He may also connect from one machine to another, potentially changing identities along the way (e.g., logging in as joe.smith at a first console, and connecting to a database server as database-admin). When he's completed various administrative tasks, Joe can relinquish his root privileges by closing out of any additional shells created, reverting back to a shell created for user joe.smith.

While there are many legitimate reasons for Joe to change his identity throughout the day, such changes may also correspond to nefarious activity. Joe himself may be nefarious, or Joe's account (joe.smith) may have been compromised by a third party (whether an "outsider" outside of entity A's network, or an "insider"). Using techniques described herein, the behavior of users of the environment can be tracked (including across multiple accounts and/or multiple machines) and modeled (e.g., using various graphs described herein). Such models can be used to generate alerts (e.g., to anomalous user behavior). Such models can also be used forensically, e.g., helping an investigator visualize various aspects of a network and activities that have occurred, and to attribute particular types of actions (e.g., network connections or file accesses) to specific users.

In a typical day in a datacenter, a user (e.g., Joe Smith) will log in, run various processes, and (optionally) log out. The user will typically log in from the same set of IP addresses, from IP addresses within the same geographical area (e.g., city or country), or from historically known IP addresses/geographical areas (i.e., ones the user has previously/occasionally used). A deviation from the user's typical (or historical) behavior indicates a change in login behavior. However, it does not necessarily mean that a breach has occurred. Once logged into a datacenter, a user may take a variety of actions. As a first example, a user might execute a binary/script. Such binary/script might communicate with other nodes in the datacenter, or outside of the datacenter, and transfer data to the user (e.g., executing "curl" to obtain data from a service external to the datacenter). As a second example, the user can similarly transfer data (e.g., out of the datacenter), such as by using POST. As a third example, a user might change privilege (one or more times), at which point the user can send/receive data as per above. As a fourth example, a user might connect to a different machine within the datacenter (one or more times), at which point the user can send/receive data as per the above.

In various embodiments, the above information associated with user behavior is broken into four tiers. The tiers represent example types of information that data platform 12 can use in modeling user behavior:

1. The user's entry point (e.g., domains, IP addresses, and/or geolocation information such as country/city) from which a user logs in.
2. The login user and machine class.
3. Binaries, executables, processes, etc. a user launches.
4. Internal servers with which the user (or any of the user's processes, child processes, etc.) communicates, and external contacts (e.g., domains, IP addresses, and/or geolocation information such as country/city) with which the user communicates (i.e., transfers data).

In the event of a security breach, being able to concretely answer questions about such information can be very important. And, collectively, such information is useful in providing an end-to-end path (e.g., for performing investigations).

In the following example, suppose a user ("UserA") logs into a machine ("Machine01") from a first IP address ("IP01"). Machine01 is inside a datacenter. UserA then launches a script ("runnable.sh") on Machine01. From Machine01, UserA next logs into a second machine ("Machine02") via ssh, also as UserA, also within the datacenter. On Machine02, UserA again launches a script ("new_runnable.sh"). On Machine02, UserA then changes privilege, becoming root on Machine02. From Machine02, UserA (now as root) logs into a third machine ("Machine03") in the datacenter via ssh, as root on Machine03. As root on Machine03, the user executes a script ("collect_data.sh") on Machine03. The script internally communicates (as root) to a MySQL-based service internal to the datacenter, and downloads data from the MySQL-based service. Finally, as root on Machine03, the user externally communicates with a server outside the datacenter ("External01"), using a POST command. To summarize what has occurred, in this example, the source/entry point is IP01. Data is transferred to an external server External01. The machine performing the transfer to External01 is Machine03. The user transferring the data is "root" (on Machine03), while the actual user (hiding behind root) is UserA.

In the above scenario, the "original user" (ultimately responsible for transmitting data to External01) is UserA, who logged in from IP01. Each of the processes ultimately started by UserA, whether started at the command line (tty) such as "runnable.sh" or started after an ssh connection such as "new_runnable.sh," and whether as UserA, or as a subsequent identity, are all examples of child processes which can be arranged into a process hierarchy.

As previously mentioned, machines can be clustered together logically into machine clusters. One approach to clustering is to classify machines based on information such as the types of services they provide/binaries they have installed upon them/processes they execute. Machines sharing a given machine class (as they share common binaries/services/etc.) will behave similarly to one another. Each machine in a datacenter can be assigned to a machine cluster, and each machine cluster can be assigned an identifier (also referred to herein as a machine class). One or more tags can also be assigned to a given machine class (e.g., database_servers_west or prod_web_frontend). One approach to assigning a tag to a machine class is to apply term frequency analysis (e.g., TF/IDF) to the applications run by a given machine class, selecting as tags those most unique to the class. Data platform 12 can use behavioral baselines taken for a class of machines to identify deviations from the baseline (e.g., by a particular machine in the class).

FIG. 3S illustrates an example of a process for detecting anomalies. In various embodiments, process 392 is performed by data platform 12. As explained above, a given session will have an original user. And, each action taken by the original user can be tied back to the original user, despite privilege changes and/or lateral movement throughout a datacenter. Process 392 begins at 393 when log data associated with a user session (and thus an original user) is received. At 394, a logical graph is generated, using at least a portion of the collected data. When an anomaly is detected (395), it can be recorded, and as applicable, an alert is generated (396). The following are examples of graphs that can be generated (e.g., at 394), with corresponding examples of anomalies that can be detected (e.g., at 395) and alerted upon (e.g., at 396).

Figure 4A:
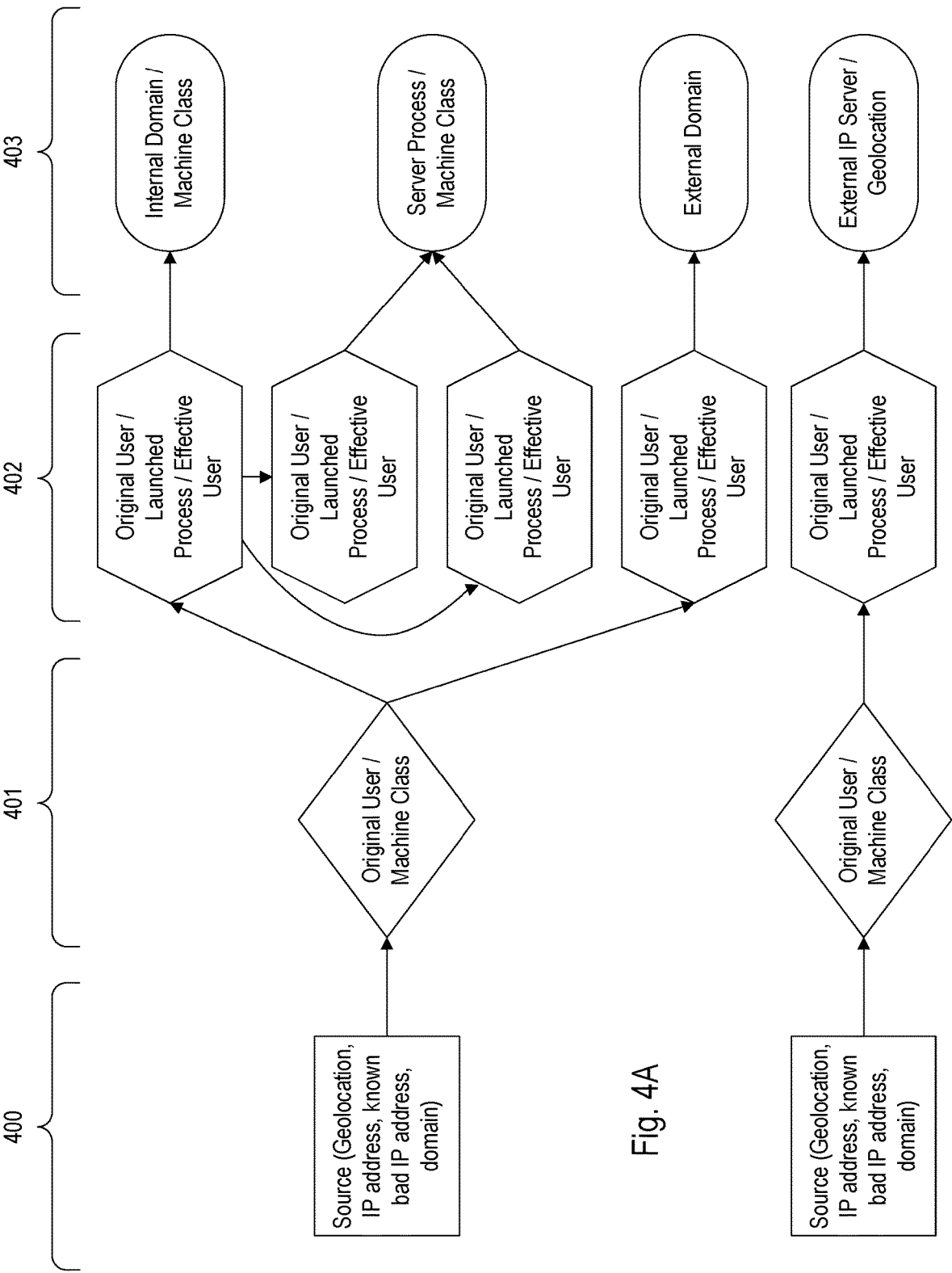
FIG. 4A illustrates a representation of an embodiment of an insider behavior graph.

FIG. 4A illustrates a representation of an embodiment of an insider behavior graph. In the example of FIG. 4A, each node in the graph can be: (1) a cluster of users; (2) a cluster of launched processes; (3) a cluster of processes/servers running on a machine class; (4) a cluster of external IP addresses (of incoming clients); or (5) a cluster of external servers based on DNS/IP/etc. As depicted in FIG. 4A, graph data is vertically tiered into four tiers. Tier 0 (400) corresponds to entry point information (e.g., domains, IP addresses, and/or geolocation information) associated with a client entering the datacenter from an external entry point. Entry points are clustered together based on such information. Tier 1 (401) corresponds to a user on a machine class, with a given user on a given machine class represented as a node. Tier 2 (402) corresponds to launched processes, child processes, and/or interactive processes. Processes for a given user and having similar connectivity (e.g., sharing the processes they launch and the machines with which they communicate) are grouped into nodes. Finally, Tier 3 (403) corresponds to the services/servers/domains/IP addresses with which processes communicate. A relationship between the tiers can be stated as follows: Tier 0 nodes log in to tier 1 nodes. Tier 1 nodes launch tier 2 nodes. Tier 2 nodes connect to tier 3 nodes.

The inclusion of an original user in both Tier 1 and Tier 2 allows for horizontal tiering. Such horizontal tiering ensures that there is no overlap between any two users in Tier 1 and Tier 2. Such lack of overlap provides for faster searching of an end-to-end path (e.g., one starting with a Tier 0 node and terminating at a Tier 3 node). Horizontal tiering also helps in establishing baseline insider behavior. For example, by building an hourly insider behavior graph, new edges/changes in edges between nodes in Tier 1 and Tier 2 can be identified. Any such changes correspond to a change associated with the original user. And, any such changes can be surfaced as anomalous and alerts can be generated.

As explained above, Tier 1 corresponds to a user (e.g., user "U") logging into a machine having a particular machine class (e.g., machine class "M"). Tier 2 is a cluster of processes having command line similarity (e.g., Ctype "C"), having an original user "U," and running as a particular effective user (e.g., user "U1"). The value of U1 may be the same as U (e.g., joe.smith in both cases), or the value of U1 may be different (e.g., U=joe.smith and U1=root). Thus, while an edge may be present from a Tier 1 node to a Tier 2 node, the effective user in the Tier 2 node may or may not match the original user (while the original user in the Tier 2 node will match the original user in the Tier 1 node).

A change from a user U into a user U1 can take place in a variety of ways. Examples include where U becomes U1 on the same machine (e.g., via su), and also where U sshes to other machine(s). In both situations, U can perform multiple changes, and can combine approaches. For example, U can become U1 on a first machine, ssh to a second machine (as U1), become U2 on the second machine, and ssh to a third machine (whether as user U2 or user U3). In various embodiments, the complexity of how user U ultimately becomes U3 (or U5, etc.) is hidden from a viewer of an insider behavior graph, and only an original user (e.g., U) and the effective user of a given node (e.g., U5) are depicted. As applicable (e.g., if desired by a viewer of the insider behavior graph), additional detail about the path (e.g., an end-to-end path of edges from user U to user U5) can be surfaced (e.g., via user interactions with nodes).

Figure 4B:
FIG. 4B illustrates an embodiment of a portion of an insider behavior graph.

FIG. 4B illustrates an example of a portion of an insider behavior graph (e.g., as rendered in a web browser). In the example shown, node 405 (the external IP address, 52.32.40.231) is an example of a Tier 0 node, and represents an entry point into a datacenter. As indicated by directional arrows 406 and 407, two users, "user1_prod" and "user2_prod," both made use of the source IP 52.32.40.231 when logging in between 5 μm and 6 pm on Sunday July 30 (408). Nodes 409 and 410 are examples of Tier 1 nodes, having user1_prod and user2_prod as associated respective original users. As previously mentioned, Tier 1 nodes correspond to a combination of a user and a machine class. In the example depicted in FIG. 4B, the machine class associated with nodes 409 and 410 is hidden from view to simplify visualization, but can be surfaced to a viewer of interface 404 (e.g., when the user clicks on node 409 or 410).

Nodes 414-423 are examples of Tier 2 nodes-processes that are launched by users in Tier 1 and their child, grandchild, etc. processes. Note that also depicted in FIG. 4B is a Tier 1 node 411 that corresponds to a user, "root," that logged in to a machine cluster from within the datacenter (i.e., has an entry point within the datacenter). Nodes 425-1 and 425-2 are examples of Tier 3 nodes—internal/external IP addresses, servers, etc., with which Tier 2 nodes communicate.

In the example shown in FIG. 4B, a viewer of interface 404 has clicked on node 423. As indicated in region 426, the user running the marathon container is "root." However, by following the directional arrows in the graph backwards from node 423 (i.e. from right to left), the viewer can determine that the original user, responsible for node 423, is "user1_prod," who logged into the datacenter from IP 52.32.40.231.

The following are examples of changes that can be tracked using an insider behavior graph model:

A user logs in from a new IP address.

A user logs in from a geolocation not previously used by that user.

A user logs into a new machine class.

A user launches a process not previously used by that user.

A user connects to an internal server to which the user has not previously connected.

An original user communicates with an external server (or external server known to be malicious) with which that user has not previously communicated.

A user communicates with an external server which has a geolocation not previously used by that user.

Such changes can be surfaced as alerts, e.g., to help an administrator determine when/what anomalous behavior occurs within a datacenter. Further, the behavior graph model can be used (e.g., during forensic analysis) to answer questions helpful during an investigation.

Examples of Such Questions Include:

Was there any new login activity (Tier 0) in the timeframe being investigated? As one example, has a user logged in from an IP address with unknown geolocation information? Similarly, has a user started communicating externally with a new Tier 3 node (e.g., one with unknown geolocation information).

Has there been any suspicious login activity (Tier 0) in the timeframe being investigated? As one example, has a user logged in from an IP address that corresponds to a known bad IP address as maintained by Threat aggregator 150? Similarly, has there been any suspicious Tier 3 activity?

Were any anomalous connections made within the datacenter during the timeframe being investigated? As one example, suppose a given user ("Frank") typically enters a datacenter from a particular IP address (or range of IP addresses), and then connects to a first machine type (e.g., bastion), and then to a second machine type (e.g., database_prod). If Frank has directly connected to database_prod (instead of first going through bastion) during the timeframe, this can be surfaced using the insider graph.

Who is (the original user) responsible for running a particular process?

Figure 4C:
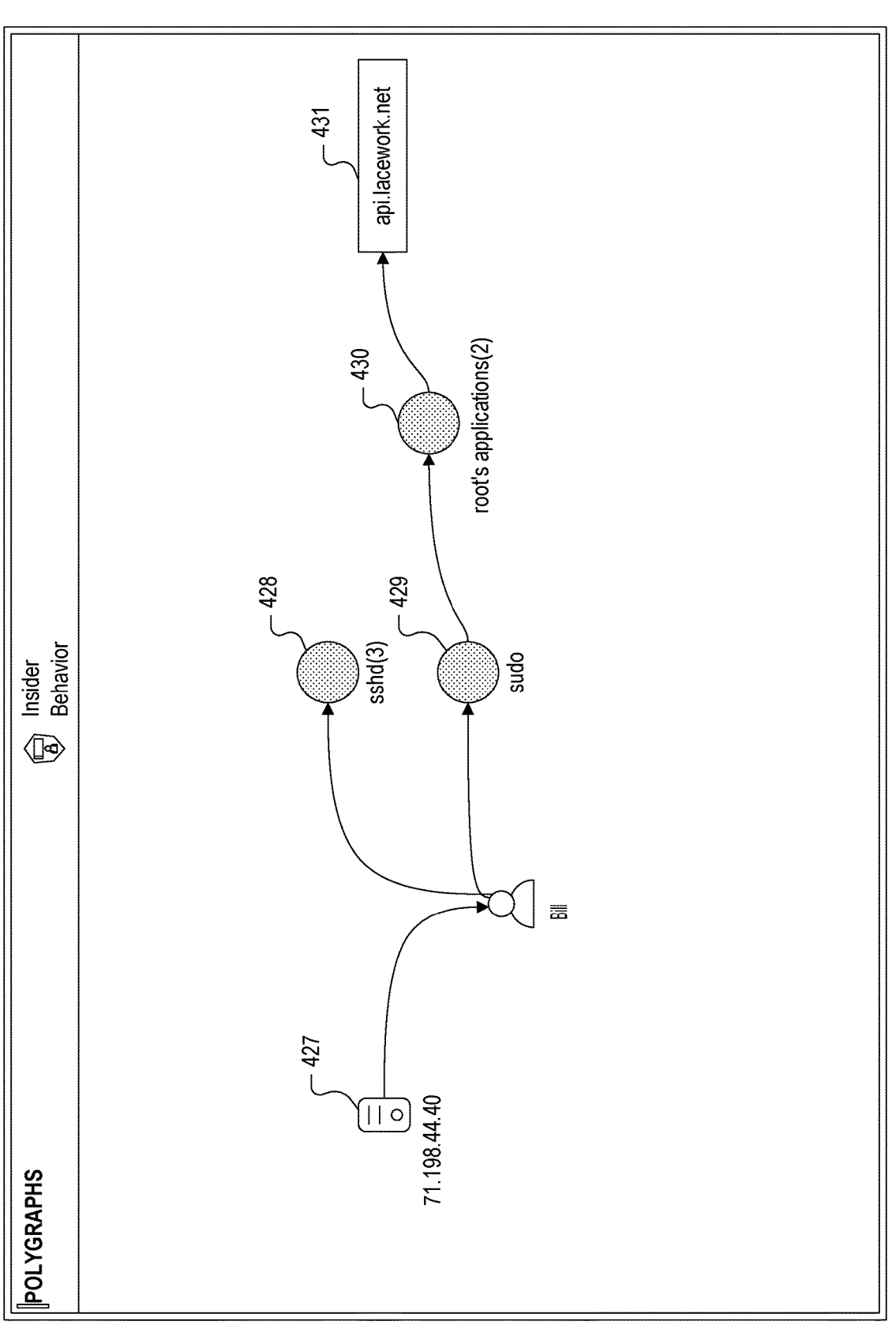
FIG. 4C illustrates an embodiment of a portion of an insider behavior graph.
Figure 4D:
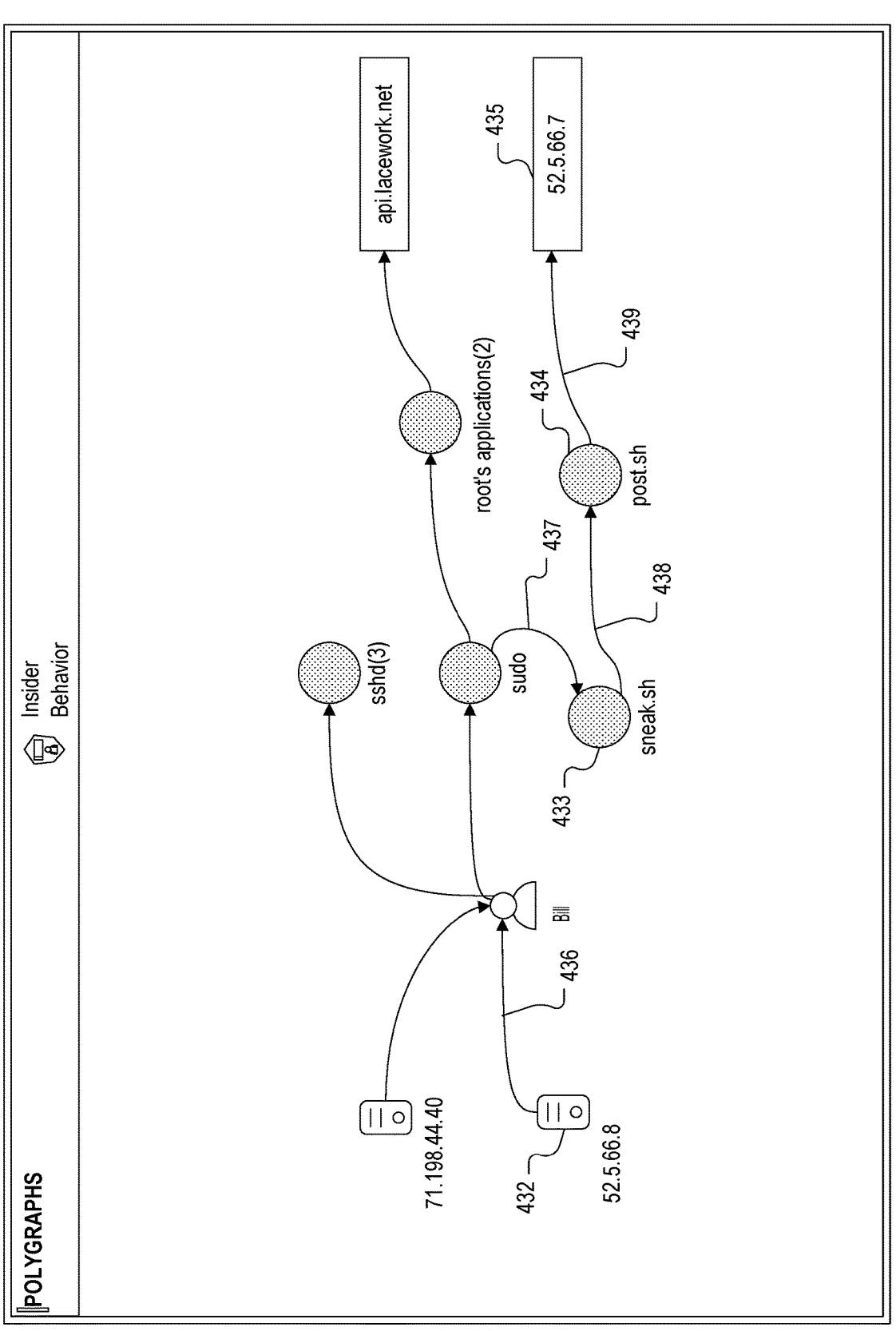
FIG. 4D illustrates an embodiment of a portion of an insider behavior graph.

An example of an insider behavior graph being used in an investigation is depicted in FIGS. 4C and 4D. FIG. 4C depicts a baseline of behavior for a user, "Bill." As shown in FIG. 4C, Bill typically logs into a datacenter from the IP address, 71.198.44.40 (427). He typically makes use of ssh (428), and sudo (429), makes use of a set of typical applications (430) and connects (as root) with the external service, api.lacework.net (431).

Suppose Bill's credentials are compromised by a nefarious outsider ("Eddie"). FIG. 4D depicts an embodiment of how the graph depicted in FIG. 4C would appear once Eddie begins exfiltrating data from the datacenter. Eddie logs into the datacenter (using Bill's credentials) from 52.5.66.8 (432). As Bill, Eddie escalates her privilege to root (e.g., via su), and then becomes a different user, Alex (e.g., via alex). As Alex, Eddie executes a script, "sneak.sh" (433), which launches another script, "post.sh" (434), which contacts external server 435 which has an IP address of 52.5.66.7, and transmits data to it. Edges 436-439 each represent changes in Bill's behavior. As previously mentioned, such changes can be detected as anomalies and associated alerts can be generated. As a first example, Bill logging in from an IP address he has not previously logged in from (436) can generate an alert. As a second example, while Bill does typically make use of sudo (429), he has not previously executed sneak.sh (433) or post.sh (434) and the execution of those scripts can generate alerts as well. As a third example, Bill has not previously communicated with server 435, and an alert can be generated when he does so (439). Considered individually, each of edges 436-439 may indicate nefarious behavior, or may be benign. As an example of a benign edge, suppose Bill begins working from a home office two days a week. The first time he logs in from his home office (i.e., from an IP address that is not 71.198.44.40), an alert can be generated that he has logged in from a new location. Over time, however, as Bill continues to log in from his home office but otherwise engages in typical activities, Bill's graph will evolve to include logins from both 71.198.44.40 and his home office as baseline behavior. Similarly, if Bill begins using a new tool in his job, an alert can be generated the first time he executes the tool, but over time will become part of his baseline.

In some cases, a single edge can indicate a serious threat. For example, if server 432 (or 435) is included in a known bad IP listing, edge 436 (or 439) indicates compromise. An alert that includes an appropriate severity level (e.g., "threat level high") can be generated. In other cases, a combination of edges could indicate a threat (where a single edge might otherwise result in a lesser warning). In the example shown in FIG. 4D, the presence of multiple new edges is indicative of a serious threat. Of note, even though "sneak.sh" and "post.sh" were executed by Alex, because data platform 12 also keeps track of an original user, the compromise of user B's account will be discovered.

Figure 4E:
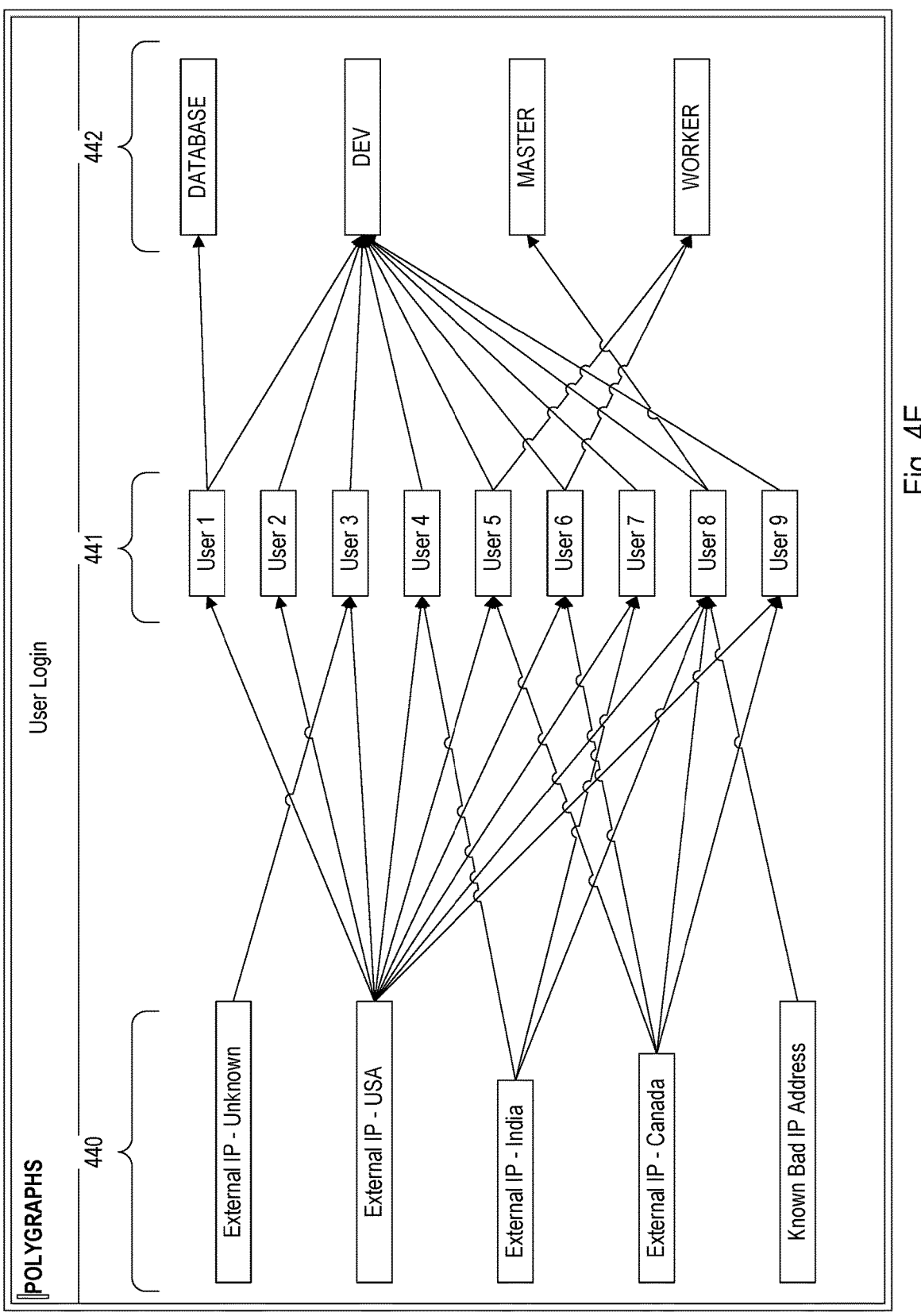
FIG. 4E illustrates a representation of an embodiment of a user login graph.

FIG. 4E illustrates a representation of an embodiment of a user login graph. In the example of FIG. 4E, tier 0 (440) clusters source IP addresses as belonging to a particular country (including an "unknown" country) or as a known bad IP. Tier 1 (441) clusters user logins, and tier 2 (442) clusters type of machine class into which a user is logging in. The user login graph tracks the typical login behavior of users. By interacting with a representation of the graph, answers to questions such as the following can be obtained:

Where is a user logging in from?

Have any users logged in from a known bad address?

Have any non-developer users accessed development machines?

Which machines does a particular user access?

Examples of alerts that can be generated using the user login graph include:

A user logs in from a known bad IP address.

A user logs in from a new country for the first time.

A new user logs into the datacenter for the first time.

A user accesses a machine class that the user has not previously accessed.

One way to track privilege changes in a datacenter is by monitoring a process hierarchy of processes. To help filter out noisy commands/processes such as "su-u," the hierarchy of processes can be constrained to those associated with network activity. In a *nix system, each process has two identifiers assigned to it, a process identifier (PID) and a parent process identifier (PPID). When such a system starts, the initial process is assigned a PID 0. Each user process has a corresponding parent process.

Using techniques described herein, a graph can be constructed (also referred to herein as a privilege change graph) which models privilege changes. In particular, a graph can be constructed which identifies where a process P1 launches a process P2, where P1 and P2 each have an associated user U1 and U2, with U1 being an original user, and U2 being an effective user. In the graph, each node is a cluster of processes (sharing a Ctype) executed by a particular (original) user. As all the processes in the cluster belong to the same user, a label that can be used for the cluster is the user's username. An edge in the graph, from a first node to a second node, indicates that a user of the first node changed its privilege to the user of the second node.

Figure 4F:
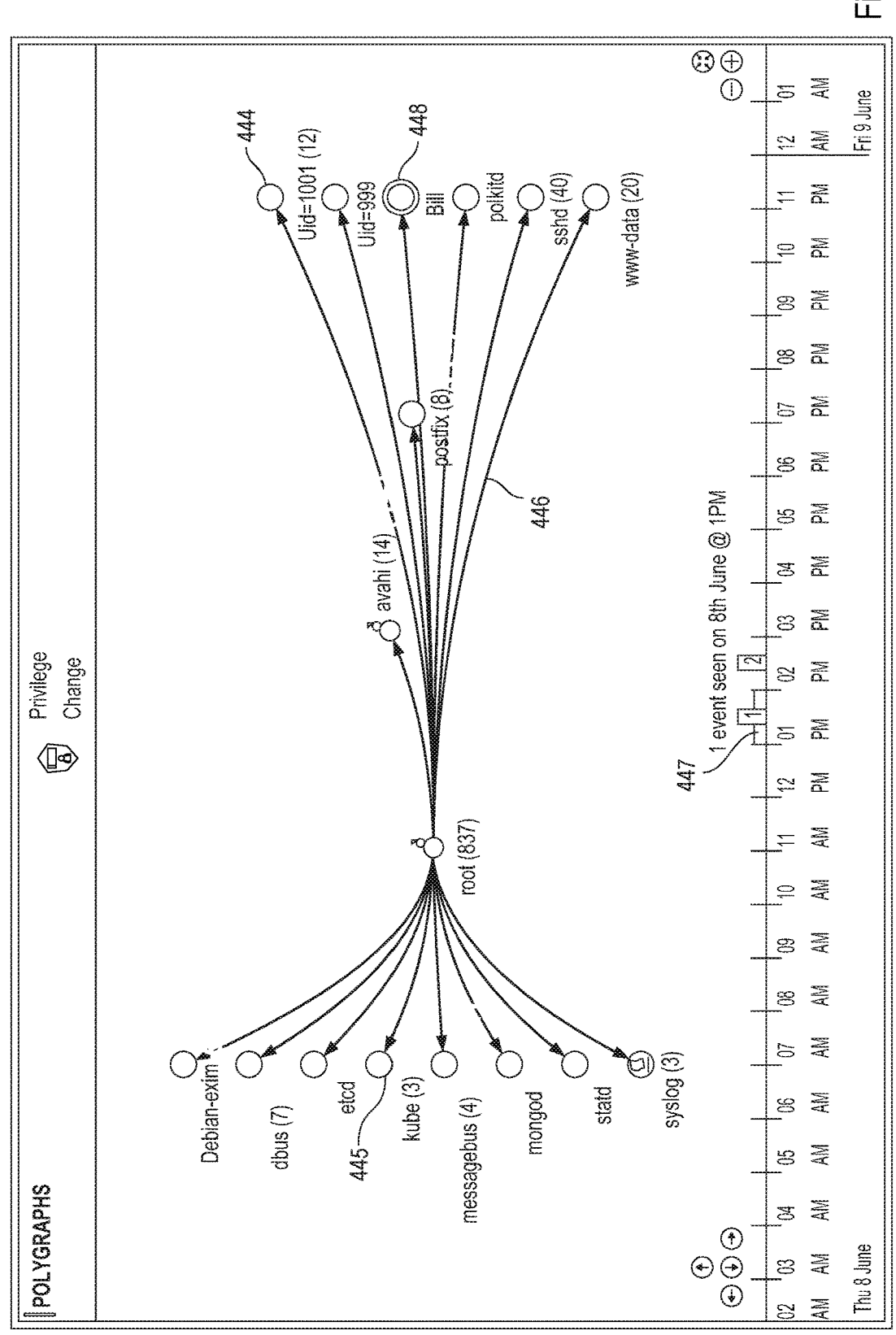
FIG. 4F illustrates an example of a privilege change graph.

FIG. 4F illustrates an example of a privilege change graph. In the example shown in FIG. 4F, each node (e.g., nodes 444 and 445) represents a user. Privilege changes are indicated by edges, such as edge 446.

As with other graphs, anomalies in graph 443 can be used to generate alerts. Three examples of such alerts are as follows:

New user entering the datacenter. Any time a new user enters the datacenter and runs a process, the graph will show a new node, with a new Ctype. This indicates a new user has been detected within the datacenter. FIG. 4F is a representation of an example of an interface that depicts such an alert. Specifically, as indicated in region 447, an alert for the time period 1 pm-2 pm on June 8 was generated. The alert identifies that a new user, Bill (448) executed a process.

Privilege change. As explained above, a new edge, from a first node (user A) to a second node (user B) indicates that user A has changed privilege to user B.

Privilege escalation. Privilege escalation is a particular case of privilege change, in which the first user becomes root.

Figure 4G:
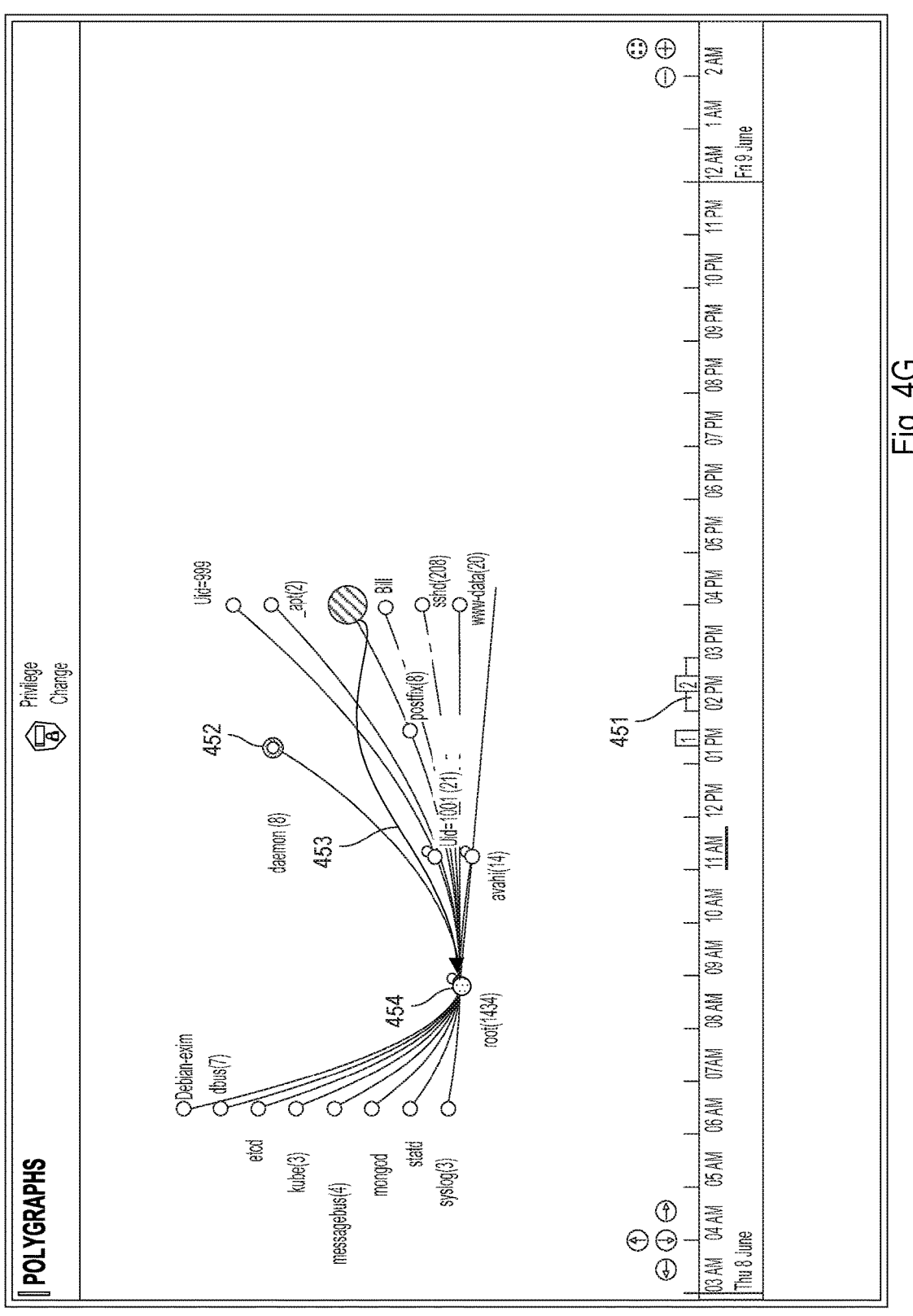
FIG. 4G illustrates an example of a privilege change graph.

An example of an anomalous privilege change and an example of an anomalous privilege escalation are each depicted in graph 450 of FIG. 4G. In particular, as indicated in region 451, two alerts for the time period 2 pm-3 pm on June 8 were generated (corresponding to the detection of the two anomalous events). In region 452, root has changed privilege to the user "daemon," which root has not previously done. This anomaly is indicated to the user by highlighting the daemon node (e.g., outlining it in a particular color, e.g., red). As indicated by edge 453, Bill has escalated his privilege to the user root (which can similarly be highlighted in region 454). This action by Bill represents a privilege escalation.

An Extensible query interface for dynamic data compositions and filter applications will now be described.

As described herein, datacenters are highly dynamic environments. And, different customers of data platform 12 (e.g., entity A vs. entity B) may have different/disparate needs/ requirements of data platform 12, e.g., due to having different types of assets, different applications, etc. Further, as time progresses, new software tools will be developed, new types of anomalous behavior will be possible (and should be detectable), etc. In various embodiments, data platform 12 makes use of predefined relational schema (including by having different predefined relational schema for different customers). However, the complexity and cost of maintaining/updating such predefined relational schema can rapidly become problematic-particularly where the schema includes a mix of relational, nested, and hierarchical (graph) datasets. In other embodiments, the data models and filtering applications used by data platform 12 are extensible. As will be described in more detail below, in various embodiments, data platform 12 supports dynamic query generation by automatic discovery of join relations via static or dynamic filtering key specifications among composable data sets. This allows a user of data platform 12 to be agnostic to modifications made to existing data sets as well as creation of new data sets. The extensible query interface also provides a declarative and configurable specification for optimizing internal data generation and derivations.

As will also be described in more detail below, data platform 12 is configured to dynamically translate user interactions (e.g., received via web app 120) into SQL queries (and without the user needing to know how to write queries). Such queries can then be performed (e.g., by query service 166) against any compatible backend (e.g., data store 30).

Figure 4H:
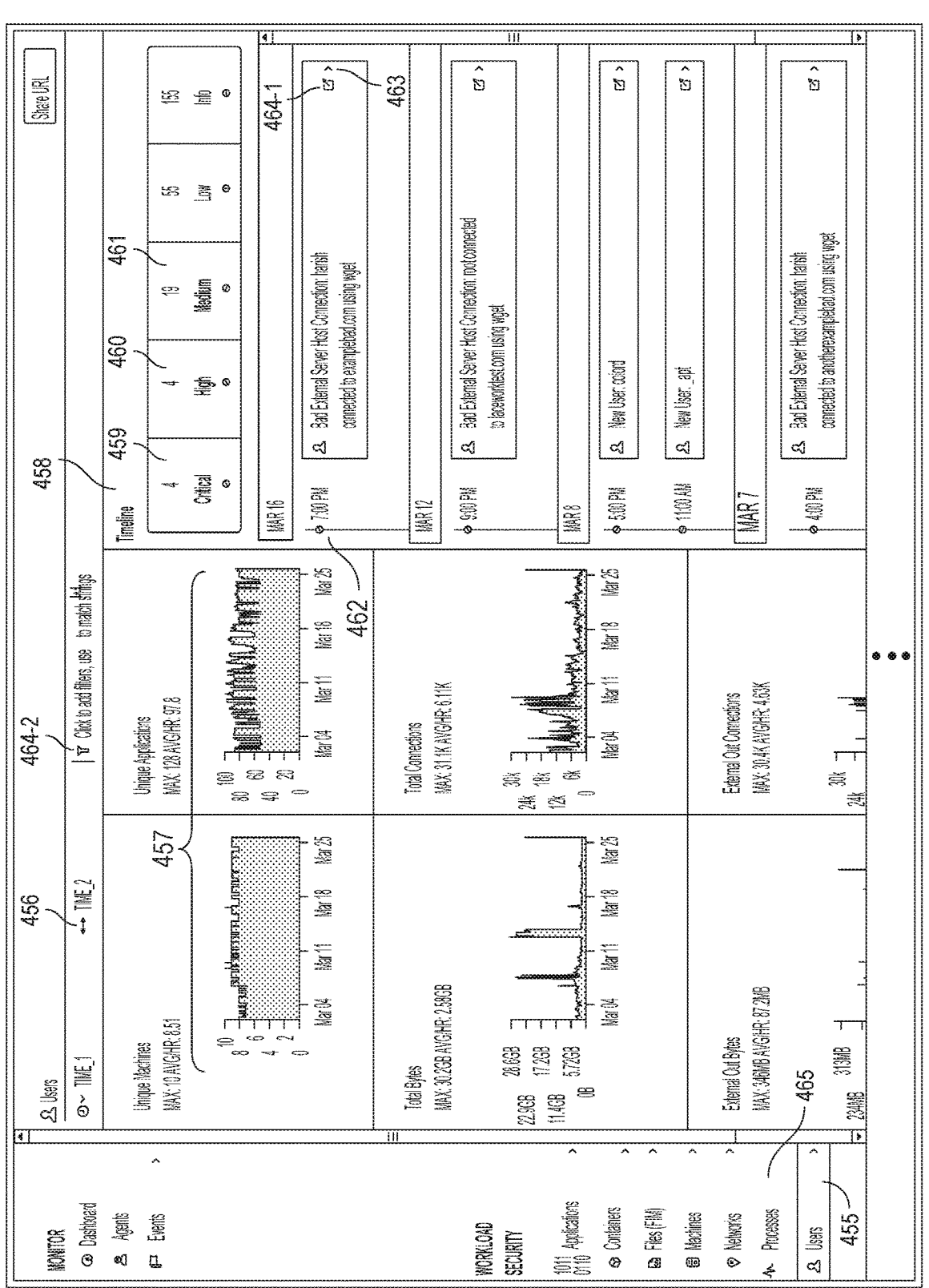
FIG. 4H illustrates an example of a user interacting with a portion of an interface.
Figure 41:
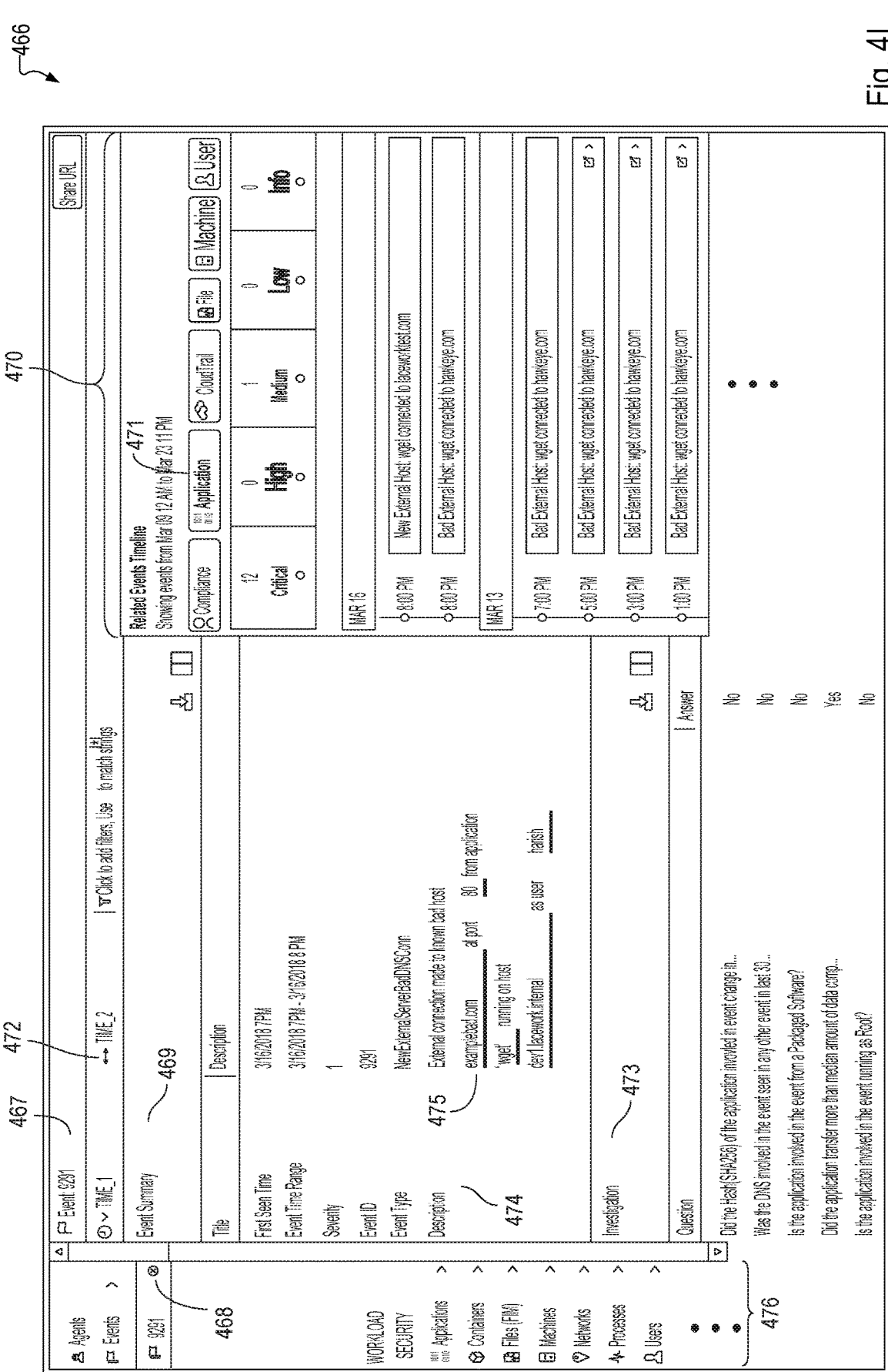

FIG. 4H illustrates an example of a user interacting with a portion of an interface. When a user visits data platform 12 (e.g., via web app 120 using a browser), data is extracted from data store 30 as needed (e.g., by query service 166), to provide the user with information, such as the visualizations depicted variously herein. As the user continues to interact with such visualizations (e.g., clicking on graph nodes, entering text into search boxes, navigating between tabs (e.g., tab 455 vs. 465)), such interactions act as triggers that cause query service 166 to continue to obtain information from data store 30 as needed (and as described in more detail below).

In the example shown in FIG. 4H, user A is viewing a dashboard that provides various information about entity A users (455), during the time period March 2 at midnight-March 25 at 7 pm (which she selected by interacting with region 456). Various statistical information is presented to user A in region 457. Region 458 presents a timeline of events that occurred during the selected time period. User A has opted to list only the critical, high, and medium events during the time period by clicking on the associated boxes (459-461). A total of 55 low severity, and 155 info-only events also occurred during the time period. Each time user A interacts with an element in FIG. 4H (e.g., clicks on box 461, clicks on link 464-1, or clicks on tab 465), her actions are translated/formalized into filters on the data set and used to dynamically generate SQL queries. The SQL queries are generated transparently to user A (and also to a designer of the user interface shown in FIG. 4H).

User A notes in the timeline (462) that a user, UserA, connected to a known bad server (examplebad.com) using wget, an event that has a critical severity level. User A can click on region 463 to expand details about the event inline (which will display, for example, the text "External connection made to known bad host examplebad.com at port 80 from application 'wget' running on host dev1.lacework.internal as user user.A") directly below timeline 462. User A can also click on link 464-1, which will take her to a dossier for the event (depicted in FIG. 4I). As will be described in more detail below, a dossier is a template for a collection of visualizations.

As shown in interface 466, the event of UserA using wget to contact examplebad.com on March 16 was assigned an event ID of 9291 by data platform 12 (467). For convenience to user A, the event is also added to her dashboard in region 476 as a bookmark (468). A summary of the event is depicted in region 469. By interacting with boxes shown in region 470, user A can see a timeline of related events. In this case, user A has indicated that she would like to see other events involving the wget application (by clicking box 471). Events of critical and medium security involving wget occurred during the one hour window selected in region 472.

Figure 4J:
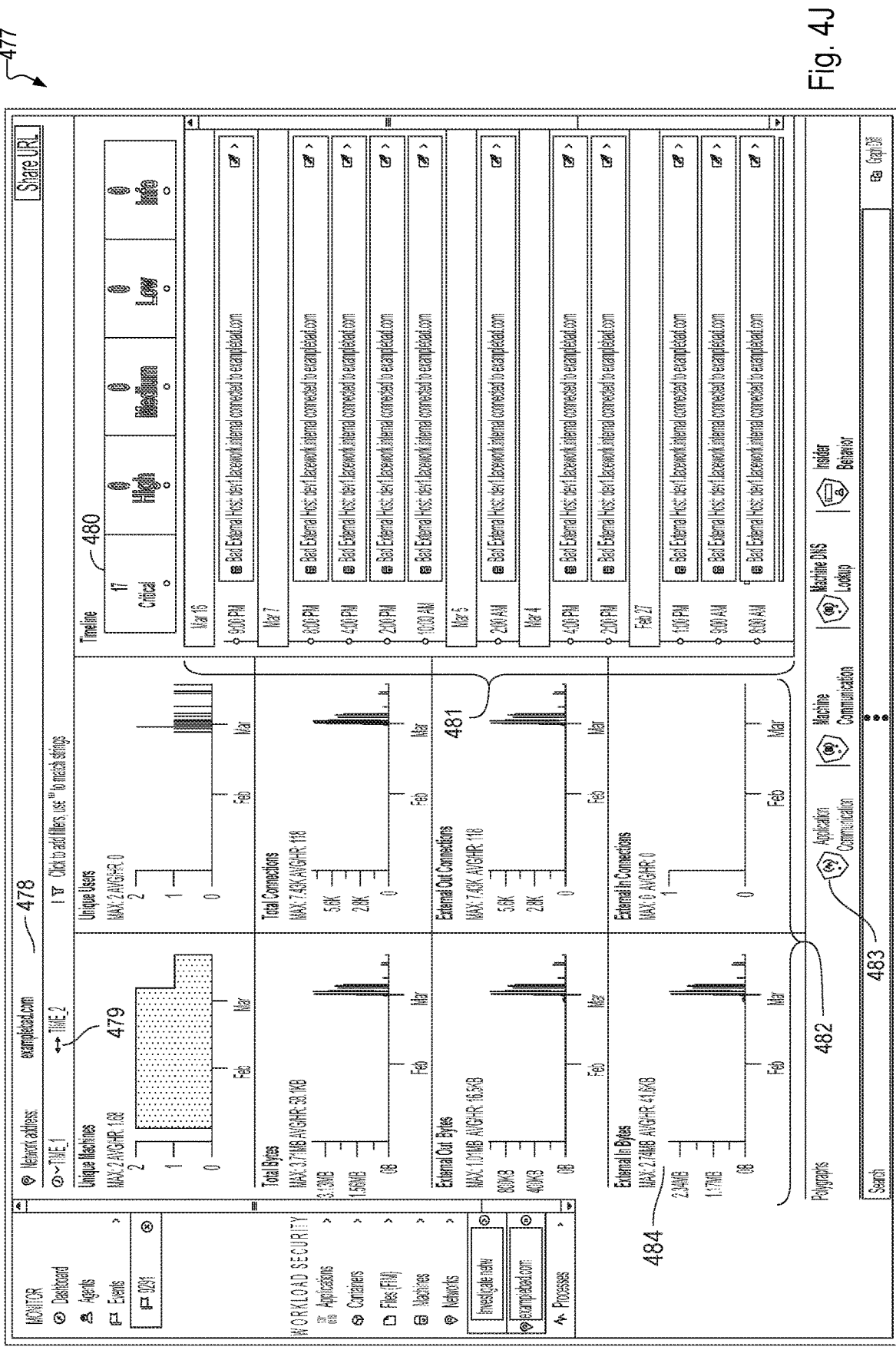
FIG. 4J illustrates an example of a dossier for a domain.

Region 473 automatically provides user A with answers to questions that may be helpful to have answers to while investigating event 9291. If user A clicks on any of the links in the event description (474), she will be taken to a corresponding dossier for the link. As one example, suppose user A clicks on link 475. She will then be presented with interface 477 shown in FIG. 4J.

Interface 477 is an embodiment of a dossier for a domain. In this example, the domain is "examplebad.com," as shown in region 478. Suppose user A would like to track down more information about interactions entity A resources have made with examplebad.com between January 1 and March 20. She selects the appropriate time period in region 479 and information in the other portions of interface 477 automatically update to provide various information corresponding to the selected time frame. As one example, user A can see that contact was made with examplebad.com a total of 17 times during the time period (480), as well as a list of each contact (481). Various statistical information is also included in the dossier for the time period (482). If she scrolls down in interface 477, user A will be able to view various polygraphs associated with examplebad.com, such as an application-communication polygraph (483).

Data stored in data store 30 can be internally organized as an activity graph. In the activity graph, nodes are also referred to as Entities. Activities generated by Entities are modeled as directional edges between nodes. Thus, each edge is an activity between two Entities. One example of an Activity is a "login" Activity, in which a user Entity logs into a machine Entity (with a directed edge from the user to the machine). A second example of an Activity is a "launch" Activity, in which a parent process launches a child process (with a directed edge from the parent to the child). A third example of an Activity is a "DNS query" Activity, in which either a process or a machine performs a query (with a directed edge from the requestor to the answer, e.g., an edge from a process to www.example.com). A fourth example of an Activity is a network "connected to" Activity, in which processes, IP addresses, and listen ports can connect to each other (with a directed edge from the initiator to the server).

As will be described in more detail below, query service 166 provides either relational views or graph views on top of data stored in data store 30. Typically, a user will want to see data filtered using the activity graph. For example, if an entity was not involved in an activity in a given time period, that entity should be filtered out of query results. Thus, a request to show "all machines" in a given time frame will be interpreted as "show distinct machines that were active" during the time frame.

Query service 166 relies on three main data model elements: fields, entities, and filters. As used herein, a field is a collection of values with the same type (logical and physical). A field can be represented in a variety of ways, including: 1. A column of relations (table/view), 2. A return field from another entity, 3. An SQL aggregation (e.g., COUNT, SUM, etc.), 4. An SQL expression with the references of other fields specified, and 5. A nested field of a JSON object. As viewed by query service 166, an entity is a collection of fields that describe a data set. The data set can be composed in a variety of ways, including: 1. A relational table, 2. A parameterized SQL statement, 3. DynamicSQL created by a Java function, and 4. Join/project/aggregate/subclass of other entities. Some fields are common for all entities. One example of such a field is a "first observed" timestamp (when first use of the entity was detected). A second example of such a field is the entity classification type (e.g., one of: 1. Machine (on which an agent is installed), 2. Process, 3. Binary, 4. UID, 5. IP, 6. DNS Information, 7. ListenPort, and 8. Ptype). A third example of such a field is a "last observed" timestamp.

A filter is an operator that: 1. Takes an entity and field values as inputs, 2. A valid SQL expression with specific reference(s) of entity fields, or 3. Is a conjunct/disjunct of filters. As will be described in more detail below, filters can be used to filter data in various ways, and limit data returned by query service 166 without changing the associated data set.

As mentioned above, a dossier is a template for a collection of visualizations. Each visualization (e.g., the box including chart 484) has a corresponding card, which identifies particular target information needed (e.g., from data store 30) to generate the visualization. In various embodiments, data platform 12 maintains a global set of dossiers/cards. Users of data platform 12 such as user A can build their own dashboard interfaces using preexisting dossiers/ cards as components, and/or they can make use of a default dashboard (which incorporates various of such dossiers/cards).

A JSON file can be used to store multiple cards (e.g., as part of a query service catalog). A particular card is represented by a single JSON object with a unique name as a field name.

Each Card May be Described by the Following Named Fields:

TYPE: the type of the card. Example values include:
Entity (the default type)
SQL
Filters
DynamicSQL
graphFilter
graph
Function
Template PARAMETERS: a JSON array object that contains an array of parameter objects with the following fields:
name (the name of the parameter)
required (a Boolean flag indicating whether the parameter is required or not)
default (a default value of the parameter)
props (a generic JSON object for properties of the parameter. Possible values are: "utype" (a user defined type), and "scope" (an optional property to configure a namespace of the parameter))
value (a value for the parameter-non-null to override the default value defined in nested source entities)

SOURCES: a JSON array object explicitly specifying references of input entities. Each source reference has the following attributes:
name (the card/entity name or fully-qualified Table name)
type (required for base Table entity)
alias (an alias to access this source entity in other fields (e.g., returns, filters, groups, etc))

RETURNS: a required JSON array object of a return field object. A return field object can be described by the following attributes:
field (a valid field name from a source entity)
expr (a valid SQL scalar expression. References to input fields of source entities are specified in the format of #{Entity. Field}. Parameters can also be used in the expression in the format of $ {ParameterName})
type (the type of field, which is required for return fields specified by expr. It is also required for all return fields of an Entity with an SQL type)
alias (the unique alias for return field)
aggr (possible aggregations are: COUNT, COUNT_DISTINCT, DISTINCT, MAX, MIN, AVG, SUM, FIRST_VALUE, LAST_VALUE)
case (JSON array object represents conditional expressions "when" and "expr")
fieldsFrom, and, except (specification for projections from a source entity with excluded fields)
props (general JSON object for properties of the return field. Possible properties include: "filterGroup," "title," "format," and "utype")

PROPS: generic JSON objects for other entity properties.

SQL: a JSON array of string literals for SQL statements. Each string literal can contain parameterized expressions $ {ParameterName} and/or composable entity by #{Entity Name}

GRAPH: required for graph entity. Has the following required fields:
source (including "type," "props," and "keys")
target (including "type," "props," and "keys")
edge (including "type" and "props")

JOINS: a JSON array of join operators. Possible fields for a join operator include:
type (possible join types include: "loj"—Left Outer Join, "join"—Inner Join, "in"—Semi Join, "implicit"—Implicit Join)
left (a left hand side field of join)
right (a right hand side field of join)
keys (key columns for multi-way joins)
order (a join order of multi-way joins)

FKEYS: a JSON array of FilterKey(s). The fields for a FilterKey are:
type (type of FilterKey)
fieldRefs (reference(s) to return fields of an entity defined in the sources field)
alias (an alias of the FilterKey, used in implicit join specification)

FILTERS: a JSON array of filters (conjunct). Possible fields for a filter include:
type (types of filters, including: "eq"—equivalent to SQL=, "ne"—equivalent to SQL< >, "ge"—equivalent to SQL>=, "gt"—equivalent to SQL>, "le"—equivalent to SQL<=, "lt"—equivalent to SQL<, "like"—equivalent to SQL LIKE, "not_like"—equivalent to SQL NOT LIKE, "rlike"—equivalent to SQL RLIKE (Snowflake specific), "not_rlike"—equivalent to SQL NOT RLIKE (Snowflake specific), "in"—equivalent to SQL IN, "not_in"—equivalent to SQL NOT IN)
expr (generic SQL expression)
field (field name)
value (single value)
values (for both IN and NOT IN)

ORDERS: a JSON array of ORDER BY for returning fields. Possible attributes for the ORDER BY clause include:
field (field ordinal index (1 based) or field alias)
order (asc/desc, default is ascending order)

GROUPS: a JSON array of GROUP BY for returning fields. Field attributes are:
field (ordinal index (1 based) or alias from the return fields)

LIMIT: a limit for the number of records to be returned

OFFSET: an offset of starting position of returned data. Used in combination with limit for pagination.

Suppose customers of data platform 12 (e.g., entity A and entity B) request new data transformations or a new aggregation of data from an existing data set (as well as a corresponding visualization for the newly defined data set). As mentioned above, the data models and filtering applications used by data platform 12 are extensible. Thus, two example scenarios of extensibility are (1) extending the filter data set, and (2) extending a FilterKey in the filter data set.

Data platform 12 includes a query service catalog that enumerates cards available to users of data platform 12. New cards can be included for use in data platform 12 by being added to the query service catalog (e.g., by an operator of data platform 12). For reusability and maintainability, a single external-facing card (e.g., available for use in a dossier) can be composed of multiple (nested) internal cards. Each newly added card (whether external or internal) will also have associated FilterKey(s) defined. A user interface (UI) developer can then develop a visualization for the new data set in one or more dossier templates. The same external card can be used in multiple dossier templates, and a given external card can be used multiple times in the same dossier (e.g., after customization). Examples of external card customization include customization via parameters, ordering, and/or various mappings of external data fields (columns).

As mentioned above, a second extensibility scenario is one in which a FilterKey in the filter data set is extended (i.e., existing template functions are used to define a new data set). As also mentioned above, data sets used by data platform 12 are composable/reusable/extensible, irrespective of whether the data sets are relational or graph data sets. One example data set is the User Tracking polygraph, which is generated as a graph data set (comprising nodes and edges). Like other polygraphs, User Tracking is an external data set that can be visualized both as a graph (via the nodes and edges) and can also be used as a filter data set for other cards, via the cluster identifier (CID) field.

As mentioned above, as users such as user A navigate through/interact with interfaces provided by data platform 12 (e.g., as shown in FIG. 4H), such interactions trigger query service 166 to generate and perform queries against data store 30. Dynamic composition of filter datasets can be implemented using FilterKeys and FilterKey Types. A FilterKey can be defined as a list of columns and/or fields in a nested structure (e.g., JSON). Instances of the same FilterKey Type can be formed as an Implicit Join Group. The same instance of a FilterKey can participate in different Implicit Join Groups. A list of relationships among all possible Implicit Join Groups is represented as a Join graph for the entire search space to create a final data filter set by traversing edges and producing Join Path(s).

Each card (e.g., as stored in the query service catalog and used in a dossier) can be introspected by a/card/describe/CardID REST request.

Figure 4K:
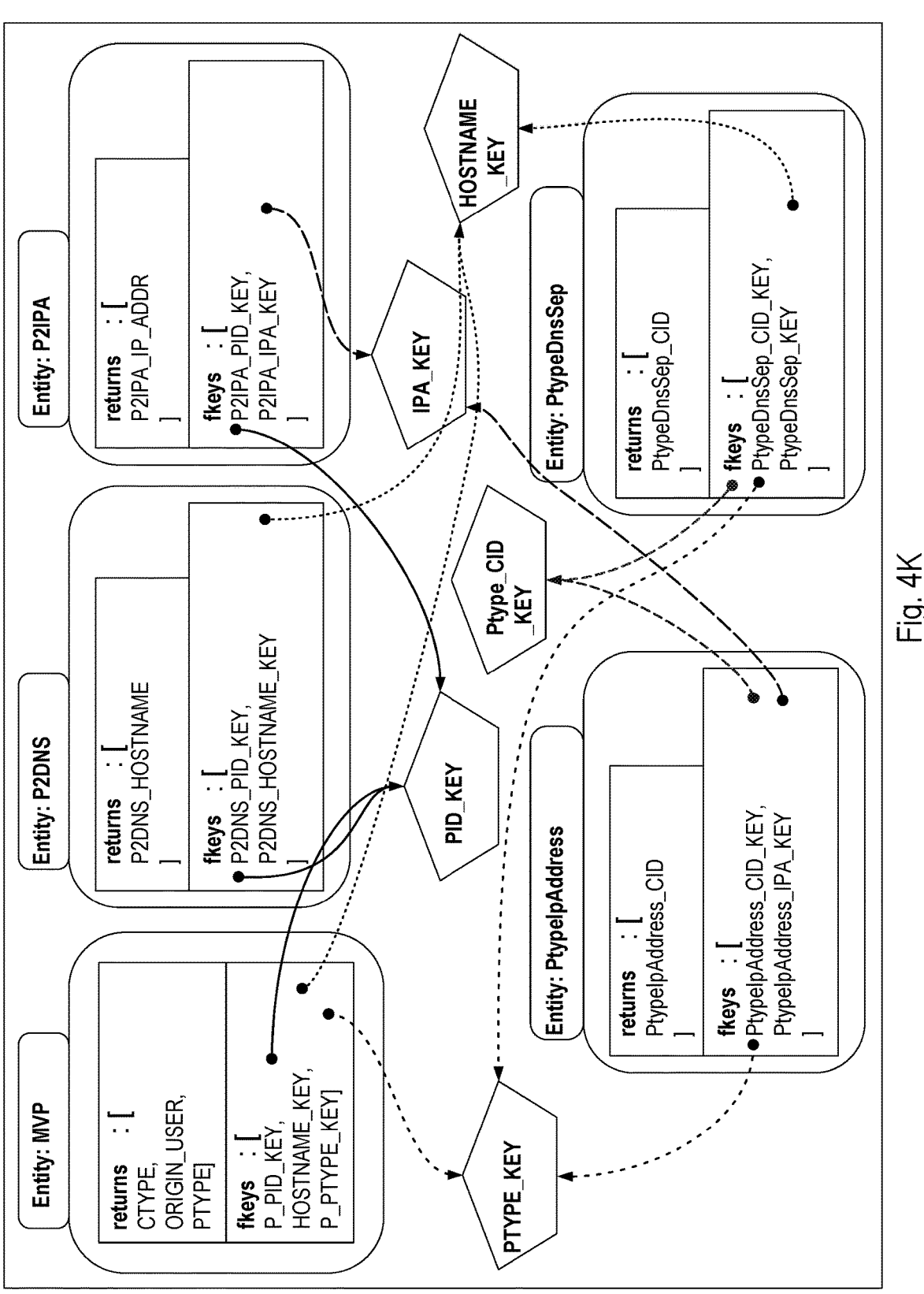
FIG. 4K depicts an example of an Entity Join graph by FilterKey and FilterKey Group (implicit join).

At runtime (e.g., whenever it receives a request from web app 120), query service 166 parses the list of implicit joins and creates a Join graph to manifest relationships of FilterKeys among Entities. A Join graph (an example of which is depicted in FIG. 4K) comprises a list of Join Link(s). A Join Link represents each implicit join group by the same FilterKey type. A Join Link maintains a reverse map (Entity-to-FilterKey) of FilterKeys and their Entities. As previously mentioned, Entities can have more than one FilterKey defined. The reverse map guarantees one FilterKey per Entity can be used for each JoinLink. Each JoinLink also maintains a list of entities for the priority order of joins. Each JoinLink is also responsible for creating and adding directional edge(s) to graphs. An edge represents a possible join between two Entities.

At runtime, each Implicit Join uses the Join graph to find all possible join paths. The search of possible join paths starts with the outer FilterKey of an implicit join. One approach is to use a shortest path approach, with breadth first traversal and subject to the following criteria:

Use the priority order list of Join Links for all entities in the same implicit join group.

Stop when a node (Entity) is reached which has local filter(s).

Include all join paths at the same level (depth).

Exclude join paths based on the predefined rules (path of edges).

FIG. 4L illustrates an example of a process for dynamically generating and executing a query. In various embodiments, process 485 is performed by data platform 12. The process begins at 486 when a request is received to filter information associated with activities within a network environment. One example of such a request occurs in response to user A clicking on tab 465. Another example of such a request occurs in response to user A clicking on link 464-1. Yet another example of such a request occurs in response to user A clicking on link 464-2 and selecting (e.g., from a dropdown) an option to filter (e.g., include, exclude) based on specific criteria that she provides (e.g., an IP address, a username, a range of criteria, etc.).

At 487, a query is generated based on an implicit join. One example of processing that can be performed at 487 is as follows. As explained above, one way dynamic composition of filter datasets can be implemented is by using FilterKeys and FilterKey Types. And, instances of the same FilterKey Type can be formed as an Implicit Join Group. A Join graph for the entire search space can be constructed from a list of all relationships among all possible Join Groups. And, a final data filter set can be created by traversing edges and producing one or more Join Paths. Finally, the shortest path in the join paths is used to generate an SQL query string.

One approach to generating an SQL query string is to use a query building library (authored in an appropriate language such as Java). For example, a common interface "sqlGen" may be used in conjunction with process 485 is as follows. First, a card/entity is composed by a list of input cards/entities, where each input card recursively is composed by its own list of input cards. This nested structure can be visualized as a tree of query blocks (SELECT) in standard SQL constructs. SQL generation can be performed as the traversal of the tree from root to leaf entities (top-down), calling the sqlGen of each entity. Each entity can be treated as a subclass of the Java class (Entity). An implicit join filter (EntityFilter) is implemented as a subclass of Entity, similar to the right hand side of a SQL semi-join operator. Unlike the static SQL semi-join construct, it is conditionally and recursively generated even if it is specified in the input sources of the JSON specification. Another recursive interface can also be used in conjunction with process 485, preSQLGen, which is primarily the entry point for EntityFilter to run a search and generate nested implicit join filters. During preSQLGen recursive invocations, the applicability of implicit join filters is examined and pushed down to its input subquery list. Another top-down traversal, pullUpCachable, can be used to pull up common sub-query blocks, including those dynamically generated by preSQLGen, such that SELECT statements of those cacheable blocks are generated only once at top-level WITH clauses. A recursive interface, sqlWith, is used to generate nested subqueries inside WITH clauses. The recursive calls of a sqlWith function can generate nested WITH clauses as well. An sqlFrom function can be used to generate SQL FROM clauses by referencing those subquery blocks in the WITH clauses. It also produces INNER/OUTER join operators based on the joins in the specification. Another recursive interface, sqlWhere, can be used to generate conjuncts and disjuncts of local predicates and semi-join predicates based on implicit join transformations. Further, sqlProject, sqlGroupBy, sqlOrderBy, and sqlLimitOffset can respectively be used to translate the corresponding directives in JSON spec to SQL SELECT list, GROUP BY, ORDER BY, and LIMIT/OFFSET clauses.

Returning to process 485, at 488, the query (generated at 487) is used to respond to the request. As one example of the processing performed at 488, the generated query is used to query data store 30 and provide (e.g., to web app 120) fact data formatted in accordance with a schema (e.g., as associated with a card associated with the request received at 486).

Although the examples described herein largely relate to embodiments where data is collected from agents and ultimately stored in a data store such as those provided by Snowflake, in other embodiments data that is collected from agents and other sources may be stored in different ways. For example, data that is collected from agents and other sources may be stored in a data warehouse, data lake, data mart, and/or any other data store.

A data warehouse may be embodied as an analytic database (e.g., a relational database) that is created from two or more data sources. Such a data warehouse may be leveraged to store historical data, often on the scale of petabytes. Data warehouses may have compute and memory resources for running complicated queries and generating reports. Data warehouses may be the data sources for business intelligence ('BI') systems, machine learning applications, and/or other applications. By leveraging a data warehouse, data that has been copied into the data warehouse may be indexed for good analytic query performance, without affecting the write performance of a database (e.g., an Online Transaction Processing ('OLTP') database). Data warehouses also enable the joining data from multiple sources for analysis. For example, a sales OLTP application probably has no need to know about the weather at various sales locations, but sales predictions could take advantage of that data. By adding historical weather data to a data warehouse, it would be possible to factor it into models of historical sales data.

Data lakes, which store files of data in their native format, may be considered as "schema on read" resources. As such, any application that reads data from the lake may impose its own types and relationships on the data. Data warehouses, on the other hand, are "schema on write," meaning that data types, indexes, and relationships are imposed on the data as it is stored in the EDW. "Schema on read" resources may be beneficial for data that may be used in several contexts and poses little risk of losing data. "Schema on write" resources may be beneficial for data that has a specific purpose, and good for data that must relate properly to data from other sources. Such data stores may include data that is encrypted using homomorphic encryption, data encrypted using privacy-preserving encryption, smart contracts, non-fungible tokens, decentralized finance, and other techniques.

Data marts may contain data oriented towards a specific business line whereas data warehouses contain enterprise-wide data. Data marts may be dependent on a data warehouse, independent of the data warehouse (e.g., drawn from an operational database or external source), or a hybrid of the two. In embodiments described herein, different types of data stores (including combinations thereof) may be leveraged. Such data stores may be proprietary or may be embodied as vendor provided products or services such as, for example, Google BigQuery, Druid, Amazon Redshift, IBM Db2, Dremio, Databricks Lakehouse Platform, Cloudera, Azure Synapse Analytics, and others.

The deployments (e.g., a customer's cloud deployment) that are analyzed, monitored, evaluated, or otherwise observed by the systems described herein (e.g., systems that include components such as the platform 12 of FIG. 1D, the data collection agents described herein, and/or other components) may be provisioned, deployed, and/or managed using infrastructure as code ('IaC'). IaC involves the managing and/or provisioning of infrastructure through code instead of through manual processes. With IaC, configuration files may be created that include infrastructure specifications. IaC can be beneficial as configurations may be edited and distributed, while also ensuring that environments are provisioned in a consistent manner. IaC approaches may be enabled in a variety of ways including, for example, using IaC software tools such as Terraform by HashiCorp. Through the usage of such tools, users may define and provide data center infrastructure using JavaScript Object Notation ('JSON'), YAML, proprietary formats, or some other format. In some embodiments, the configuration files may be used to emulate a cloud deployment for the purposes of analyzing the emulated cloud deployment using the systems described herein. Likewise, the configuration files themselves may be used as inputs to the systems described herein, such that the configuration files may be inspected to identify vulnerabilities, misconfigurations, violations of regulatory requirements, or other issues. In fact, configuration files for multiple cloud deployments may even be used by the systems described herein to identify best practices, to identify configuration files that deviate from typical configuration files, to identify configuration files with similarities to deployments that have been determined to be deficient in some way, or the configuration files may be leveraged in some other ways to detect vulnerabilities, misconfigurations, violations of regulatory requirements, or other issues prior to deploying an infrastructure that is described in the configuration files. In some embodiments the techniques described herein may be use in multi-cloud, multi-tenant, cross-cloud, cross-tenant, cross-user, industry cloud, digital platform, and other scenarios depending on specific need or situation.

In some embodiments, the deployments that are analyzed, monitored, evaluated, or otherwise observed by the systems described herein (e.g., systems that include components such as the platform 12 of FIG. 1D, the data collection agents described herein, and/or other components) may be monitored to determine the extent to which a particular component has experienced "drift" relative to its associated IaC configuration. Discrepancies between how cloud resources were defined in an IaC configuration file and how they are currently configured in runtime may be identified and remediation workflows may be initiated to generate an alert, reconfigure the deployment, or take some other action. Such discrepancies may occur for a variety of reasons. Such discrepancies may occur, for example, due to maintenance operations being performed, due to incident response tasks being carried out, or for some other reason. Readers will appreciate that while IaC helps avoid initial misconfigurations of a deployment by codifying and enforcing resource creation, resource configuration, security policies, and so on, the systems described herein may prevent unwanted drift from occurring during runtime and after a deployment has been created in accordance with an IaC configuration.

In some embodiments, the deployments (e.g., a customer's cloud deployment) that are analyzed, monitored, evaluated, or otherwise observed by the systems described herein (e.g., systems that include components such as the platform 12 of FIG. 1D, the data collection agents described herein, and/or other components) may also be provisioned, deployed, and/or managed using security as code ('SaC'). SaC extends IaC concepts by defining cybersecurity policies and/or standards programmatically, so that the policies and/or standards can be referenced automatically in the configuration scripts used to provision cloud deployments. Stated differently, SaC can automate policy implementation and cloud deployments may even be compared with the policies to prevent "drift." For example, if a policy is created where all personally identifiable information ('PII') or personal health information ('PHI') must be encrypted when it is stored, that policy is translated into a process that is automatically launched whenever a developer submits code, and code that violates the policy may be automatically rejected.

In some embodiments, SaC may be implemented by initially classifying workloads (e.g., by sensitivity, by criticality, by deployment model, by segment). Policies that can be instantiated as code may subsequently be designed. For example, compute-related policies may be designed, access-related policies may be designed, application-related policies may be designed, network-related policies may be designed, data-related policies may be designed, and so on. Security as code may then be instantiated through architecture and automation, as successful implementation of SaC can benefit from making key architectural-design decisions and executing the right automation capabilities. Next, operating model protections may be built and supported. For example, an operating model may "shift left" to maximize self-service and achieve full-life-cycle security automation (e.g., by standardizing common development toolchains, CI/CD pipelines, and the like). In such an example, security policies and access controls may be part of the pipeline, automatic code review and bug/defect detection may be performed, automated build processes may be performed, vulnerability scanning may be performed, checks against a risk-control framework may be made, and other tasks may be performed all before deploying an infrastructure or components thereof.

The systems described herein may be useful in analyzing, monitoring, evaluating, or otherwise observing a GitOps environment. In a GitOps environment, Git may be viewed as the one and only source of truth. As such, GitOps may require that the desired state of infrastructure (e.g., a customer's cloud deployment) be stored in version control such that the entire audit trail of changes to such infrastructure can be viewed or audited. In a GitOps environment, all changes to infrastructure are embodied as fully traceable commits that are associated with committer information, commit IDs, time stamps, and/or other information. In such an embodiment, both an application and the infrastructure (e.g., a customer's cloud deployment) that supports the execution of the application are therefore versioned artifacts and can be audited using the gold standards of software development and delivery. Readers will appreciate that while the systems described herein are described as analyzing, monitoring, evaluating, or otherwise observing a GitOps environment, in other embodiments other source control mechanisms may be utilized for creating infrastructure, making changes to infrastructure, and so on. In these embodiments, the systems described herein may similarly be used for analyzing, monitoring, evaluating, or otherwise observing such environments.

As described in other portions of the present disclosure, the systems described herein may be used to analyze, monitor, evaluate, or otherwise observe a customer's cloud deployment. While securing traditional datacenters requires managing and securing an IP-based perimeter with networks and firewalls, hardware security modules ('HSMs'), security information and event management ('SIEM') technologies, and other physical access restrictions, such solutions are not particularly useful when applied to cloud deployments. As such, the systems described herein may be configured to interact with and even monitor other solutions that are appropriate for cloud deployments such as, for example, "zero trust" solutions.

A zero trust security model (a.k.a., zero trust architecture) describes an approach to the design and implementation of IT systems. A primary concept behind zero trust is that devices should not be trusted by default, even if they are connected to a managed corporate network such as the corporate LAN and even if they were previously verified. Zero trust security models help prevent successful breaches by eliminating the concept of trust from an organization's network architecture. Zero trust security models can include multiple forms of authentication and authorization (e.g., machine authentication and authorization, human/user authentication and authorization) and can also be used to control multiple types of accesses or interactions (e.g., machine-to-machine access, human-to-machine access).

In some embodiments, the systems described herein may be configured to interact with zero trust solutions in a variety of ways. For example, agents that collect input data for the systems described herein (or other components of such systems) may be configured to access various machines, applications, data sources, or other entity through a zero trust solution, especially where local instances of the systems described herein are deployed at edge locations. Likewise, given that zero trust solutions may be part of a customer's cloud deployment, the zero trust solution itself may be monitored to identify vulnerabilities, anomalies, and so on. For example, network traffic to and from the zero trust solution may be analyzed, the zero trust solution may be monitored to detect unusual interactions, log files generated by the zero trust solution may be gathered and analyzed, and so on.

In some embodiments, the systems described herein may leverage various tools and mechanisms in the process of performing its primary tasks (e.g., monitoring a cloud deployment). For example, Linux eBPF is mechanism for writing code to be executed in the Linux kernel space. Through the usage of eBPF, user mode processes can hook into specific trace points in the kernel and access data structures and other information. For example, eBPF may be used to gather information that enables the systems described herein to attribute the utilization of networking resources or network traffic to specific processes. This may be useful in analyzing the behavior of a particular process, which may be important for observability/SIEM.

The systems described may be configured to collect security event logs (or any other type of log or similar record of activity) and telemetry in real time for threat detection, for analyzing compliance requirements, or for other purposes. In such embodiments, the systems described herein may analyze telemetry in real time (or near real time), as well as historical telemetry, to detect attacks or other activities of interest. The attacks or activities of interest may be analyzed to determine their potential severity and impact on an organization. In fact, the attacks or activities of interest may be reported, and relevant events, logs, or other information may be stored for subsequent examination.

In one embodiment, systems described herein may be configured to collect security event logs (or any other type of log or similar record of activity) and telemetry in real time to provide customers with a SIEM or SIEM-like solution. SIEM technology aggregates event data produced by security devices, network infrastructure, systems, applications, or other source. Centralizing all of the data that may be generated by a cloud deployment may be challenging for a traditional SIEM, however, as each component in a cloud deployment may generate log data or other forms of machine data, such that the collective amount of data that can be used to monitor the cloud deployment can grow to be quite large. A traditional SIEM architecture, where data is centralized and aggregated, can quickly result in large amounts of data that may be expensive to store, process, retain, and so on. As such, SIEM technologies may frequently be implemented such that silos are created to separate the data.

In some embodiments of the present disclosure, data that is ingested by the systems described herein may be stored in a cloud-based data warehouse such as those provided by Snowflake and others. Given that companies like Snowflake offer data analytics and other services to operate on data that is stored in their data warehouses, in some embodiments one or more of the components of the systems described herein may be deployed in or near Snowflake as part of a secure data lake architecture (a.k.a., a security data lake architecture, a security data lake/warehouse). In such an embodiment, components of the systems described herein may be deployed in or near Snowflake to collect data, transform data, analyze data for the purposes of detecting threats or vulnerabilities, initiate remediation workflows, generate alerts, or perform any of the other functions that can be performed by the systems described herein. In such embodiments, data may be received from a variety of sources (e.g., EDR or EDR-like tools that handle endpoint data, cloud access security broker ('CASB') or CASB-like tools that handle data describing interactions with cloud applications, Identity and Access Management ('IAM') or IAM-like tools, and many others), normalized for storage in a data warehouse, and such normalized data may be used by the systems described herein. In fact, the systems described herein may actually implement the data sources (e.g., an EDR tool, a CASB tool, an IAM tool) described above.

In some embodiments one data source that is ingested by the systems described herein is log data, although other forms of data such as network telemetry data (flows and packets) and/or many other forms of data may also be utilized. In some embodiments, event data can be combined with contextual information about users, assets, threats, vulnerabilities, and so on, for the purposes of scoring, prioritization and expediting investigations. In some embodiments, input data may be normalized, so that events, data, contextual information, or other information from disparate sources can be analyzed more efficiently for specific purposes (e.g., network security event monitoring, user activity monitoring, compliance reporting). The embodiments described here offer real-time analysis of events for security monitoring, advanced analysis of user and entity behaviors, querying and long-range analytics for historical analysis, other support for incident investigation and management, reporting (for compliance requirements, for example), and other functionality.

In some embodiments, the systems described herein may be part of an application performance monitoring ('APM') solution. APM software and tools enable the observation of application behavior, observation of its infrastructure dependencies, observation of users and business key performance indicators ('KPIs') throughout the application's life cycle, and more. The applications being observed may be developed internally, as packaged applications, as software as a service ('SaaS'), or embodied in some other ways. In such embodiments, the systems described herein may provide one or more of the following capabilities:

The ability to operate as an analytics platform that ingests, analyzes, and builds context from traces, metrics, logs, and other sources.

Automated discovery and mapping of an application and its infrastructure components.

Observation of an application's complete transactional behavior, including interactions over a data communications network.

Monitoring of applications running on mobile (native and browser) and desktop devices.

Identification of probable root causes of an application's performance problems and their impact on business outcomes.

Integration capabilities with automation and service management tools.

Analysis of business KPIs and user journeys (for example, login to check-out).

Domain-agnostic analytics capabilities for integrating data from third-party sources.

Endpoint monitoring to understand the user experience and its impact on business outcomes.

Support for virtual desktop infrastructure ('VDI') monitoring.

In embodiments where the systems described herein are used for APM, some components of the system may be modified, other components may be added, some components may be removed, and other components may remain the same. In such an example, similar mechanisms as described elsewhere in this disclosure may be used to collect information from the applications, network resources used by the application, and so on. The graph based modelling techniques may also be leveraged to perform some of the functions mentioned above, or other functions as needed.

In some embodiments, the systems described herein may be part of a solution for developing and/or managing artificial intelligence ('Al') or machine learning ('ML') applications. For example, the systems described herein may be part of an AutoML tool that automate the tasks associated with developing and deploying ML models. In such an example, the systems described herein may perform various functions as part of an AutoML tool such as, for example, monitoring the performance of a series of processes, microservices, and so on that are used to collectively form the AutoML tool. In other embodiments, the systems described herein may perform other functions as part of an AutoML tool or may be used to monitor, analyze, or otherwise observe an environment that the AutoML tool is deployed within.

In some embodiments, the systems described herein may be used to manage, analyze, or otherwise observe deployments that include other forms of AI/ML tools. For example, the systems described herein may manage, analyze, or otherwise observe deployments that include AI services. AI services are, like other resources in an as-a-service model, ready-made models and AI applications that are consumable as services and made available through APIs. In such an example, rather than using their own data to build and train models for common activities, organizations may access pre-trained models that accomplish specific tasks. Whether an organization needs natural language processing ('NLP'), automatic speech recognition ('ASR'), image recognition, or some other capability, AI services simply plug-and-play into an application through an API. Likewise, the systems described herein may be used to manage, analyze, or otherwise observe deployments that include other forms of AI/ML tools such as Amazon Sagemaker (or other cloud machine-learning platform that enables developers to create, train, and deploy ML models) and related services such as Data Wrangler (a service to accelerate data prep for ML) and Pipelines (a CI/CD service for ML).

In some embodiments, the systems described herein may be used to manage, analyze, or otherwise observe deployments that include various data services. For example, data services may include secure data sharing services, data marketplace services, private data exchanges services, and others. Secure data sharing services can allow access to live data from its original location, where those who are granted access to the data simply reference the data in a controlled and secure manner, without latency or contention from concurrent users. Because changes to data are made to a single version, data remains up-to-date for all consumers, which ensures data models are always using the latest version of such data. Data marketplace services operate as a single location to access live, ready-to-query data (or data that is otherwise ready for some other use). A data marketplace can even include a "feature stores," which can allow data scientists to repurpose existing work. For example, once a data scientist has converted raw data into a metric (e.g., costs of goods sold), this universal metric can be found quickly and used by other data scientists for quick analysis against that data.

In some embodiments, the systems described herein may be used to manage, analyze, or otherwise observe deployments that include distributed training engines or similar mechanisms such as, for example, such as tools built on Dask. Dask is an open source library for parallel computing that is written in Python. Dask is designed to enable data scientists to improve model accuracy faster, as Dask enables data scientists can do everything in Python end-to-end, which means that they no longer need to convert their code to execute in environments like Apache Spark. The result is reduced complexity and increased efficiency. The systems described herein may also be used to manage, analyze, or otherwise observe deployments that include technologies such as RAPIDS (an open source Python framework which is built on top of Dask). RAPIDS optimizes compute time and speed by providing data pipelines and executing data science code entirely on graphics processing units (GPUs) rather than CPUs. Multi-cluster, shared data architecture, DataFrames, Java user-defined functions (UDF) are supported to enable trained models to run within a data warehouse.

In some embodiments, the systems described herein may be leveraged for the specific use case of detecting and/or remediating ransomware attacks and/or other malicious action taken with respect to data, systems, and/or other resources associated with one or more entities. Ransomware is a type of malware from cryptovirology that threatens to publish the victim's data or perpetually block access to such data unless a ransom is paid. In such embodiments, ransomware attacks may be carried out in a manner such that patterns (e.g., specific process-to-process communications, specific data access patterns, unusual amounts of encryption/re-encryption activities) emerge, where the systems described herein may monitor for such patterns. Alternatively, ransomware attacks may involve behavior that deviates from normal behavior of a cloud deployment that is not experiencing a ransomware attack, such that the mere presence of unusual activity may trigger the systems described herein to generate alerts or take some other action, even without explicit knowledge that the unusual activity is associated with a ransomware attack.

In some embodiments, particular policies may be put in place the systems described herein may be configured to enforce such policies as part of an effort to thwart ransomware attacks. For example, particular network sharing protocols (e.g., Common Internet File System ('CIFS'), Network File System ('NFS')) may be avoided when implementing storage for backup data, policies that protect backup systems may be implemented and enforced to ensure that usable backups are always available, multifactor authentication for particular accounts may be utilized and accounts may be configured with the minimum privilege required to function, isolated recovery environments may be created and isolation may be monitored and enforced to ensure the integrity of the recovery environment, and so on. As described in the present disclosure, the systems described herein may be configured to explicitly enforce such policies or may be configured to detect unusual activity that represents a violation of such policies, such that the mere presence of unusual activity may trigger the systems described herein to generate alerts or take some other action, even without explicit knowledge that the unusual activity is associated with a violation of a particular policy.

Readers will appreciate that ransomware attacks are often deployed as part of a larger attack that may involve, for example:

Penetration of the network through means such as, for example, stolen credentials and remote access malware.

Stealing of credentials for critical system accounts, including subverting critical administrative accounts that control systems such as backup, Active Directory ('AD'), DNS, storage admin consoles, and/or other key systems.

Attacks on a backup administration console to turn off or modify backup jobs, change retention policies, or even provide a roadmap to where sensitive application data is stored.

Data theft attacks.

As a result of the many aspects that are part of a ransomware attack, embodiments of the present disclosure may be configured as follows:

The systems may include one or more components that detect malicious activity based on the behavior of a process.

The systems may include one or more components that store indicator of compromise ('IOC') or indicator of attack ('IOA') data for retrospective analysis.

The systems may include one or more components that detect and block fileless malware attacks.

The systems may include one or more components that remove malware automatically when detected.

The systems may include a cloud-based, SaaS-style, multitenant infrastructure.

The systems may include one or more components that identify changes made by malware and provide the recommended remediation steps or a rollback capability.

The systems may include one or more components that detect various application vulnerabilities and memory exploit techniques.

The systems may include one or more components that continue to collect suspicious event data even when a managed endpoint is outside of an organization's network.

The systems may include one or more components that perform static, on-demand malware detection scans of folders, drives, devices, or other entities.

The systems may include data loss prevention (DLP) functionality.

In some embodiments, the systems described herein may manage, analyze, or otherwise observe deployments that include deception technologies. Deception technologies allow for the use of decoys that may be generated based on scans of true network areas and data. Such decoys may be deployed as mock networks running on the same infrastructure as the real networks, but when an intruder attempts to enter the real network, they are directed to the false network and security is immediately notified. Such technologies may be useful for detecting and stopping various types of cyber threats such as, for example, Advanced Persistent Threats ('APTs'), malware, ransomware, credential dumping, lateral movement and malicious insiders. To continue to outsmart increasingly sophisticated attackers, these solutions may continuously deploy, support, refresh and respond to deception alerts.

In some embodiments, the systems described herein may manage, analyze, or otherwise observe deployments that include various authentication technologies, such as multi-factor authentication and role-based authentication. In fact, the authentication technologies may be included in the set of resources that are managed, analyzed, or otherwise observed as interactions with the authentication technologies may be monitored. Likewise, log files or other information retained by the authentication technologies may be gathered by one or more agents and used as input to the systems described herein.

In some embodiments, the systems described herein may be leveraged for the specific use case of detecting supply chain attacks. More specifically, the systems described herein may be used to monitor a deployment that includes software components, virtualized hardware components, and other components of an organization's supply chain such that interactions with an outside partner or provider with access to an organization's systems and data can be monitored. In such embodiments, supply chain attacks may be carried out in a manner such that patterns (e.g., specific interactions between internal and external systems) emerge, where the systems described herein may monitor for such patterns. Alternatively, supply chain attacks may involve behavior that deviates from normal behavior of a cloud deployment that is not experiencing a supply chain attack, such that the mere presence of unusual activity may trigger the systems described herein to generate alerts or take some other action, even without explicit knowledge that the unusual activity is associated with a supply chain attack.

In some embodiments, the systems described herein may be leveraged for other specific use cases such as, for example, detecting the presence of (or preventing infiltration from) cryptocurrency miners (e.g., bitcoin miners), token miners, hashing activity, non-fungible token activity, other viruses, other malware, and so on. As described in the present disclosure, the systems described herein may monitor for such threats using known patterns or by detecting unusual activity, such that the mere presence of unusual activity may trigger the systems described herein to generate alerts or take some other action, even without explicit knowledge that the unusual activity is associated with a particular type of threat, intrusion, vulnerability, and so on.

The systems described herein may also be leveraged for endpoint protection, such the systems described herein form all of or part of an endpoint protection platform. In such an embodiment, agents, sensors, or similar mechanisms may be deployed on or near managed endpoints such as computers, servers, virtualized hardware, internet of things ('IotT') devices, mobile devices, phones, tablets, watches, other personal digital devices, storage devices, thumb drives, secure data storage cards, or some other entity. In such an example, the endpoint protection platform may provide functionality such as:

Prevention and protection against security threats including malware that uses file-based and fileless exploits.

The ability to apply control (allow/block) to access of software, scripts, processes, microservices, and so on.

The ability to detect and prevent threats using behavioral analysis of device activity, application activity, user activity, and/or other data.

The ability for facilities to investigate incidents further and/or obtain guidance for remediation when exploits evade protection controls The ability to collect and report on inventory, configuration and policy management of the endpoints.

The ability to manage and report on operating system security control status for the monitored endpoints.

The ability to scan systems for vulnerabilities and report/manage the installation of security patches.

The ability to report on internet, network and/or application activity to derive additional indications of potentially malicious activity.

Example embodiments are described in which policy enforcement, threat detection, or some other function is carried out by the systems described herein by detecting unusual activity, such that the mere presence of unusual activity may trigger the systems described herein to generate alerts or take some other action, even without explicit knowledge that the unusual activity is associated with a particular type of threat, intrusion, vulnerability, and so on. Although these examples are largely described in terms of identifying unusual activity, in these examples the systems described herein may be configured to learn what constitutes 'normal activity'—where 'normal activity' is activity observed, modeled, or otherwise identified in the absence of a particular type of threat, intrusion, vulnerability, and so on. As such, detecting 'unusual activity' may alternatively be viewed as detecting a deviation from 'normal activity' such that 'unusual activity' does not need to be identified and sought out. Instead, deviations from 'normal activity' may be assumed to be 'unusual activity'.

Readers will appreciate that while specific examples of the functionality that the systems described herein can provide are included in the present disclosure, such examples are not to be interpreted as limitations as to the functionality that the systems described herein can provide. Other functionality may be provided by the systems described herein, all of which are within the scope of the present disclosure. For the purposes of illustration and not as a limitation, additional examples can include governance, risk, and compliance ('GRC'), threat detection and incident response, identity and access management, network and infrastructure security, data protection and privacy, identity and access management ('IAM'), and many others.

In order to provide the functionality described above, the systems described herein or the deployments that are monitored by such systems may implement a variety of techniques. For example, the systems described herein or the deployments that are monitored by such systems may tag data and logs to provide meaning or context, persistent monitoring techniques may be used to monitor a deployment at all times and in real time, custom alerts may be generated based on rules, tags, and/or known baselines from one or more polygraphs, and so on.

Although examples are described above where data may be collected from one or more agents, in some embodiments other methods and mechanisms for obtaining data may be utilized. For example, some embodiments may utilize agentless deployments where no agent (or similar mechanism) is deployed on one or more customer devices, deployed within a customer's cloud deployment, or deployed at another location that is external to the data platform. In such embodiments, the data platform may acquire data through one or more APIs such as the APIs that are available through various cloud services. For example, one or more APIs that enable a user to access data captured by Amazon CloudTrail may be utilized by the data platform to obtain data from a customer's cloud deployment without the use of an agent that is deployed on the customer's resources. In some embodiments, agents may be deployed as part of a data acquisition service or tool that does not utilize a customer's resources or environment. In some embodiments, agents (deployed on a customer's resources or elsewhere) and mechanisms in the data platform that can be used to obtain data from through one or more APIs such as the APIs that are available through various cloud services may be utilized. In some embodiments, one or more cloud services themselves may be configured to push data to some entity (deployed anywhere), which may or may not be an agent. In some embodiments, other data acquisition techniques may be utilized, including combinations and variations of the techniques described above, each of which is within the scope of the present disclosure.

Readers will appreciate that while specific examples of the cloud deployments that may be monitored, analyzed, or otherwise observed by the systems described herein have been provided, such examples are not to be interpreted as limitations as to the types of deployments that may be monitored, analyzed, or otherwise observed by the systems described herein. Other deployments may be monitored, analyzed, or otherwise observed by the systems described herein, all of which are within the scope of the present disclosure. For the purposes of illustration and not as a limitation, additional examples can include multi-cloud deployments, on-premises environments, hybrid cloud environments, sovereign cloud environments, heterogeneous environments, DevOps environments, DevSecOps environments, GitOps environments, quantum computing environments, data fabrics, composable applications, composable networks, decentralized applications, and many others.

Readers will appreciate that while specific examples of the types of data that may be collected, transformed, stored, and/or analyzed by the systems described herein have been provided, such examples are not to be interpreted as limitations as to the types of data that may be collected, transformed, stored, and/or analyzed by the systems described herein. Other types of data can include, for example, data collected from different tools (e.g., DevOps tools, DevSecOps, GitOps tools), different forms of network data (e.g., routing data, network translation data, message payload data, Wifi data, Bluetooth data, personal area networking data, payment device data, near field communication data, metadata describing interactions carried out over a network, and many others), data describing processes executing in a container, lambda, EC2 instance, virtual machine, or other execution environment, data associated with a virtualization platform (e.g., VMWare vSphere, VMware vCenter servers, vSphere plug-ins, etc.), data associated with a virtual machine monitor (e.g., hypervisors, ESXi hosts, etc.), information describing the execution environment itself, and many other types of data. In some embodiments, various backup images may also be collected, transformed, stored, and/or analyzed by the systems described herein for the purposes of identifying anomalies. Such backup images can include backup images of an entire cloud deployment, backup images of some subset of a cloud deployment, backup images of some other system or device(s), and so on. In such a way, backup images may serve as a separate data source that can be analyzed for detecting various anomalies.

As described above, data platforms described herein may be configured to perform various functions (e.g., graphing functions, analysis functions, policy making and implementation, etc.) to facilitate identification of security anomalies, vulnerabilities, compliance issues, and other security threats that may be found within compute environments that the data platforms are monitoring (e.g., cloud compute environments, on-premise compute environments, etc.). For example, as described above in relation to FIG. 1A, compute assets 16 of a cloud environment 14 (e.g., various assets or resources included within a cloud-based or other suitable compute environment) may provide data to data platform 12 that, once ingested by data ingestion resources 18 and stored in data store 30, may be analyzed and processed by data processing resources 20 to provide valuable insights to a user of computing device 24 (e.g., by way of user interface resources 22). Such data ingestion and processing may be performed using software agents executing in the compute environment and/or in other ways that do not rely on such agents (i.e., agentless configurations).

From a perspective of a client entity (e.g., a company, organization, individual, security team, stakeholder, etc.) that is invested in maintaining the security of the compute environment and that relies on (or otherwise utilizes) the data platform to do so, the effectiveness of the data platform at accurately and thoroughly identifying potential security threats, as well as doing so in a timely manner, is crucial. However, even if a perfectly effective and instantaneous process could be implemented to accurately identify and score every anomaly or potential threat, the success of such a process at securing the compute environment would still largely be determined by its effectiveness in communicating each identified issue in a manner that is understandable, actionable, and capable of successfully moving a user associated with the client entity to action when appropriate and without creating alert fatigue or complacency from too many false alarms.

Accordingly, having described various principles above related to how data platforms may effectively identify and bring attention to anomalies and other potential security issues (e.g., using polygraphs, custom policies, etc.), various aspects will now be described that relate to effective contextualization and communication of these security issues. In particular, the following description addresses how a data platform may determine and effectively communicate what a given security issue may entail (e.g., an attack narrative for a multifaceted security threat, etc.), and what severity or importance such an issue may pose (e.g., a minor issue in need of no special investigational attention, a more serious issue that should be monitored carefully, a full-blown attack requiring immediate investigational attention and/or mitigation/remedial action, etc.). Specifically, as will be described in detail below, methods and systems described herein provide modular detection policies that, in conjunction with graph partitioning algorithms (e.g., connected-components algorithms, community detection algorithms, and/or other algorithms described herein for partitioning polygraphs and/or other types of graphs described herein), allow for the assembling of comprehensive narratives of complex attacks and/or other types of security threats. Additionally, the following description addresses various user interface concepts to help effectively articulate and communicate potential threats, effectively facilitate exploration of potential issues, and other related topics. As will be made apparent, the modularity of these policies and algorithms may provide various significant advantages and benefits over more conventional (e.g., less modular) forms of security monitoring. For example, as will be demonstrated in the following description, modular detection policies may use detection logic that is more readily maintainable and that produces threat detection that is more readily interpretable.

As will be described in more detail below, systems and methods described herein may involve detecting different events that occur within a compute environment and identifying affiliations between such events based on known criteria and characteristics of predefined attack patterns referred to herein as multifaceted security threats. For example, various events detected to have occurred within the compute environment may be assessed, on their own, to be of relatively low importance (e.g., having an alert score of "info" or "low" or "medium," etc.). However, when such events are associated or correlated with one another based on known patterns of predefined multifaceted security threats, the events in the aggregate may be determined to be indicative of an attack much more serious than the low alert scores may suggest. In some examples, a few of the individual detected events may be assessed to be relatively high in importance (e.g., having an alert score of "high" or "critical"), yet even in these cases, the events on their own, while perhaps meriting some amount of special investigational attention, fail to fully tell the story of how serious an ongoing multifaceted security threat may actually be. Here again, when such events are combined and considered in aggregate with other relevant events that fit the pattern of some predefined multifaceted security threat, a more thorough and helpful rendering of an attack narrative (or other actionable insight) may be presented to more reliably help client entities to quickly understand and appropriately act in light of the security threats that may be underway.

While no process or system may be expected to be able to anticipate every novel form of attack that creative and motivated attackers may employ, various security entities (e.g., security experts with significant domain knowledge, machine learning processes and other artificial intelligence or automated processes, etc.) may accumulate a broad store of security issue knowledge based on attacks that have been observed in the past. By continually and systematically breaking down successful attacks, attempted attacks, and various other intentional and/or inadvertent security compromises, security entities may, over time, develop effective working models of what to monitor in a compute environment not only in terms of suspicious individual events but also in terms of suspicious groupings of events that may be performed by different entities, detected by different monitoring or detection services, and so forth. Based on this knowledge, a data platform may reliably generate alerts that reflect not only the importance of constituent events, but that also give accurate and actionable indications of how important composite groups of events (also referred to as composite events) may be, particularly when they appear to fit (e.g., perfectly fit, or, in the event that a novel iteration of a known attack technique is being employed, partially fit) predefined patterns that have been identified and encoded in representations of multifaceted security threats.

Because the security threats such data platforms are watching out for are defined ahead of time (at least to some extent, though, as mentioned, partial matches may also be monitored to help identify novel forms of known security issues), user interfaces may be presented to facilitate convenient exploration and assessment of potential threats. For example, a multifaceted security threat may be presented in a way that shows various evidence items in context, including, for example, one or more major evidence items that largely define the multifaceted security threat (e.g., one event or set of events that is highly correlated with a particular type of attack) and other more minor evidence items that further define the multifaceted security threat to a lesser extent (e.g., other events or sets of events that are also correlated, though less reliably, with known instances of the particular type of attack). For instance, a primary evidence item can be presented as having been observed in the compute environment, information explaining how likely a certain attack is based on the observation of this evidence item can be indicated, supporting evidence items can be presented as having been observed (or not yet observed, as the case may be), and so forth.

In some examples, affiliated events that are aggregated (e.g., stitched together) to form composite events (e.g., which may in turn serve as evidence items for particular multifaceted security threats) may also be enriched and/or tagged with additional domain knowledge that has been observed and learned from the monitoring of other compute environments in the face of similar events or security threats. In these ways, a client entity attempting to understand security issues occurring in the compute environment may not be merely presented with a long list of disparate events of differing alert levels to try to make sense of, but may be offered a more comprehensive presentation of a type of attack that may be underway, how likely it is to be occurring in some form (and what the evidence is for that), what can be done to remediate the attack, and other helpful information serving to make it easier to effectively secure the assets of the compute environment.

Along with advantages and benefits already mentioned for methods and systems described herein related to creating composite events and/or facilitating interactive analysis of multifaceted security threats within a compute environment, other advantages and benefits may also arise from principles described below. For example, by facilitating client entities in accurately and conveniently understanding detected events in context (e.g., as components of a potential multifaceted security threat, etc.), data platforms described herein may help these client entities to efficiently triage ongoing suspicious activities in the environment, to avoid alert fatigue, to expend mitigation and remediation resources effectively, to accurately identify and group events that are part of the same attack (even if initiated from different focal entities such as different machines, users, IP addresses, containers, etc.), to reduce investigation and remediation time with more context and actionable information, and to otherwise increase data protection and improve the experience and effectiveness of client entities. Moreover, in combination with highly versatile and robust anomaly detection and security threat identification techniques described above (e.g., monitoring techniques, graphing techniques, etc.), methods and systems described below for protecting against multifaceted security threats within compute environments may flexibly protect both against known and well-defined security threats as well as unknown (e.g., novel) security threats that bear some resemblance or common characteristics with the known threats.

Figure 5A:
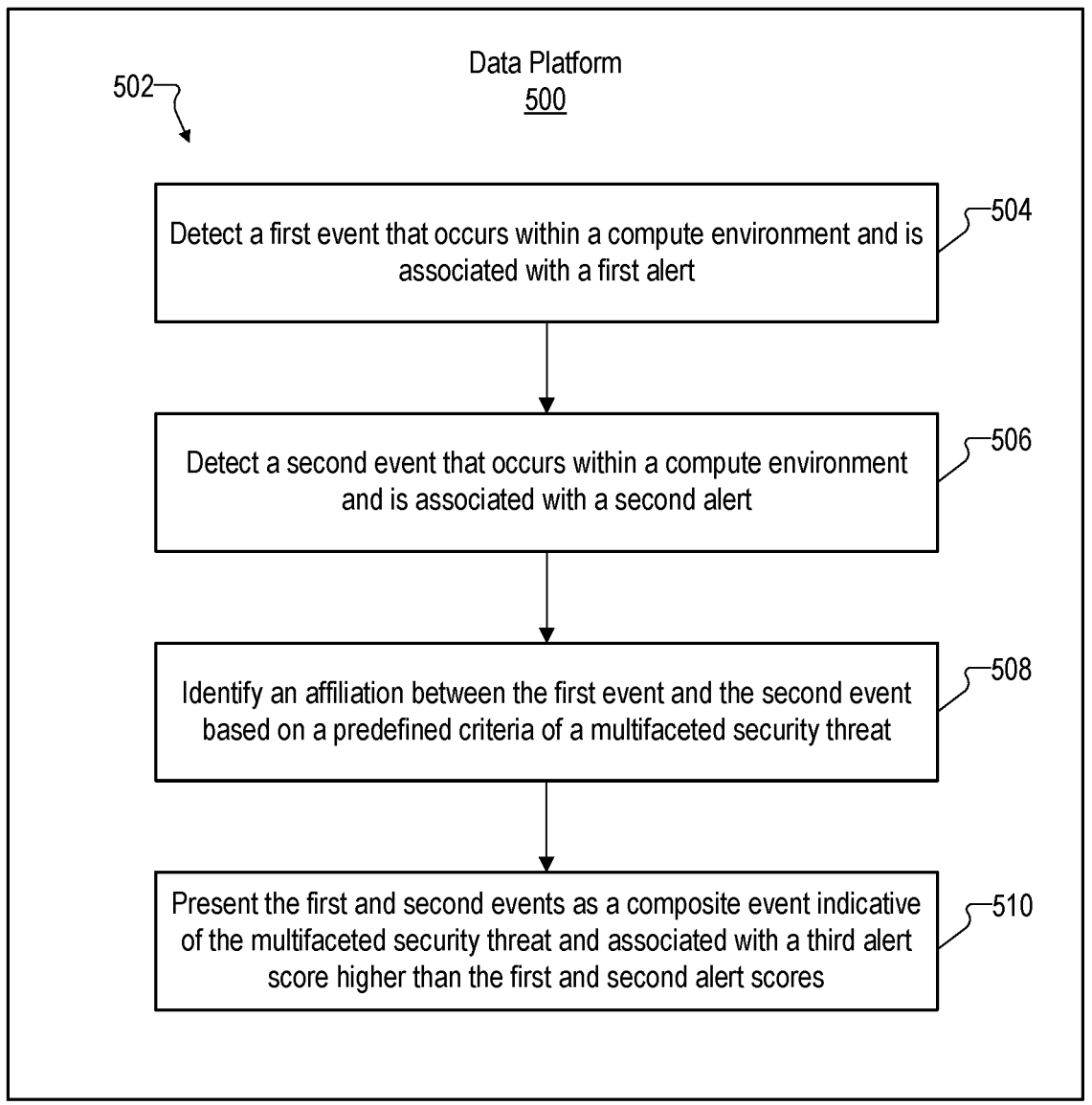
FIG. 5A illustrates an example data platform configured to perform an illustrative process for creating and presenting composite events indicative of multifaceted security threats within a compute environment monitored by the data platform.

FIG. 5A illustrates an example data platform 500 configured to perform an illustrative process 502 for creating and presenting composite events indicative of multifaceted security threats within a compute environment monitored by the data platform. As shown, process 502 may include a plurality of operations 504, 506, 508, and 510 each of which may be performed, in full or in part, by data platform 500. Data platform 500 may implement data platform 12 illustrated and described above, or any other data platform described herein.

While process 502 shows illustrative operations according to one implementation, other implementations may omit, add to, reorder, and/or modify any of the operations shown in process 502. In some examples, multiple operations shown in process 502 may be performed concurrently (e.g., in parallel) with one another, rather than being performed sequentially as illustrated and/or described. One or more of the operations shown in FIG. 5A may be performed by data processing resources (e.g., data processing resources 20 of data platform 12), user interface resources (e.g., user interface resources 22 of data platform 12), communication resources, and/or other suitable computing resources of data platform 500.

The operations of process 502 may be performed prior to, in parallel with, or subsequent to other operations described above to be performed by the data platform. For example, the operations of process 502 may be performed before, during, or after the data platform constructs a graph (e.g., a polygraph) with respect to data received from the agent and ingested in the ways described herein. Each of operations 504-510 of process 502 will now be described in more detail as the operations may be performed by computing resources of data platform 500 as data platform 500 monitors a compute environment.

At operation 504, data platform 500 (e.g., computing resources operating on the data platform) may detect a first event that occurs within the compute environment being monitored. The first event may be associated with a first alert score. For example, the first event, when assessed in isolation, may be determined to be of relatively low importance (e.g., having an alert score corresponding to low or medium importance, etc.). As a result of this assessment, the first event may not be likely to merit special investigational attention on its own. In other words, when brought to the attention of a client entity responsible for maintaining the security of the compute environment (e.g., in a long list with various other events having similar alert scores), the first event may not stand out as being particularly important or worthy of spending much (or any) time investigating.

Similarly, at operation 506, data platform 500 may detect a second event that occurs within the compute environment and that is associated with a second alert score. Like the first alert score, the second alert score may indicate that the second event, when assessed in isolation, may be considered to be of relatively low importance. For instance, the second alert score may be the same as the first alert score (e.g., an alert score corresponding to low or medium importance, etc.) or may be similarly indicative of an event that is not extremely important when considered by itself. However, even if the second alert score is higher than the first alert score (e.g., an alert score corresponding to high or critical importance, etc.), such that the second event is likely to receive more investigational attention than the first event, it may still be difficult for a client entity to fully understand the second event and/or to appreciate its gravity as long as it is only presented as an event occurring in isolation.

Accordingly, at operation 508, data platform 500 may identify an affiliation between the first event and the second event based on a predefined criteria of a multifaceted security threat. For example, the multifaceted security threat may have been observed in the past to be associated with a variety of particular events (or groups of events) and both the first and second events identified at operations 504 and 506 may be determined to be among those events that are known to be associated with the multifaceted security threat. In some examples, this affiliation identified at operation 508 may arise from the first and second events each representing different evidence items defined for the multifaceted security threat. In other examples, this affiliation may arise from the first and second events each being included in a known set of events that is indicative of a particular evidence item for the multifaceted security threat. Examples of multifaceted security threats and various evidence items (and/or other predefined criteria) indicating the likelihood that the multifaceted security threats being undertaken will be provided in more detail below.

While only two events (i.e., the first and second events) are explicitly described in this example (and in various other examples below) for sake of illustrative clarity, it will be understood that principles being described may apply to any suitable number of events that may all ultimately be assembled into a whole narrative of a complex attack using modular detection policies (and in conjunction with graph partitioning algorithms described herein. Including connected-entity algorithms, community detection algorithms, etc.). For example, in addition to the first and second events detected at operations 504 and 506, any number of additional events, each with their own individual alert scores, may also be similarly detected and ultimately merged together into one or more composite events that help form a comprehensive event narrative for the relevant multifaceted security threat.

At operation 510, data platform 500 may present the first and second events as a composite event indicative of the multifaceted security threat. For example, operation 510 may be performed based on the identifying at operation 508 of the affiliation between the first and second events. The presenting of the composite event may be performed by way of any suitable user interface technology described herein, including, as one example, the user interface described below in relation to FIG. 5B. To clearly indicate the importance of the composite event, as well as to contextualize the composite event in light of its association with the predefined multifaceted security threat, the composite event may be associated with a third alert score different from the first and second alert scores when presented at operation 510. For example, if the first and second alert scores were relatively low alert scores that would be unlikely to instigate special investigational attention for either of the first and/or second events on their own, the third alert score associated with the composite event presented at operation 510 may be a relatively high alert score that is more likely to instigate such investigational attention for the composite event (e.g., as part of an investigation into the possibility that the multifaceted security threat could be underway). As another example, the first and/or second alert scores could be relatively high alert scores that, individually, may appear more suspicious than they do when placed in context with the rest of a particular attack narrative. In this example then, the third alert score may be lower than the first and second alert scores. For instance, if a client application involves crawling the internet, individual events (e.g., a connection to a "knownBadIp", etc.) may appear more suspicious alone than when reinterpreted in their proper context as being part of a systematic scan of IP ranges by the client application (and therefore, are most likely not related to an attacker reaching out for command and control instructions or to download a payload).

Figure 5B:
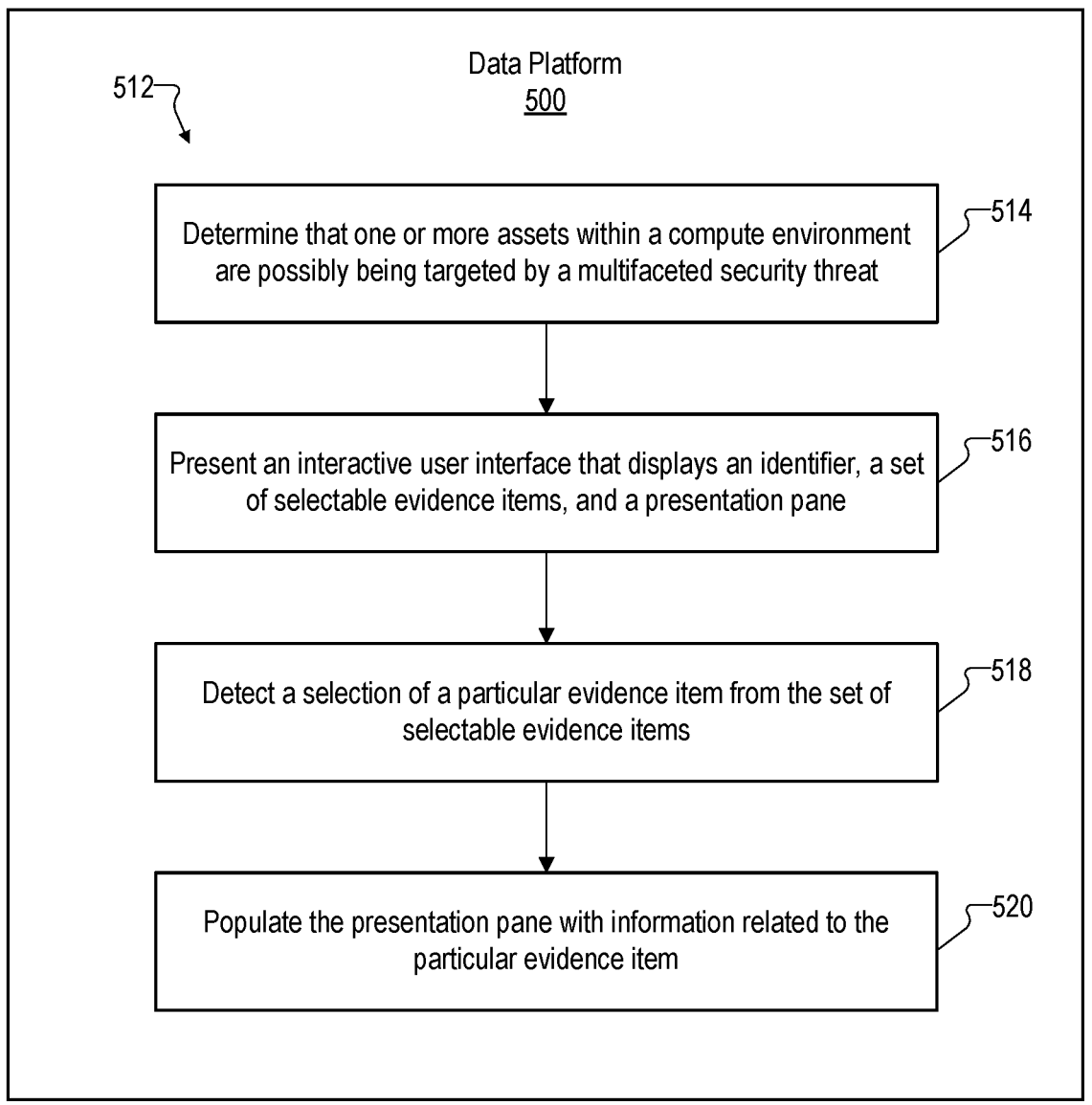
FIG. 5B illustrates an example data platform configured to perform an illustrative process for facilitating interactive analysis of multifaceted security threats within a compute environment monitored by the data platform.

FIG. 5B illustrates the same or another implementation of data platform 500 as it may perform an illustrative process 512 for facilitating interactive analysis of multifaceted security threats within a compute environment monitored by the data platform. Similar to process 502, process 512 is shown to include a plurality of operations 514, 516, 518, and 520, each of which may be performed, in full or in part, by data platform 500.

As with process 502, it will be understood that while process 512 shows illustrative operations according to one implementation, other implementations may omit, add to, reorder, and/or modify any of the operations shown in process 512. In some examples, multiple operations shown in process 512 may be performed concurrently (e.g., in parallel) with one another, rather than being performed sequentially as illustrated and/or described. One or more of the operations shown in FIG. 5B may be performed by data processing resources (e.g., data processing resources 20 of data platform 12), user interface resources (e.g., user interface resources 22 of data platform 12), communication resources, and/or other suitable computing resources of data platform 500.

The operations of process 512 may be performed prior to, in parallel with, or subsequent to other operations described above to be performed by the data platform. For example, the operations of process 512 may be performed before, during, after, or continuously with operations of process 502 or other operations being performed by data platform 500. Each of operations 514-520 of process 512 will now be described in more detail as the operations may be performed by computing resources of data platform 500 as data platform 500 monitors a compute environment.

At operation 514, data platform 500 (e.g., computing resources operating on the data platform) may determine that one or more assets or other resources within the compute environment (e.g., compute assets 16 of cloud environment 14 in FIG. 1A, etc.) are possibly being targeted by a multifaceted security threat. As used herein, an asset within a compute environment may be considered to be "possibly" targeted by a security threat (e.g., including a multifaceted security threat) when there is at least some evidence that the security threat may be underway with respect to the asset, even if that evidence is inconclusive and/or the asset is not, in fact, being so targeted. For instance, a multifaceted security threat that relates to a cryptomining attack may provide an instructive example. In this type of multifaceted security threat, an attacker may attempt to compromise certain compute assets (e.g., processors, memory and storage resources, etc.) to illicitly use those assets to conduct cryptocurrency mining operations. To accomplish this goal, it may be expected for compute assets in the compute environment to be used in certain anomalous ways including by downloading files from a remote source, establishing a remote connection (e.g., with a mining pool), and, eventually, obtaining and executing known files associated with cryptomining.

It may be the case that, if each of these criteria can be observed (each of which may involve multiple detectable events and may constitute a particular evidence item for the cryptomining multifaceted security threat), data platform 500 can positively determine that the compute assets are being targeted by the cryptomining multifaceted security threat. However, since it may be desirable to raise an alert prior to achieving this level of certainty, data platform 500 may be configured to perform operation 514 to determine that the assets are "possibly" being targeted by the multifaceted security threat when only some (but not all) of the aforementioned events are detected. For example, data platform 500 may determine that the assets are possibly being targeted by the cryptomining attack when it is detected that the assets have been used to establish a remote connection with a mining pool, even if known files or other such anomalies have not yet been detected in connection with this multifaceted security threat. It will be understood that, in certain examples, data platform 500 may determine that assets are possibly being targeted by a particular multifaceted security threat (e.g., based on one or more evidence items or other predefined criteria associated with the particular multifaceted security threat being observed) even when those assets are not in fact being so targeted (as may ultimately be determined upon further investigation or based on additional observed evidence).

At operation 516, data platform 500 may present an interactive user interface configured to facilitate the presentation of both the multifaceted security threat possibly targeting the assets of the compute environment and the evidence that has led to that determination at operation 514. For example, the interactive user interface presented at operation 516 may be configured to display any suitable information, including, without limitation: 1) an identifier indicative of the multifaceted security threat, 2) a set of selectable evidence items each associated with a different facet (e.g., criterion, etc.) of the multifaceted security threat and assessed based on the monitoring of the compute environment, and 3) a presentation pane for displaying information (e.g., including particular types of information described in more detail below). As will be described, this interactive user interface may be used by a human user (e.g., an administrator associated with a client entity with a stake in the security of the compute environment, etc.) or by an automated process or other entity (e.g., a bot, a script, an artificial intelligence, etc., associated with the client entity).

At operation 518, data platform 500 may detect a selection of a particular evidence item from the set of selectable evidence items. For example, a user entity presented with the interactive user interface (e.g., the human user, automated process, etc., using the interface) may select, from the set of selectable evidence items, a particular evidence item of interest to the user entity. In the cryptomining attack example described above, for instance, the set of selectable evidence items may include items such as described above (e.g., establishing the connection to the mining pool, accessing anomalous data, the data being detected to be recognized files associated with cryptomining, etc.), and a particular evidence item may be detected to have been selected for more investigation or exploration.

Accordingly, at operation 520, data platform 500 may populate, in response to the detecting of the selection at operation 518, the presentation pane with information related to the particular evidence item. For instance, if the selected evidence item relates to the established connection to the mining pool, the presentation pane may be populated at operation 520 to indicate more detail as to whether such a connection has been observed to be established and, if it has, what events were involved in this observation, what entity established the connection, when the connection was established, what the address of the mining pool is, and so forth. Additional examples of selectable evidence items for various multifaceted security threats, as well as content that may be populated in a presentation pane when such selectable evidence items are selected, will be described and illustrated below.

Figure 6:
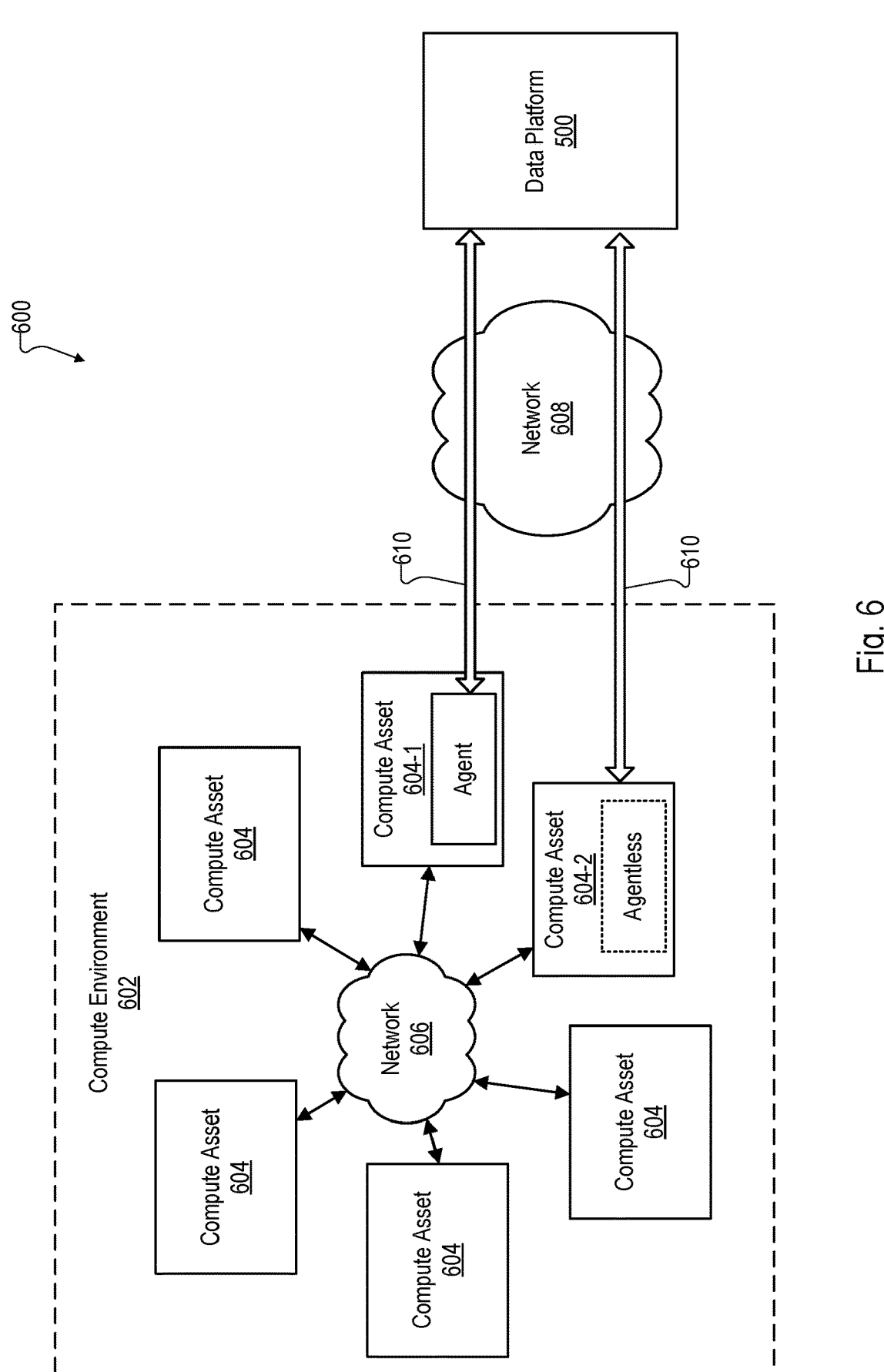
FIG. 6 illustrates an example configuration within which a data platform may perform processes described herein with respect to a compute environment monitored by the data platform.

FIG. 6 illustrates an example configuration 600 within which data platform 500 may perform processes described herein (e.g., processes 502 and 512, etc.) with respect to a compute environment 602 monitored by the data platform. More particularly, as shown, configuration 600 includes an implementation of data platform 500 that communicates with various compute assets 604 within compute environment 602. As shown, a particular compute asset 604, labeled compute asset 604-1, is shown to host an agent that is used to provide data monitored in relation to compute asset 604-1 to data platform 500. Meanwhile, another particular compute asset 604, labeled compute asset 604-2, is shown to provide data monitored in relation to compute asset 604-2 without reliance on such an agent (as indicated by the dotted box labeled "Agentless"). Though explicit communications are not shown for other compute assets 604, it will be understood that each of the other illustrated compute assets 604 may similarly communicate data to data platform 500 by way of an agent (as with compute asset 604-1) or in an agentless manner (as with compute asset 604-2) as may serve a particular implementation.

Compute assets 604 of configuration 600 are further shown to be in communication with other compute assets 604 in compute environment 602 by way of a network 606. Compute environment 602 may represent an implementation of cloud environment 14 of FIGS. 1A-1B (e.g., compute resources provided by a cloud service provider such as AWS, GCP, Azure, etc.) or any other cloud environment or other compute environment described herein or as may serve a particular implementation. As such, the compute assets 604 included within compute environment 602 may implement compute assets 16 of FIGS. 1A-1B (e.g., containers, container runtime environments, virtual machines, workloads, applications, processes, physical computing devices, compute nodes or clusters of nodes, etc.) or other suitable compute assets as may serve a particular implementation.

While network 606 is referred to as a network and may be implemented as such (e.g., similar or identical to a network 608 that is used to transport communications 610 between compute assets 604 and data platform 500, as described below), it will be understood that different types of compute assets 604 may intercommunicate via a variety of different means and media, some of which may not typically be referred to or thought of networks. In any case, network 606 will be understood to represent any hardware, software, interfacing, or other aspects of a communicative fabric by way of which various compute assets 604 within compute environment 602 communicate with one another.

As further shown in FIG. 6 (and as mentioned above), a network 608 may provide a communicative medium by way of which agents and/or agentless compute assets 604 may exchange (e.g., provide to and/or receive from) various communications 610 with data platform 500. For example, network 608 may be implemented by any suitable private or public networks (e.g., the Internet, a wide area network (WAN), a local area network (LAN), a provider-specific communications network such as a cellular carrier network operated by a mobile carrier entity, etc.) and may use any communication technologies, devices, media, protocols, or the like, as may serve a particular implementation. Communications 610 exchanged between data platform 500 and compute assets 604 may be used to ingest data representative of events that may be aggregated, tagged, and/or otherwise processed to create and present composite events indicative of multifaceted security threats and/or to promote interactive analysis of multifaceted security threats within compute environment 602.

Figure 7:
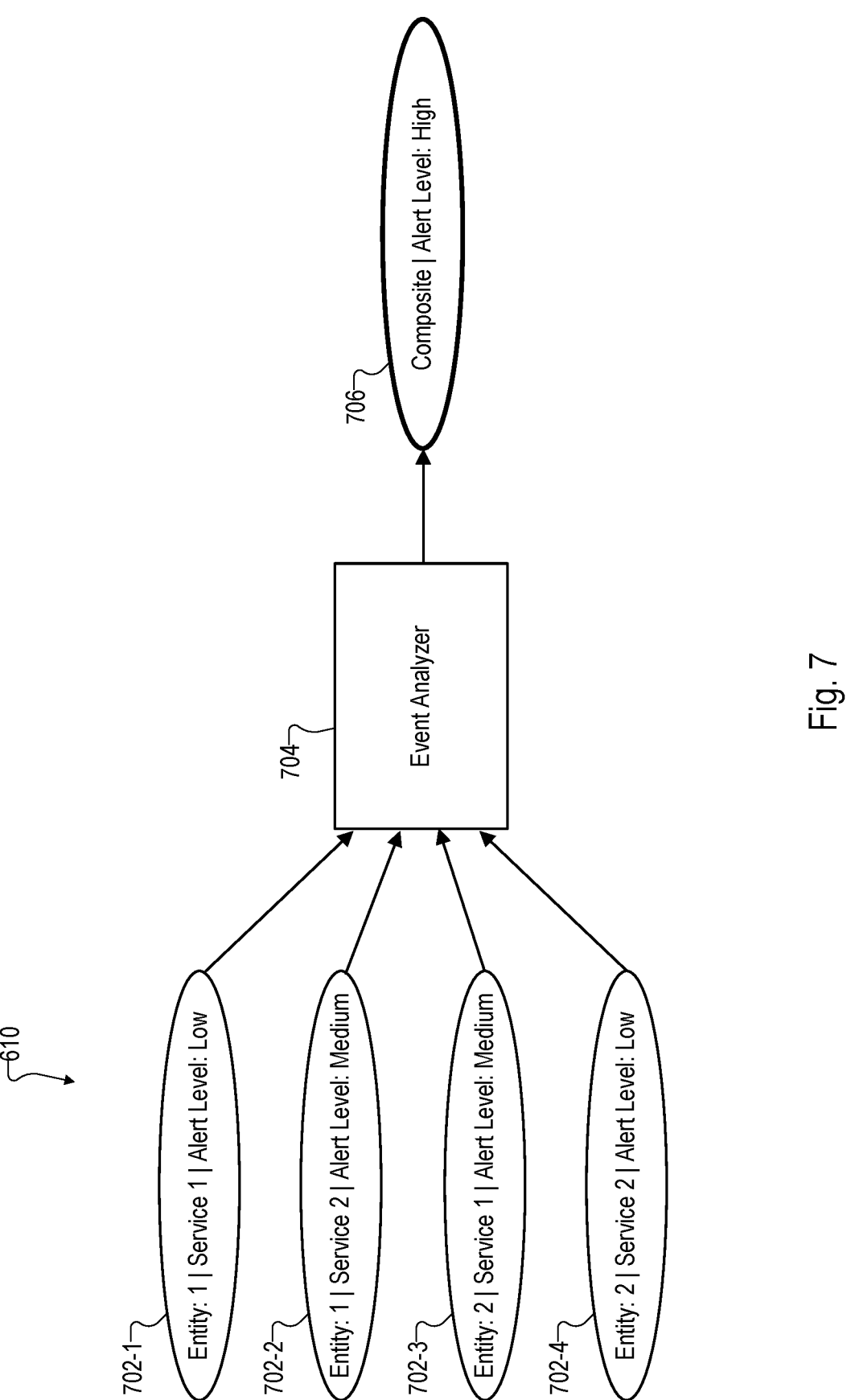
FIG. 7 illustrates example aspects of how an illustrative composite event may be created based on various events detected to occur within a compute environment.

FIG. 7 illustrates example aspects of how an illustrative composite event may be created based on various events detected to occur within a compute environment. More particularly, certain communications 610 from one or more compute assets 604 of compute environment 602 are shown in FIG. 7 to include information about certain events 702 (e.g., events 702-1 through 702-4) that have been detected within compute environment 602. As shown, these events 702 may be processed by an event analyzer 704 (e.g., implemented by or within data platform 500) to generate a composite event 706 that may be presented and/or otherwise used by data platform 500 instead of (or together with) the constituent events 702 that form composite event 706. Each of the elements of FIG. 7 will now be described in more detail.

Each of events 702 may represent different events detected (e.g., by data platform 500) to have occurred in a particular compute environment (e.g., compute environment 602). Specifically, as shown, events 702 may be received by data platform 500 by way of communications 610 from agents hosted within compute assets 604 in the compute environment or from agentless compute assets 604 that provide the data in other ways.

As described above, different monitoring services or detection services operating within data platform 500 may be employed to analyze all the data (e.g., communications 610) that is being ingested from the compute environment. For example, graph-based modeling (GBM)-based services, timeseries modeling services, custom policies implemented using a query language, vulnerability services, threat intelligence services, and/or other such detection services may all be utilized by certain implementations of data platform 500 to accurately detect and identify different types of events occurring with respect to different types of assets in different types of compute environments. In some examples, some or all of the events 702 that are communicated, analyzed, and ultimately aggregated to form composite event 706 may be detected by the same one of these detection services. In other examples, however, different events 702 detected by way of different detection services may be aggregated to form composite event 706 as may serve a particular implementation. More particularly, referring to the first and second events described in relation to process 502, the detecting (at operation 504) of the first event may be performed by a first detection service operated by data platform 500, while the detecting (at operation 506) of the second event may be performed by a second detection service that is also operated by data platform 500 but that is distinct from the first detection service. For example, the first detection service used to detect the first event could be a GBM-based service, while the second detection service used to detect the second event could be based on custom policies.

To illustrate how the detection of different events 702 may be performed by different detection services, FIG. 7 shows that each of events 702 is associated with a particular service (labeled "Service 1" or "Service 2" in this example). Specifically, as shown, the detection of events 702-1 and 702-3 may be performed (e.g., by event analyzer 704 or another component of data platform 500) using the detection service represented by "Service 1," while the detection of events 702-2 and 702-4 may performed using the detection service represented by "Service 2."

Another characteristic noted for each of events 702 in FIG. 7 relates to the entities that initiates the event. For example, different types of entities may be detected as having initiated the different events 702, including entities such as, without limitation: a user identity (e.g., a particular human or automated user, as indicated by an IAMUser function or the like), a host machine (e.g., a particular server or other computing device), an address identity (e.g., a particular IP address or other type of address from which an event may originate), a container, a process, or a file. In some examples, some or all of the events 702 that are communicated, analyzed, and ultimately aggregated to form composite event 706 may originate from or otherwise be associated with a same entity (e.g., a particular IP address, a particular user, etc.) or same entity type. In other examples, however, different events 702 originating from different entities (including from different types of entities) may be aggregated to form composite event 706. More particularly, referring again to the first and second events described in relation to process 502, the first event may be initiated within compute environment 602 by a first entity (e.g., a particular IP address, etc.), while the second event may be initiated within compute environment 602 by a second entity distinct from the first entity (e.g., a particular container, etc.). Accordingly, the identifying (at operation 508) of the affiliation between the first event and the second event may be based on an additional affiliation detected between the first entity and the second entity. For example, as will be described in more detail below, the affiliation between entities may include that one entity created the other (e.g., one user setting up an account for another user), one entity is operating using resources of the other (e.g., a container executing using resources of a host machine), or other such affiliations.

To illustrate how different events 702 may be initiated by different entities, FIG. 7 shows that each of events 702 is associated with a particular entity (labeled "Entity 1" or "Entity 2" in this example). Specifically, as shown, events 702-1 and 702-2 are shown to be initiated by the entity represented as "Entity 1," while events 702-3 and 702-4 are shown to be initiated by the entity represented as "Entity 2." It will be understood that Entities 1 and 2 may represent different entities of the same type (e.g., different IP addresses, etc.) or different entities of different types (e.g., an address identity and a user identity). More particularly, for instance, this first entity ("Entity 1") and the second entity ("Entity 2") may be implemented by different types of entities selected from: a user identity, a host machine, an address identity, a container, a process, or a file.

As has been mentioned, detected events within a compute environment, such as events 702, may be associated with their own respective alert levels indicative of how important the events are assessed to be in isolation (e.g., as opposed to in aggregation with other events that may be known to be affiliated under the umbrella of a certain multifaceted security threat pattern). For example, alert levels in a particular scoring scheme may represent various levels of importance or severity including, as one example, an information level ("Info"), a low importance level ("Low"), a medium importance level ("Medium"), a high importance level ("High"), and a critical importance level ("Critical"). Ordinarily, events scored in accordance with this type of scheme may only receive special investigational attention from an administrator or other user if the alert level is ranked as, perhaps, "High" or "Critical." This is the case because, due to a vast number of events continually occurring in any typical compute environment, it may be impractical or functionally impossible for any individual or team to carefully investigate and look into each event that occurs. As a result, most "Info," "Low," and even "Medium" scored events may generally be ignored while special investigational attention will only be given to those events ranked "High" or "Critical."

In some examples, some or all of the events 702 that are communicated, analyzed, and ultimately aggregated to form composite event 706 may be scored with alert levels that would be likely to receive at least some special investigation based solely on their own importance. For example, one or more of events 702 may have an alert level of "High" or "Critical," such that, even if it were not aggregated together with other events, it would likely be investigated further. In other examples, however, each of the alert scores of events 702 may be low or medium alert scores (e.g., "Info," "Low," or "Medium" in the example scheme described above) that fall below a risk threshold configured to indicate which events ought to be given special investigational attention. For example, as shown in FIG. 7, each of events 702 is associated with a particular alert level (labeled "Alert Level: Low" or "Alert Level: Medium" in this example) that will be understood to fall below a risk threshold that would make it likely for the event to receive special investigational attention. Specifically, as shown, events 702-1 and 702-4 are shown to be associated with low alert scores ("Alert Level: Low"), while events 702-2 and 702-3 are shown to be associated with medium alert scores ("Alert Level: Medium").

Event analyzer 704 may be implemented by data platform 500 and may receive and analyze events 702 (which may all be understood to be affiliated with one another based on criteria of one or more multifaceted security threats), as well as various other non-affiliated events (not explicitly shown in FIG. 7). For example, event analyzer 704 may buffer events from all detection services and entities over a particular period of time (e.g., a 2-day sliding window, etc.) so that each event may be analyzed with respect to the others to determine whether relevant relationships and affiliations exist based on criteria of known multifaceted security threats.

Figure 8:
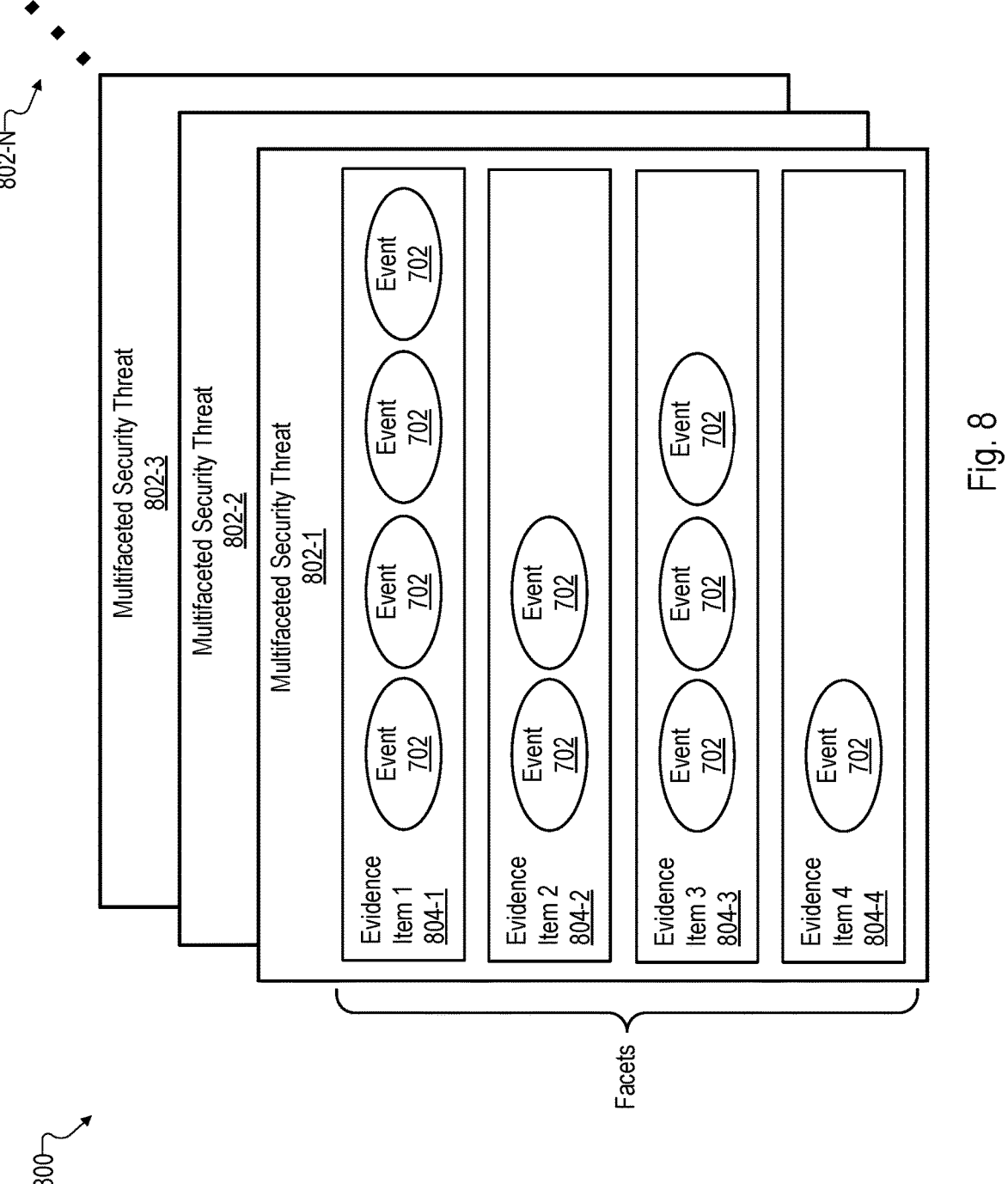
FIG. 8 illustrates an example set of multifaceted security threats that each include predefined criteria defining various known facets of the multifaceted security threat.

To illustrate, FIG. 8 shows an example set 800 of multifaceted security threats 802 (also referred to as a library or corpus of known multifaceted security threats) that each include predefined criteria defining various known facets of the multifaceted security threat. As shown in FIG. 8, the set 800 of multifaceted security threats 802 includes N different multifaceted security threats 802-1 through 802-N that is each shown to include (or to be defined by or associated with) various criteria labeled as "Facets" of the multifaceted security threat.

Taking multifaceted security threat 802-1 as an example, each of the criteria or facets defined for this particular multifaceted security threat is implemented as a particular evidence item 804 (e.g., evidence items 804-1 through 804-4). The evidence items 804 in this set of evidence items will be understood to constitute predefined criteria of multifaceted security threat 802-1. Each of these evidence items 804 is shown to include one or more events 702. For example, evidence item 804-4 in shown to include just one particular event 702, signifying that if such an event is detected to occur in the compute environment, evidence item 804-4 would contribute to showing that assets of the compute environment are possibly being targeted by multifaceted security threat 802-1. As another example, evidence item 804-1 is shown to include four particular events 702, signifying that if a particular composite event (e.g., a composite event 706 with these four events 702 as the constituent events) is detected to occur in the compute environment, evidence item 804-1 would contribute to showing that assets of the compute environment are possibly being targeted by multifaceted security threat 802-1. While each evidence item 804 does not need to be observed for it to be possible that multifaceted security threat 802-1 is possibly targeting assets of the compute environment, each evidence item 804 that is observed may increase the likelihood that the threat is real and may accordingly serve to raise the alert levels of each of the events and/or composite events associated with the multifaceted security threat.

Constructing and maintaining a comprehensive, accurate, and up-to-date set 800 of multifaceted security threats may be performed in any suitable way, and may require data platform 500 to continually observe, analyze, test, and update the dataset using the expertise of policy experts, the power of machine learning processes, and/or other information and technologies that may help create and maintain an effective database of known multifaceted security threats. For example, policy experts with a broad understanding of various attack techniques may be well-positioned to define various multifaceted security threats and to list the types of evidence items or other criteria that would be expected for those types of threat. For example, such policy experts may be able to at least make a good "first draft" of the types of attacks that should be watched for, the evidence expected to be seen for each type of attack, and the specific events that would be indicative of these evidence items. Machine learning then may be useful for refining the library and imposing weighting parameters to the various evidence items and/or individual events to reflect how predictive each of these elements is for determining when compute assets are actually under attack by a particular multifaceted security threat. Machine learning technologies may also be useful for identifying and creating multifaceted security threat definitions for novel attack patterns with which policy experts may not yet be familiar, as well as for discovering ways that attackers may attempt to circumvent security measures by altering certain events or combinations of events to elude detection while attempting to achieve the same ends. A balance of human oversight and automation (e.g., based on machine learning or other automated technologies) may thus be highly effective in building and maintaining a library of multifaceted security threats such as set 800 of multifaceted security threats 802.

In some implementations, data platform 500 may maintain a suite of regression tests configured to evaluate an effectiveness of data platform 500 with regard to assessing a risk of multifaceted security threats being attempted. For example, as changes are made to the definition of each multifaceted security threat 802 (e.g., day to day modifications and tweaks based on new observations, by humans or automated processes, of how attacks are being attempted and accomplished), the suite of regression tests may be configured to help make sure that the changes only improve the dataset (e.g., set 800 of multifaceted security threats 802) and do not make the compute environment more vulnerable in any regard ("breaking" something that used to work, "breaking" something for one client entity in service of a different client entity, etc.). To this end, data platform 500 may periodically (e.g., each night, once a week, etc., depending on how dynamic the changes to the dataset are) execute the suite of regression tests. For example, this may occur throughout a development period in which the predefined criteria of the multifaceted security threat are under development (e.g., as long as the library of multifaceted security threats 802 is being adjusted and modified).

Defining multifaceted security threats 802 and their respective evidence items and constituent events may be a continuing process that may be specific to certain industries, compute environments, client entity preferences, and other factors. Noting the varied and dynamic nature of this challenge of defining a corpus of multifaceted security threats, a few examples of multifaceted security threats will now be provided for the purpose of illustrating certain types of attacks that may be secured against using principles described herein.

As a first example (also mentioned above), one multifaceted security threat 802 may relate to cryptomining attacks. Evidence items 804 for such a threat could relate to identifying anomalous user activity, detecting that files are downloaded from remote sources, determining that a remote connection to a mining pool has been established, discovering a known cryptomining file being stored or used by a compute asset, and so forth. Additional attempts to compromise compute assets or gain further access (e.g., gaining illicit access to cloud-provider credentials, spinning up new and high-cost instances of certain processes with GPU resources attached, API calls from users or IP addresses that are associated with other anomalous logins or suspicious behaviors, etc.) may constitute additional evidence items in this example.

Another example multifaceted security threat 802 may relate to compromised keys or user identities. Evidence items 804 that would tend to show this type of threat may include, for example, an anomalous login (since the attacker may be unlikely to log in from the same set of locations or set of IP addressess as a typical user), anomalous API calls that look like "discovery" activity (since certain APIs are known to be used by attackers to discover how much access they have and how they can exploit it, seeing lots of these "discovery" calls may be revealing particularly if they are to different services/regions or made by different users), and so forth. The anomalous login may be identified based on the login being from a new IP address or new geolocation, the login being from a known bad IP address, or the like, and the anomalous API calls may call sensitive or rare APIs or may spike at a certain time.

Another example multifaceted security threat 802 may relate to malware beaconing, in which malware installed on multiple machines may, over the course of numerous events, reach out to other hosts to seek opportunities for lateral movement within the compute environment. Several distinct models (e.g., detection services) may produce information about the various events involved in this type of attack, and few if any of these events may rise to a severity level above the threat threshold that would cause a user to give investigational attention to these events. Accordingly, evidence items 804 may include known malware files being detected, attempts at lateral movement detected by different models or services, and so forth.

In some examples, one multifaceted security threat 802 may build on another (e.g., by incorporating some or all of the same evidence items along with others). For example, if keys have been determined to have been compromised in accordance with the multifaceted security threat described above, an additional example multifaceted security threat 802 may relate to defense evasion in which the attacker, having compromised the keys already, initiates (e.g., generates, instigates, causes, etc.) additional events to attempt to evade detection. Additional evidence items in this case may relate to attempts to disable certain security or monitoring services (e.g., using the keys that have been compromised).

Yet another example multifaceted security threat 802 may relate to a cloud ransomware attack. As with the defense evasion example described above, this cloud ransomware threat may also include the same evidence items as the multifaceted security threat associated with compromised keys, along with additional evidence items specifically indicative of a ransomware attack. For example, an attempt to encrypt data will retaining the encryption key may constitute one evidence item 804. Various events 702 may serve as steps to accomplishing this and may thus be associated with this evidence item 804: 1) creating an externally managed encryption key, 2) uploading the data for that key, 3) encrypting the data with that key, and 4) deleting that key from the cloud provider. Other evidence items 804 indicative of a cloud ransomware multifaceted security threat 802 could include, for instance, a cloud storage object discovery, a cloud account discovery, a cloud infrastructure discovery, data encrypted for impact, new externally managed keys being created and deleted, and so forth.

As has been mentioned, certain multifaceted security threats, even when validly detected, may ultimately turn out to be benign (i.e., the compute assets in question may not actually be targeted by an attack). For example, another example multifaceted security threat 802 may relate to webcrawling activity being detected, which may be suspicious for certain types of client entities and not at all suspicious for others (e.g., search engines). Evidence items 804 for a webcrawling multifaceted security threat could include detecting conditions such as, for instance: 1) a high count of new IP addresses, 2) a high diversity of new IP addresses by location, 3) a high diversity of new IP addresses by block ownership, 4) a high diversity of new IP addresses, 5) a low proportion of known bad IP addresses, 6) a low proportion of outbound connections, and so forth.

Returning to FIG. 7, event analyzer 704 may analyze each of the incoming events 702 against various evidence items 804 and/or other criteria of the multifaceted security threats 802 in the library of set 800 to determine if any of the events 702 are affiliated with one another. For example, multiple events 702 could be determined to both relate to a same evidence item 804 or to even constitute evidence items or other criteria for a particular multifaceted security threat 802 themselves. When such affiliations can be identified, event analyzer 704 may combine multiple events 702 to create a composite event such as composite event 706. In this way, certain events that may not be suspicious enough on their own to merit special investigational attention may be elevated due to their existence with other affiliated events that tend to show a likelihood of a particular multifaceted security threat.

For example, referring again to the multifaceted security threat described above to relate to potentially compromised keys, it may be discovered that certain events or evidence items occur too often to assign a high alert score for each occurrence. For example, an anomalous login may be determined to occur 60% of the time (e.g., in 60% of customer databases within a particular compute environment), calls to "discovery-sensitive" APIs may occur 40% of the time, and suspicious calls to various distinct APIs (e.g., from new services or across regions) may occur 5% of the time. By themselves, any of these events (or groups of events) may occur too often for it to be practical for a user to investigate each instance. For example, attempting to do so may result in alert fatigue and, over time, cause the user to become desensitized and complacent when receiving alerts of these kinds. However, if the convergence of these three events only happens 1% of the time, it may be desirable and practical for the user to further investigate each such instance. Accordingly, a composite event 706 that incorporates various events 702 that are assigned relatively low alert levels may be associated with a higher alert level to encourage the client entity to dedicate investigational attention to it. For example, as shown in FIG. 7, while each of events 702 include alert levels of "Low" or "Medium," the alert level of composite event 706 is shown to be a high or critical alert score (shown to be "High" in this example) that satisfies the risk threshold and will lead to composite event 706 getting the investigational attention it merits.

The scoring of each individual event 702 and composite event 706 may be performed in any suitable way. For example, as mentioned above, the discovery of multiple events associated with criteria of a multifaceted security threat may merit a weightier score for each of the events and/or for a composite event (e.g., evidence item) created based on the event. Additionally or alternatively, scoring may be performed holistically based on various factors to provide a high signal-to-noise ratio and to allow various weak signals (i.e., less important events) to be synthesized into stronger signals (i.e., more important composite events). For example, factors accounted for may include how frequently a particular entity performs events in a given compute environment, how frequently a pair (or larger set) of entities interact within one another in the compute environment, how frequently an entity or set of entities initiates new or anomalous types of activities, and so forth.

Figure 9A:
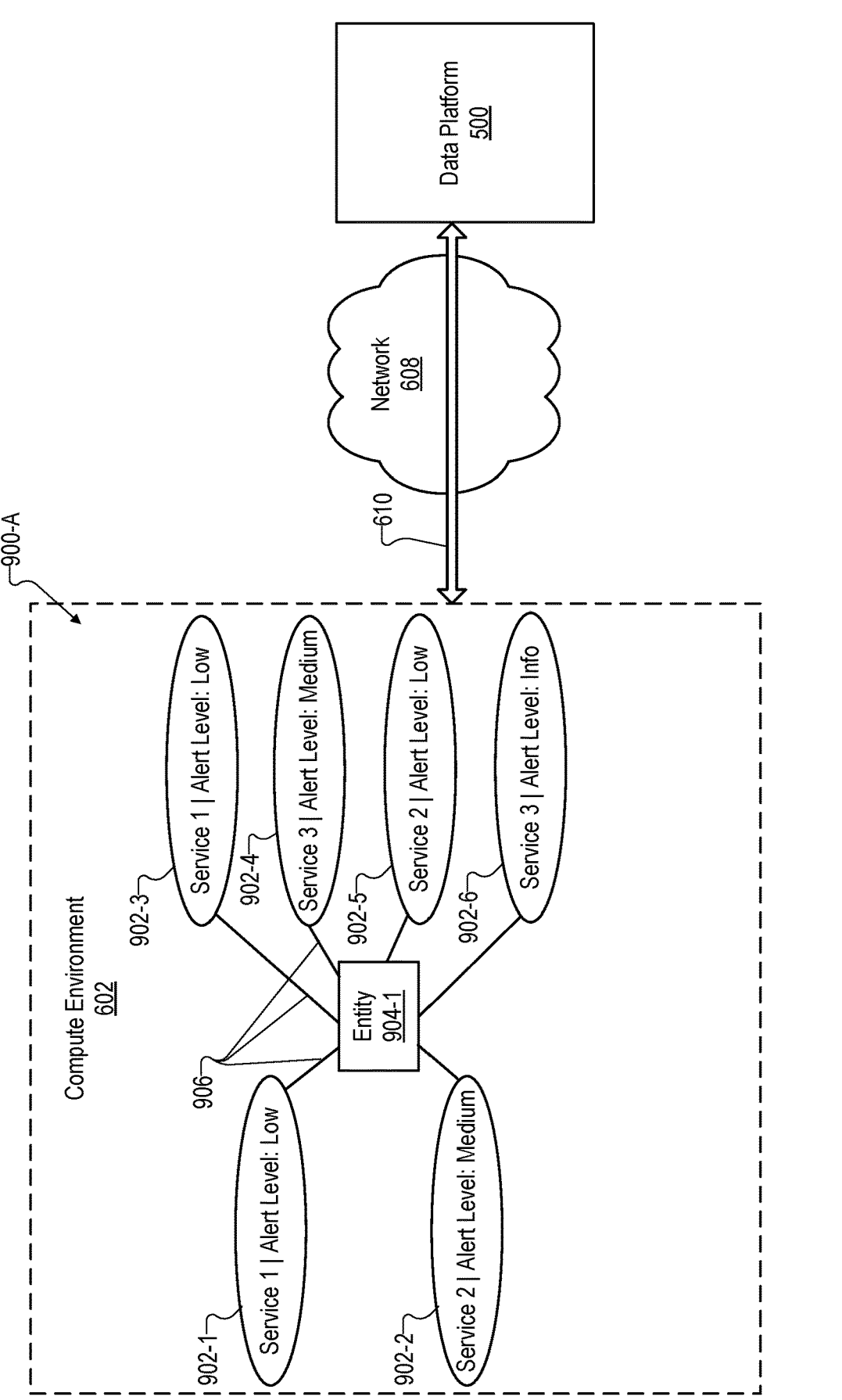
FIG. 9A illustrates a first example mapping of events that a data platform may detect within a compute environment.
Figure 9B:
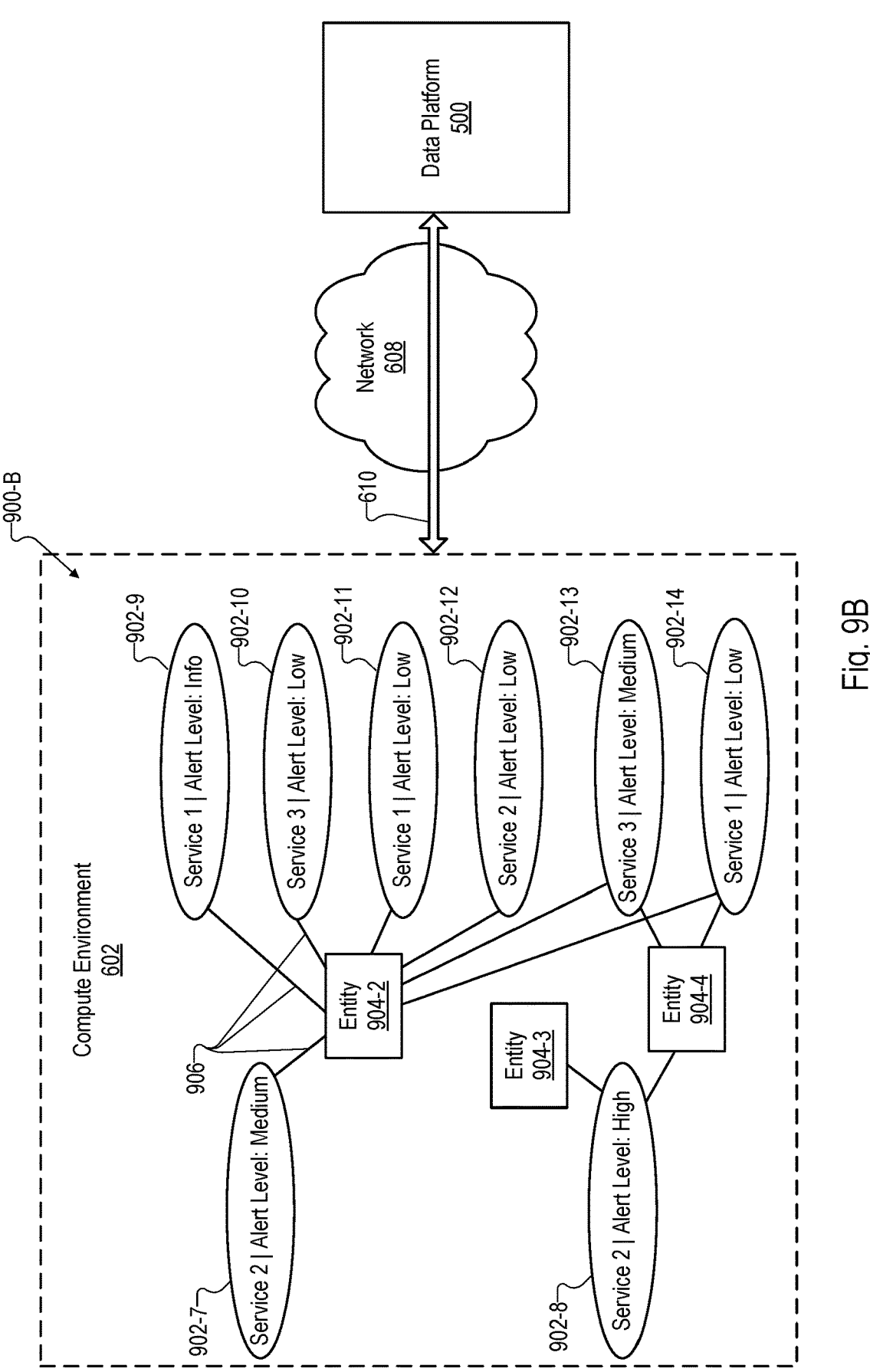
FIG. 9B illustrates a second example mapping of events that a data platform may detect within a compute environment.
Figure 9C:
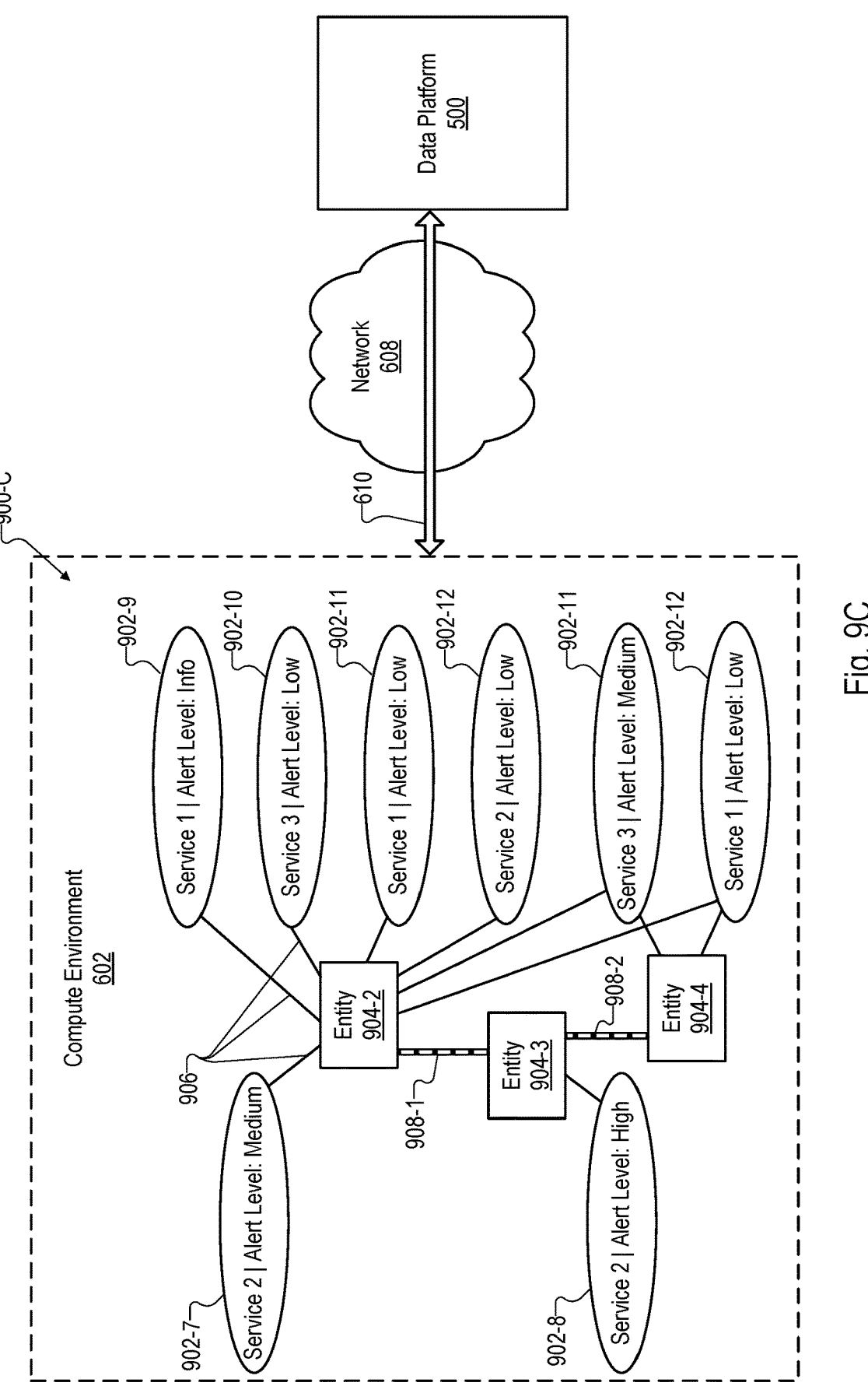
FIG. 9C illustrates a third example mapping of events that a data platform may detect within a compute environment.

FIGS. 9A-9C illustrate different example mappings of events that a data platform such as data platform 500 may detect within a compute environment such as compute environment 602. As shown, each of FIGS. 9A-9C show data platform 500, compute environment 602, network 608, and communications 610 representing communications between compute assets in the compute environment 602 and the data platform 500. While compute assets 604 and network 606 are not explicitly shown in the view of FIG. 9A-9C, it will be understood that various events 902 (e.g., events 902-1 through 902-6 in FIG. 9A and events 902-7 through 902-14 in FIGS. 9B-9C) initiated by various entities 904 (e.g., entity 904-1 in FIG. 9A and entities 904-2 through 904-4 in FIGS. 9B-9C) may be communicated in the ways described above in relation to FIG. 6. Specifically, as described above, events 902 may be reported to data platform 500 from compute assets 604 by way of communications 610 over networks 606-608 (e.g., using agent-based or agentless methods). Each of events 902 may have the same types of characteristics as described above for events 702 and/or any other events described herein. For example, as shown, each event 902 may indicate a particular detection service (e.g., "Service 1," "Service 2," or "Service 3" in this example) that data platform 500 may use to detect the event, as well as an alert level (e.g., "Alert Level: Info," "Alert Level: Low," "Alert Level: Medium," or "Alert Level: High" in this example) indicative of the importance of the event 902 standing alone. The one or more entities 904 (e.g., entities 904-1 through 904-4 in this example) that have initiated each event 902 are shown to be indicated in a graph format in FIGS. 9A-9C using edges 906 connecting the respective events 902 to their entities 904.

Examining each of these figures now in more detail, FIG. 9A is shown to include a first example mapping 900-A of events that data platform 500 may detect within compute environment 602. Mapping 900-A specifically illustrates how various events 902 that are initiated by a common entity 904 (i.e., events 902-1 through 902-6 initiated by entity 904-1 in this example), that may take place over the course of a relatively long period of time (e.g., many hours or several days in some examples), and that are all scored with relatively low importance (i.e., alert level "Low" to "Medium" in this example) may be considered in aggregate so as to help reveal a larger attack narrative that shows how these seemingly low-impact events may pose real risk. For example, the events 902 shown in FIG. 9A may constitute events associated with any of multifaceted security threats 802 and/or evidence items 804 described above, and, as such, may merit more investigational attention than their individual alert scores may suggest. Mapping 900-A shows how beneficial a multi-service analysis may be for multifaceted security threats that involve events that are only detectable by way of different techniques or approaches (e.g., by disparate detection services such as graph-based models, timeseries models, custom policies, vulnerability services, and/or other detection services described herein).

Even if a client entity trying to secure compute environment 602 was aware that a particular multifaceted security threat might be underway and was actively looking for it, identifying the relevant attack evidence by tracing through a large number of events (e.g., hundreds or thousands of events, most of which are not shown to be among events 902) that occur over the course of multiple hours or days and that are identified using different detection services could be extremely difficult and time consuming. Accordingly, mapping 900-A shows how systems and methods described herein may be highly beneficial to users by automatically aggregating affiliated events from multiple detection services (referred to herein as multi-service events) to form composite events indicative of multifaceted security threats within the compute environment.

FIG. 9B is shown to include a second example mapping 900-B of events that data platform 500 may detect within compute environment 602. Mapping 900-B specifically illustrates how various events 902 that are initiated by multiple entities 904 (i.e., events 902-7 through 902-14 initiated by entities 904-2 through 904-4 in this example) and that may take place over the course of a relatively long period of time (e.g., hours or days, etc.) may be considered in aggregate so as to help reveal an attack narrative demonstrative of a more accurate risk assessment of all events in light of known multifaceted security threat patterns (similar to the attack narrative described above in relation to FIG. 9A). In this example, many of the events 902 are shown to be of relatively low importance (e.g., with alert levels "Low" or "Medium") so as to be likely to fall below a risk threshold that would determine which events merit special investigational attention. At the same time, however, FIG. 9B shows that at least one event in this example (event 902-8) may be scored higher (e.g., with an alert level "High") so as to rise above to that illustrative risk threshold. Regardless, even if an administrator looked into event 902-8 on its own, FIG. 9B illustrates how complex it could be for the administrator to see the entire picture of how this one event 902 relates to other events in the context of a known attack. Accordingly, mapping 900-B shows how beneficial a multi-service and multi-entity analysis may be for multifaceted security threats that involve events detectable by different detection services and initiated by different (or multiple) entities.

In the examples of both FIGS. 9A and 9B, mappings 900-A and 900-B are shown to be bipartite graphs in which each entity is associated (by edges 906) with one or more events 902 but in which no entity is associated with another entity. While there may be certain reasons that graphs (e.g., polygraphs, etc.) herein generally incorporate this bipartite characteristic, multiple entities controlled by one party may be used in certain types of attacks to avoid scrutiny or attempt to evade security measures. Accordingly, additional edges that associate entities with one another may be at least temporarily represented in certain mappings so as to allow events (e.g., even including events seemingly initiated by disparate entities) to be affiliated based on criteria of particular multifaceted security threats.

To illustrate, FIG. 9C shows a third example mapping 900-C of events that data platform 500 may detect within compute environment 602. As shown, mapping 900-C is similar to mapping 900-B described above. However, whereas the highly scored event 902-8 could be affiliated in mapping 900-B with other events 902 based on overlap between initiating entities (i.e., event 902-8 was shown to be initiated not only by entity 904-3, but also by entity 904-4, which, in turn, initiated other events 902 that could thereby be affiliated with event 902-8), in mapping 900-B this overlap does not exist (i.e. there is no edge 906 between event 902-8 and entity 904-4). Without this particular edge 906, this most important event 902-8 (the only event with a score of "High" in this example) may not be easily affiliated with other events 902 that are shown and, if entity 904-3 is controlled by a same party as entities 904-2 and/or 904-4, important insights about the possible affiliation of event 902-8 to other events 902 may be lost. Accordingly, as shown, certain entity-to-entity edges 908 (edges 908-1 and 908-2) may be identified and included in the mapping if appropriate to help ensure that events such as event 902-8 can properly be associated with other events 902 to which they may relate. In this way, if a first event is initiated within the compute environment by a first entity and a second event is initiated within the compute environment by a second entity distinct from the first entity, the identifying of an affiliation between the first event and the second event may be based on an additional affiliation detected between the first entity and the second entity. For example, referring to mapping 900-C, in which event 902-8 is initiated by entity 904-3 and event 902-11 is initiated by entity 904-4, data platform 500 may identify an affiliation between events 902-8 and 902-11 based on an additional affiliation (represented by edge 908-2) between entity 904-3 and 904-4.

Entity-to-entity edges such as edges 908 may be added to the mapping under various circumstances and/or for various reasons as may serve a particular implementation. As one example, if a first entity is implemented by a first user identity and a second entity is implemented by a second user identity (distinct from the first user identity), an additional affiliation (e.g., represented by an entity-to-entity edge 908) may be detected between the first user identity and the second user identity based on a determination that the first user identity has either created the second user identity or modified a permission status of the second user identity. For instance, if data platform 500 detects that one IAMUser identity creates or modifies the permissions of another IAMUser identity, data platform 500 may temporarily tie those IAMUsers identities together for purposes of affiliating the events they are responsible for initiating.

As another example, if a first entity is implemented by a container and a second entity is implemented by a host machine to which the container is deployed, an additional affiliation may be detected between the container and the host machine based on a determination that an operation associated with the container has evaded or attempted to evade a constraint of the container. For instance, if data platform 500 detects signs of container escape by an application executing in a container, data platform 500 may temporarily associate the container to the host it is running on and consider events performed by both the container and the host machine itself as being initiated by a same party (e.g., a potential attacker).

In still other examples, data platform 500 may create temporary or permanent entity-to-entity affiliations (e.g., signified by edges 908 in a graph) under other circumstances such as the following: 1) when data platform 500 detects a user identity (e.g., an IAMUser identity) logging in from an anomalous location, data platform 500 may affiliate the address identity (e.g., IP address) to that user identity; 2) when data platform 500 detects that a particular machine (e.g., an EC2 instance) uses its credentials to assume a particular role, data platform 500 may affiliate that machine to that role; 3) when data platform 500 detects that a process launches from a directory where a known malware file resides, data platform 500 may affiliate that process with that malware file; 4) when data platform 500 detects that a process establishes a connection with a suspicious address identity (e.g., a suspicious IP address), data platform 500 may affiliate the process with that address identity; and 5) when data platform 500 detects signs of lateral movement (e.g., WMIC-based lateral movement, etc.) from one machine to another (e.g., between Windows machines), data platform 500 may affiliate those machines with another.

As has been described, graph partitioning algorithms used to analyze and affiliate events and/or entities may be used in connection with modular policies described herein to create comprehensive narratives of complex attacks and/or other multifaceted security threats that have been described. As a result of this modularity, the detection logic applied by data platforms described herein may advantageously be more maintainable and/or more capable of producing clear and easy-to-comprehend communication about potential threats that may be underway. To supplement various other examples that have been provided, a particular example of how subject matter experts may define modular rules to indicate when to associate certain entities will now be described. It will be understood that by following the chain of these associations, greater insights into overarching multifaceted security threats may be determined and clearer communications (e.g., comprehensive attack narratives, etc.) may be produced.

In this example, the data platform may determine that: 1) a container escape to the host has occurred and has been detected to branch; 2) a lateral movement from that host to another host has been detected; 3) the host's credentials have been used to assume a particular role in the cloud environment (e.g., an AWS role using the host machine's instance credentials); and 4) this particular role has been used to create another user. Detecting any of these events in isolation may be of interest and may even rise to the level of meriting an alert. However, when these detections are chained together into a single attack narrative (e.g., building a composite event or multifaceted security threat that uses all of these connected edges), a clearer picture of the potential threat may be produced and communicated. Any suitable type of lateral movement with regard to these determinations may be detected (e.g. 1→2, 2→3, 3→4; 1→2, 2→3, 2→4; etc.). When they are all detected together under the umbrella of a single multifaceted security threat (e.g., one unified attack), the data platform may advantageously generate a composite detection that has full visibility into all of these attack steps at once (rather than having separate alerts for each one).

It will be understood that the proceeding situations are provided merely as examples and that various other situations may similarly arise that may merit data platform 500 affiliating two or more entities (e.g., of the same or different entity types including, for example, users, machines, addresses, containers, processes, files, etc.) using an entity-to-entity edge such as one of edges 908. It will also be understood that if entity-to-entity affiliation policies are defined with sufficient specificity (e.g., by designating particular scenarios such as those described above), graphs generated with such affiliations may indicate (e.g., so that client entities by informed about) the reasons that entities are linked, the length of time the entities will be considered to be affiliated, and so forth. In implementations involving a large number of rationales (and/or particularly broad rationales) for affiliating entities with one another, graphs may become very complex and opportunities for affiliating different events may multiply quickly. Accordingly, as the number and/or breadth of these rationales grows, various protections may be put in place to avoid undesirable and unlimited sprawl of event-affiliation detections. For example, weighting values (e.g., imposed manually or via link prediction models) may be assigned to each entity-to-entity affiliation (e.g., each edge 908) based on the system's confidence in the affiliation's legitimacy and/or based on the relative significance of the affiliation. As sprawl increases and/or demands too many system resources, such weighting values may then be used to prioritize how system resources are used. As another example, simple connected-component analysis may be replaced by more statistical methods of partitioning the graph (e.g., community detection, centrality measurement for determining which entities to include and exclude, etc.).

Once data platform 500 has ingested and combined various events 702 to form composite events 706 in the ways described above, data platform 500 may present information associated with these composite events to different types of users (e.g., human and/or automated users associated with a client entity that has an interest in securing a compute environment). The presentation of this data may be performed in ways that prioritize more important information above less important information (e.g., bringing the most pertinent and likely threats to the user's attention, etc.), that put the composite events in context with comprehensive event narratives (e.g., based on predefined multifaceted security threats described above), and/or that provide intuitive tools to facilitate exploration of the composite events in their proper context.

Figure 10A:
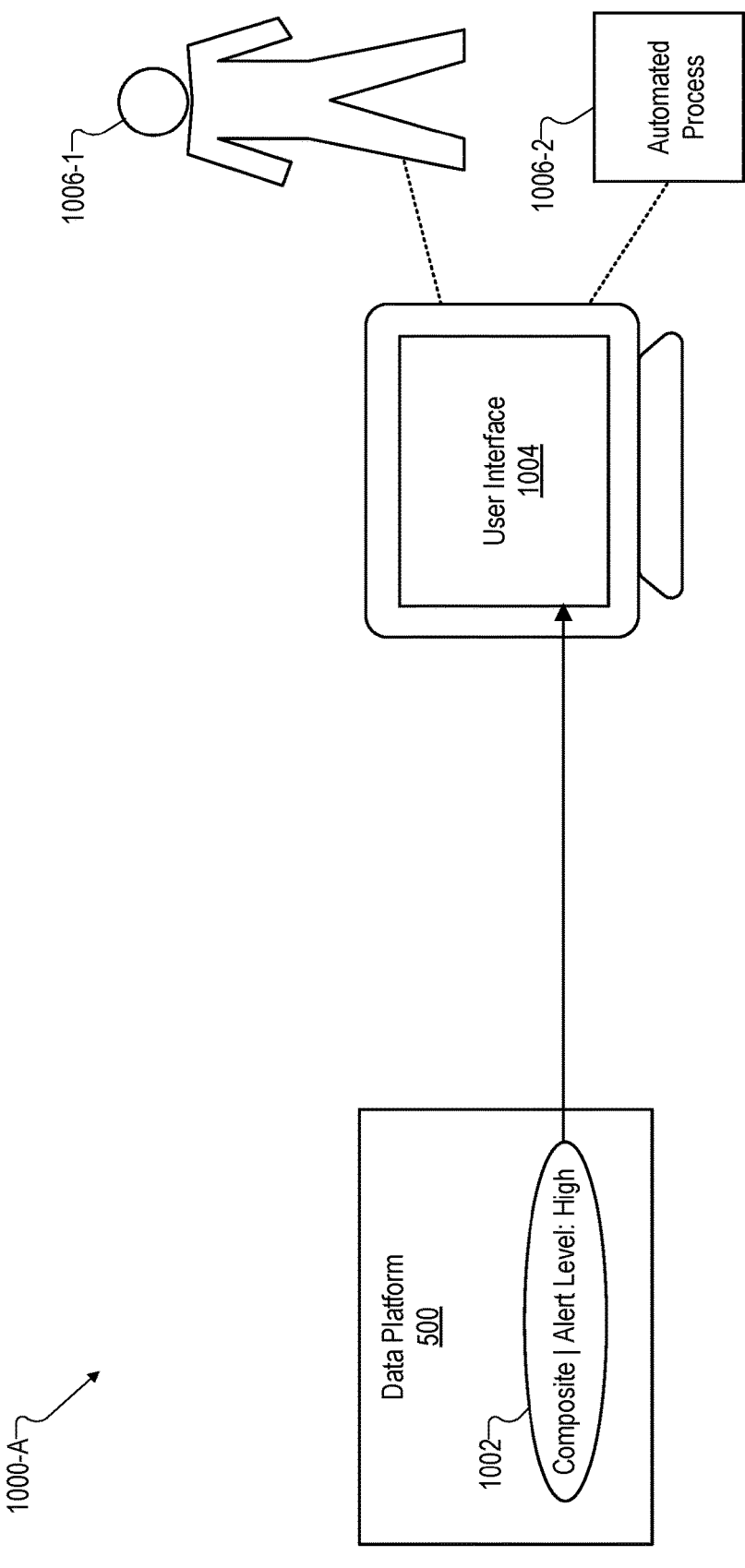
FIG. 10A illustrates a first example configuration in which a composite event created by a data platform may be presented by way of a user interface.
Figure 10B:
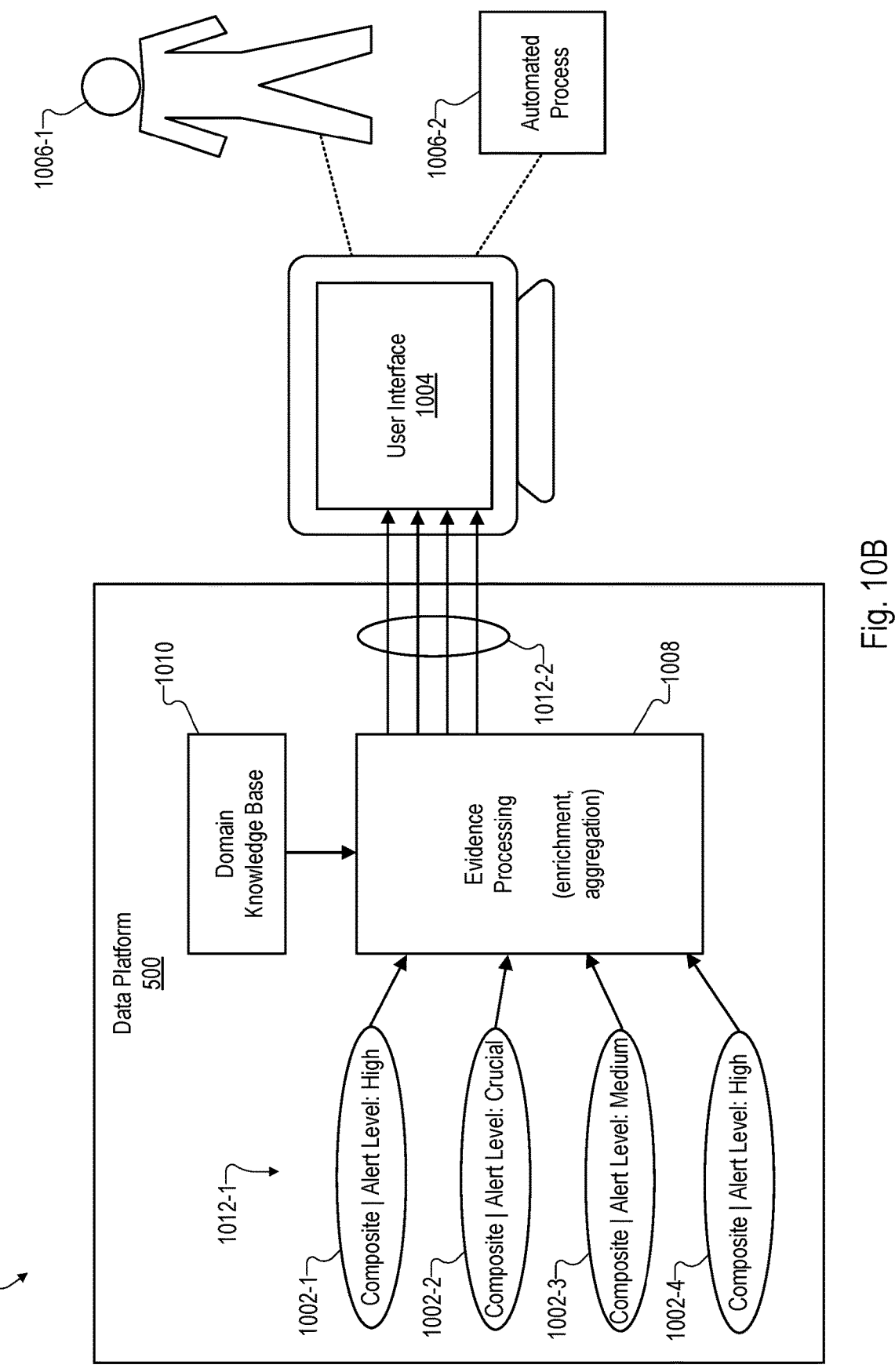
FIG. 10B illustrates a second example configuration in which composite events created by a data platform may be presented by way of a user interface.

To illustrate, FIGS. 10A and 10B illustrate respective example configurations 1000 (i.e., configuration 1000-A in FIG. 10A and configuration 1000-B in FIG. 10B) in which one or more composite events created by data platform 500 are shown to be presented to different types of users by way of a user interface. In both configurations 1000-A and 1000-B, data platform 500 is shown to have created one or more composite events 1002 (e.g., a single composite event 1002 in configuration 1000-A and a plurality of composite events 1002-1 through 1002-4 in configuration 1000-B) that are presented in a user interface 1004 to one or more users 1006 (e.g., a human user 1006-1, a non-human, automated process user 1006-2, etc.). Various details and examples of user interface 1004 will be described in more detail below, but it will be understood that user interface 1004 may be configured to provide information to both human users (e.g., human user 1006-1) such as administrators and technicians employed by a client entity to help oversee security for a compute environment being monitored by data platform 500 (e.g., compute environment 602) and non-human users (automated process user 1006-2) such as scripts, bots, and/or other non-human entities associated with the client entity that may interact with the information presented by user interface 1004.

Configuration 1000-1 of FIG. 10A is shown to be a relatively straightforward configuration in which data platform 500 creates the composite event 1002 and presents it by way of user interface 1004. Composite event 1002 may be presented in any suitable way within user interface 1004. For instance, various composite events may be listed or graphed within user interface 1004 in a manner that allows users 1006 to browse and explore the composite events in useful ways, such as by organizing the composite events by importance (e.g., alert level, etc.), time of occurrence, or the like. In the event that a particular composite event is deemed to be of particular significance (e.g., if the alert level with which this particular composite event 1002 is scored meets or exceeds a threat threshold), data platform 500 may be configured to perform actions to bring special attention to the event. For instance, data platform 500 may generate an alert configured to indicate composite event 1002 to users 1006 and/or to recommend that special investigational attention be given to the composite event.

An alert engine implemented by data platform 500 (not explicitly shown in FIGS. 10A-10B) may be responsible for processing observations (e.g., individual events) and evidence items (e.g., composite events) produced by other services within the data platform (e.g., event analyzer 704) and to generate alerts as appropriate. Each alert generated by the alert engine may include a description (e.g., a narrative or other indication of the anomalous behavior observed in the compute environment), a severity (e.g., an alert level indicative of the importance of the issue), and/or any other information as may serve a particular implementation. Alert generation may be performed in real time with microservices for performing augmentation, scoring, tagging, and so forth.

As has been described, the predefined criteria of certain multifaceted security threats may include a plurality of distinct evidence items (e.g., evidence items 804 of each of multifaceted security threats 802 of the set 800 shown in FIG. 8) that are each indicative of the multifaceted security threat, and composite events may implement such evidence items. For example, a particular composite event 1002 may implement one evidence item of the plurality of distinct evidence items for a particular multifaceted security threat. In this scenario, data platform 500 may assess a risk of the particular multifaceted security threat being attempted based on this and other similar evidence items in any suitable way. For example, data platform 500 may enrich each evidence item with information from a domain knowledge base, aggregate distinct evidence items with one another to construct a picture of how likely a particular multifaceted security threat is to be underway, and so forth.

To illustrate, FIG. 10B shows a plurality of composite events 1002-1 through 1002-4 created by data platform 500 that are processed by evidence processing 1008 of data platform 500 before being presented within user interface 1004. For example, evidence processing 1008 may involve enriching the composite events 1002 based on information from a domain knowledge base 1010, aggregating the composite events 1002 based on criteria of multifaceted security threats, and so forth. In this example, the composite events 1002 will be understood to serve as evidence items that begin as raw evidence 1012-1 and, after evidence processing 1008, are presented within user interface 1004 as processed evidence 1012-2. Raw evidence 1012-1 may include individual composite events, for example, while processed evidence 1012-2 may include tagged (or otherwise enriched) composite events that are aggregated together and/or organized based on specific criteria of predesignated multifaceted security threat patterns (e.g., so as to be presented in user interface 1004 in any of the ways described herein).

In some examples, evidence processing 1008 may be tunable (e.g., by way of a knob or other suitable user interface element) to control how much processing effort data platform 500 asserts in aggregating the events and attempting to aggregate new additional evidence/events. Evidence processing 1008 may be executed asynchronously, possibly generating evidence of long-running attacks over long time windows (e.g., of several days, etc.) in addition to quickly identifying more simple threats and attacks. Evidence processing 1008 may also involve incorporating feedback from users and/or from domain knowledge base 1010 by adding annotations or missing links to various evidence items (thereby creating a new or enriched evidence item).

Along with tagging and enriching evidence, evidence processing 1008 may also score evidence (e.g., based on any suitable rules, models, etc.) to be further processed by the alert generator described above (e.g., so that alerts may be generated to bring user attention specifically to multifaceted security threats that are likely to be underway or most relevant).

Evidence aggregation processes in evidence processing 1008 may be configured to merge or "stitch together" evidence into new, richer evidence with an aim of generating the smallest possible suspicious evidence graphs. In certain implementations, a number of constraints may be included to make these processes computationally feasible, including, for instance: 1) a maximum time window that a piece of evidence can span, 2) a maximum number of distinct entities that can be involved, 3) a requirement that each piece of evidence be a connected graph, 4) a requirement that only certain types of entities may be merged, or the like.

Domain knowledge base 1010 may include information curated by domain experts to help evidence processing 1008 appropriately tag and contextualize evidence in the ways described herein. For instance, information within domain knowledge base 1010 may represent an example of what port scanning would look like, what would be expected for a log 4j exploit, or the like. In some implementations, a team of domain experts may build domain knowledge base 1010 as a proprietary and continually-growing knowledge base that machine learning models may add to (e.g., by building policies that help fill out the knowledge base with more examples, make the knowledge base more accurate and robust and up-to-date, etc.). Domain knowledge base 1010 may allow data platform 500 to build functions that consume evidence as input and produce evidence as output, thereby creating virtuous loops in which policies may build on policies that build on model outputs and so forth. In this way, data platform 500 may, over time, become increasingly capable of reliably detecting attacks even when those attacks are novel, complex, long-running, and/or otherwise difficult to detect.

As mentioned above, multiple individual events that have been determined to be affiliated with one another and combined to create a composite event may be presented in a standalone manner or by way of an interactive user interface configured to facilitate contextual understanding of attack narratives for predefined multifaceted security threats. For example, as described in relation to process 512 above, data platform 500 may present an interactive user interface (e.g., user interface 1004) that is configured to display: 1) an identifier indicative of a multifaceted security threat; 2) a plurality of selectable evidence items each associated with a different facet of the multifaceted security threat and including, as the selectable evidence items, a set of composite events (e.g., composite events 1002); 3) one or more presentation panes for displaying information; and any other elements as may serve a particular implementation. As further described in relation to process 512, data platform 500 may detect a selection (e.g., by one of users 1006) of the composite event from the plurality of selectable evidence items presented in this type of interactive user interface, and then may populate (e.g., in response to the detecting of the selection), the presentation pane with information related to the composite event.

Figure 11A:
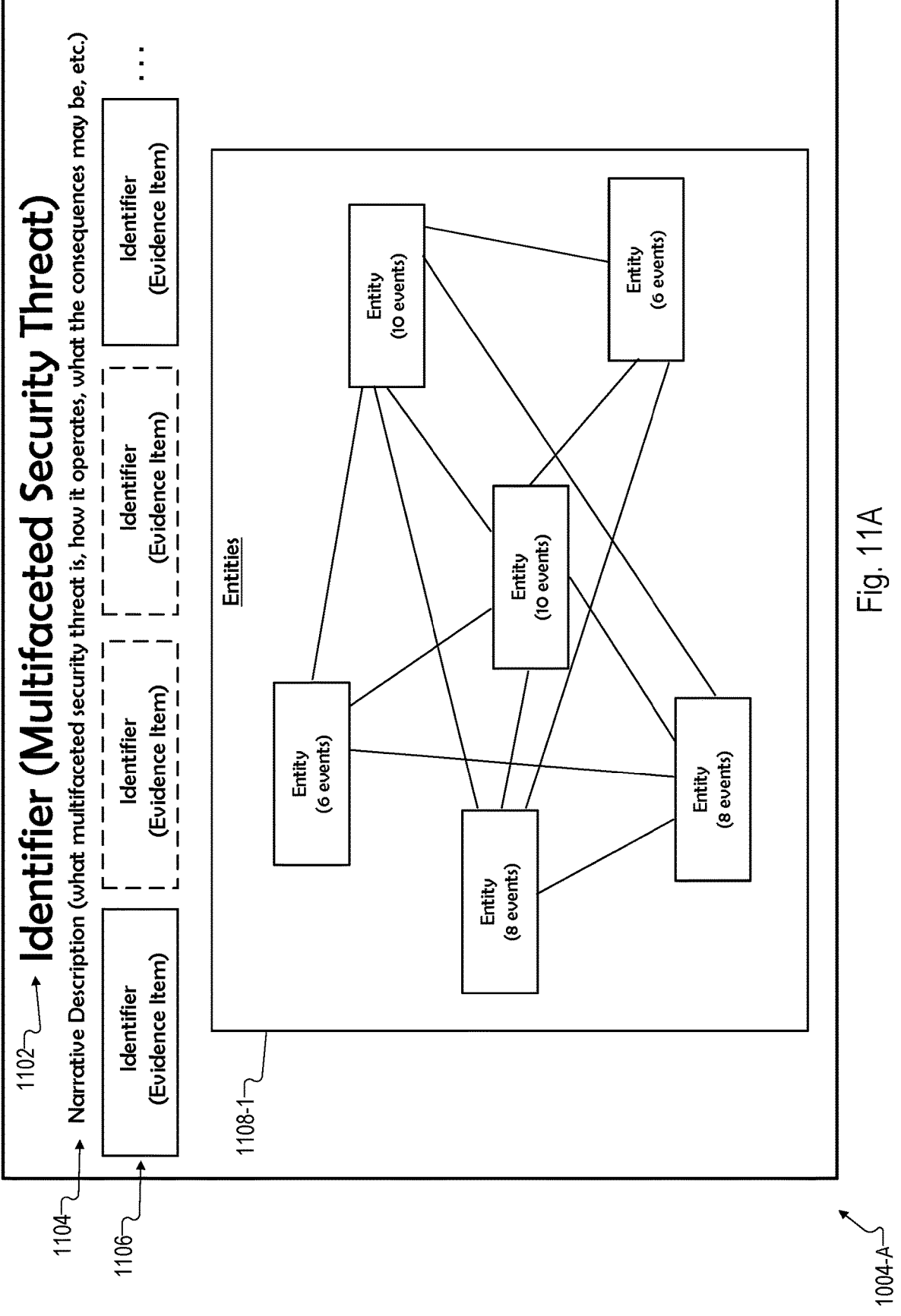
FIG. 11A illustrates a first example implementation of a user interface that may be presented by a data platform to facilitate interactive analysis of multifaceted security threats within a compute environment.
Figure 11B:
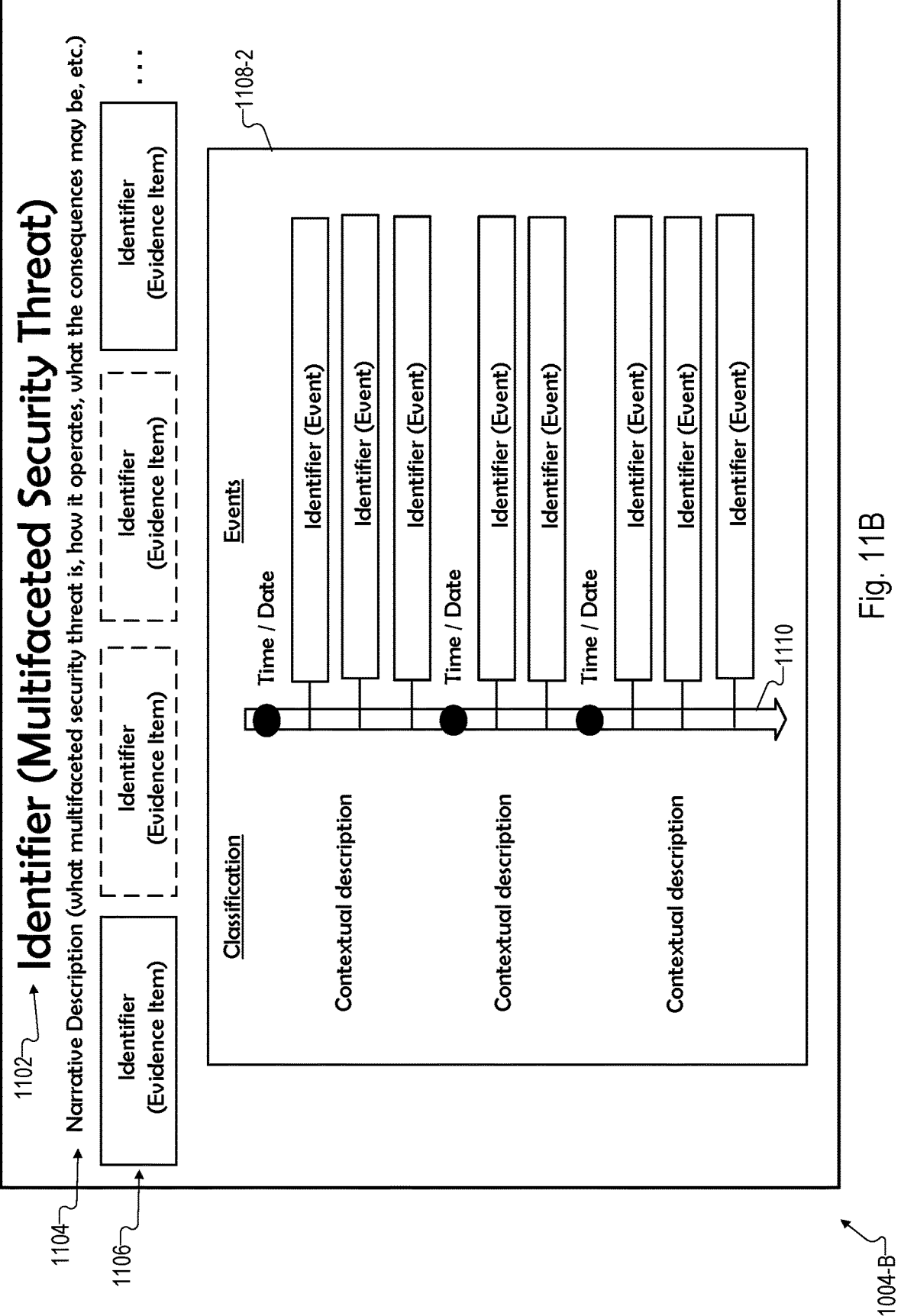
FIG. 11B illustrates a second example implementation of a user interface that may be presented by a data platform to facilitate interactive analysis of multifaceted security threats within a compute environment.
Figure 11C:
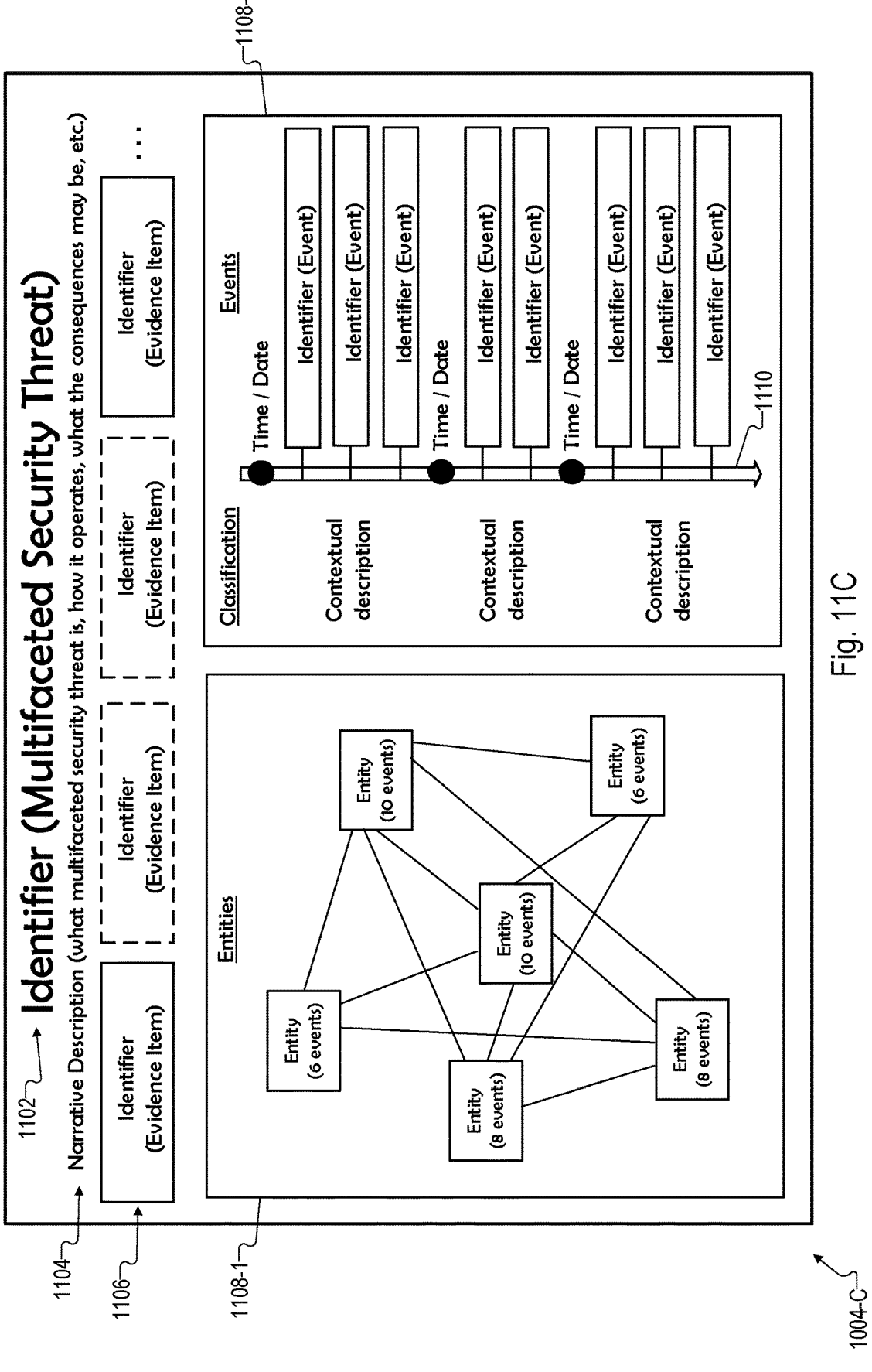
FIG. 11C illustrates a third example implementation of a user interface that may be presented by a data platform to facilitate interactive analysis of multifaceted security threats within a compute environment.

To illustrate these principles in more detail, FIGS. 11A-11C illustrate a few example implementations of the user interface 1004 shown in FIGS. 10A-10B. Specifically, as shown, FIG. 11A shows an implementation labeled as user interface 1004-A, FIG. 11B shows an implementation labeled as user interface 1004-B, and FIG. 11C shows an implementation labeled as user interface 1004-C. Each of these user interface implementations will be understood to be interactively presented, by a data platform such as data platform 500, to a user such as either of users 1006 (e.g., a human or non-human user). In this way, the various user interface implementations may facilitate interactive analysis of multifaceted security threats (e.g., any of multifaceted security threats 802 described above or any other suitable multifaceted security threat) suspected to be underway within a compute environment.

As shown, each of the example user interfaces 1004-A through 1004-C may include certain common elements, including a threat identifier 1102 (labeled as "Identifier (Multifaceted Security Threat)" in these examples), a narrative description 1104 (labeled as "Narrative Description (what multifaceted security threat is, how it operates, what the consequences may be, etc.)" in these examples), a plurality of selectable evidence items 1106 (each labeled as "Identifer (Evidence Item)" in these examples), and one or more presentation panes 1108 (e.g., presentation pane 1108-1 in user interfaces 1004-A and 1004-C, presentation pane 1108-2 in user interfaces 1004-B and 1004-C). Each of these elements will now be described in more detail.

Threat identifier 1102 is shown to be displayed prominently in each of the examples of user interfaces 1004-A through 1004-C. Whereas conventional event browsers may surface individual events that have been determined to be important (e.g., events high alert levels, etc.) conventional user interfaces have not organized (e.g., aggregated, enriched, etc.) disparate events and presented them in a contextualized manner under the banner of a single mode of attack (or other multifaceted security threat). Accordingly, the ability of data platform 500 to not only present the collected information but to do so contextually in a manner that supports or builds around the common thread of the multifaceted security threat may provide a significant benefit to users seeking not only to direct their attention productively but also to quickly gain a strong and comprehensive understanding of how secure a compute environment is and/or what threats may possibly be underway.

While no specific threat or attack is reflected in the generic threat identifier 1102 shown in these examples, it will be understood that any of the example multifaceted security threats described herein could be reflected in this identifier (e.g., "Possible Crypto Mining Attack," "Possible Cloud Ransomware Attack," etc.). It will also be understood that any multifaceted security threat represented at a given time (and therefore reflected in the threat identifier 1102 and throughout the rest of the user interface 1004) may be determined in any of the ways described herein.

As one example, a multifaceted security threat may be automatically presented within the user interface 1004 as a result of being deemed to present a particular risk. For instance, data platform 500 may determine that one or more assets within the compute environment are possibly being targeted by the multifaceted security threat by evaluating, in relation to a threat threshold, a likelihood that the one or more assets are in fact being targeted by the multifaceted security threat. This evaluation may result in a determination that the likelihood surpasses the threat threshold (e.g., the possibility of the multifaceted security threat being underway is more likely than not, etc.), and, accordingly (i.e., based on the determination that the likelihood surpasses the threat threshold), data platform 500 may automatically present the interactive user interface with information related to the multifaceted security threat.

As another example, a multifaceted security threat may be manually selected for presentation within user interface 1004 by a user (e.g., to allow the user to selectively monitor for threats of interest even if those threat are not currently deemed to present a particular risk). For instance, data platform 500 may again determine that one or more assets within the compute environment are possibly being targeted by the multifaceted security threat by evaluating, in relation to the threat threshold, the likelihood that the one or more assets are in fact being targeted by the multifaceted security threat. However, in this example, the evaluation may result in a determination that the likelihood fails to reach the threat threshold (e.g., the possibility of the multifaceted security threat being underway is deemed to be unlikely). In this case, and notwithstanding the determination that the likelihood fails to reach the threat threshold data, platform 500 may present the interactive user interface with information related to the multifaceted security threat based on an explicit request (e.g., by one of users 1006) for the interactive user interface to present the information related to the multifaceted security threat. For instance, a drop-down menu or the like (not explicitly shown in FIGS. 11A-11C) may be included in user interface 1004 to allow the user to explicitly request a particular multifaceted security threat of interest that the user desires to monitor (e.g., to view the various evidence items for that threat, the individual and composite events that have been detected related to that threat, and so forth).

Narrative description 1104 is shown to be presented prominently, along with threat identifier 1102, to further the aim of contextualizing and facilitating the user's understanding of not only individual events that have been detected, but also of an overarching multifaceted security threat that may possibly be targeting assets of the compute environment. As shown in each of the examples of user interfaces 1004-A through 1104-C, the interactive user interface may be further configured to display, in connection with identifier 1102, a narrative description of the multifaceted security threat. While a generic narrative description is shown in these figures, it will be understood that the narrative description may be configured to provide context for the different facets of the multifaceted security threat by describing how the multifaceted security threat operates to target the one or more assets within the compute environment. For example, as shown, narrative description 1104 may describe what the multifaceted security threat is, how it operates, why the threat is problematic, what the consequences of the threat may be (if the threat is mitigated and/or if it is not), and so forth.

The plurality of selectable evidence items 1106 may represent each of the evidence items associated with the particular multifaceted security threat (e.g., as shown by evidence items 804 of multifaceted security threat 802-1 in FIG. 8, for example). For instance, if the multifaceted security threat relates to cryptojacking and the threat identifier 1102 reads "Possible Crypto Mining Attack," selectable evidence items 1106 may, respectively, relate to whether 1) anomalous user activity has been identified, 2) files are detected to be downloaded from a remote source, 3) a remote connection to a mining pool has been established, 4) a known cryptomining file has been discovered to be stored or used within the compute environment, and so forth.

As shown, there may be different ways of presenting the various selectable evidence items 1106 (e.g., outlined with a solid line or a dashed line, etc.). These different modes of presentation may help differentiate different subsets of selectable evidence items 1106 having different statuses or characteristics. For example, a first subset of evidence items included in the set of selectable evidence items 1106 may be determined (in an assessment of a risk of the multifaceted security threat being attempted, as described above) to suggest that the one or more assets are being targeted by the multifaceted security threat, while a second subset of evidence items included in the set of selectable evidence items 1106 may be determined, in the assessment, to not suggest that the one or more assets are being targeted by the multifaceted security threat. Accordingly, the interactive user interface may be configured to display the set of selectable evidence items in a manner that graphically differentiates the first subset of evidence items (e.g., shown with solid lines) from the second subset of evidence items (e.g., shown with dashed lines). Put another way, the selectable evidence items 1106 that have already been detected may be presented in one way, while the selectable evidence items 1106 that have not yet been detected may be presented in a visually distinguishable way.

While different line styles are used to graphically differentiate the selectable evidence items 1106 shown in FIGS. 11A-11C, it will be understood that other ways of graphically differentiating the selectable evidence items may be employed in other implementations. For example, the graphically differentiating of the first and second subsets of evidence items may be performed, in certain implementations, by using a first color (e.g., red) to display evidence items of the first subset of evidence items, and by using a second color different from the first color (e.g., green) to display evidence items of the second subset of evidence items. In certain implementations, a third color (e.g., yellow) could be used if the assessment of a particular evidence item reveals an indeterminate or ambiguous result or for other purposes.

One or more presentation panes 1108 may be included within the user interface 1004 to be populated in accordance with what multifaceted security threat is being presented and, more particularly, with information related to a selected evidence item of the set of selectable evidence items 1106. In some examples, information related to multiple evidence items may be populated within presentation panes 1108 at the same time with information related to a selected evidence item 1106 emphasized.

As shown in FIG. 11A, user interface 1004-A illustrates a single presentation pane 1108-1 that includes a graph displaying entities and connections between them. More particularly, the information displayed in the populated presentation pane 1108-1 may include a graph (e.g., a polygraph such as any of the polygraphs described herein or another graph as may serve a particular implementation) that comprises a plurality of nodes connected by a plurality of edges. Each node of the plurality of nodes in the graph may represent either an entity or an observation and each edge of the plurality of edges may represent a behavioral relationship between nodes connected by the edge. For instance, in this example, each node is shown to be associated with a particular entity ("Entity") that, in turn, is associated with various events ("X events", where X is a number of events initiated or co-initiated by this entity). As has been described, it will be understood that each entity represented by a node in the graph of presentation pane 1108-1 may be of an entity type selected from: a user identity, a host machine, an address identity, a container, a process, a file, or another suitable type of entity described herein or as may serve a particular implementation.

As shown in FIG. 11B, user interface 1004-B illustrates a single presentation pane 1108-2 that includes an event list that individually displays events that have been monitored to have occurred within the compute environment. These events individually displayed in the event list may form a basis on which a particular evidence item (e.g., a selected one of the plurality of selectable evidence items 1106) is assessed. For example, while a large number of events (e.g., hundreds or thousands or more) may be monitored to have occurred in the compute environment over a relevant time period, when a particular selectable evidence item is selected, presentation pane 1108-2 may be populated with information about specific events related to that evidence item (e.g., the events 702 that are combined to form the composite event 706 that implements the selected evidence item). As shown, each of the events individually displayed in the event list may be arranged along a timeline 1110 to indicate an order in which the events were observed to have occurred with respect to one another and/or with respect to real time. For example, the arrangement of the events along timeline 1110 shows not only the order that the displayed events occurred (e.g., from the earliest events at the bottom to the most recent events at the top or vice versa) but also specific dates and times that the events were detected ("Time/Date").

Additionally, each of the events individually displayed in the event list may include a descriptive identifier configured to indicate a nature of the event. While generic identifiers (i.e., "Identifier (Event)") are shown in presentation pane 1108-2 rather than specific examples, it will be understood that the events may be described at any suitable level of detail as may serve a particular implementation. As further shown, a contextual description may be offered along the timeline with different groupings of events (under "Classification" in presentation pane 1108-2). For example, each grouping may relate to a particular batch of events detected at a particular date and time, to a group of individual events that are combined into a composite event and associated with a particular evidence item (such that the list may be navigated by selecting different evidence items and having the appropriate grouping be presented at the top of the timeline), or in other suitable ways.

As shown in FIG. 11C, user interfaces 1004-C illustrates dual presentation panes 1108-1 and 1108-2 in the same user interface. The same information is shown to be presented in these presentation panes as described above for user interfaces 1004-A and 1004-B such that, in this example interface, information about both entities and events may be presented for users to freely browse and explore in an interactive way. For example, the presentation panes may be interactive with the selectable evidence items 1106 in the same ways as described above. Additionally, presentation panes 1108 may be mutually interactive with one another as will. For instance, each presentation pane 1108 may not only be populated based on which evidence item is selected but also based on interaction with information populated in the other presentation pane.

Specifically, along with being configured to display the first presentation pane 1108-1 for displaying information, interactive user interface 1004-C is show to further display, together with that first presentation pane 1108-1, an additional presentation pane 1108-2 for displaying additional information. Data platform 500 may populate, in response to the detecting of the selection of a particular selectable evidence item 1106, the additional presentation pane 1108-2 with additional information related to the selected evidence item 1106. For example, as shown in user interface 1004-C, the information displayed in populated presentation pane 1108-1 may include the graph comprising the plurality of nodes connected by the plurality of edges (as described above, each node of the plurality of nodes representing either an entity or an observation and each edge of the plurality of edges representing a behavioral relationship between nodes connected by the edge), and the additional information displayed in the populated additional presentation pane 1108-2 may include the event list (as described above, which may individually display events that have been monitored to have occurred within the compute environment and that form a basis on which the particular evidence item is assessed).

The graph and the event list in the presentation panes 1108 may be mutually interactive such that selecting an item from one influences what is displayed in the other. For instance, if a particular entity is selected in presentation pane 1108-1, one or more events initiated by that entity may be displayed (and/or emphasized if, for instance, they were already being displayed) in presentation pane 1108-2. Similarly, if a particular event or event grouping or classification is selected in presentation pane 1108-2, one or more entities detected to have initiated that event or grouping may be displayed (and/or emphasized if, for instance, they were already being displayed) in presentation pane 1108-1. Additionally, special colors or highlighting or other forms of emphasis may be applied to selectable evidence items 1106 when an associated entity or event is selected that is affiliated with those evidence items. In this way, each of the presentation panes 1108 and the set of selectable evidence items 1106 may all be mutually interactive to facilitate users in exploring and quickly arriving at a good understanding of multifaceted security threat that may possibly be targeting the compute environment.

Advantages and features of the present disclosure can be further described by the following statements:

1. A method comprising: accessing, by a data platform monitoring a compute environment, event data representative of a plurality of events that occur within the compute environment; analyzing, by the data platform using a first event analyzer that operates in accordance with a first analysis heuristic, a first set of one or more events included in the plurality of events to generate a first output signal; analyzing, by the data platform using a second event analyzer that operates in accordance with a second analysis heuristic, a second set of one or more events included in the plurality of events to generate a second output signal; analyzing, by the data platform using a third event analyzer that operates in accordance with a third analysis heuristic, the first and second output signals to generate a composite alert signal indicative of whether the first set of one or more events and the second set of one or more events are together indicative of one or more intrusions that are severe enough to be alerted on by the data platform; and performing, by the data platform based on the composite alert signal, an alert-based operation with respect to the plurality of events.

2. The method of any of the preceding statements, wherein: the first output signal is indicative of whether the first set of one or more events are together indicative of one or more intrusions that are severe enough to be alerted on by the data platform, and the second output signal is indicative of whether the first second of one or more events are together indicative of one or more intrusions that are severe enough to be alerted on by the data platform.

3. The method of any of the preceding statements, wherein: the first analysis heuristic comprises a first machine learning model, the second analysis heuristic comprises a second machine learning model, and the third analysis heuristic comprises a third machine learning model.

4. The method of any of the preceding statements, wherein one or more of the first, second, or third trained machine learning models comprises one or more large language models configured to perform generative artificial intelligence operations.

5. The method of any of the preceding statements, wherein one or more of the first, second, or third trained machine learning models are configured to be trained on training sets generated by generative artificial intelligence.

6. The method of any of the preceding statements, wherein the first analysis heuristic is configured in accordance with a first common characteristic of the first set of one or more events, the second analysis heuristic is configured in accordance with a second common characteristic of the second set of one or events different from the first common characteristic, and the third analysis heuristic is configured in accordance with a third common characteristic of the third set of one or events different from the first and second common characteristics.

7. The method of any of the preceding statements, further comprising: analyzing, by the data platform using a fourth event analyzer that operates in accordance with a fourth analysis heuristic, the composite alert signal to generate contextual information associated with the composite alert signal.

8. The method of any of the preceding statements, wherein the performing the alert-based operation comprises presenting the contextual information together with information associated with an alert associated with the composite alert signal within a user interface.

9. The method of any of the preceding statements, wherein the contextual information includes one or more of a recommended remedial action associated with the composite alert signal, a feature associated with the composite alert signal, a significance level associated with the feature, or a narrative description associated with the composite alert signal.

10. The method of any of the preceding statements, wherein the fourth analysis heuristic comprises a large language model configured to perform generative artificial intelligence operations.

11. The method of any of the preceding statements, wherein the performing the alert-based operation comprises presenting a security alert within a user interface based on a characteristic associated with the composite alert signal satisfying one or more predetermined criteria.

12. The method of any of the preceding statements, wherein the performing the alert-based operation comprises abstaining from presenting a security alert within a user interface based on a characteristic associated with the composite alert signal failing to satisfy one or more predetermined criteria.

13. The method of any of the preceding statements, wherein the performing the alert-based operation further comprises presenting a plurality of selectable items each associated with a different facet of the composite alert signal.

14. The method of any of the preceding statements, wherein: the first set of one or more events is initiated within the compute environment by a first entity, and the second set of one or more events is initiated within the compute environment by a second entity.

15. The method of any of the preceding statements, wherein the event data is collected using one or more agents deployed within the computing environment.

16. The method of any of the preceding statements, wherein the event data is collected using one or more agentless configurations.

17. A computer program product embodied in a non-transitory computer-readable storage medium and comprising computer instructions for a data platform to perform a process comprising: accessing, by a data platform monitoring a compute environment, event data representative of a plurality of events that occur within the compute environment; analyzing, by the data platform using a first event analyzer that operates in accordance with a first analysis heuristic, a first set of one or more events included in the plurality of events to generate a first output signal; analyzing, by the data platform using a second event analyzer that operates in accordance with a second analysis heuristic, a second set of one or more events included in the plurality of events to generate a second output signal; analyzing, by the data platform using a third event analyzer that operates in accordance with a third analysis heuristic, the first and second output signals to generate a composite alert signal indicative of whether the first set of one or more events and the second set of one or more events are together indicative of one or more intrusions that are severe enough to be alerted on by the data platform; and performing, by the data platform based on the composite alert signal, an alert-based operation with respect to the plurality of events.

18. The computer program product of any of the preceding statements, wherein: the first output signal is indicative of whether the first set of one or more events are together indicative of one or more intrusions that are severe enough to be alerted on by the data platform, and the second output signal is indicative of whether the first second of one or more events are together indicative of one or more intrusions that are severe enough to be alerted on by the data platform.

19. The computer program product of any of the preceding statements, wherein the process further comprises: analyzing, by the data platform using a fourth event analyzer that operates in accordance with a fourth analysis heuristic, the composite alert signal to generate contextual information associated with the composite alert signal.

20. A system comprising: memory storing instructions; and one or more processors communicatively coupled to the memory and configured to execute the instructions to perform a process comprising: accessing, by a data platform monitoring a compute environment, event data representative of a plurality of events that occur within the compute environment; analyzing, by the data platform using a first event analyzer that operates in accordance with a first analysis heuristic, a first set of one or more events included in the plurality of events to generate a first output signal; analyzing, by the data platform using a second event analyzer that operates in accordance with a second analysis heuristic, a second set of one or more events included in the plurality of events to generate a second output signal; analyzing, by the data platform using a third event analyzer that operates in accordance with a third analysis heuristic, the first and second output signals to generate a composite alert signal indicative of whether the first set of one or more events and the second set of one or more events are together indicative of one or more intrusions that are severe enough to be alerted on by the data platform; and performing, by the data platform based on the composite alert signal, an alert-based operation with respect to the plurality of events.

As described above, a data platform may be configured to detect disparate events occurring within a compute environment and identify affiliations between the events (e.g., between the events themselves, between the entities responsible for initiating the events, etc.). The data platform may then consolidate affiliated events so as to treat them as a single composite event. As further described, certain events, including certain composite events, may be associated with a multifaceted security threat that the data platform may be configured to monitor for within the compute environment. Various examples of such multifaceted security threats have been described in detail above, including individual events, composite events, and other evidence items that may serve to indicate the presence of these multifaceted security threats. Moreover, certain interactive user interfaces configured to present selectable evidence items to facilitate a user in investigating and quickly developing an understanding of ongoing multifaceted security threats that the data platform detects have been illustrated and described as well.

In the foregoing examples, comprehensive, accurate, and up-to-date sets of multifaceted security threats (e.g., set 800 described in relation to FIG. 8) were described to be constructed and maintained by way of continual observation, analysis, testing, and analysis based on expertise of policy experts as well as the power of machine learning processes. In particular, policy experts with a broad understanding of various attack techniques were described as being well-positioned to define various multifaceted security threats and to list the types of evidence items or other criteria that would be expected for those types of threats (e.g., to produce at least a "first draft" of attacks that may be monitored for). Then machine learning tools were mentioned as being useful for refining the library of threats, for imposing weighting parameters to the various evidence items and/or individual or composite events to reflect how predictive each of these elements is for determining when compute assets are actually under attack by a particular multifaceted security threat, and so forth. Machine learning technologies were also mentioned to be useful for identifying and creating multifaceted security threat definitions for novel attack patterns with which policy experts may not yet be familiar, as well as for discovering ways that attackers may attempt to circumvent security measures by altering certain events or combinations of events to elude detection while attempting to achieve the same ends. Ultimately, a balance of human oversight and automation (e.g., based on machine learning or other automated technologies) was described as being highly effective in building and maintaining a library of multifaceted security threats (e.g., set 800 of multifaceted security threats 802).

Additional details regarding various ways in which machine learning models may be used to manage security threat alerts for a compute environment will now be described. For example, along with helping to identify connections between events (e.g., individual or composite events) and any possible security threats (e.g., multifaceted security threats) that the events may indicate, examples described below will show how the same or other machine learning models may be employed to facilitate threat detection and alerting in other ways as well. For example, a machine learning model may be used to more effectively identify affiliations (e.g., event affiliations, entity affiliations, etc.) between events so as to be able form highly instructive composite event structures from less instructive individual events. Once a set of security threats has been detected, a machine learning model may also be used to limit and otherwise control the way these detected security threats serve as the basis of alerts provided to users or downstream processes. For example, as will be described in more detail below, a machine learning model may be used to identify the most important security threats (e.g., to form a subset of prioritized security threats from a larger set of detected security threats) so that, on one hand, a user or downstream process will not be overwhelmed by too many alerts (e.g., false positives that are not particularly helpful for increasing security), and, on the other hand, the user or downstream process will receive sufficient alerts to have confidence that the monitoring of the compute environment is still occurring even when attacks or other imminent security threats posing real risk do not happen to actually be underway.

By using machine learning models in the ways described herein (and particularly in accordance with principles described below), data platforms may provide various benefits and advantages as they perform security monitoring functions for different types of compute environments. One such benefit may include the multitude of different types of events triggered by different entities and detected by different data detection services that can be affiliated and consolidated under the umbrella of a single composite event and/or a single multifaceted security threat. For example, as will be described in more detail, information from different sources may include agent data, agentless data, cross-customer data, customer interaction data, known baseline data for agents, known baseline data for software applications, and so forth. Machine learning models trained with these types of data may manage alerts by, for example, generating, classifying, prioritizing, filtering, presenting, and/or otherwise processing the alerts.

Another benefit provided by data platforms using machine learning models in ways described herein involves reducing a potentially large number of false positive alerts that could otherwise be produced and cause alert fatigue in users (e.g., human technicians, automated processes, or other human or automated users associated with a client entity and responsible for addressing alerts provided by the system). Alert fatigue may lead to compromised security since, when users are constantly overwhelmed with alerts for security threats that turn out to be false alarms (i.e., turn out to not represent actual attacks or problematic security issues), the users may develop a tendency to take all alerts, including important ones, less seriously. Accordingly, as has been mentioned, machine learning models may help identify relationships and connections between different types of data and events (e.g., including esoteric connections and relationships that would be difficult, impractical, or even impossible for humans to manually identify and/or include in the security monitoring programmatically) so that alerting may be prioritized for higher-risk security threats (those more likely to represent actual attacks or other security problems) that merit the resources required for additional investigation.

At the same time, machine learning models described herein may also ensure that there are not too few alerts generated, even when that means occasionally prioritizing alerts for security threats that are relatively likely to represent what may ultimately be considered false alarms. Such alerts would still be assigned appropriate alerts scores (e.g., alert scores that would inform users of the relatively low likelihood that they represent actual problems that need to be investigated), but, based on the number and nature of alerts that have been provided and prioritized for a particular compute environment, machine learning models described herein may determine that prioritization of a few of these less important alerts is still helpful to a user. For example, alerts likely to be false positives (and having correspondingly low alert scores) may be helpful to see in moderation when no "true positives" (i.e., alerts representative of actual attacks) are observed for a period of time. This is because it may be informative and reassuring for the user to see at least some evidence of monitoring (e.g., low-score alerts likely to represent false alarms) from the security monitoring system to foster confidence that the data platform is operating correctly and performing its security monitoring function properly (even if it is not currently finding particularly risky security threats).

Regardless of whether a machine learning model facilitates a determination that there are too many alerts (and therefore that likely false positives need to be reduced and deprioritized) or that there are too few alerts (and therefore that a few alerts likely to represent false positives may be helpful to prioritize), machine learning models may be useful for identifying interesting composite events from disparate data, determining attack narratives for complex multifaceted security threats, and assessing the likelihood that identified security threats represent actual problems and should be prioritized and brought to the user's attention. In all of these cases, alerts associated with likely true positives may always be scored and prioritized over alerts associated with likely false positives, such that machine learning models described herein facilitate drawing users' finite attention to real and present security issues as effectively as possible. And all of these benefits may be provided regardless of the nature (e.g., size, type, architecture, etc.) of the compute environment being monitored and without users needing to manually configure or calibrate many user options or user-configurable parameters. Rather, highly effective and customized alert management may be provided to users of different types of compute environment right "out of the box" with algorithms that are tuned based on machine learning classifier models trained by events from the present compute environment (and/or possibly from other compute environments associated with other customers) rather than solely based on programmatic, "hand-tuned" logic from human programmers.

Figure 12A:
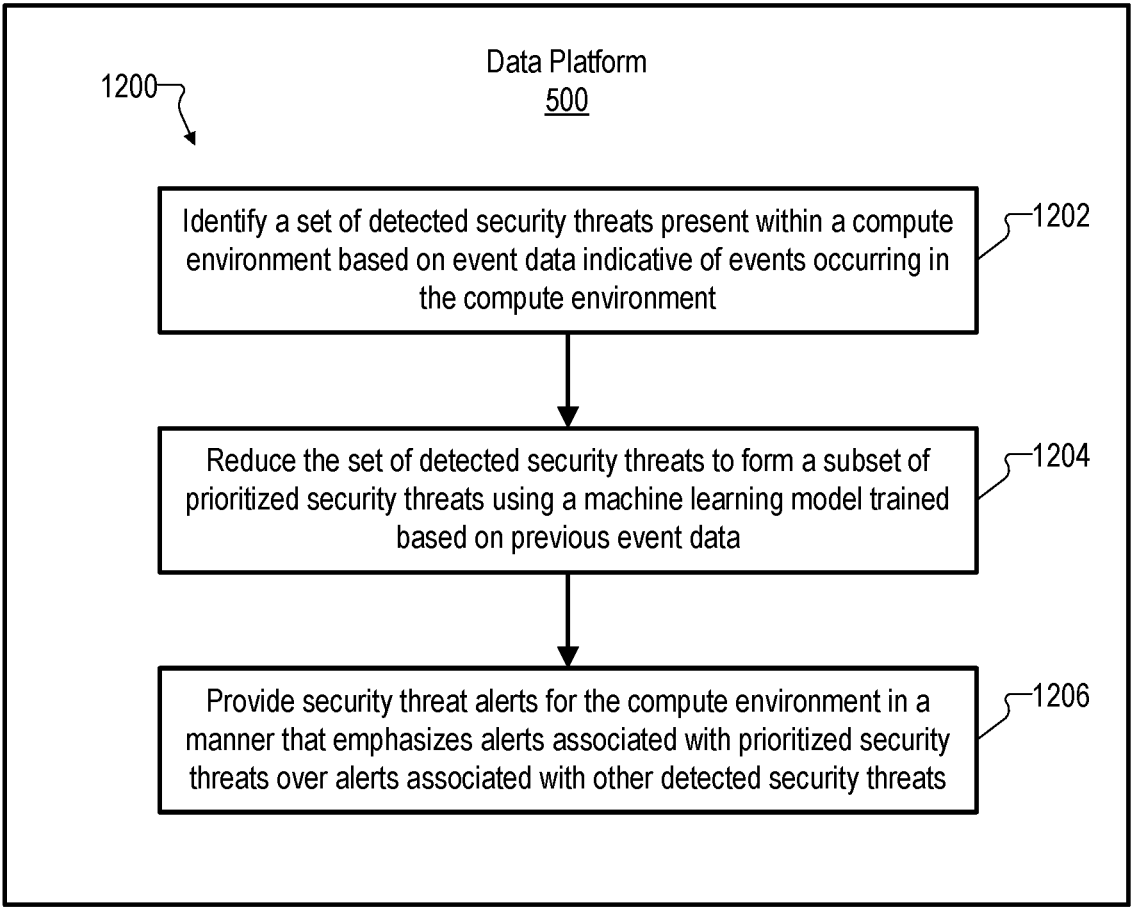
FIG. 12A illustrates an example data platform configured to perform an illustrative method for using a machine learning model for managing security threat alerts for a compute environment.

FIG. 12A illustrates the example data platform 500 and an illustrative method 1200 that it may perform in which data platform 500 uses a machine learning model for managing security threat alerts for a compute environment. As shown, method 1200 (also referred to as a process 1200) may include a plurality of operations 1202, 1204, and 1206, each of which may be performed, in full or in part, by data platform 500 or components thereof, as will be described in more detail below.

While method 1200 shows illustrative operations according to one implementation, other implementations may omit, add to, reorder, and/or modify any of the operations shown in method 1200. In some examples, multiple operations shown in method 1200 may be performed concurrently (e.g., in parallel) with one another, rather than being performed sequentially as illustrated and/or described. One or more of the operations shown in FIG. 12A may be performed by data processing resources (e.g., data processing resources 20 of data platform 12), user interface resources (e.g., user interface resources 22 of data platform 12), communication resources, and/or other suitable computing resources of data platform 500.

The operations of method 1200 may be performed prior to, in parallel with, or subsequent to other operations described above to be performed by the data platform. For example, the operations of method 1200 may be performed before, during, or after the data platform performs processes such as processes 502 or 512 or constructs a graph (e.g., a polygraph) with respect to event data received from agents and/or ingested in other ways described herein. Each of operations 1202-1206 of process 1200 will now be described in more detail as the operations may be performed by computing resources of data platform 500 as data platform 500 monitors a compute environment.

At operation 1202, data platform 500 (e.g., computing resources operating on the data platform) may identify a set of detected security threats present within a compute environment that data platform 500 is monitoring. These detected security threats may be detected based on any suitable event data indicative of events occurring in the compute environment. For example, based on agent data and/or other data ingested from the compute environment (e.g., log data, etc.), data platform 500 may identify anomalies (e.g., using graphing and/or other techniques that have been described) and/or other types of security threats that meet at least some threshold criteria for possibly relating to an attack. Certain of these detected security threats may be multifaceted security threats detected in any of the ways described above. As has been described, anomalies or other patterns or observations referred to herein as "security threats" may or may not actually be associated with a malicious attack or other intentional attempt to compromise system security. Rather, each detected security threat may meet certain predetermined criteria that indicates a possibility or likelihood that an actual attack is being perpetrated. Accordingly, for every security threat that is detected, there is some probability that the security threat is associated with an actual problem or malicious attack of some kind (i.e., a "true"-positive security threat) and a corresponding probability that the security threat is benign and not indicative of an actual problem or malicious attack (i.e., a "false"-positive security threat). In some cases, this probability may be computed or estimated so that the security threat can be weighted, scored, and prioritized appropriately (i.e., according to how true of a threat it actually represents).

At operation 1204, data platform 500 may reduce the set of detected security threats identified at operation 1202 to form a subset of prioritized security threats. The subset of prioritized security threats may include only those security threats from the overall set of detected security threats that are "prioritized" due to, for example, surpassing a certain weight or score that may be assessed for each threat (e.g., as described above, a weight or score indicative of how likely the threat is to be a true, rather than false, positive threat and/or to represent a significant problem that needs to be investigated). As will be described in more detail below, what it takes for a detected security threat to be included in the prioritized subset at operation 1204 may vary depending on various factors, including, among other factors, how many detected security threats have been identified in the set, how serious those threats are assessed to be, past history of observations and events in the particular compute environment, customer preferences, and/or other factors.

To account for these various factors effectively, operation 1204 may be performed, in certain implementations, using a machine learning model trained based on previous event data indicative of events that occurred previously (e.g., within the same compute environment being monitored, within a different compute environment associated with a different client entity, etc.). For example, the machine learning model may help data platform 500 to accurately assess the danger likely to be posed by each detected threat based on patterns that have been witnessed in the past, as well as to provide contextual insight into when it may be appropriate to err on the side of providing more alerts (e.g., including those likely to be associated with false positive threats) and when it may be appropriate to err on the side of providing fewer alerts (e.g., attempting to reduce all false positive and lower-importance alerts).

In some situations, there may be relatively few detected security threats in the set identified at operation 1202, such that reducing the set to form the prioritized subset does not involve dropping many or any of the detected security threats (i.e., so that the prioritized subset is nearly the same or identical to the set). In other situations, it may be the case that a relatively large percentage of detected security threats identified for the set are deemed to be likely false positives or, even if true, to be relatively low risk in other ways (e.g., part of an attack that is not likely to succeed or be disruptive, etc.). In these situations, the reducing of the set to form the prioritized subset may involve dropping a relatively large number of the detected security threats so that only a few security threats highly likely to be true and high risk are left in the subset. In either case, the machine learning model and the insights it provides based on the previous event data may be useful for drawing the line between prioritized and non-prioritized (or lower priority) security threats.

At operation 1206, data platform 500 may provide security threat alerts for the compute environment in a manner that emphasizes alerts associated with prioritized security threats over alerts associated with other detected security threats of the set of detected security threats (e.g., non-prioritized security threats or those that have been assessed to have lower priority scores than those in the prioritized subset). The alerts provided at operation 1206 may be provided to any of the human or automated users described herein to be responsible for managing the compute environment and investigating security threats based on alerts received as a result of the data platform's monitoring of the compute environment. The alerts may also take any form as may serve a particular implementation (e.g., including any of the forms described herein) and may be presented by way of any suitable interface (e.g., any user interface described herein such as any of the user interfaces described above in relation to FIGS. 11A-11C or the like).

Figure 12B:
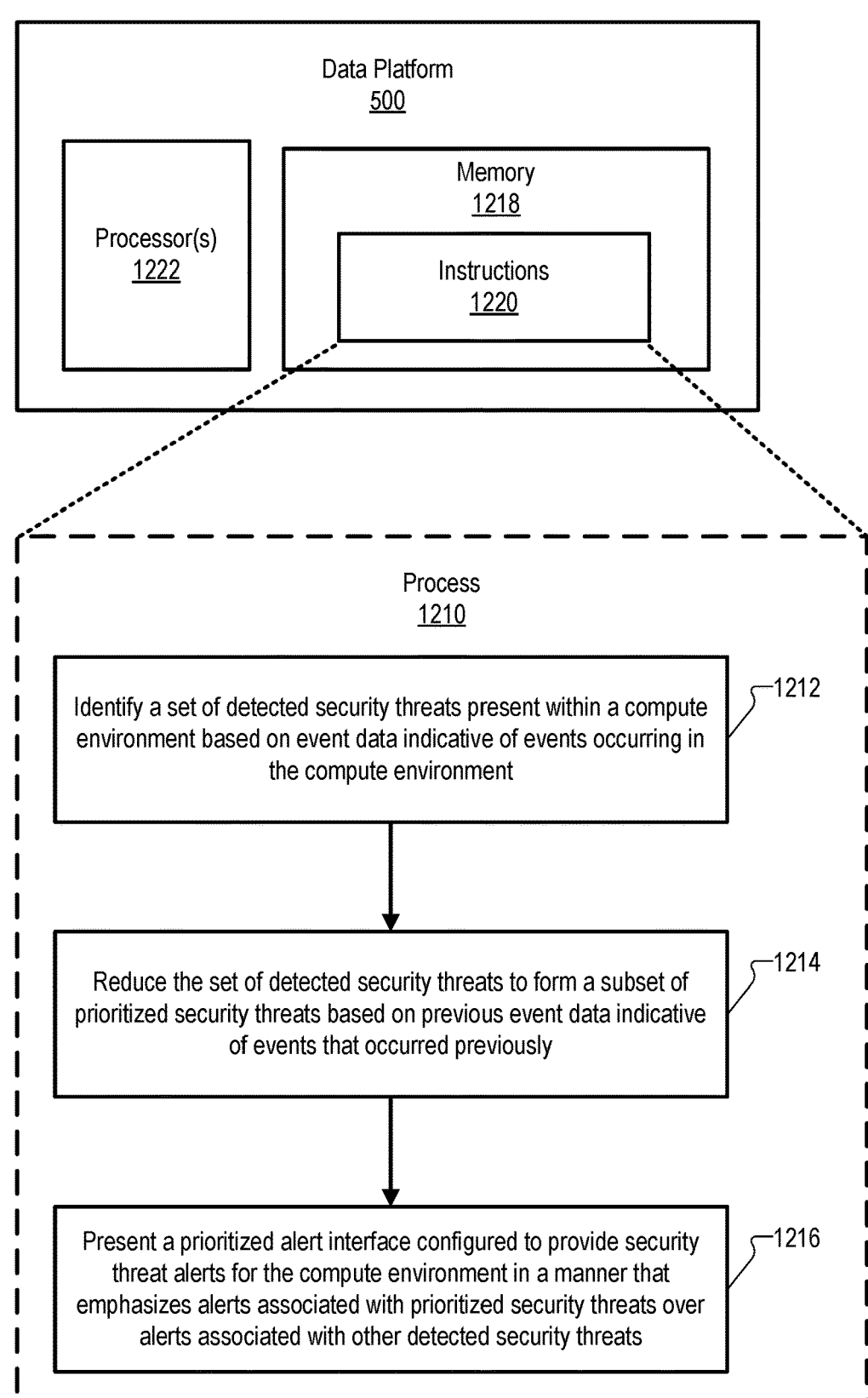
FIG. 12B illustrates an example implementation of a data platform having a processor and a memory that stores instructions for performing a process for managing security threat alerts for a compute environment.

FIG. 12B illustrates another example implementation of data platform 500 that is configured to perform a process 1210 for managing security threat alerts for a compute environment that is similar to method 1200. Specifically, as shown, an operation 1212 of process 1210 may be similar to operation 1202 of method 1200, an operation 1214 of process 1210 may be similar to operation 1204 of method 1200, and an operation 1216 of process 1210 may be similar to operation 1206 of method 1200. In this example, data platform 500 is shown to include a memory 1218 storing instructions 1220, as well as one or more processors 1222 communicatively coupled to memory 1218 and configured to execute instructions 1220 to perform process 1210. Specifically, a processor 1222 may access memory 1218 and load instructions 1220 that cause the processor to perform the operations 1212-1216 of process 1210.

The implementation of data platform 500 shown in FIG. 12B may be implemented by computer resources such as processors, memory facilities, storage facilities, communication interfaces, and so forth, implemented on one or more computing systems described herein. In some examples, system 100 (or components thereof) may be implemented by on-premise server systems, by cloud compute server systems running containerized applications or other distributed software, by some combination of these, or by other suitable computing systems as may serve a particular implementation.

In the generalized representation of data platform 500 shown in FIG. 12B, processor 1222 (which will be understood to represent one or more processors) and memory 1218 may be selectively and communicatively coupled to one another and/or to other resources (e.g., networking and communication interfaces, etc.). In certain embodiments, memory facilities represented by memory 1218 and processors represented by processor 1222 may be distributed between multiple computing systems and/or multiple locations as may serve a particular implementation.

One or more memory facilities represented by memory 1218 may store and/or otherwise maintain executable data used by one or more processors represented by processor 1222 to perform any of the functionality described herein. For example, as shown, memory 1218 may store instructions 1220 that may be executed by processor 1222. Memory 1218 may represent (e.g., may be implemented by) one or more memory or storage devices, including any memory or storage devices described herein, that are configured to store data in a transitory or non-transitory manner. Instructions 1220 may be executed by processor 1222 to cause data platform 500 to perform any of the functionality described herein. Instructions 1220 may be implemented by any suitable application, software, script, code, and/or other executable data instance. Additionally, memory 1218 may also maintain any other data accessed, managed, used, and/or transmitted by processor 1222 in a particular implementation.

Processor 1222 may represent (e.g., may be implemented by) one or more computer processing devices, including general-purpose processors (e.g., central processing units (CPUs), graphics processing units (GPUs), microprocessors, etc.), special-purpose processors (e.g., application-specific integrated circuits (ASICs), field-programmable gate arrays (FPGAs), etc.), or the like. Using processor 1222 (e.g., when the processor is directed to perform operations represented by instructions 1220 stored in memory 1218), data platform 500 may perform functions associated with using machine learning model for managing security threat alerts for a compute environment in accordance with methods and systems described herein and/or as may serve a particular implementation.

As one example of functionality that processor 1222 may perform, FIG. 12B shows process 1210 for machine learning model for managing security threat alerts for a compute environment in accordance with principles described herein. While FIG. 12B shows illustrative operations 1212-1216 according to one implementation, other implementations may omit, add to, reorder, and/or modify any of the operations 1212-1216 shown in FIG. 12B. In some examples, multiple operations shown in FIG. 12B or described in relation to FIG. 12B may be performed concurrently (e.g., in parallel) with one another, rather than being performed sequentially as illustrated and/or described. Each of operations 1212-1216 of process 1210 will now be described in more detail as the operations may be performed by an implementation of data platform 500 (e.g., by processor 1222 executing instructions 1220 stored in memory 1218).

At operation 1212, data platform 500 may identify a set of detected security threats present within the compute environment. For example, the set of detected security threats may be detected in any of the ways described above in relation to operation 1202 or in other ways based on event data indicative of events occurring in a compute environment monitored by the data platform. In some examples, a machine learning model may be employed in the detection of security threats at this stage. For instance, as will be described in more detail below, a machine learning model may help identify connections between different types of events and event data to recognize complex attack patterns in large amounts of data that would be difficult for a human programmer to parse in the same way or to gain the same insights. Certain multifaceted security threats identified within the set of detected security threats, for example, may be based on seemingly disparate events that a machine learning model is able to synthesize into an attack narrative better more productively and accurately than a human would be likely to be able to do.

At operation 1214, data platform 500 may reduce the set of detected security threats identified at operation 1212 to form a subset of prioritized security threats. For example, operation 1214 may be performed based on previous event data indicative of events that occurred previously. In some examples, the reduction of the set to form the prioritized subset may be performed programmatically (i.e., without a machine learning model). In other examples, this reduction of the set of detected security threats at operation 1214 may employ a machine learning model to help form the prioritized subset (e.g., operating similarly as described above in relation to operation 1204).

At operation 1216, data platform 500 may present a prioritized alert interface configured to provide security threat alerts for the compute environment. For example, the prioritized alert interface may be configured to present alerts in a manner similar to that described above in relation to operation 1206, emphasizing alerts associated with prioritized security threats over alerts associated with other detected security threats of the set of detected security threats. Examples of prioritized alert interfaces will be described in more detail below.

Figure 12C:
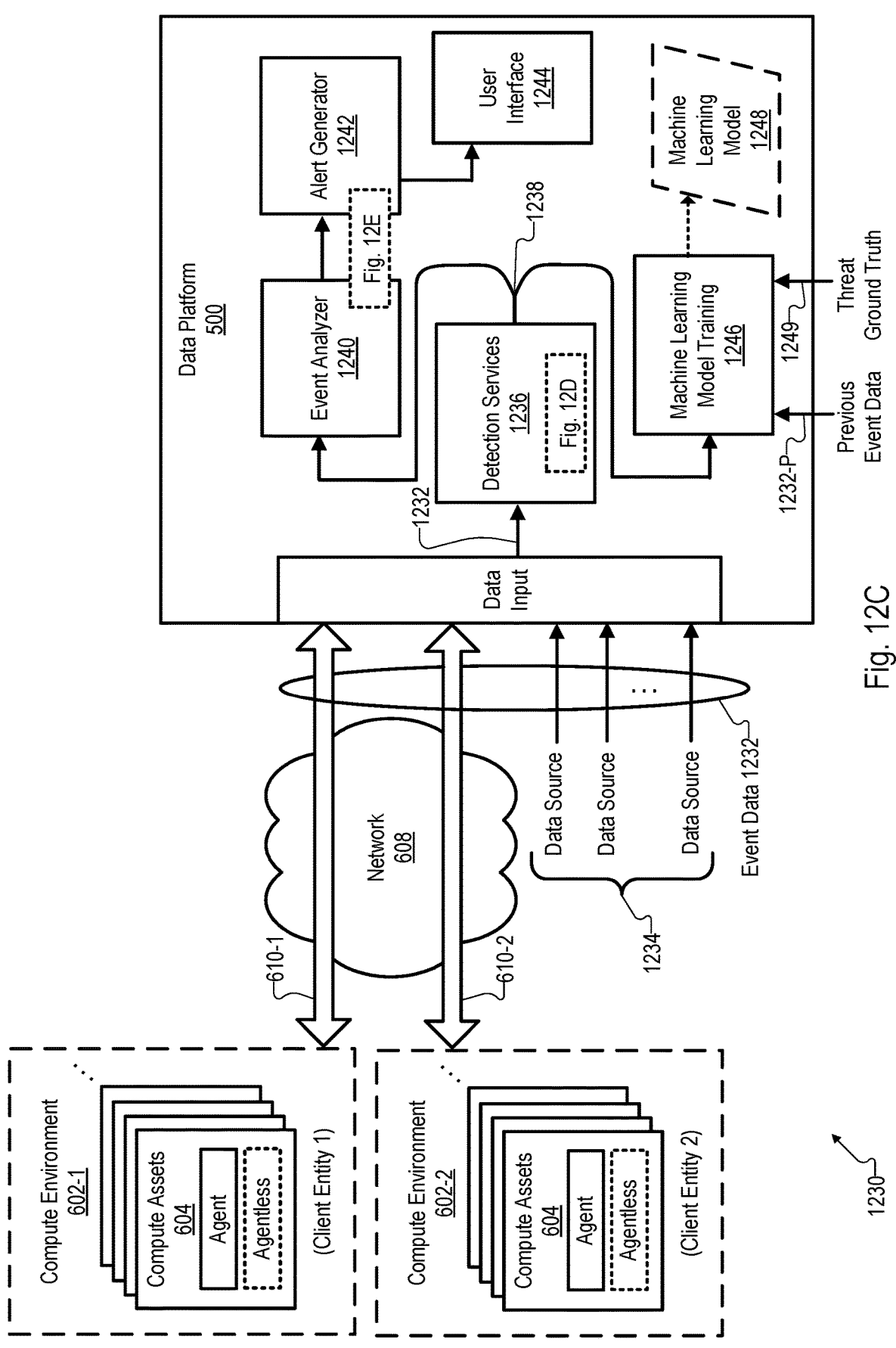
FIG. 12C illustrates an example configuration within which an example implementation of a data platform may perform operations described herein to manage security threat alerts for a compute environment.

FIG. 12C illustrates an example configuration 1230 within which an example implementation of data platform 500 may perform operations described herein to manage security threat alerts for a compute environment.

As shown, configuration 1230 has various similarities with configuration 600 described above, but shows various additional details to illustrate aspects of how security threat management (e.g., particularly by using machine learning models) may be performed. For example, like configuration 600, configuration 1230 shows that the data platform 500 may exchange communications 610 with a compute environment 602 over network 608. However, whereas configuration 600 illustrated a single compute environment 602 being monitored by data platform 500, configuration 1230 shows two distinct compute environments 602 (e.g., a compute environment 602-1 associated with a first client entity ("Client Entity 1") and a compute environment 602-2 associated with a separate client entity ("Client Entity 2")). Each of these compute environments may include a variety of compute assets 604 that engage in communications 610 with the data platform 500 performing security monitoring on them (e.g., communications 610-1 representing communications exchanged with compute assets 604 of compute environment 602-1 and communications 610-2 representing communications exchanged with compute assets 604 of compute environment 602-2).

Configuration 1230 further shows that along with (and/or as part of) communications 610, data platform 500 may receive various types of event data 1232 generated by a variety of data sources 1234. This event data 1232 is shown to be processed by a variety of event detection services 1236 that will be illustrated and described in more detail with respect to FIG. 12D (as indicated by the dotted box labeled "FIG. 12D"). A variety of events 1238 may be identified by these event detection services and these events may be used both by an event analyzer 1240 that identifies events to identify security threats and an alert generator 1242 that generates appropriate alerts to be presented by way of a user interface 1244. The events 1238 may also be used in machine learning model training 1246 to generate a machine learning model 1248 that may be used at least by event analyzer 1240 and alert generator 1242, as will be shown and described in detail with respect to FIG. 12E (indicated in FIG. 12C by the dotted box labeled "FIG. 12E"). The machine learning model training 1246 may be based not only on current events 1238 that are coming in, but also on previous event data (e.g., previous events) that have been analyzed and used in the training set, as well as, in certain examples, certain threat ground truth 1249. Each of the elements of configuration 1230 will now be described in more detail with reference to FIG. 12C as well as to FIGS. 12D and 12E (for the specific elements mentioned above to be indicated by the dotted boxes in FIG. 12C).

Compute environments 602 and the respective compute assets 604 included within each are similar to those described above in relation to FIG. 6. For example, each compute asset 604 may provide communications 610 by way of any type of agent software or other data collection software operating with respect to the compute asset 604, by way of agentless data collection techniques, or by way of a combination of these. A number of different compute assets 604 (shown to be stacked within each compute environment 602 in configuration 1230) may be in communication with one another within the compute environment 602 (e.g., by way of a network such as network 606 of configuration 600, not explicitly shown in configuration 1230). As noted above, one distinction between the different compute environments 602 that are shown (e.g., compute environment 602-1 and 602-2) is that they are associated with different client entities (e.g., Client Entity 1 in the case of compute environment 602-1 and Client Entity 2 in the case of compute environment 602-2). For example, Client Entity 1 (e.g., one customer of services provided by data platform 500) may deploy various software to operate in compute environment 602-1 (e.g., containerized, cloud-based software, etc.), while Client Entity 2 (e.g., another customer of the services being provided by data platform 500) may deploy their own software to operate in compute environment 602-2. In some examples, these compute environments 602 may be separated by geography and/or other distinctions (e.g., the compute assets may be located in different data centers, controlled by different entities, associated with different cloud platforms, etc.). In other examples, these compute environments 602 may not necessarily have such differences (e.g., they may be implemented in the same data center on the same cloud platform, etc.).

Event data 1232 is shown to incorporate various types of data that are received by data platform 500. Event data 1232 may include various types of data described herein to indicate conditions in compute environments being monitored by data platform 500. For example, event data 1232 may include any of the data described to be incorporated by data platform 500 in constructing graphs, detecting anomalies or other security threats, and so forth. As shown, certain event data 1232 may be included in communications 610 from compute environments 602 (e.g., communications 610-1 from compute environment 602-1, communications 610-2 from compute environment 602-2, etc.).

Various generic data sources 1234 (which may be understood to represent compute assets 604 and/or various other sources of data) are also shown in configuration 1230 to source certain event data 1232 which may be received by data platform 500. Data sources 1234 providing event data 1232 may be implemented by a plurality of distinct data sources associated with compute environments 602 (and/or other compute environments associated with other client entities, in certain examples). As such, event data 1232 provided by these data sources 1234 may include various types of agent data (e.g., data collected by agent software deployed to the compute environments for the purpose of collecting event data) from various compute assets and environments. For example, agent data may include event data reported from user-space agents, kernel (e.g., driver-based or eBPF-based) agents, sub-kernel components operating below a kernel (such as in a hypervisor, etc.), or the like. Additionally, along with these agent data examples from agents deployed into compute environments 602 by data platform 500 or by an entity associated with data platform 500, certain generic agent data may be provided from agent software operating in compute environments 602 that was not deployed by data platform 500, nor has any particular relation to data platform 500. For instance, instead of agent software developed by an entity managing data platform 500, other agent software providing event data 1232 may be developed and managed by a provider of compute assets 604 (e.g., a cloud provider, etc.) or another third-party entity that is trusted to deploy software to compute assets 604 within compute environments 602.

Along with agent-based data described above, various data sources 1234 may also provide event data 1232 that includes agentless data from various compute assets and environments (e.g., log data provided by cloud platform providers such as CloudTrail data provided by AWS, etc.), customer preference data or other parameters provided by the client entities (e.g., provided by way of user interface 1244 or stored in the respective compute environments 602, etc.), baseline data for agents or software applications (e.g., information about what data is expected to be collected in the compute environments if there is not anomalous activity or other security threats), and so forth.

Figure 12D:
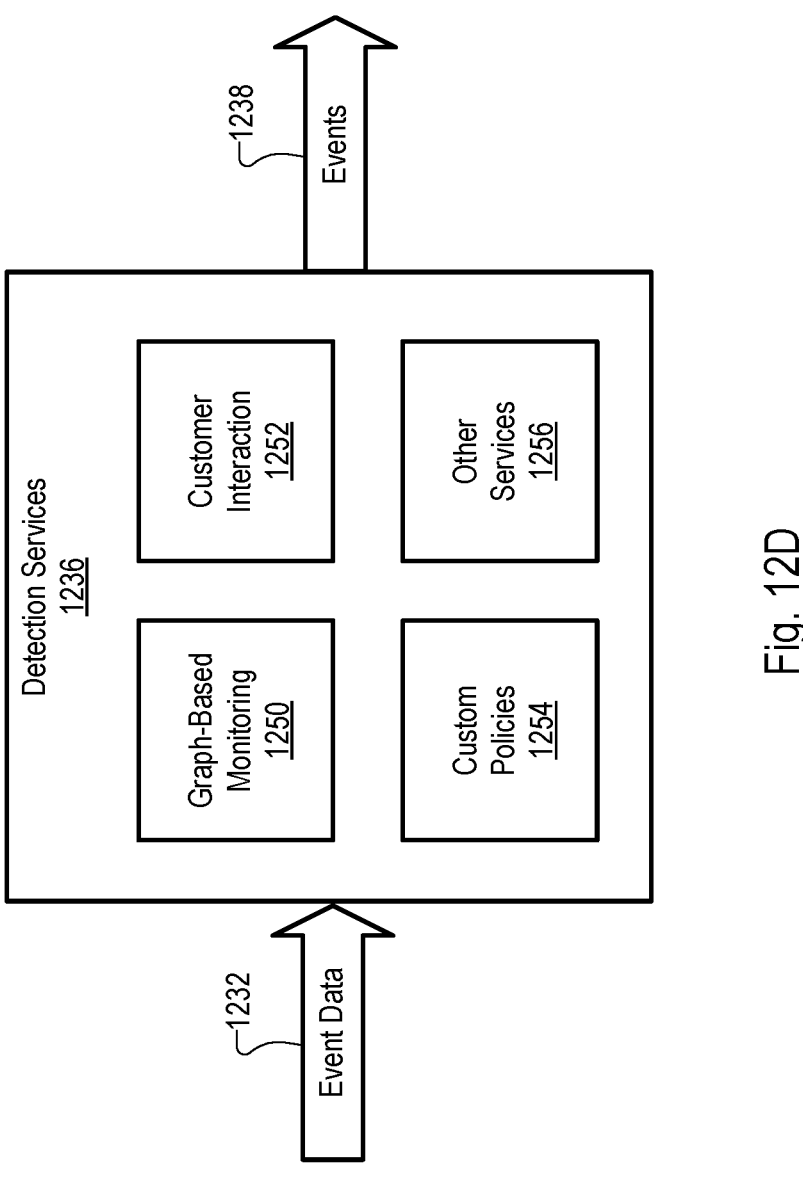
FIG. 12D illustrates example detection services that may be performed by the data platform illustrated in FIG. 12C.

As shown, the various event data 1232 from the various data sources 1234 may be input to data platform 500 by way of one or more appropriate communication interfaces (labeled "Data Input" in FIG. 12C) and then provided to a variety of detection services 1236 that are configured to process the event data to identify a plurality of events 1238 that may be further processed and analyzed by downstream components such as machine learning model training 1246 and events analyzer 1240 (described in more detail below). Detection services 1236 may include any of the event detection services described herein. To offer a few examples, FIG. 12D shows several illustrative detection services 1236 that may be performed by data platform 500. Specifically, as shown, FIG. 12D shows event data 1232 being input to detection services 1236, as well as events 1238 being output after being processed by any of several individual services or a combination of services. The detection services 1236 shown in FIG. 12D include a graph-based monitoring service 1250, a customer interaction service 1252, a custom policies service 1254, and other services 1256.

These illustrated event detection services may each be understood to represent data services that have been described herein. For example, graph-based monitoring service 1250 may represent a service configured to construct any of the graphs (e.g., polygraphs, etc.) described above to be used for identifying anomalies and other security threats. Graph-based monitoring service may be configured, for example, to construct a graph based on event data 1232. As in various examples above, the graph may include a plurality of nodes connected by a plurality of edges, where each node of the plurality of nodes represents a logical entity and each edge of the plurality of edges represents a behavioral relationship between nodes connected by the edge. As the graph is continuously constructed over time, event data 1232 becomes previous event data, such that it may be said that the graph constructed by graph-based monitoring service 1250 is based on previous event data and is being updated by current event data. As will be described in more detail below, the graph constructed by graph-based monitoring service 1250 may be used by machine learning model training 1246 to train machine learning model 1248.

Another detection service 1236 shown in FIG. 12D is customer interaction service 1252. Different types of event data were mentioned above as being provided by a client entity associated with a particular compute environment (e.g., by storing parameters in the compute environment, by indicating preferences by way of user interface 1244, etc.). Customer interaction service 1252 may be configured to account for these types of data by setting parameters for how other types of event data are to be processed and analyzed (e.g., what types of threats are of most interest to the client, what types of event data are considered most important, what types of events can generally be ignored, what custom combinations of events the client would like to correlate and monitor as known multifaceted security threats, etc.) or in other suitable ways.

Custom policies service 1254 may allow a user of data platform 500 (e.g., a client entity overseeing the security monitoring of their compute environment) to create custom queries and policies into certain types of event data (e.g., log data, trail data, etc.). In this way, when certain combinations of conditions are detected to be present in the compute environment, a custom policy or other indication can be triggered by an event 1238. Tools such as Lacework Query Language may be used to construct custom policies and queries analyzed by service 1254. Other services 1256 will be understood to represent other data services not already mentioned in relation to detection services 1236 that a data platform may be configured to provide. These other services 1256 may include any other data services described herein or as may serve a particular implementation.

Returning to FIG. 12C, events 1238 are shown to be used by machine learning model training 1246 to train machine learning model 1248. Along with events 1238, machine learning model training 1246 is further shown to be based on previous event data 1232-P ('P' for "previous"), which will be understood to represent data previously processed by detection services 1236 to produce previous events (events that occurred at an earlier time and have already been incorporated into the training set). Certain data indicative of what events have ultimately turned out to be actionable security threats for which monitoring is desirable may also be accounted for in some examples, as shown by threat ground truth 1249.

Machine learning model training 1246 may be performed based on a training set comprising any of the types of data shown to be input to machine learning model training 1246 and using any machine learning model training techniques as may serve a particular implementation. For example, machine learning model 1248 may be tuned and refined continually over time as event data is observed to correlate with various types of security threats, and as those security threats are ultimately detected to correspond (or to not correspond) to certain types of security issues of varying levels of importance (e.g., some threats ultimately being completely benign, some threats associated with actual malicious attacks that are potentially very harmful, and some threats falling between these extremes).

Data platform 500 may identify the set of detected security threats using the trained machine learning model 1248. For example, machine learning model 1248 may be used to designate composite events including two or more affiliated events that occur in one of compute environments 602. The trained machine learning model 1248 may identify composite events as detected security threats to be included in the set of detected security threats. As event data 1232 continues being received and new events 1238 continue to be provided by detection services 1236, data platform 500 may discover connections and relationships between the events that may further influence machine learning model training 1246. For example, data platform 500 may discover an affiliation between two or more of events 1238 occurring in the compute environment, a correlation of one or more of events 1238 occurring in compute environment 602 with a multifaceted security threat, or various other relations or connections between events 1238. Upon discovering this affiliation, correlation, or other such relation, data platform 500 may update, based on the discovering, the training 1246 of machine learning model 1248 to incorporate that affiliation, correlation, or other discovered connection. In this way, machine learning model 1248 may be kept continuously up to date with the latest attack patterns and security threats that may be putting the compute environments at risk. In this way, data platform 500 improves over time in its ability to identify important security threats, deemphasize false positives, and generally provide highly relevant alerts to users overseeing the security of their respective compute environments.

In some examples, machine learning model 1248 may be trained based only on a single compute environment associated with a single client entity. Such a machine learning model may be specialized to the types of security threats that tend to be observed in that compute environment and may be well-attuned to user preferences of the client entity (e.g., in terms of what alerts are considered to be more helpful or less helpful, etc.). In other examples, machine learning model 1248 may be trained based on multiple compute environments so as to imbue the machine learning model with more general insight into the types of security threats that may be encountered in a variety of situations (e.g., in different types of compute environments associated with different types of client entities). For example, as mentioned, compute environment 602-1 may be associated with a first client entity (Client Entity 1), compute environment 602-2 may be associated with a second client entity (Client Entity 2) distinct from the first client entity, and the event data on which the machine learning model training is based (e.g., events 1238, previous event data 1232-P, etc.) may include cross-client event data indicative of events that are occurring or occurred previously in both compute environments 602-1 and 602-2. A more robust profile of various types of composite events, multifaceted security threats, and so forth may be constructed within machine learning model 1248 in this way, since, even when it is difficult to specify what threats certain applications and assets may attract, the specification may be inferred for one client entity by observing behavior across compute assets of other client entities.

In some implementations, machine learning model training 1246 may be configured to calibrate machine learning model 1248 based on an isotonic regression procedure. For example, certain classifiers may provide a numerical score (e.g., between 0 and 1) that reflect the likelihood that proposed composite events, generated alerts, or other decisions made under the influence of machine learning model 1248 are associated with true positive threats or false positive threats. This score can then be calibrated (e.g., by isotonic regression) to represent a probability that the composite event or alert reflects an attack or other intrusion or true-positive threat.

Along with facilitating the identification of the set of detected security threats (e.g., by helping correlate events into composite events, helping tie individual and/or composite events to multifaceted security threats, staying up-to-date even as new types of threats and attacks emerge, etc.), machine learning model 1248 may be further trained to facilitate narrowing down the set of detected security threats to form a relevant and helpful subset of prioritized security threats. For example, one way of doing this, as has been mentioned, is by helping sort true and false positive threats that may be encountered together and may be difficult to distinguish using predesignated rules or programmatic algorithms.

Having machine learning model 1248 trained using cross-customer event data (i.e., event data from multiple compute environments associated with multiple client entities) may also be helpful for this event prioritization function, since a machine learning model 1248 trained in accordance with cross-customer event data may be well-positioned to provide various insights. For example, a machine learning model trained on cross-customer data may provide insight about whether false-positive threats encountered in one environment are likely to still be considered falsely positive if encountered in other compute environments. Moreover, insight about the relevance of particular events or detected threats in specific or general contexts may be valuable for the machine learning model to provide.

To provide the various insights that have been described and/or to facilitate event/alert prioritization in ways set forth above, event analyzer 1240 and/or alert generator 1242 may use an implementation of machine learning model 1248 that is trained in accordance with principles described herein (e.g., by machine learning model training 1246). As mentioned above, FIG. 12E shows how these functions operate and benefit from the machine learning model 1248 in more detail than is shown in FIG. 12C.

Figure 12E:
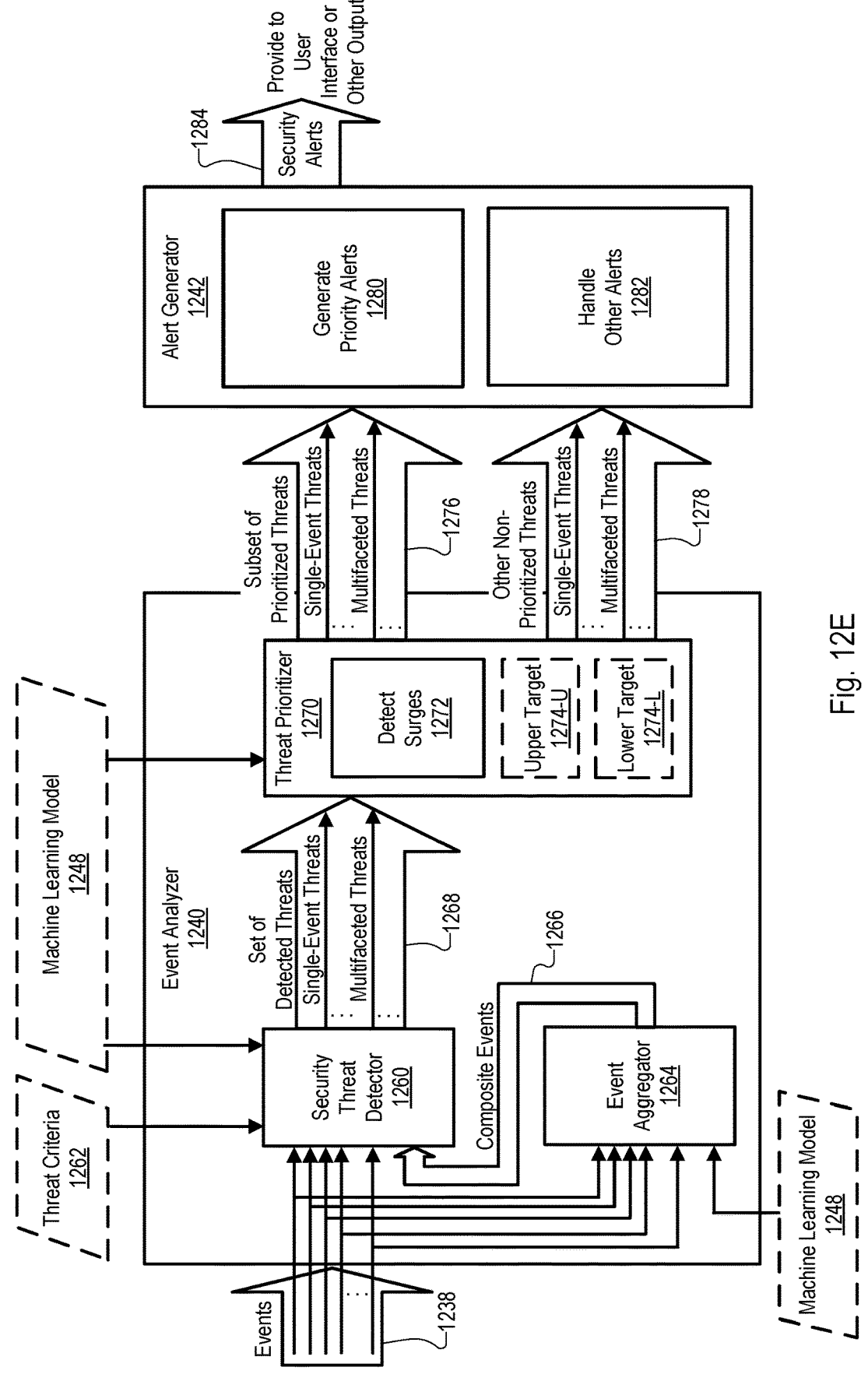
FIG. 12E illustrates example implementations of an event analyzer and an alert generator that may be incorporated within the data platform illustrated in FIG. 12C.

FIG. 12E shows various events 1238 that are received as input to event analyzer 1240 as described above. As shown, events 1238 may be used within event analyzer 1240 by a security threat detector 1260 that may be informed by (e.g., configured to perform analysis and/or make decisions based on) certain threat criteria 1262 and an implementation of machine learning model 1248. Events 1238 are also shown to be used, at least in certain implementations, by an event aggregator 1264 within event analyzer 1240. Event aggregator 1264 may be informed by the same or another implementation of machine learning model 1248 and may be configured to aggregate individual events 1238 to form composite events 1266 that are further analyzed (along with individual events 1238) by security threat detector 1260. Security threat detector 1260 is shown to generate a set of detected threats 1268 (which may include both single-event threats and multifaceted security threats) that is then provided to a threat prioritizer 1270, what is also informed by the machine learning model 1248. Threat prioritizer 1270 is shown to include a facility that detects surges (detect surges 1272). Threat prioritizer 1270 is also shown to perform its threat prioritization function in accordance with one or more threat targets 1274, including an upper target 1274-U and a lower target 1274-L. Threat prioritizer 1270 is shown to sort the set of detected threats 1268 into various subsets of threats, including at least a subset of prioritized threats 1276 and a subset of other non-prioritized threats 1278, all of which may be provided to alert generator 1242. Alert generator 1242 is then shown to include both a facility that generates priority alerts (generate priority alerts 1280) and a facility that handles other, non-priority alerts (handle other alerts 1282). Alert generator 1242 provides security alerts 1284 to user interface 1244 and/or to one or more other destinations configured to receive this output of the alert generator. Certain elements illustrated in FIG. 12E have been described above (e.g., events 1238, machine learning model 1248, etc.). Other elements illustrated in FIG. 12E will now be described to provide a more detailed accounting of this particular implementation of event analyzer 1240 and alert generator 1242.

Security threat detector 1260 is one of several elements shown in event analyzer 1240 to be configured to use machine learning model 1248. As shown, security threat detector 1260 may analyze individual events from various detection services (e.g., events 1238) as well as composite events 1266 (provided by event aggregator 1264, as described below) to identify the set of detected security threats 1268 present in the compute environment. For example, security threat detector 1260 may perform or facilitate operations 1202 and/or 1212 in accordance with principles described above. In some examples, the set of detected threats 1268 may comprise a large number of security threats including, possibly, some threats that are high risk and likely to represent an actual attack or to pose a real problem (true-positive security threats) as well as including a variety of threats that are unlikely to represent any actual threat or to pose any real problem for the compute environment (false-positive security threats). As shown, some of the detected threats in the set of detected threats 1268 may be associated with individual events 1238 and/or with composite events 1266 (which, as described in more detail below, may be associated with relevant patterns of individual events that can be programmatically recognized or recognized based on machine learning model 1248).

In some examples, each detected threat identified by security threat detector 1260 may satisfy certain threat criteria 1262. These criteria may be predetermined (e.g., based on machine learning) and/or may be predesignated programmatically based on expert knowledge or previously identified threats. As mentioned above, it will be understood that various threats may be detected and included in the set of detected threats 1268 despite these threats ultimately not being a danger to the compute environment or associated with any actual problem or attempt to compromise the compute environment. Each of the detected threats may, however, at least satisfy whatever predetermined threat criteria 1262 have been designated. At this stage, it may be desirable to be overinclusive and to exercise an abundance of caution (i.e., to have a relatively low bar for what is identified as a security threat), whereas at later stages (e.g., at threat prioritizer 1270 and alert generator 1242) it may be desirable to be more selective and to scrutinize the security threats more carefully so as not to overwhelm the user interface with too many alerts. Accordingly, as described above, a "security threat" (including any of the detected security threats in the set of detected threats 1268) may refer to any individual event, composite event, or combination thereof that is detected to satisfy threat criteria 1262, even if these "security threats" are ultimately determined to not pose any significant or actionable problem to the system's security or integrity.

Event aggregator 1264 is another of the elements shown in event analyzer 1240 that may be configured in certain implementations to use machine learning model 1248. For example, event aggregator 1264 may facilitate the identifying of the set of detected security threats 1268 using machine learning model 1248 by designating composite events 1266 that include two or more affiliated events 1238 occurring in the compute environment (so that security threat detector 1260 may then identify such composite events 1266 as detected security threats to be included in the set of detected security threats 1268, as described above). Informed by machine learning model 1248, event aggregator 1264 may identify significant combinations of events 1238 and may aggregate these to form individual composite events 1266 that include both a first event 1238 and a second event 1238 that are detected (e.g., based on machine learning model 1248) to have any type of affiliation with one another as has been described. For example, the affiliation between events 1238 in a composite event 1266 may be relate to a known multifaceted security threat that both events are known to be associated with (e.g., as evidence items such as described above). Accordingly, as shown, both the set of detected threats 1268 and the subset of prioritized threats 1276 may include one or more multifaceted security threats detected to be present within the compute environment based on composite events 1266 that are formed by event aggregator 1264. It will be understood that in other implementations, machine learning model 1248 may not be used for this linking of events. Rather, heuristics may be used to predict appropriate links or affiliations for composite events, while machine learning may be employed only further downstream where the composite events are assessed and scored in ways described below.

In some examples, the affiliation between individual events 1238 in a given composite event 1266 may be based on a detected affiliation between entities that initiate the individual events 1238. For example, if a first event included within a particular composite event 1266 is initiated within the compute environment by a first entity and a second event included within the particular composite event 1266 is initiated within the compute environment by a second entity, the affiliation with one another (which event aggregator 1264 may detect that the first and second events have) may be based on an affiliation between the first entity and the second entity. For instance, event aggregator 1264 may identify affiliations between entities in the ways described above (e.g., in relation to FIG. 9C, etc.). In some examples, individual events 1238 may be aggregated to form composite events 1266 only if entity affiliations between the events can be detected (e.g., only if the events are initiated by the same entity or by ostensibly separate entities that are determined to actually be affiliated with one another in ways described herein).

As mentioned above, certain events may be determined (e.g., based on insight incorporated into machine learning model 1248) to be relatively benign (low risk) when encountered in one context while being more significant in another context. For instance, a first event may be considered relatively harmless unless a second event is also detected, in which case the first event may be indicative of a more high-risk threat to system security. Accordingly, when security threat detector 1260 analyzes a particular composite event 1266 to identify the set of detected security threats 1268 based on threat criteria 1262, at least one of the first event or the second event included in the particular composite event 1266, standing alone, may fail to satisfy the predetermined threat criteria, even though the particular composite event 1266 (the aggregate of the first and second events) may satisfy the one or more predetermined threat criteria 1262. For instance, the first event may fail to satisfy threat criteria 1262 standing alone, the second event may succeed at satisfying threat criteria 1262 standing alone, and the composite event including these two events may be determined to satisfy threat criteria 1262 by virtue of the second event satisfying the criteria. In this case, the first event may boost the overall risk level determined for the composite event (i.e., so that the composite event is assessed as being higher risk than the second event standing alone) or may have a neutral effect on the overall risk level of the composite event (i.e., so that the composite event is assessed as having the same risk as the second event standing alone). As another example, both the first and second events, standing alone, may fail to satisfy threat criteria 1262 and only when aggregated into a composite event 1266 do these events succeed at satisfying threat criteria 1262 such that the composite event is incorporated in a detected threat in the set of detected threats 1268. In yet another example, both the first and that second event may satisfy threat criteria 1262 standing alone, such that aggregating these produces a composite event 1266 that also satisfies threat criteria 1262 (and is determined to be associated with at least as much risk as either of the first or second events).

By setting threat criteria 1262 such that security threat detector 1260 only identifies certain events as detected threats when included in combination with other events, event analyzer 1240 may limit the size of the set of detected threats 1268 that is produced. Such events may hence not be capable of triggering any alert if standing alone and may only add to the potential set of security alerts provided to the user interface if they are part of composite events known to present a threshold degree of risk. A user presented such a risk on the user interface would still be able to dig down, investigate, and learn more about these individual events when they occur (e.g., using user interfaces described herein), but they may not be surfaced or brought to the user's attention if not observed in a context where the events actually have a threshold likelihood of presenting real risk to the compute environment.

Threat prioritizer 1270 is yet another of the elements shown in event analyzer 1240 to be configured to use machine learning model 1248. For example, threat prioritizer 1270 may perform or facilitate reducing the set of detected security threats 1268 to form the subset of prioritized security threats 1276. For example, threat prioritizer may perform or facilitate operations 1204 and/or 1214 in accordance with principles described above. In some examples, threat prioritizer 1270 may perform a sorting function wherein each detected threat of the set of detected threats 1268 in grouped into either the subset of prioritized threats 1276 or the subset of other non-prioritized threats 1278 (or into one of multiple subsets of non-prioritized threats that are organized into tiers based on risk or another suitable basis). This prioritization function performed by threat prioritizer 1270 may be performed in any suitable way and based on any suitable criteria. For example, each of the detected threats may be assessed and assigned a weight (e.g., a risk metric representative of a likelihood that the detected threat is associated with an attack or other true-positive threat) and these weights may be used to select certain detected threats (e.g., those with the highest weights) for the subset of prioritized threats 1276.

In some examples, a predetermined range may dictate or influence the size of the subset of prioritized threats 1276 (i.e., the number of detected threats that are designated as being prioritized and which will ultimately be used to generate priority alerts that are to be presented to users and investigated further). For example, it may be determined that, for a particular compute environment and/or a particular client entity, it is desirable for a user to receive at least a lower target 1274-L quantity of alerts in a certain period (e.g., at least 2 alerts per day). If the user were alerted to fewer than this lower target 1274-L, for example, the user may begin to lose confidence that the data platform is operational and properly performing its security monitoring function. Accordingly, in this example, the reducing of the set of detected security threats 1268 to form the subset of prioritized security threats 1276 may be performed in accordance with a lower alert quantity target (e.g., lower target 1274-L) that is configured to ensure that a number or rate of security threat alerts being provided is at least equal to the lower alert quantity target.

Additionally or alternatively, it may be determined that, for the particular compute environment and/or the particular client entity, it is desirable for the user to receive no more than an upper target 1274-U quantity of alerts in a certain period (e.g., no more than 10 prioritized alerts per day). If the user were alerted to more than this upper target 1274-U, for example, the user may be overwhelmed by trying to further investigate each of these and may be forced or motivated to ignore certain alerts that are presumed to be associated with less risk than others. Accordingly, in this example, the reducing of the set of detected security threats 1268 to form the subset of prioritized security threats 1276 may be performed in accordance with an upper alert quantity target (e.g., upper target 1274-U) that is configured to limit a number or rate of security threat alerts being provided to a number or rate less than the upper alert quantity target.

In some implementations, only one of these alert quantity targets may be employed (either the upper or lower alert quantity targets but not both). In other implementations, neither or both alert quantity targets may be employed. For instance, if both alert quantity targets are employed by a particular threat prioritizer implementation, the threat prioritizer would consistently output a number or rate of prioritized threats that falls into a desirable range between the alert quantity targets (e.g., between 2 and 10 prioritized threats per day regardless of the number or rate of security threats that are detected to meet threat criteria 1262). In this way, a relatively steady stream of security alerts 1284 may be provided for further investigation to a human user so that the user never receives so few alerts as to wonder if the data platform is still performing the security monitoring, nor receives so many alerts as to be overwhelmed and unable to know which ones to exert investigational resources on (e.g., to spend time looking into).

It will be understood that the range desirable for different compute environments and/or client entities may vary depending on various factors. Accordingly, in certain examples, a user may set a parameter that indicates directly or indirectly what upper and/or lower alert quantity targets are most helpful to that user given their particular circumstances (e.g., skill level, resources, etc.). In other examples, it may be desirable for the data platform to provide a comfortable number and rate of alerts without the user needing to set such parameters. As such, the range formed by targets 1274 (i.e., lower target 1274-L and upper target 1274-U) may not be customizable (e.g., may be set automatically for the compute environment based on machine learning from past experience with the compute environment and/or associated client entity) or may be customizable with a parameter that is set to a default value that is determined to be reasonably optimal for most compute environments and/or client entities.

In some examples, threat prioritizer 1270 may detect a surge of a particular type of detected security threat within the compute environment. For example, as indicated by detected surges 1272, a facility of threat prioritizer 1270 may determine that an abnormal or unexpected number of detected threats is suddenly included in the set of detected threats 1268. If this surge were in response to an attack being launched on the compute environment, the surge of threats would be assessed and prioritized in the usual way, as has been described above. In certain cases, however, the surge may be of a character that is unlikely to represent an actual surge of true-positive threats posing real risk to the compute environment. For example, as machine learning model 1248 evolves in the ways described herein and as the algorithm by which security threat detector 1260 operates changes, a sudden surge of detected threats may be indicative of an undesirable change to the algorithm rather than indicative of security issues in the system. Accordingly, further investigation of the surge of detected security threats (e.g., by a human technician, automated process, etc.) may be triggered when a surge is detected and the reducing of the set of detected security threats 1268 to form the subset of prioritized security threats 1276 may be performed in response to the detecting of the surge. In some examples, a reduction of the detected security threats triggered in this way may be performed by at least partially excluding the particular type of detected security threat (i.e., the type of threat that is detected to form the surge of threats) from the subset of prioritized security threats 1276. That is, until the further investigation into the surge can be performed, the particular type of security threat may be de-prioritized and not surfaced in security alerts (since it is likely to be the result of an ill-conceived algorithm change rather than an actual attack or other security issue).

Alert generator 1242 may receive at least the subset of prioritized threats 1276 and, in certain examples such as shown in FIG. 12E, may further receive one or more other subsets of non-prioritized threats 1278. Based on this input, alert generator 1242 may provide security threat alerts for the compute environment in a manner that emphasizes alerts associated with prioritized security threats over alerts associated with other detected security threats of the set of detected security threats, as described above, for instance, in relation to operations 1206 and 1216. To illustrate, FIG. 12E shows that alert generator 1242 includes facilities configured both to generate priority threat alerts ("Generate Priority Alerts 1280"), and to handle other, non-priority threat alerts ("Handle Other Alerts 1282") in any manner as may serve a particular implementation.

In a first type of implementations, the providing of the security threat alerts in the manner that emphasizes alerts associated with prioritized security threats over alerts associated with other detected security threats may include: 1) providing security threat alerts 1284 associated with the subset of prioritized security threats 1276, and 2) abstaining from providing security threat alerts 1284 associated with detected security threats excluded from the subset of prioritized security threats (e.g., the subset of other non-prioritized threats 1278). In this type of example, the subset of non-prioritized security threats 1278 may not be provided from event analyzer 1240 to alert generator 1242 or may be provided but dropped or only revealed under certain circumstances (e.g., when a user indicates a desire to see lower-priority alerts).

In other types of implementations, the providing of the security threat alerts in the manner that emphasizes alerts associated with prioritized security threats over alerts associated with other detected security threats may include: 1) providing a high-priority tier of security threat alerts 1284 associated with the subset of prioritized security threats 1276, and 2) providing one or more low-priority tiers of security threat alerts 1284 associated with detected security threats excluded from the subset of prioritized security threats (e.g., the subset of other non-prioritized threats 1278). In this type of example, the subset of non-prioritized security threats 1278 may be provided from event analyzer 1240 to alert generator 1242 and may even be used to generate security alerts 1284. However, these security alerts 1284 may be designated to be lower in priority than the priority alerts associated with the subset of prioritized security threats 1276. As such, a user presented with the potential large number of high and low security alerts 1284 may easily identify which alerts should be granted more attention and resources and which one may more safely be ignored or given only cursory attention.

FIG. 12E shows that security alerts 1284 may be provided to a user interface or other output. For example, returning to FIG. 12C, the output of alert generator 1242 is shown to be provided to user interface 1244. User interface 1244 may be implemented by any of the user interfaces described herein to perform any interfacing functionality as has been described or as may serve a particular implementation. For instance, in certain examples, the user interface could provide different panes to indicate prioritized alerts (e.g., a pane labeled "Attack") and non-prioritized alerts (e.g., a pane labeled "Benign"). By clicking on alerts presented in such panes, a user may investigate evidence items (e.g., individual events, composite events, etc.) that led to the alert being generated in any of the ways described and/or illustrated above. In some implementations, the evidence items presented for a given multifaceted security threat may be ordered in the user interface to indicate what events or threat criteria weighed most heavily in identifying the threat. In this way, user interface 1244 may facilitate an investigation into the question of what the most important reasons are for a particular multifaceted security threat to be identified. The evidence items supporting the detection of any multifaceted security threat or other security threat presented in user interface 1244 may be ranked and explicated (e.g., with text, examples, remedial recommendations, etc.) in any manner described above or as may serve a particular implementation.

As described above, a data platform may be configured to detect disparate events occurring within a compute environment and identify affiliations between the events (e.g., between the events themselves, between the entities responsible for initiating the events, etc.). The data platform may use event analyzers to analyze and consolidate the events to generate composite events indicative of multifaceted security threats within the compute environment. As further described above, the data platform may implement machine learning models to manage security threat alerts for a compute environment. For example, a machine learning model may be configured to help to identify connections between events (e.g., individual or composite events) and any possible security threats (e.g., multifaceted security threats) that the events may indicate.

Additional details regarding various ways in event analyzers may be used to manage security threat alerts for a compute environment will now be described. For example, a set of event analyzers within a data platform may be organized into a set of processing stages. An initial processing stage of event analyzers may receive event data as input and output a set of output signals (e.g., composite events). The set of output signals may be input for further processing stage of event analyzers and so forth until a final processing stage outputs a composite alert signal. As will be described in more detail, any combination of event analyzers may implement machine learning models such as generative artificial intelligence (gen-AI) models to generate output signals.

This multi-stage composite event processing may provide various benefits and advantages (including those already mentioned) as the data platform performs security monitoring functions for different types of compute environments. For example, a multi-stage approach to analyzing event data may allow different combinations of signals (e.g., signals representative of different events) to be analyzed using machine learning models and/or logic specifically configured for the different combinations of signals, which in turn may allow for more precise generation and explanation of composite alerts. Using appropriately configured machine learning models may also reduce a potentially large number of false positive alerts that could otherwise be produced and cause alert fatigue in users. In some situations, a processing stage may implement machine learning models and/or logic (e.g., a large language model) specifically configured to generate contextual information based on a composite alert signal. This may allow for informative and explanatory information that may help users appropriately respond to a security alert while reducing usage of resources (e.g., by reducing investigation and remediation time).

Figure 13:
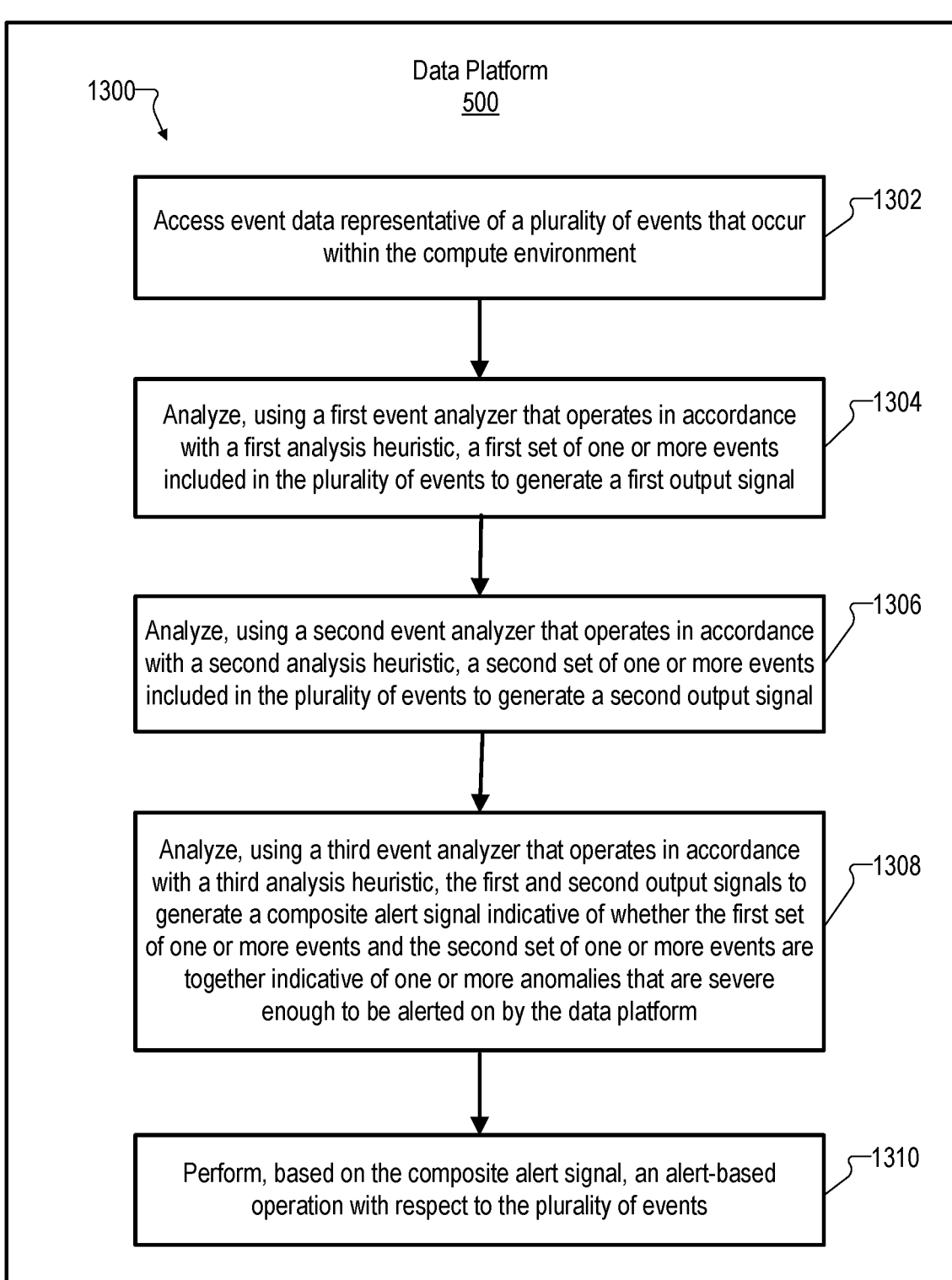
FIG. 13 illustrates an example data platform configured to perform an illustrative method for multi-stage composite event processing for a compute environment.

FIG. 13 illustrates an illustrative method 1300 where data platform 500 may be configured to perform multi-stage composite event processing for a compute environment. As shown, method 1200 (also referred to as a process 1200) may include a plurality of operations 1302-1310, each of which may be performed, in full or in part, by data platform 500 or components thereof, as will be described in more detail below.

While method 1300 shows illustrative operations according to one implementation, other implementations may omit, add to, reorder, and/or modify any of the operations shown in method 1300. In some examples, multiple operations shown in method 1300 may be performed concurrently (e.g., in parallel) with one another, rather than being performed sequentially as illustrated and/or described. One or more of the operations shown in method 1300 may be performed by data processing resources (e.g., data processing resources 20 of data platform 12), user interface resources (e.g., user interface resources 22 of data platform 12), communication resources, and/or other suitable computing resources of data platform 500.

The operations of method 1300 may be performed prior to, in parallel with, or subsequent to other operations described above to be performed by data platform 500. For example, the operations of method 1300 may be performed before, during, or after data platform 500 performs processes such as processes 502 or 512 or constructs a graph (e.g., a polygraph) with respect to event data received from agents and/or ingested in other ways described herein. Each of operations 1302-1306 of method 1300 will now be described in more detail as the operations may be performed by computing resources of data platform 500 as data platform 500 monitors a compute environment.

At operation 1302, data platform 500 (e.g., computing resources operating on the data platform) may access event data representative of a plurality of events that occur within a compute environment (e.g., compute environment 602). Data platform 500 may be configured to monitor the compute environment to access the event data. The event data may include any data indicative of any suitable type of event occurring in the compute environment, such as security events associated with the compute environment, system events associated with the compute environment, application events associated with the compute environment, database events associated with the compute environment, and/or error events associated with the compute environment. For example, the event data may include data indicating a request by an unknown entity to access a compute asset (e.g., compute asset 16-1) at a cloud environment (e.g., cloud environment 14) associated with data platform 500. In some embodiments, the event data may be associated with one or more anomalies and/or other types of security threats occurring within the compute environment. The event data may be collected using any suitable data collection configuration, such as a configuration of one or more agents (e.g., at compute asset 604-1) and/or an agentless configuration (e.g., at compute asset 604-2).

At operation 1304, data platform 500 may analyze, using a first event analyzer that operates in accordance with a first analysis heuristic, a first set of one or more events included in the plurality of events to generate a first output signal. The first event analyzer may be implemented by any of the event analyzers described herein, such as event analyzer 704.

The first analysis heuristic may be implemented by any suitable model and/or algorithm. The first analysis heuristic may configure the first event analyzer to analyze event data according to any of the methods and/or processes described herein. For example, the first event analyzer may determine if any events within the first set of one or more events are affiliated with one another. The first event analyzer may combine multiple events (e.g., affiliated events) within the first set to generate a composite event. In some embodiments, the first event analyzer may generate an embedding vector of one or more features associated with the first set. In some embodiments, the first event analyzer may generate a first output signal that is indicative of whether the first set is together indicative of one or more intrusions (e.g., security anomalies, security threats, vulnerabilities, misconfigurations, compliance issues, etc.) that are severe enough to be alerted on by data platform 500 (and/or any other suitable platform). The first event analyzer may determine a numerical value associated with the first set of one or more events (e.g., a value indicative of a degree of affiliation among the first set), and output the first output signal based on whether the numerical value exceeds a predetermined threshold.

In some embodiments, the first analysis heuristic may be implemented by a first machine learning model (e.g., machine learning model 1248) configured to generate the first output signal. The first machine learning model may be implemented to identify connections between different types of events and event data to recognize complex attack patterns in large amounts of data that would be difficult for a human programmer to parse in the same way or to gain the same insights. The first machine learning model may be trained on the event data (e.g., sequences of command line inputs that are indicative of an intrusion) and/or previous event data indicative of events that occurred previously. The first machine learning model may be continuously tuned and refined over time as new event data is observed to correlate with various types of anomalies and/or security threats.

The first machine learning model may be implemented by any suitable machine learning algorithm, such as one or more decision tree learning algorithms, association rule learning algorithms, artificial neural network learning algorithms, deep learning algorithms, bitmap algorithms, and/or any other suitable machine learning technique. In some embodiments, the first machine learning model may be implemented by one or more neural networks, such as one or more deep convolutional neural networks (CNN) using internal memories of its respective kernels (filters), recurrent neural networks (RNN), and/or long/short term memory neural networks (LSTM).

In some embodiments, the first machine learning model may be implemented by a gen-AI algorithm configured to generate the first output signal, such as one or more large language model (LLM) algorithms, autoencoder algorithms, long short-term memory network (LSTM) algorithms, generative adversarial network (GAN) algorithms, and/or deep belief network (DBN) algorithms. In some embodiments, the gen-AI algorithm may generate recommended sets of events within the first set for further analysis by the first event analyzer (and/or any other suitable event analyzer). For example, the gen-AI algorithm may analyze unlabeled event data (e.g., sequences of command land strings that may be indicative of intrusions) to generate a recommend set of events (e.g., by determining that the sequences of command land strings are likely to be part of an intrusion). In some embodiments, the gen-AI algorithm may generate further training data for training the first event analyzer (and/or any other suitable event analyzers). For example, the gen-AI algorithm may generate a training dataset by generating variations of event data (e.g., variations of a command line string that is likely to be indicative of an intrusion). In some embodiments, the gen-AI algorithm may generate a set of rules indicating a pattern of events (e.g., a decision tree). The set of rules may be implemented for determining future output signals based on future event data.

In some embodiments, the first analysis heuristic may be implemented programmatically (i.e., without a machine learning model), such as based on expert knowledge or previously identified threats. For example, an entity such as a user and/or administrator may manually identify an event data as being highly correlated with a specific anomaly and/or security threat.

At operation 1306, data platform 500 may analyze, using a second event analyzer that operates in accordance with a second analysis heuristic, a second set of one or more events included in the plurality of events to generate a second output signal. The second event analyzer and the second analysis heuristic may be implemented in accordance with any of the implementations described herein, such as the first event analyzer and the first analysis heuristic. For example, the second analysis heuristic may be implemented by a second machine learning model (e.g., a gen-AI model) configured to generate the second output signal. In some embodiments, the first analysis heuristic may be configured in accordance with a first common characteristic of the first set of one or more events, and the second analysis heuristic may be configured in accordance with a second common characteristic of the second set of one or events different from the first common characteristic.

At operation 1308, data platform 500 may analyze, using a third event analyzer that operates in accordance with a third analysis heuristic, the first and second output signals to generate a composite alert signal indicative of whether the first set of one or more events and the second set of one or more events are together indicative of one or more intrusions that are severe enough to be alerted on by the data platform. The third event analyzer and the third analysis heuristic may be implemented in accordance with any of the implementations described herein, such as the first event analyzer and the first analysis heuristic. For example, the third analysis heuristic may be implemented by a third machine learning model (e.g., a gen-AI model) configured to generate the composite alert signal. In some embodiments, the third analysis heuristic may be configured in accordance with a third common characteristic of the third set of one or more events different from the first and second common characteristics.

At operation 1310, data platform 500 may perform, based on the composite alert signal, an alert-based operation with respect to the plurality of events. The alert-based operation may include any suitable operation associated with alerting an entity of the composite alert signal. In some embodiments, for example, the alert-based operation may include presenting a security alert associated with the composite alert signal within a user interface (e.g., user interface 1004). The user interface may display the security alert in accordance with any of the implementations described herein. For example, the user interface may present one or more presentation planes indicating the composite alert signal. In some embodiments, the user interface may present a plurality of selectable items (e.g., within the presentation planes) each associated with a different feature of the composite alert signal, such as individual events, composite events, and/or prioritized alerts. For example, a user presented with the user interface may select, from the plurality of selectable items, an individual evidence item of interest associated with the composite alert signal. The user interface may then present content associated with the event of interest.

In some embodiments, the user interface may present the security alert based on a characteristic associated with the composite alert signal satisfying one or more predetermined criteria. For example, the user interface may present the security alert based on the composite alert signal exceeding a significance threshold (e.g., a predetermined likelihood of a security threat and/or intrusion). In other examples, the user interface may present the security alert based on the composite alert signal indicating one or more prioritized security threats (e.g., by presenting a high-priority tier of security alerts). The user interface may abstain from presenting the security alert within a user interface based on a characteristic associated with the composite alert signal failing to satisfy one or more predetermined criteria. For example, the user interface may abstain from presenting the security alert based on the composite alert signal failing to exceed the significance threshold. In other examples, the user interface may abstain from presenting the security alert or present a low-priority tier of security alerts based on the composite alert signal indicating an absence of one or more prioritized security threats.

In some embodiments, method 1300 may include any number of additional and/or alternative operations in accordance with the needs of a particular implementation. For example, method 1300 may further include data platform 500 analyzing, using a fourth event analyzer that operates in accordance with a fourth analysis heuristic, the composite alert signal to generate contextual information associated with the composite alert signal. The fourth event analyzer and the fourth analysis heuristic may be implemented in accordance with any of the implementations described herein, such as the first event analyzer and the first analysis heuristic. For example, the fourth event analyzer may be implemented by a gen-AI algorithm configured to generate the contextual information.

The contextual information may include any suitable information describing one or more contextual aspects of the composite alert signal, such as a recommended remedial action associated with the composite alert signal (e.g., a recommendation for preventing a security threat associated with the composite alert signal, a recommendation for preventing a related security threat in the future, etc.), an inference associated with the composite alert signal (e.g., a inferred motive of a security threat associated with the composite alert signal, a plan of attack for the security threat, etc.) an evidence item associated with the composite alert signal (e.g., events, composite events, etc.), a relevance level of an evidence item associated with the composite alert signal, a significance level associated with a security alert associated with the composite alert signal, and/or narrative information associated with the composite alert signal. In some embodiments, the contextual information may be generated based on an isolated composite alert signal. In some embodiments, the contextual information may be generated based on a sequence of composite alert signals.

The contextual information may be presented in any suitable format within the user interface, such as a timeline indicating an order of events associated with the composite alert signal, a narrative description associated with the composite alert signal, a description associated with individual evidence items (e.g., individual events, composite events, etc.) associated with the composite alert signal, and/or a threat identifier indicating a security threat associated with the composite alert signal. In some embodiments, the contextual information may be auto-generated in a textual format (e.g., a narrative description) by a gen-AI model (e.g., a LLM). In some embodiments, the contextual information may be presented together with information associated with a security alert associated with the composite alert signal (e.g., within the user interface). In this manner, the contextual information may provide contextual support for the composite alert signal so that users may gain a strong and comprehensive understanding of any anomalies associated with the composite alert signal and how to secure the compute environment.

Figure 14A:
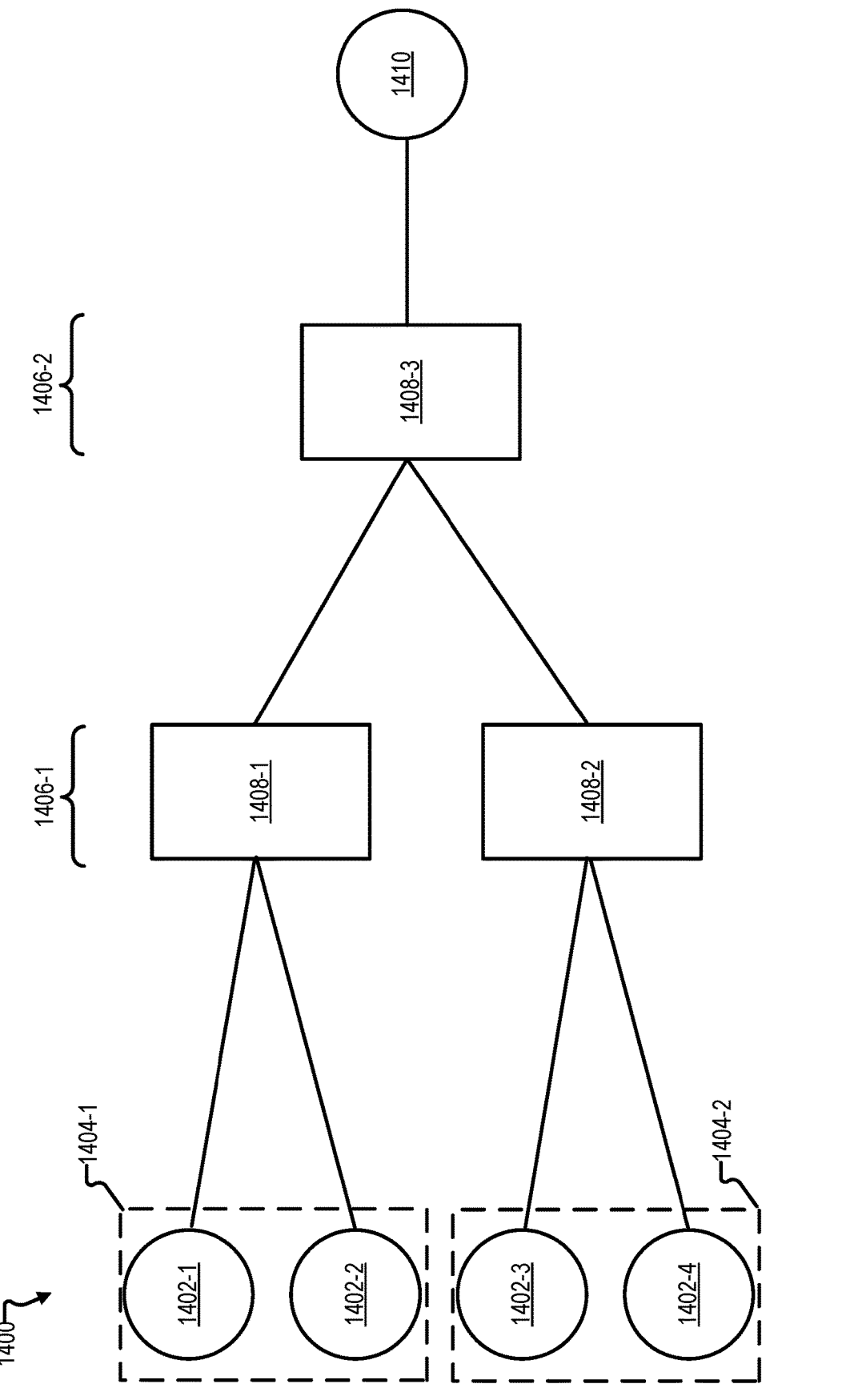
FIG. 14A illustrates an example implementation of a multi-stage system that may be incorporated within the data platform illustrated in FIG. 13.

FIG. 14A illustrates an example implementation of a multi-stage system 1400 configured to perform multi-stage composite event processing for a compute environment. Multi-stage system 1400 may be incorporated within data platform 500 to perform any of the implementations described herein. For example, multi-stage system 1400 may be configured to perform any of the operations of method 1300 to generate composite alert signals.

Multi-stage system 400 may access (e.g., at operation 1302) event data representative of a plurality of events 1402 (e.g., events 1402-1 to 1402-4) that occur within a compute environment. The event data may be categorized into one or more sets 1404 (e.g., sets 1401-1 and 1401-2) by a component of multi-stage system 400 and/or any other suitable component. Each set may include one or more events within events 1402 that are determined to be affiliated with one another.

Multi-stage system 400 may provide the event data to one or more event analyzers 1408 (e.g., event analyzers 1408-1 and 1408-2). Each event analyzer 1408 may be implemented in accordance with any of the implementations described herein. Event analyzers 1408 may be organized into one or more processing stages 1406 (e.g., processing stages 1406-1 and 1406-2). While multi-stage system 400 is illustrated as including two processing stages, it is to be appreciated that multi-stage system 400 may include any number of processing stages in accordance with the demands of a particular implementation. Each processing stage 1406 may include one or more event analyzers 1408. As illustrated, for example, processing stage 1406-1 may include event analyzers 1408-1 and 1408-2, and processing stage 1406-2 may include event analyzer 1406-3. Processing stage 1406-1 may be configured to receive events 1402 as input. As illustrated, for example, event analyzer 1408-1 may be configured to receive events 1402-1 and 1402-2 as set 1404-1 (e.g., at operation 1304), and event analyzer 1408-2 may be configured to receive events 1402-3 and 1402-4 as set 1404-2 (e.g., at operation 1306).

Processing stage 1406-2 may receive one or more output signals from processing stage 1406-1 as input. As illustrated, for example, event analyzer 1408-3 may receive the one or more output signals from processing stage 1406-1 as input. Each event analyzer 1408 in processing stage 1406-1 may output an output signal for processing stage 1406-2. Processing stage 1406-2 may output (e.g., at operation 1308) a composite alert signal 1410 indicative of whether sets 1404 are together indicative of one or more intrusions that are severe enough to be alerted on by data platform 500.

Figure 14B:
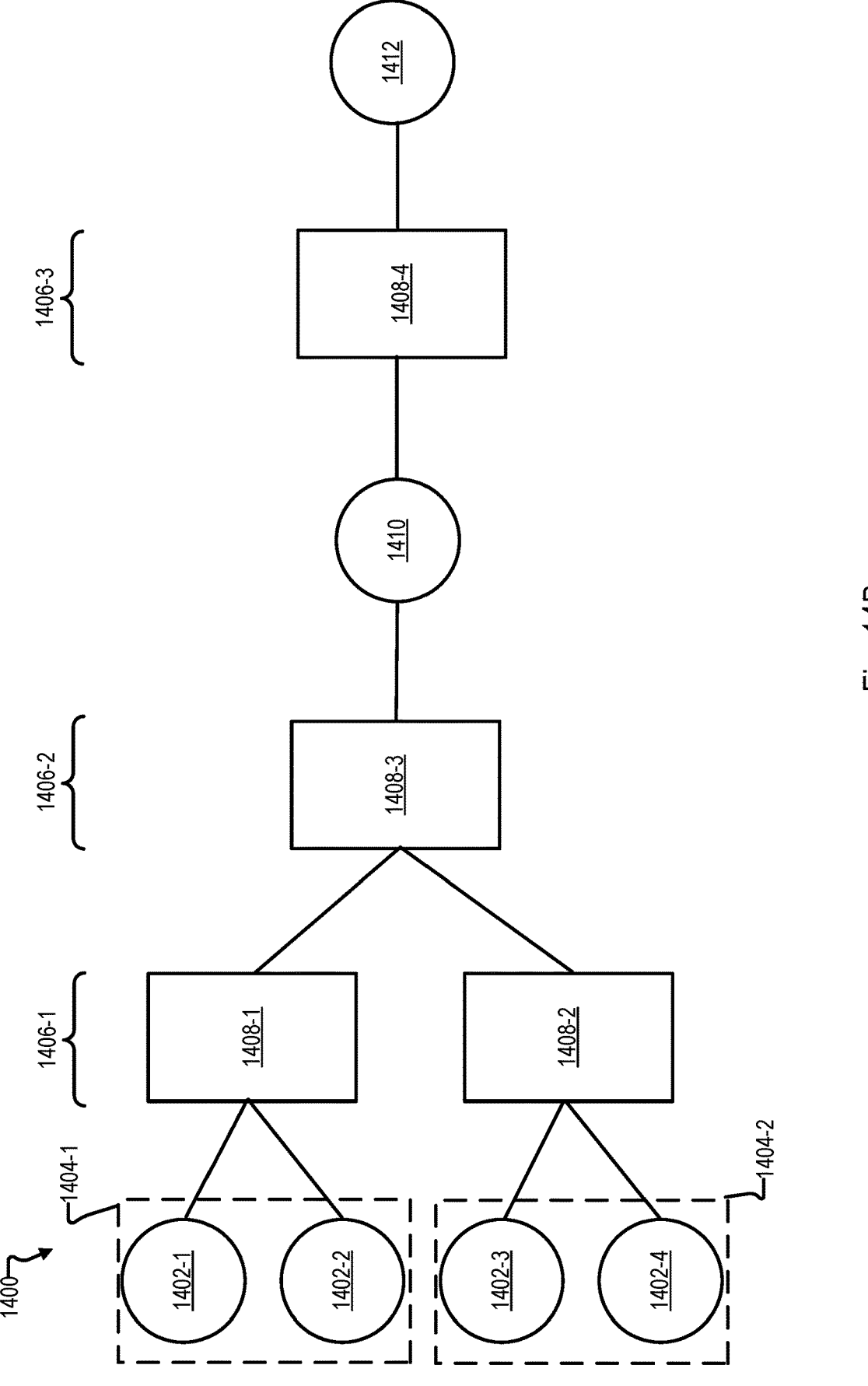
FIG. 14B illustrates an example implementation of a multi-stage system that may be incorporated within the data platform illustrated in FIG. 13.

FIG. 14B illustrates an example implementation of multi-stage system 1400. As illustrated, multi-stage system 1400 may include a processing stage 1406-3 configured to generate contextual information 1412 associated with composite alert signal 1410. Processing stage 1406-3 may include event analyzer 1408-4 (or any number of suitable event analyzers) configured to receive composite alert signal 1410 as input and generate contextual information 1412 as an output. While generating contextual information 1412 is illustrated as being a processing stage of multi-stage system 1400, it is to be appreciated that contextual information 1412 may be generated within any suitable system and/or environment (e.g., a remote processing facility).

In some embodiments, contextual information 1412 may be presented within a user interface (e.g., user interface 1004). Contextual information 1412 may be presented together with any suitable information, such as a security alert associated with composite alert signal 1410. The user interface may present contextual information 1412 in accordance with any of the implementations described herein. In some embodiments, for example, the user interface may present a narrative summary describing contextual information 1412.

In some embodiments, the user interface may present a set of metrics indicating a set of output signals and/or evidence items associated with composite alert signal 1410. For example, the metrics may include a set of numerical and/or graphical indicators each indicating a relevant significance of a corresponding output signal and/or evidence item (e.g., output signals associated with event analyzers 1408) associated with composite alert signal 1410. In some embodiments, the user interface may present a set of narrative summaries associated with the metrics. Each narrative summary may be associated with a corresponding output signal and/or evidence item. Each narrative summary may include information and/or data for giving context and support to a corresponding metric, such as events associated with the metric, a degree of accuracy for the metric, identities of entities associated with the metric, and/or criteria used for determining the metric.

Figure 15:
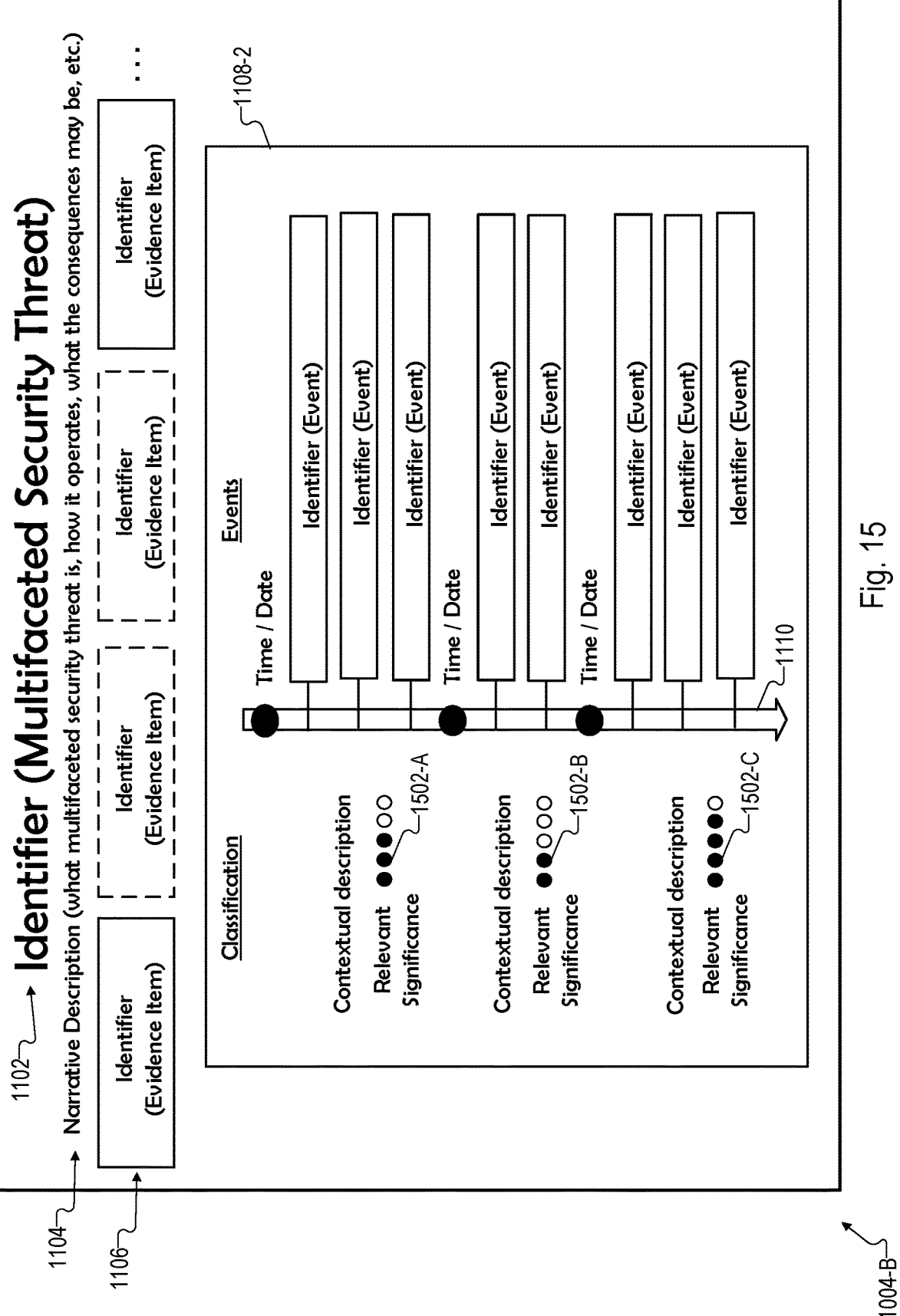
FIG. 15 illustrates an example implementation of a user interface that may be presented by a data platform to facilitate interactive analysis of composite alert signals within a compute environment.

To illustrate, FIG. 15 illustrates an example implementation of user interface 1004. Specifically, FIG. 15 illustrates user interface 1004-D as an example implementation of user interface 1004. User interface 1004-D may be similar to any of the implementations of user interface 1004 described herein, such as user interfaces 1004-A to 1004-C. Any combination of components of user interface 1004-D may be generated by any of the models and/or systems described herein. For example, narrative description 1104 may be automatically generated by a gen-AI model implemented as part of a multi-stage system (e.g., multi-stage system 1400). Similarly, contextual descriptions of one or more output signals of a multi-stage system (e.g., multi-stage system 1400) may be generated by a gen-AI model and then displayed at user interface 1004-D.

In some implementations, user interface 1004-D may display a set of indicators 1502 (e.g., indicators 1502-A to 1502-C) indicating relevant significance levels of one or more output signals (e.g., evidence items 1106). For example, as shown, indicators 1502 may indicate a significance level from 1 to 5, with 1 being the least significant and 5 being the most significant. However, it is to be appreciated that indicators 1502 may indicate the relevant significance levels in any suitable manner, such as a percentage and/or a color-coded alert.

What is claimed is:

1. A method comprising:
accessing, by a data platform monitoring a compute environment, event data representative of a plurality of events that occur within the compute environment;
analyzing, by the data platform using a first event analyzer that operates in accordance with a first analysis heuristic, a first set of one or more events included in the plurality of events to generate a first output signal;
analyzing, by the data platform using a second event analyzer that operates in accordance with a second analysis heuristic, a second set of one or more events included in the plurality of events to generate a second output signal;
analyzing, by the data platform using a third event analyzer that operates in accordance with a third analysis heuristic, the first and second output signals to generate a composite alert signal indicative of whether the first set of one or more events and the second set of one or more events are together indicative of one or more intrusions that are severe enough to be alerted on by the data platform; and
performing, by the data platform based on the composite alert signal, an alert-based operation with respect to the plurality of events.

2. The method of claim 1, wherein:
the first output signal is indicative of whether the first set of one or more events are together indicative of one or more intrusions that are severe enough to be alerted on by the data platform, and
the second output signal is indicative of whether the first second of one or more events are together indicative of one or more intrusions that are severe enough to be alerted on by the data platform.

3. The method of claim 1, wherein:
the first analysis heuristic comprises a first machine learning model, the second analysis heuristic comprises a second machine learning model, and the third analysis heuristic comprises a third machine learning model.

4. The method of claim 3, wherein one or more of the first, second, or third trained machine learning models comprises one or more large language models configured to perform generative artificial intelligence operations.

5. The method of claim 3, wherein one or more of the first, second, or third trained machine learning models are configured to be trained on training sets generated by generative artificial intelligence.

6. The method of claim 1, wherein the first analysis heuristic is configured in accordance with a first common characteristic of the first set of one or more events, the second analysis heuristic is configured in accordance with a second common characteristic of the second set of one or events different from the first common characteristic, and the third analysis heuristic is configured in accordance with a third common characteristic of the third set of one or events different from the first and second common characteristics.

7. The method of claim 1, further comprising:

analyzing, by the data platform using a fourth event analyzer that operates in accordance with a fourth analysis heuristic, the composite alert signal to generate contextual information associated with the composite alert signal.

8. The method of claim 7, wherein the performing the alert-based operation comprises presenting the contextual information together with information associated with an alert associated with the composite alert signal within a user interface.

9. The method of claim 7, wherein the contextual information includes one or more of a recommended remedial action associated with the composite alert signal, a feature associated with the composite alert signal, a significance level associated with the feature, or a narrative description associated with the composite alert signal.

10. The method of claim 7, wherein the fourth analysis heuristic comprises a large language model configured to perform generative artificial intelligence operations.

11. The method of claim 1, wherein the performing the alert-based operation comprises presenting a security alert within a user interface based on a characteristic associated with the composite alert signal satisfying one or more predetermined criteria.

12. The method of claim 1, wherein the performing the alert-based operation comprises abstaining from presenting a security alert within a user interface based on a characteristic associated with the composite alert signal failing to satisfy one or more predetermined criteria.

13. The method of claim 1, wherein the performing the alert-based operation further comprises presenting a plurality of selectable items each associated with a different facet of the composite alert signal.

14. The method of claim 1, wherein:

the first set of one or more events is initiated within the compute environment by a first entity, and the second set of one or more events is initiated within the compute environment by a second entity.

15. The method of claim 1, wherein the event data is collected using one or more agents deployed within the computing environment.

16. The method of claim 1, wherein the event data is collected using one or more agentless configurations.

17. A computer program product embodied in a non-transitory computer-readable storage medium and comprising computer instructions for a data platform to perform a process comprising:

accessing event data representative of a plurality of events that occur within a compute environment;

analyzing, using a first event analyzer that operates in accordance with a first analysis heuristic, a first set of one or more events included in the plurality of events to generate a first output signal;

analyzing, using a second event analyzer that operates in accordance with a second analysis heuristic, a second set of one or more events included in the plurality of events to generate a second output signal;

analyzing, using a third event analyzer that operates in accordance with a third analysis heuristic, the first and second output signals to generate a composite alert signal indicative of whether the first set of one or more events and the second set of one or more events are together indicative of one or more intrusions that are severe enough to be alerted on; and performing, based on the composite alert signal, an alert-based operation with respect to the plurality of events.

18. The computer program product of claim 17, wherein:

the first output signal is indicative of whether the first set of one or more events are together indicative of one or more intrusions that are severe enough to be alerted on by the data platform, and the second output signal is indicative of whether the first second of one or more events are together indicative of one or more intrusions that are severe enough to be alerted on by the data platform.

19. The computer program product of claim 17, wherein the process further comprises:

analyzing, by the data platform using a fourth event analyzer that operates in accordance with a fourth analysis heuristic, the composite alert signal to generate contextual information associated with the composite alert signal.

20. A system comprising:

memory storing instructions; and one or more processors communicatively coupled to the memory and configured to execute the instructions to perform a process comprising:

accessing event data representative of a plurality of events that occur within a compute environment;

analyzing, using a first event analyzer that operates in accordance with a first analysis heuristic, a first set of one or more events included in the plurality of events to generate a first output signal;

analyzing, using a second event analyzer that operates in accordance with a second analysis heuristic, a second set of one or more events included in the plurality of events to generate a second output signal;

analyzing, using a third event analyzer that operates in accordance with a third analysis heuristic, the first and second output signals to generate a composite alert signal indicative of whether the first set of one or more events and the second set of one or more events are together indicative of one or more intrusions that are severe enough to be alerted on; and performing, based on the composite alert signal, an alert-based operation with respect to the plurality of events.

* * * * *